US011858952B2

(12) United States Patent
Sung et al.

(10) Patent No.: US 11,858,952 B2
(45) Date of Patent: *Jan. 2, 2024

(54) COMPOUND AND COLOR CONVERSION FILM COMPRISING SAME

(71) Applicant: LG CHEM, LTD., Seoul (KR)

(72) Inventors: Jiyeon Sung, Daejeon (KR); Hieu Leduy, Daejeon (KR); Sang Pil Moon, Daejeon (KR); Hoyong Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 458 days.

This patent is subject to a terminal disclaimer.

(21) Appl. No.: 17/270,933

(22) PCT Filed: Oct. 15, 2019

(86) PCT No.: PCT/KR2019/013487

§ 371 (c)(1),
(2) Date: Feb. 24, 2021

(87) PCT Pub. No.: WO2020/080784

PCT Pub. Date: Apr. 23, 2020

(65) Prior Publication Data

US 2021/0347790 A1 Nov. 11, 2021

(30) Foreign Application Priority Data

Oct. 15, 2018 (KR) ........................ 10-2018-0122401

(51) Int. Cl.
*C07F 5/02* (2006.01)
*C09K 9/02* (2006.01)
(Continued)

(52) U.S. Cl.
CPC ................ *C07F 5/027* (2013.01); *C09K 9/02* (2013.01); *G02B 5/23* (2013.01); *G02F 1/1336* (2013.01); *G02F 1/133509* (2013.01)

(58) Field of Classification Search
CPC ......... C07F 5/027; C09K 9/02; G02F 1/1336; G02F 1/133509; G02B 5/23
See application file for complete search history.

(56) References Cited

U.S. PATENT DOCUMENTS 6,337,536 B1 1/2002 Matsubara et al.
2016/0230961 A1 8/2016 Seo et al.
(Continued)

FOREIGN PATENT DOCUMENTS

JP 2018-53064 A 4/2018
JP 2021-512050 A 5/2021
(Continued)

OTHER PUBLICATIONS

International Search Report and Written Opinion issued for International Application No. PCT/KR2019/013487 dated Jan. 30, 2021, 10 pages.
(Continued)

*Primary Examiner* — Bijan Ahvazi
(74) *Attorney, Agent, or Firm* — ROTHWELL, FIGG, ERNST & MANBECK, P.C.

(57) ABSTRACT

The present specification relates to a compound, and a color conversion film, a backlight unit and a display apparatus including the same.

13 Claims, 1 Drawing Sheet

(51) Int. Cl.

| | |
|---|---|
| ***G02B 5/23*** | (2006.01) |
| ***G02F 1/1335*** | (2006.01) |
| ***G02F 1/13357*** | (2006.01) |

(56) References Cited

U.S. PATENT DOCUMENTS

| | | | |
|---|---|---|---|
| 2017/0260212 | A1 | 9/2017 | Lee et al. |
| 2018/0186817 | A1 | 7/2018 | Lee et al. |
| 2019/0263836 | A1 | 8/2019 | Oh et al. |
| 2021/0108133 | A1 | 4/2021 | Sung et al. |

FOREIGN PATENT DOCUMENTS

| | | | | |
|---|---|---|---|---|
| KR | 10-2000-0011622 A | 2/2000 | | |
| KR | 10-2016-0044153 A | 4/2016 | | |
| KR | 10-1778378 B1 | 7/2016 | | |
| KR | 10-2016-0097146 A | 8/2016 | | |
| KR | 10-2017-0049360 A | 5/2017 | | |
| KR | 10-2018-0013798 A | 2/2018 | | |
| KR | 10-2018-0026340 A | 3/2018 | | |
| WO | WO-2017164155 A1 * | 9/2017 | ................ | F21S 2/00 |

OTHER PUBLICATIONS

Zhao et al., "Stepwise Polychlorination of 8-chloro-BODIPY and Regioselective Functionalization of 2,3,5,6,8-bentachloro-BODIPY", Journal of Organic Chemistry, 2015, 80(16), 8377-8383.

Zhao et al., "Enhanced Hypsochromic Shifts, Quantum Yield, and π-π Interactions in a meso,β-Heteroaryl-Fused BODIPY", Journal of Organic Chemistry, 2017, 82, 3880-3885.

Roacho, et al., "Unprecedented One-Pot Sequential Thiolate Substitutions under Mild Conditions leading to a Red Emissive BODIPY Dye 3,5,8-tris(PhS)-BODIPY", Organic & Biomolecular Chemistry, 2015, 13, 995-999.

* cited by examiner

【FIG. 1】
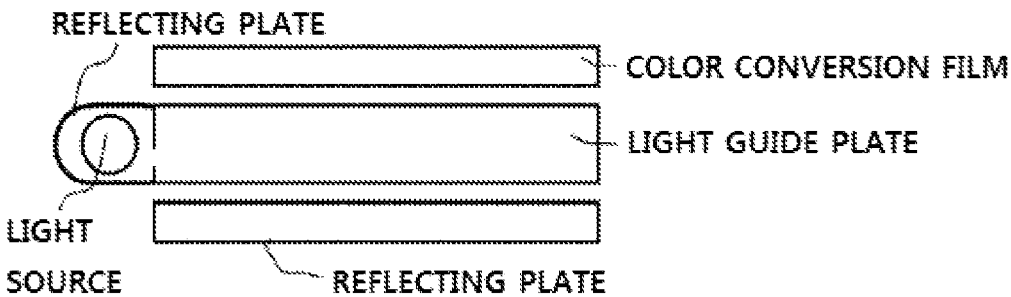
【FIG. 2】
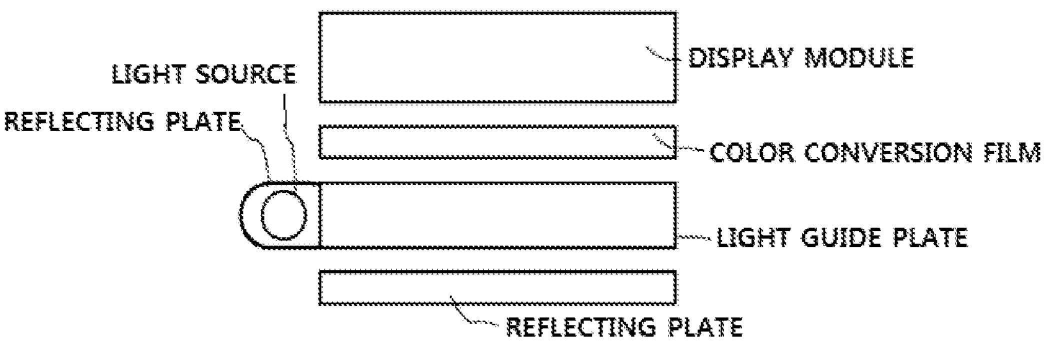

COMPOUND AND COLOR CONVERSION FILM COMPRISING SAME

This application is a 35 U.S.C. 371 National Phase Entry Application from PCT/KR2019/013487, filed on Oct. 15, 2019, designating the United States and claiming priority to and the benefits of Korean Patent Application No. 10-2018-0122401 filed with the Korean Intellectual Property Office on Oct. 15, 2018, the entire contents of which are incorporated herein by reference.

TECHNICAL FIELD

The present specification relates to a compound, and a color conversion film, a backlight unit and a display apparatus including the same.

BACKGROUND OF THE INVENTION

Existing light emitting diodes (LED) are obtained by mixing a green phosphorescent substance and a red phosphorescent substance to a blue light emitting diode, or mixing a yellow phosphorescent substance and a blue-green phosphorescent substance to a UV light emitting diode. However, with such a method, it is difficult to control colors, and therefore, color rendering is not favorable. Accordingly, color gamut declines.

In order to overcome such color gamut decline and reduce production costs, methods of obtaining green and red in a manner of filming quantum dots and binding the dots to a blue LED have been recently tried. However, cadmium series quantum dots have safety problems, and other quantum dots have significantly decreased efficiency compared to cadmium series quantum dots. In addition, quantum dots have reduced stability for oxygen and water, and have a disadvantage in that the performance is significantly degraded when aggregated. Furthermore, unit costs of production are high since, when producing quantum dots, maintaining the sizes is difficult.

BRIEF SUMMARY OF THE INVENTION

The present disclosure provides a compound, and a color conversion film, a backlight unit and a display apparatus including the same.

One embodiment of the present specification provides a compound represented by the following Chemical Formula 1.

[Chemical Formula 1]

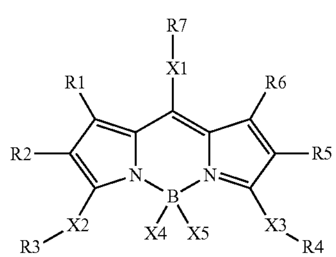

In Chemical Formula 1,

X1 to X3 are the same as or different from each other, and each independently O or S, X4 and X5 are the same as or different from each other, and each independently a halogen group; CN; a substituted or unsubstituted alkoxy group; a substituted or unsubstituted alkenyl group; a substituted or unsubstituted alkynyl group; a substituted or unsubstituted aryl group; a substituted or unsubstituted aryloxy group; or a substituted or unsubstituted heteroaryl group, R1 and R6 are the same as or different from each other, and each independently hydrogen; deuterium; a halogen group; CN; a substituted or unsubstituted alkyl group; a substituted or unsubstituted cycloalkyl group; a substituted or unsubstituted alkoxy group; a substituted or unsubstituted aryloxy group; a substituted or unsubstituted aryl group; or a substituted or unsubstituted heteroaryl group, R2 and R5 are the same as or different from each other, and each independently a substituted or unsubstituted ester group; a substituted or unsubstituted aryl group; or a substituted or unsubstituted heteroaryl group, R3 and R4 are the same as or different from each other, and each independently a substituted or unsubstituted alkyl group; a substituted or unsubstituted cycloalkyl group; a substituted or unsubstituted aryl group; or a substituted or unsubstituted heteroaryl group, and R7 is a substituted or unsubstituted aryl group; or a substituted or unsubstituted heteroaryl group.

Another embodiment of the present specification provides a color conversion film including a resin matrix; and the compound represented by Chemical Formula 1 dispersed into the resin matrix.

Another embodiment of the present specification provides a backlight unit including the color conversion film.

Another embodiment of the present specification provides a display apparatus including the backlight unit.

ADVANTAGEOUS EFFECTS

A compound according to one embodiment of the present specification is, as well as having high fluorescence efficiency, stable for water or oxygen, and has lower unit costs of production compared to quantum dots. Accordingly, by using a compound represented by Chemical Formula 1 described in the present specification as a fluorescent substance of a color conversion film, a color conversion film having excellent luminance and color gamut, having a simple manufacturing process, and having low manufacturing costs can be provided.

BRIEF DESCRIPTION OF DRAWINGS

FIG. 1 is a mimetic diagram using a color conversion film according to one embodiment of the present specification in a backlight unit.

FIG. 2 is a mimetic diagram illustrating a structure of a display apparatus according to one embodiment of the present specification.

DETAILED DESCRIPTION OF THE INVENTION

Hereinafter, the present application will be described in more detail.

One embodiment of the present specification provides a compound represented by Chemical Formula 1.

In the present specification, a certain part "including" certain constituents means capable of further including other constituents, and does not exclude other constituents unless particularly stated on the contrary.

In the present specification, one member being placed "on" another member includes not only a case of the one member being in contact with the another member but a case of still another member being present between the two members.

Examples of substituents in the present specification are described below, however, the substituents are not limited thereto.

The term "substitution" means a hydrogen atom bonding to a carbon atom of a compound is changed to another substituent, and the position of substitution is not limited as long as it is a position at which the hydrogen atom is substituted, that is, a position at which a substituent can substitute, and when two or more substituents substitute, the two or more substituents may be the same as or different from each other.

The term "substituted or unsubstituted" in the present specification means being substituted with one, two or more substituents selected from the group consisting of hydrogen; deuterium; a halogen group; a cyano group; a nitro group; a carbonyl group; an imide group; an amide group; an ester group; a hydroxyl group; an amine group; a substituted or unsubstituted alkyl group; a substituted or unsubstituted cycloalkyl group; a substituted or unsubstituted alkoxy group; a substituted or unsubstituted aryloxy group; a substituted or unsubstituted alkenyl group; a substituted or unsubstituted alkynyl group; a substituted or unsubstituted aryl group; a substituted or unsubstituted alkylthioxy group; a substituted or unsubstituted arylthioxy group; a substituted or unsubstituted alkylsulfoxy group; and a substituted or unsubstituted heteroaryl group, or being substituted with a substituent linking two or more substituents among the substituents illustrated above, or having no substituents. For example, "a substituent linking two or more substituents" may include a biphenyl group. In other words, a biphenyl group may be an aryl group, or interpreted as a substituent linking two phenyl groups.

In the present specification,

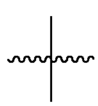 and mean a site bonding to other substituents or bonding sites.

In the present specification, examples of the halogen group may include fluorine, chlorine, bromine or iodine.

In the present specification, the number of carbon atoms of the imide group is not particularly limited, but is preferably from 1 to 30.

In the present specification, in the amide group, nitrogen of the amide group may be substituted with hydrogen, a linear, branched or cyclic alkyl group having 1 to 30 carbon atoms, or an aryl group having 6 to 30 carbon atoms.

In the present specification, in the ester group, oxygen of the ester group may be substituted with a linear, branched or cyclic alkyl group having 1 to 25 carbon atoms; or a monocyclic or polycyclic aryl group having 6 to 30 carbon atoms. Specifically, compound having a structure such as —C(═O)ORa or —O(C═O)Ra may be included, and in this case, Ra is a substituted or unsubstituted alkyl group, a substituted or unsubstituted aryl group, or a substituted or unsubstituted heteroaryl group.

In the present specification, the number of carbon atoms of the carbonyl group is not particularly limited, but is preferably from 1 to 30. Specifically, compounds having a structure such as —C(═O)Rb may be included, and in this case, Rb is hydrogen or an alkyl group, however, the carbonyl group is not limited thereto.

In the present specification, the alkyl group may be linear or branched, and although not particularly limited thereto, the number of carbon atoms is preferably from 1 to 30. Specific examples thereof may include methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, cyclopentylmethyl, cyclohexylmethyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 2-methylpentyl, 4-methylhexyl, 5-methylhexyl and the like, but are not limited thereto.

In the present specification, the cycloalkyl group is not particularly limited, but preferably has 3 to 30 carbon atoms, and specific examples thereof may include cyclopropyl, cyclobutyl, cyclopentyl, 3-methylcyclopentyl, 2,3-dimethylcyclopentyl, cyclohexyl, 3-methylcyclohexyl, 4-methylcyclohexyl, 2,3-dimethylcyclohexyl, 3,4,5-trimethylcyclohexyl, 4-tert-butylcyclohexyl, cycloheptyl, cyclooctyl and the like, but are not limited thereto.

In the present specification, the alkoxy group may be linear, branched or cyclic. The number of carbon atoms of the alkoxy group is not particularly limited, but is preferably from 1 to 30. Specific examples thereof may include methoxy, ethoxy, n-propoxy, isopropoxy, i-propyloxy, n-butoxy, isobutoxy, tert-butoxy, sec-butoxy, n-pentyloxy, neopentyloxy, isopentyloxy, n-hexyloxy, 3,3-dimethylbutyloxy, 2-ethylbutyloxy, n-octyloxy, n-nonyloxy, n-decyloxy, benzyloxy, p-methylbenzyloxy and the like, but are not limited thereto.

In the present specification, the alkenyl group may be linear or branched, and although not particularly limited thereto, the number of carbon atoms is preferably from 2 to 30. Specific examples thereof may include vinyl, 1-propenyl, isopropenyl, 1-butenyl, 2-butenyl, 3-butenyl, 1-pentenyl, 2-pentenyl, 3-pentenyl, 3-methyl-1-butenyl, 1,3-butadienyl, allyl, 1-phenylvinyl-1-yl, 2-phenylvinyl-1-yl, 2,2-diphenylvinyl-1-yl, 2-phenyl-2-(naphthyl-1-yl)vinyl-1-yl, 2,2-bis(diphenyl-1-yl)vinyl-1-yl, a stilbenyl group, a styrenyl group and the like, but are not limited thereto.

In the present specification, the alkynyl group may be linear or branched, and although not particularly limited thereto, the number of carbon atoms is preferably from 2 to 30. Specific examples thereof may include an alkynyl group such as ethynyl, propynyl, 2-methyl-2-propynyl, 2-butynyl or 2-pentynyl, but are not limited thereto.

In the present specification, the amine group may be selected from the group consisting of $—NH_2$; a monoalkylamine group; a dialkylamine group; an N-alkylarylamine group; a monoarylamine group; a diarylamine group; an N-arylheteroarylamine group; an N-alkylheteroarylamine group, a monoheteroarylamine group and a diheteroarylamine group, and although not particularly limited thereto, the number of carbon atoms is preferably from 1 to 30. Specific examples of the amine group may include a methylamine group, a dimethylamine group, an ethylamine group, a diethylamine group, a phenylamine group, a naphthylamine group, a biphenylamine group, an anthracenylamine group, a 9-methyl-anthracenylamine group, a diphenylamine group, a ditolylamine group, an N-phenyltolylamine group, a triphenylamine group, an N-phenylbiphenylamine group; an N-phenylnaphthylamine group; an N-biphenylnaphthylamine group; an N-naphthylfluorenylamine group; an N-phenylphenanthrenylamine group; an N-biphenylphenanthrenylamine group; an N-phenylfluorenylamine group; an N-phenylterphenylamine group; an N-phenanthrenylfluorenylamine group; an N-biphenylfluorenylamine group and the like, but are not limited thereto.

In the present specification, the N-alkylarylamine group means an amine group in which N of the amine group is substituted with an alkyl group and an aryl group.

In the present specification, the N-arylheteroarylamine group means an amine group in which N of the amine group is substituted with an aryl group and a heteroaryl group.

In the present specification, the N-alkylheteroarylamine group means an amine group in which N of the amine group is substituted with an alkyl group and a heteroaryl group.

In the present specification, the alkyl group in the alkylamine group, the N-alkylarylamine group, the alkylthioxy group, the alkylsulfoxy group and the N-alkylheteroarylamine group is the same as the examples of the alkyl group described above. Specific examples of the alkylthioxy group may include a methylthioxy group, an ethylthioxy group, a tert-butylthioxy group, a hexylthioxy group, an octylthioxy group and the like, and specific examples of the alkylsulfoxy group may include mesyl, an ethylsulfoxy group, a propylsulfoxy group, a butylsulfoxy group and the like, however, the alkylthoixy group and the alkylsulfoxy group are not limited thereto.

In the present specification, the aryl group is not particularly limited, but preferably has 6 to 30 carbon atoms, and the aryl group may be monocyclic or polycyclic.

When the aryl group is a monocyclic aryl group, the number of carbon atoms is not particularly limited, but is preferably from 6 to 30. Specific examples of the monocyclic aryl group may include a phenyl group, a biphenyl group, a terphenyl group and the like, but are not limited thereto.

When the aryl group is a polycyclic aryl group, the number of carbon atoms is not particularly limited, but is preferably from 10 to 30. Specific examples of the polycyclic aryl group may include a naphthyl group, an anthracenyl group, a phenanthryl group, a triphenyl group, a pyrenyl group, a perylenyl group, a chrysenyl group, a fluorenyl group and the like, but are not limited thereto.

In the present specification, the fluorenyl group may be substituted, and adjacent substituents may bond to each other to form a ring.

When the fluorenyl group is substituted,

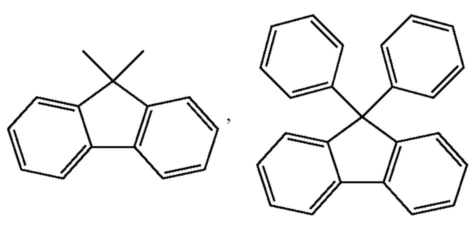

and the like may be included. However, the structure is not limited thereto.

In the present specification, the aryl group in the aryloxy group, the arylthioxy group, the N-alkylarylamine group and the N-arylheteroarylamine group is the same as the examples of the aryl group described above. Specific examples of the aryloxy group may include phenoxy, p-tolyloxy, m-tolyloxy, 3,5-dimethyl-phenoxy, 2,4,6-trimethylphenom p-tert-butylphenoxy, 3-biphenyloxy, 4-biphenyloxy, 1-naphthyloxy, 2-naphthyloxy, 4-methyl-1-naphthyloxy, 5-methyl-2-naphthyloxy, 1-anthryloxy, 2-anthryloxy, 9-anthryloxy, 1-phenanthryloxy, 3-phenanthryloxy, 9-phenanthryloxy and the like, and specific examples of the arylthioxy group may include a phenylthioxy group, a 2-methylphenylthioxy group, a 4-tert-butylphenylthioxy group and the like, however, the aryloxy group and the arylthioxy group are not limited thereto.

In the present specification, the heteroaryl group is a group including one or more atoms that are not carbon, that is, heteroatoms, and specifically, the heteroatom may include one or more atoms selected from the group consisting of O, N, Se, S and the like. The number of carbon atoms is not particularly limited, but is preferably from 2 to 30, and the heteroaryl group may be monocyclic or polycyclic. Examples of the heteroaryl group may include a thiophene group, a furanyl group, a pyrrole group, an imidazolyl group, a thiazolyl group, an oxazolyl group, an oxadiazolyl group, a pyridine group, a bipyridine group, a pyrimidine group, a triazinyl group, a triazolyl group, an acridyl group, a pyridazinyl group, a pyrazinyl group, a quinolinyl group, a quinazolinyl group, a quinoxalinyl group, a phthalazinyl group, a pyridopyrimidyl group, a pyridopyrazinyl group, a pyrazinopyrazinyl group, an isoquinolinyl group, an indolyl group, a carbazolyl group, a benzoxazolyl group, a benzimidazolyl group, a benzothiazolyl group, a benzocarbazolyl group, a benzothiophene group, a dibenzothiophene group, a benzofuranyl group, a phenanthrolinyl group, an isoxazolyl group, a thiadiazolyl group, a phenothiazinyl group, a dibenzofuranyl group, a chromene group and the like, but are not limited thereto.

In the present specification, the heteroaryl group may be monocyclic or polycyclic, may be aromatic or a fused ring of aromatic and aliphatic, and may be selected from among the examples of the heterocyclic group.

In the present specification, an "adjacent" group may mean a substituent substituting an atom directly linked to an atom substituted by the corresponding substituent, a substituent sterically most closely positioned to the corresponding substituent, or another substituent substituting an atom substituted by the corresponding substituent. For example, two substituents substituting ortho positions in a benzene ring, and two substituents substituting the same carbon in an aliphatic ring may be interpreted as groups "adjacent" to each other.

In the present specification, the meaning of "adjacent groups bond to each other to form a ring" among substituents means adjacent groups bonding to each other to form a substituted or unsubstituted hydrocarbon ring; or a substituted or unsubstituted heteroring.

One embodiment of the present specification provides a compound represented by the following Chemical Formula 1.

[Chemical Formula 1]

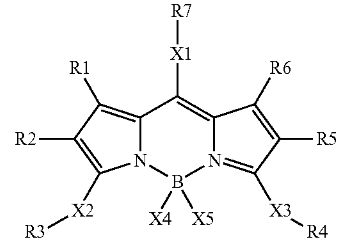

In Chemical Formula 1,

X1 to X3 are the same as or different from each other, and each independently O or S, X4 and X5 are the same as or different from each other, and each independently a halogen group; CN; a substituted or unsubstituted alkoxy group; a substituted or unsubstituted alkenyl group; a substituted or unsubstituted alkynyl group; a substituted or unsubstituted aryl group; a substituted or unsubstituted aryloxy group; or a substituted or unsubstituted heteroaryl group, R1 and R6 are the same as or different from each other, and each independently hydrogen; deuterium; a halogen group; CN; a substituted or unsubstituted alkyl group; a substituted or unsubstituted cycloalkyl group; a substituted or unsubstituted alkoxy group; a substituted or unsubstituted aryloxy group; a substituted or unsubstituted aryl group; or a substituted or unsubstituted heteroaryl group, R2 and R5 are the same as or different from each other, and each independently a substituted or unsubstituted ester group; a substituted or unsubstituted aryl group; or a substituted or unsubstituted heteroaryl group, R3 and R4 are the same as or different from each other, and each independently a substituted or unsubstituted alkyl group; a substituted or unsubstituted cycloalkyl group; a substituted or unsubstituted aryl group; or a substituted or unsubstituted heteroaryl group, and R7 is a substituted or unsubstituted aryl group; or a substituted or unsubstituted heteroaryl group.

According to one embodiment of the present specification, Chemical Formula 1 is represented by any one of the following Chemical Formulae 1-1 to 1-4.

[Chemical Formula 1-1]

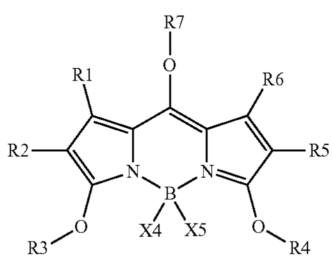

[Chemical Formula 1-2]

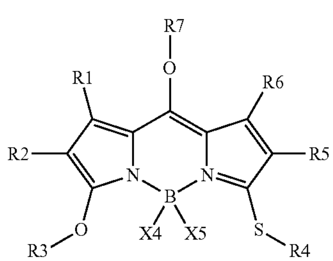

[Chemical Formula 1-3]

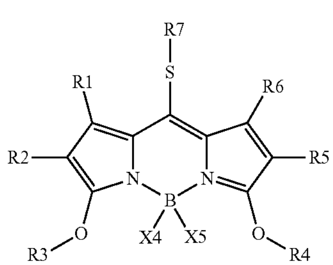

-continued

[Chemical Formula 1-4]

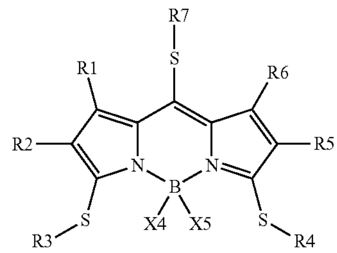

In Chemical Formulae 1-1 to 1-4, R1 to R7, X4 and X5 have the same definitions as in Chemical Formula 1.

In one embodiment of the present specification, X1 to X3 are the same as or different from each other, and each independently O or S.

In one embodiment of the present specification, X1 to X3 are O.

In another embodiment, X1 is O, and X2 and X3 are S.

In another embodiment, X1 to X3 are S.

In another embodiment, X1 is S, and X2 and X3 are O.

In one embodiment of the present specification, X4 and X5 are the same as or different from each other, and each independently a halogen group; CN; a substituted or unsubstituted alkoxy group; a substituted or unsubstituted alkenyl group; a substituted or unsubstituted alkynyl group; a substituted or unsubstituted aryl group; a substituted or unsubstituted aryloxy group; or a substituted or unsubstituted heteroaryl group.

In one embodiment of the present specification, X4 and X5 are the same as or different from each other, and each independently a halogen group; CN; an alkoxy group unsubstituted or substituted with a halogen group; an alkynyl group unsubstituted or substituted with a substituted or unsubstituted aryl group; an aryl group unsubstituted or substituted with a nitro group; an aryloxy group; or a heteroaryl group.

In one embodiment of the present specification, X4 and X5 are the same as or different from each other, and each independently fluorine; CN; an n-butoxy group substituted with a halogen group; an ethynyl group substituted with a substituted or unsubstituted aryl group; a phenyl group unsubstituted or substituted with a nitro group; a substituted or unsubstituted phenoxy group; or a pyridine group.

In one embodiment of the present specification, X4 and X5 are the same as or different from each other, and each independently fluorine; CN; an n-butoxy group substituted with fluorine; an ethynyl group substituted with a phenyl group unsubstituted or substituted with an alkyl group; a phenyl group unsubstituted or substituted with $NO_2$; a phenoxy group; or a pyridine group.

In one embodiment of the present specification, R1 and R6 are the same as or different from each other, and each independently hydrogen; deuterium; a halogen group; CN; a substituted or unsubstituted alkyl group; a substituted or unsubstituted cycloalkyl group; a substituted or unsubstituted alkoxy group; a substituted or unsubstituted aryloxy group; a substituted or unsubstituted aryl group; or a substituted or unsubstituted heteroaryl group.

In one embodiment of the present specification, R1 and R6 are the same as or different from each other, and each independently hydrogen; deuterium; a halogen group; CN; an alkyl group; a cycloalkyl group unsubstituted or substituted with an alkyl group; an alkoxy group; an aryloxy group unsubstituted or substituted with a halogen group, CN, $CF_3$ or an alkyl group; an aryl group unsubstituted or substituted with a halogen group, CN, $CF_3$, an alkyl group or an alkoxy group; or a substituted or unsubstituted heteroaryl group.

In one embodiment of the present specification, R1 and R6 are the same as or different from each other, and each independently hydrogen; deuterium; chlorine; bromine; CN; a methyl group; a cycloalkyl group having 3 to 30 carbon atoms unsubstituted or substituted with an alkyl group; a methoxy group; an isopropoxy group; an aryloxy group having 6 to 30 carbon atoms unsubstituted or substituted with a halogen group, CN, $CF_3$ or an alkyl group; an aryl group having 6 to 30 carbon atoms unsubstituted or substituted with a halogen group, CN, $CF_3$, an alkyl group or an alkoxy group; a pyrrole group; a pyridine group; or a thiophene group.

In one embodiment of the present specification, R1 and R6 are the same as or different from each other, and each independently hydrogen; deuterium; chlorine; bromine; CN; a methyl group; a cyclopropyl group; a cyclobutyl group; a cyclopentyl group; a cyclohexyl group unsubstituted or substituted with an alkyl group; an aryloxy group having 6 to 30 carbon atoms unsubstituted or substituted with fluorine, CN, $CF_3$ or a methyl group; an aryl group having 6 to 30 carbon atoms unsubstituted or substituted with fluorine, CN, $CF_3$, a methyl group, a butyl group, a tert-butyl group or a methoxy group; a pyrrole group; a pyridine group; or a thiophene group.

In one embodiment of the present specification, R2 and R5 are the same as or different from each other, and each independently a substituted or unsubstituted ester group; a substituted or unsubstituted aryl group; or a substituted or unsubstituted heteroaryl group.

In one embodiment of the present specification, R2 and R5 are the same as or different from each other, and each independently —C(═O)ORa; an aryl group having 6 to 30 carbon atoms unsubstituted or substituted with one or more selected from the group consisting of a halogen group, CN, $CF_3$, —C(═O)ORa, a substituted or unsubstituted alkyl group, a substituted or unsubstituted alkoxy group, a substituted or unsubstituted amine group, a substituted or unsubstituted aryl group, and a substituted or unsubstituted heteroaryl group; or a heteroaryl group having 6 to 30 carbon atoms unsubstituted or substituted with an aryl group, and Ra is a substituted or unsubstituted alkyl group, a substituted or unsubstituted aryl group, or a substituted or unsubstituted heteroaryl group.

In one embodiment of the present specification, R2 and R5 are the same as or different from each other, and each independently —C(═O)ORa; an aryl group having 6 to 30 carbon atoms unsubstituted or substituted with one or more selected from the group consisting of a halogen group, CN, $CF_3$, —C(═O)ORa, an alkyl group unsubstituted or substituted with a halogen group, an alkoxy group, an amine group unsubstituted or substituted with an alkyl group, an aryl group having 6 to 30 carbon atoms, and a heteroaryl group having 2 to 30 carbon atoms unsubstituted or substituted with an ester group and ═O; a substituted or unsubstituted dibenzofuranyl group; a substituted or unsubstituted dibenzothiophene group; a substituted or unsubstituted carbazole group; or a substituted or unsubstituted phenanthrolinyl group, and Ra is a substituted or unsubstituted alkyl group having 1 to 30 carbon atoms, a substituted or unsubstituted aryl group having 6 to 30 carbon atoms, or a substituted or unsubstituted heteroaryl group having 6 to 30 carbon atoms.

In one embodiment of the present specification, R2 and R5 are the same as or different from each other, and each independently —C(═O)ORa; an aryl group having 6 to 20 carbon atoms unsubstituted or substituted with one or more selected from the group consisting of fluorine, chlorine, bromine, CN, $CF_3$, —C(═O)ORa, a methyl group unsubstituted or substituted with a halogen group, a propyl group, an isopropyl group, a butyl group, a tert-butyl group, a pentyl group, a hexyl group, a methoxy group, $NH_2$, a dialkylamine group, a naphthyl group, an anthracenyl group, a carbazole group, a dibenzofuranyl group, a pyridine group, and a chromene group substituted with an ester group and ═O; a dibenzofuranyl group unsubstituted or substituted with a phenyl group; a dibenzothiophene group unsubstituted or substituted with a phenyl group; a carbazole group unsubstituted or substituted with a phenyl group; or a phenanthrolinyl group, and Ra is a methyl group, a phenyl group unsubstituted or substituted with CN, or a chromene group substituted with ═O.

In one embodiment of the present specification, R3 and R4 are the same as or different from each other, and each independently a substituted or unsubstituted alkyl group; a substituted or unsubstituted cycloalkyl group; a substituted or unsubstituted aryl group; or a substituted or unsubstituted heteroaryl group.

In one embodiment of the present specification, R3 and R4 are the same as or different from each other, and each independently an alkyl group having 1 to 30 carbon atoms unsubstituted or substituted with $CF_3$; a cycloalkyl group having 1 to 30 carbon atoms unsubstituted or substituted with an alkyl group; an aryl group having 6 to 30 carbon atoms unsubstituted or substituted with one or more selected from the group consisting of a halogen group, CN, $CF_3$, —C(═O)ORa, an amine group, an alkoxy group, an alkyl group having 1 to 30 carbon atoms and a heteroaryl group having 6 to 30 carbon atoms; or a substituted or unsubstituted heteroaryl group having 6 to 30 carbon atoms, and Ra is a substituted or unsubstituted alkyl group, a substituted or unsubstituted aryl group, or a substituted or unsubstituted heteroaryl group.

In one embodiment of the present specification, R3 and R4 are the same as or different from each other, and each independently an alkyl group having 1 to 30 carbon atoms unsubstituted or substituted with $CF_3$; a cyclohexyl group unsubstituted or substituted with an alkyl group; an aryl group having 6 to 20 carbon atoms unsubstituted or substituted with one or more selected from the group consisting of a halogen group, CN, $CF_3$, —C(═O)ORa, $NH_2$, a dialkylamine group, a diphenylamine group, an alkoxy group, an alkyl group having 1 to 30 carbon atoms, a pyridine group, a dibenzofuranyl group and a carbazole group; a dibenzofuranyl group unsubstituted or substituted with an aryl group; a dibenzothiophene group unsubstituted or substituted with an aryl group; a carbazole group unsubstituted or substituted with an aryl group; or a chromene group unsubstituted or substituted with ═O, and Ra is a substituted or unsubstituted alkyl group having 1 to 30 carbon atoms.

In one embodiment of the present specification, R3 and R4 are the same as or different from each other, and each independently an alkyl group having 1 to 30 carbon atoms unsubstituted or substituted with $CF_3$; a cyclohexyl group unsubstituted or substituted with an alkyl group; an aryl group having 6 to 20 carbon atoms unsubstituted or substituted with one or more selected from the group consisting of fluorine, chlorine, CN, $CF_3$, —C(═O)ORa, $NH_2$, a dialkylamine group, a diphenylamine group, a methoxy group, a methyl group, an ethyl group, a propyl group, an isopropyl group, a butyl group, a tert-butyl group, a pentyl group, a hexyl group, a pyridine group, a dibenzofuranyl group and a carbazole group; a dibenzofuranyl group unsubstituted or substituted with a phenyl group; a dibenzothiophene group; a carbazole group unsubstituted or substituted with a phenyl group; or a chromene group substituted with ═O, and Ra is a methyl group.

In one embodiment of the present specification, R3 and R4 are the same as each other, and an alkyl group having 1 to 30 carbon atoms unsubstituted or substituted with $CF_3$; a cyclohexyl group unsubstituted or substituted with an alkyl group; an aryl group having 6 to 20 carbon atoms unsubstituted or substituted with one or more selected from the group consisting of fluorine, chlorine, CN, $CF_3$, —C(═O)ORa, $NH_2$, a dialkylamine group, a diphenylamine group, a methoxy group, a methyl group, an ethyl group, a propyl group, an isopropyl group, a butyl group, a tert-butyl group, a pentyl group, a hexyl group, a pyridine group, a dibenzofuranyl group and a carbazole group; a dibenzofuranyl group unsubstituted or substituted with a phenyl group; a dibenzothiophene group; a carbazole group unsubstituted or substituted with a phenyl group; or a chromene group substituted with ═O, and Ra is a methyl group.

In one embodiment of the present specification, R7 is a substituted or unsubstituted aryl group; or a substituted or unsubstituted heteroaryl group.

In one embodiment of the present specification, R7 is an aryl group unsubstituted or substituted with one or more selected from the group consisting of a halogen group, CN, $CF_3$, an alkoxy group, an alkyl group unsubstituted or substituted with a halogen group, a substituted or unsubstituted aryl group, and a heteroaryl group; or a heteroaryl group unsubstituted or substituted with O═.

In one embodiment of the present specification, R7 is an aryl group having 6 to 30 carbon atoms unsubstituted or substituted with one or more selected from the group consisting of fluorine, chlorine, CN, $CF_3$, an alkoxy group, an alkyl group having 1 to 30 carbon atoms unsubstituted or substituted with a halogen group, an aryl group and a heteroaryl group; a pyridine group; a dibenzofuranyl group; a dibenzothiophene group; a carbazolyl group; or

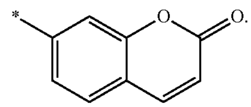 [SMILES: *c1ccc2ccc(=O)oc2c1]

In one embodiment of the present specification, R7 is an aryl group having 6 to 20 carbon atoms unsubstituted or substituted with one or more selected from the group consisting of fluorine, chlorine, CN, $CF_3$, a methoxy group, an alkyl group having 1 to 30 carbon atoms unsubstituted or substituted with fluorine or chlorine, a naphthyl group, a dibenzofuranyl group and a pyridine group; a pyridine group; a dibenzofuranyl group; a dibenzothiophene group; a carbazolyl group; or

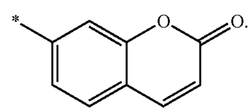

In one embodiment of the present specification, X1 to X5 of Chemical Formula 1 may be selected from the following Tables 1-1 to 1-4, R1, R6 and R7 of Chemical Formula 1 may be selected from the following Tables 2-1 to 2-9, and R2 to R5 of Chemical Formula 1 may be selected from the following Tables 3-1 to 3-14.

TABLE 1-1

| | $X_4$ | $X_5$ | $X_1$ | $X_2$ | $X_3$ |
|---|---|---|---|---|---|
| A1 | F | F | O | O | O |
| A2 | F | CN | O | O | O |
| A3 | CN | CN | O | O | O |
| A4 | 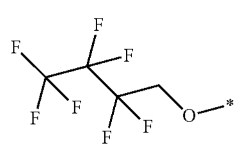 | 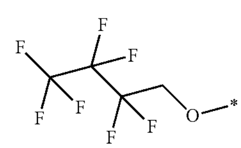 | O | O | O |
| A5 | 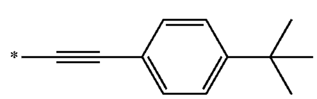 | 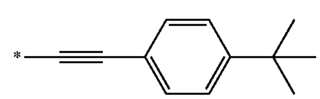 | O | O | O |
| A6 | 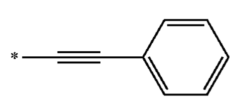 | 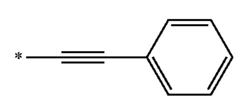 | O | O | O |
| A7 | 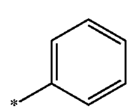 | 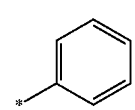 | O | O | O |
| A8 | 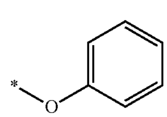 | 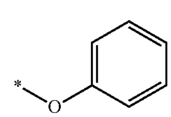 | O | O | O |

TABLE 1-1-continued
| | $X_4$ | $X_5$ | $X_1$ | $X_2$ | $X_3$ |
|---|---|---|---|---|---|
| A9 | 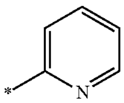 | 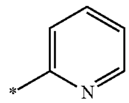 | O | O | O |
| A10 | 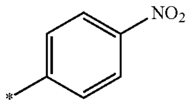 | 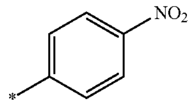 | O | O | O |
TABLE 1-2
| | $X_4$ | $X_5$ | $X_1$ | $X_2$ | $X_3$ |
|---|---|---|---|---|---|
| A11 | F | F | O | S | S |
| A12 | F | CN | O | S | S |
| A13 | CN | CN | O | S | S |
| A14 | 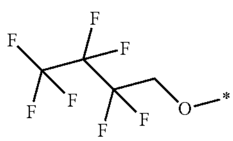 | 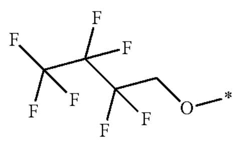 | O | S | S |
| A15 | 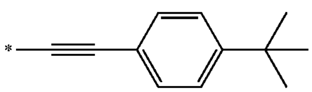 | 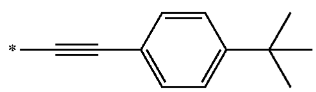 | O | S | S |
| A16 | 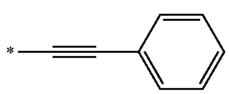 | 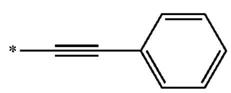 | O | S | S |
| A17 | 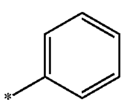 | 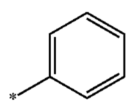 | O | S | S |
| A18 | 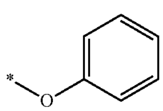 | 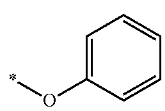 | O | S | S |
| A19 | 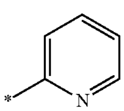 | 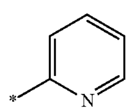 | O | S | S |
| A20 | 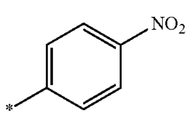 | 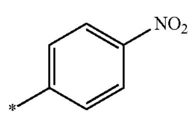 | S | S | S |
TABLE 1-3
| | $X_4$ | $X_5$ | $X_1$ | $X_2$ | $X_3$ |
|---|---|---|---|---|---|
| A21 | F | F | S | O | O |
| A22 | F | CN | S | O | O |
| A23 | CN | CN | S | O | O |

TABLE 1-3-continued
| | $X_4$ | $X_5$ | $X_1$ | $X_2$ | $X_3$ |
|---|---|---|---|---|---|
| A24 | 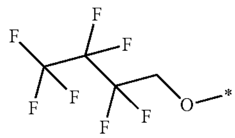 | 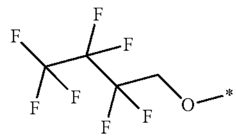 | S | O | O |
| A25 | 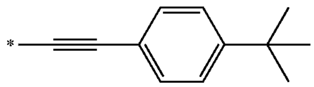 | 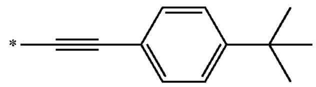 | S | O | O |
| A26 | 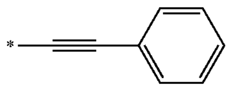 | 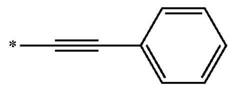 | S | O | O |
| A27 | 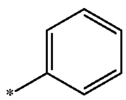 | 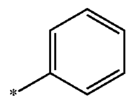 | S | O | O |
| A28 | 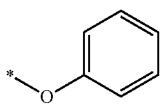 | 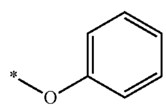 | S | O | O |
| A29 | 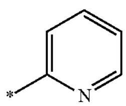 | 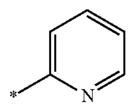 | S | O | O |
| A30 | 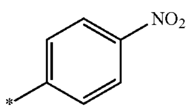 | 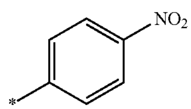 | S | O | O |
TABLE 1-4
| | $X_4$ | $X_5$ | $X_1$ | $X_2$ | $X_3$ |
|---|---|---|---|---|---|
| A31 | F | F | S | S | S |
| A32 | F | CN | S | S | S |
| A33 | CN | CN | S | S | S |
| A34 | 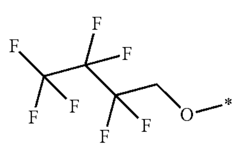 | 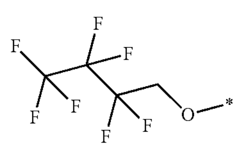 | S | S | S |
| A35 | 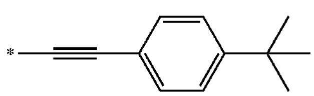 | 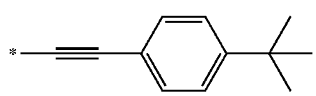 | S | S | S |
| A36 | 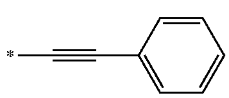 | 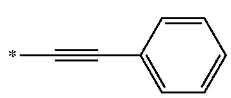 | S | S | S |
| A37 | 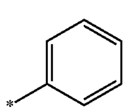 | 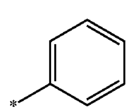 | S | S | S |

TABLE 1-4-continued
| | $X_4$ | $X_5$ | $X_1$ | $X_2$ | $X_3$ |
|---|---|---|---|---|---|
| A38 | 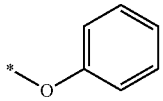 | 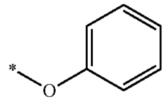 | S | S | S |
| A39 | 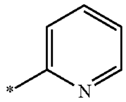 | 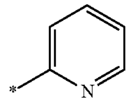 | S | S | S |
| A40 | 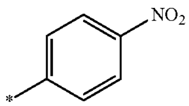 | 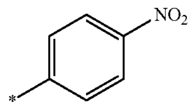 | S | S | S |
TABLE 2-1
| | | $R_7$ | | | |
|---|---|---|---|---|---|
| $R_1$ | $R_6$ | 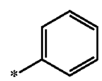 | 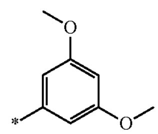 | 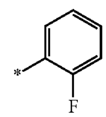 | 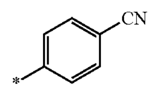 |
| H | H | B1 | B2 | B3 | B4 |
| Cl | H | B5 | B6 | B7 | B8 |
| Cl | Cl | B9 | B10 | B11 | B12 |
| Br | Br | B13 | B14 | B15 | B16 |
| H | CN | B17 | B18 | B19 | B20 |
| H | *— | B21 | B22 | B23 | B24 |
| *— | *— | B25 | B26 | B27 | B28 |
| H |  | B29 | B30 | B31 | B32 |
| H | 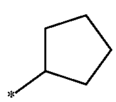 | B33 | B34 | B35 | B36 |
| H | 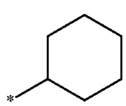 | B37 | B38 | B39 | B40 |
|  |  | B41 | B42 | B43 | B44 |
| 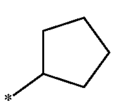 | 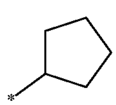 | B45 | B46 | B47 | B48 |
| 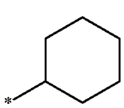 | 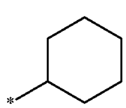 | B49 | B50 | B51 | B52 |
| H | 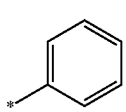 | B53 | B54 | B55 | B56 |

TABLE 2-1-continued
| | | $R_7$ | | | |
|---|---|---|---|---|---|
| $R_1$ | $R_6$ | 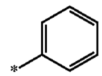 | 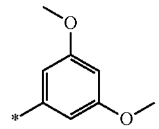 | 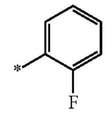 | 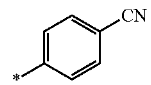 |
| H | 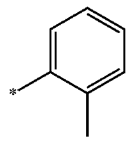 | B57 | B58 | B59 | B60 |
| H | 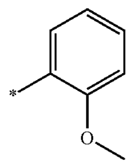 | B61 | B62 | B63 | B64 |
| H | 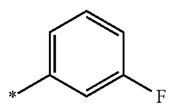 | B65 | B66 | B67 | B68 |
| H | 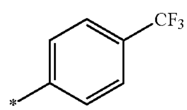 | B69 | B70 | B71 | B72 |
| H | 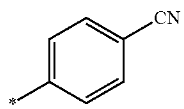 | B73 | B74 | B75 | B76 |
| H | 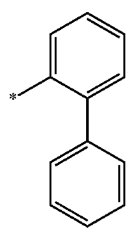 | B77 | B78 | B79 | B80 |
| 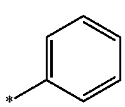 | 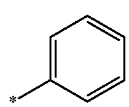 | B81 | B82 | B83 | B84 |
| 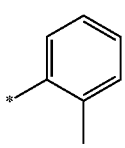 | 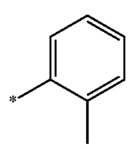 | B85 | B86 | B87 | B88 |
| 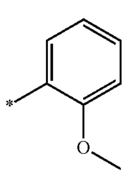 | 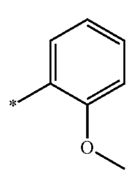 | B89 | B90 | B91 | B92 |

TABLE 2-1-continued
| | | $R_7$ | | | |
|---|---|---|---|---|---|
| $R_1$ | $R_6$ | 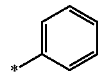 | 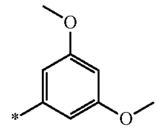 | 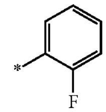 | 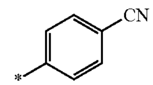 |
| 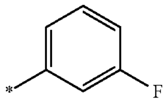 | 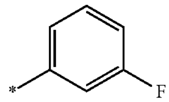 | B93 | B94 | B95 | B96 |
| 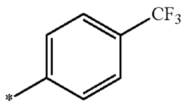 | 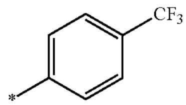 | B97 | B98 | B99 | B100 |
| 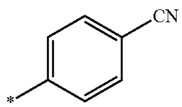 | 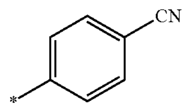 | B101 | B102 | B103 | B104 |
| 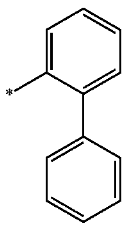 | 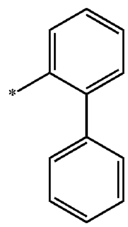 | B105 | B106 | B107 | B108 |
| H | 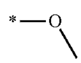 | B109 | B110 | B111 | B112 |
| H | 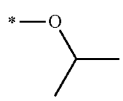 | B113 | B114 | B115 | B116 |
| 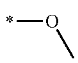 | 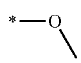 | B117 | B118 | B119 | B120 |
| 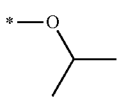 | 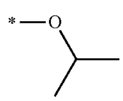 | B121 | B122 | B123 | B124 |
| H | 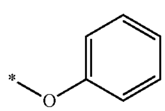 | B125 | B126 | B127 | B128 |
| H | 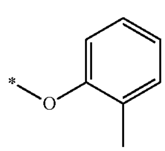 | B129 | B130 | B131 | B132 |
| H | 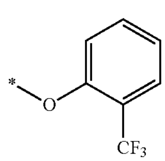 | B133 | B134 | B135 | B136 |

TABLE 2-1-continued
| R1 | R6 | R7 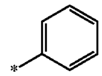 | 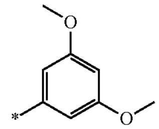 | 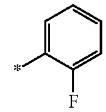 | 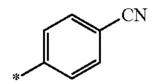 |
|---|---|---|---|---|---|
| H | 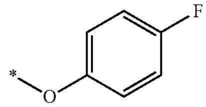 | B137 | B138 | B139 | B140 |
| H | 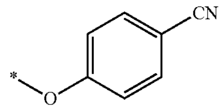 | B141 | B142 | B143 | B144 |
| H | 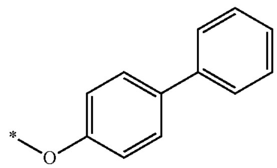 | B145 | B146 | B147 | B148 |
| 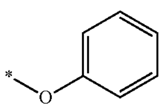 | 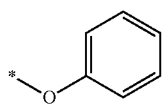 | B149 | B150 | B151 | B152 |
| 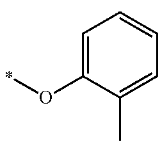 | 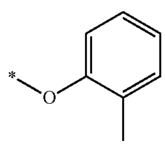 | B153 | B154 | B155 | B156 |
| 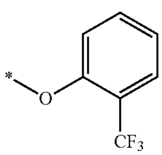 | 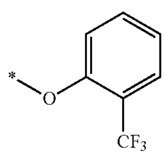 | B157 | B158 | B159 | B160 |
| 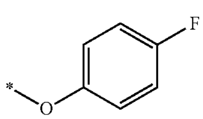 | 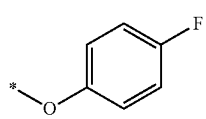 | B161 | B162 | B163 | B164 |
| 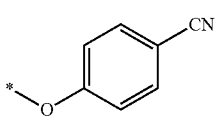 | 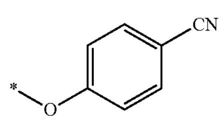 | B165 | B166 | B167 | B168 |
| 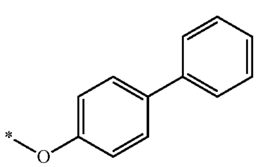 | 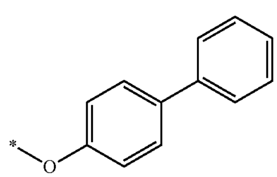 | B169 | B170 | B171 | B172 |
| 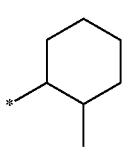 | 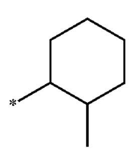 | B173 | B174 | B175 | B176 |

TABLE 2-2
| $R_1$ | $R_6$ | $R_7$ | | | |
|---|---|---|---|---|---|
| | | 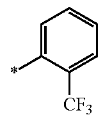 | 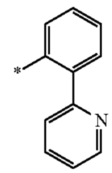 | 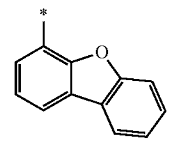 | 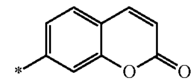 |
| H | H | B177 | B178 | B179 | B180 |
| Cl | H | B181 | B182 | B183 | B184 |
| Cl | Cl | B185 | B186 | B187 | B188 |
| Br | Br | B189 | B190 | B191 | B192 |
| H | CN | B193 | B194 | B195 | B196 |
| H | *— | B197 | B198 | B199 | B200 |
| *— | *— | B201 | B202 | B203 | B204 |
| H |  | B205 | B206 | B207 | B208 |
| H | 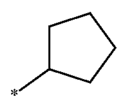 | B209 | B210 | B211 | B212 |
| H | 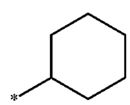 | B213 | B214 | B215 | B216 |
| 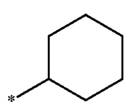 | H | B217 | B218 | B219 | B220 |
|  |  | B221 | B222 | B223 | B224 |
| 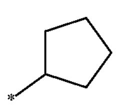 | 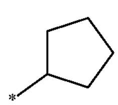 | B225 | B226 | B227 | B228 |
| 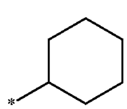 | 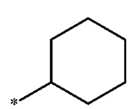 | B229 | B230 | B231 | B232 |
| H | 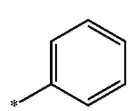 | B233 | B234 | B235 | B236 |
| H | 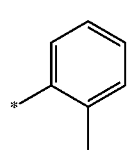 | B237 | B238 | B239 | B240 |

TABLE 2-2-continued
| | | $R_7$ | | | |
|---|---|---|---|---|---|
| $R_1$ | $R_6$ | 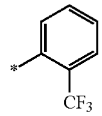 | 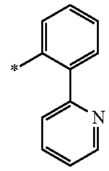 | 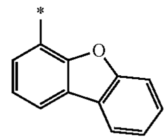 | 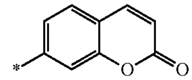 |
| H | 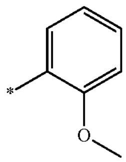 | B241 | B242 | B243 | B244 |
| H | 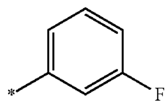 | B245 | B246 | B247 | B248 |
| H | 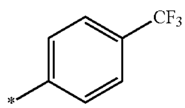 | B249 | B250 | B251 | B252 |
| H | 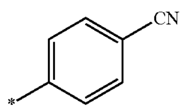 | B253 | B254 | B255 | B256 |
| H | 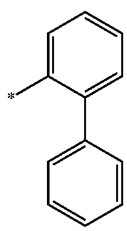 | B257 | B258 | B259 | B260 |
| 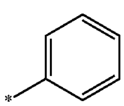 | 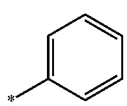 | B261 | B262 | B263 | B264 |
| 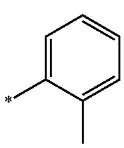 | 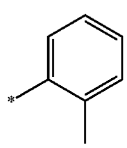 | B265 | B266 | B267 | B268 |
| 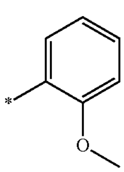 | 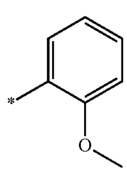 | B269 | B270 | B271 | B272 |
| 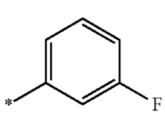 | 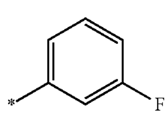 | B273 | B274 | B275 | B276 |

TABLE 2-2-continued
| | | $R_7$ | | | |
|---|---|---|---|---|---|
| $R_1$ | $R_6$ | 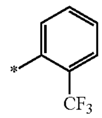 | 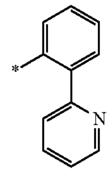 | 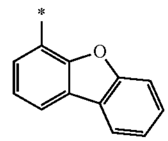 | 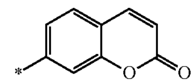 |
| 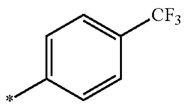 | 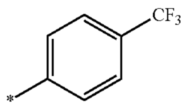 | B277 | B278 | B279 | B280 |
| 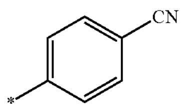 | 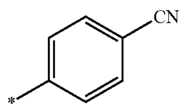 | B281 | B282 | B283 | B284 |
| 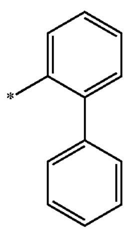 | 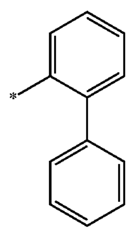 | B285 | B286 | B287 | B288 |
| H | 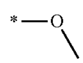 | B289 | B290 | B291 | B292 |
| H | 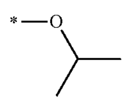 | B293 | B294 | B295 | B296 |
| 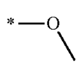 | 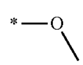 | B297 | B298 | B299 | B300 |
| 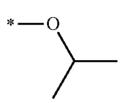 | 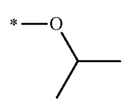 | B301 | B302 | B303 | B304 |
| H | 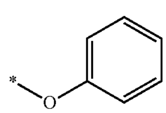 | B305 | B306 | B307 | B308 |
| H | 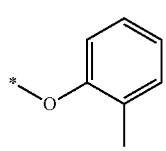 | B309 | B310 | B311 | B312 |
| H | 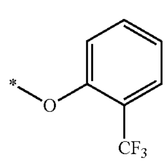 | B313 | B314 | B315 | B316 |
| H | 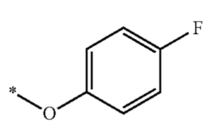 | B317 | B318 | B319 | B320 |

TABLE 2-2-continued
| | | R7 | | | |
|---|---|---|---|---|---|
| R1 | R6 | 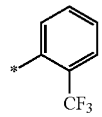 | 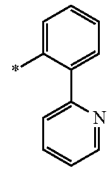 | 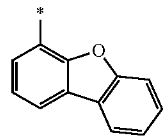 | 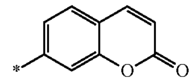 |
| H | 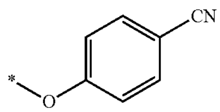 | B321 | B322 | B323 | B324 |
| 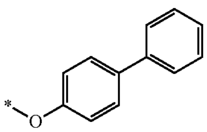 | H | B325 | B326 | B327 | B328 |
| 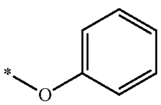 | 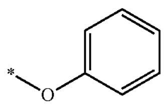 | B329 | B330 | B331 | B332 |
| 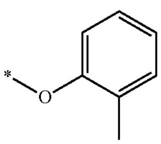 | 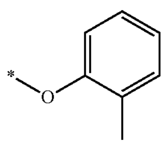 | B333 | B334 | B335 | B336 |
| 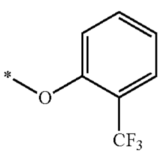 | 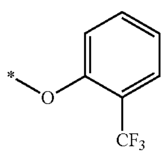 | B337 | B338 | B339 | B340 |
| 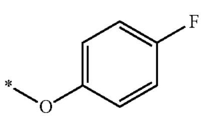 | 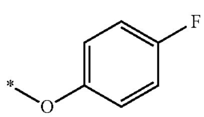 | B341 | B342 | B343 | B344 |
| 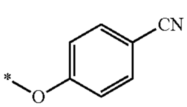 | 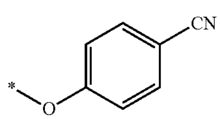 | B345 | B346 | B347 | B348 |
| 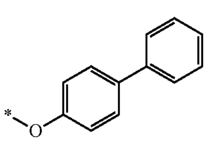 | 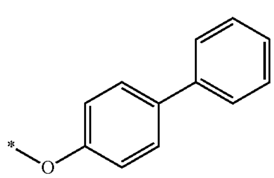 | B349 | B350 | B351 | B352 |

TABLE 2-3
| | | R7 | | | |
|---|---|---|---|---|---|
| $R_1$ | $R_6$ | 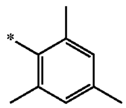 | 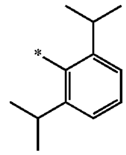 | 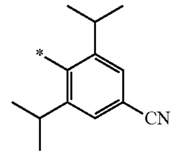 | 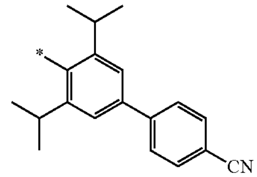 |
| H | H | B353 | B354 | B355 | B356 |
| Cl | H | B357 | B358 | B359 | B360 |
| Cl | Cl | B361 | B362 | B363 | B364 |
| Br | Br | B365 | B366 | B367 | B368 |
| H | CN | B369 | B370 | B371 | B372 |
| H | *— | B373 | B374 | B375 | B376 |
| *— | *— | B377 | B378 | B379 | B380 |
| H |  | B381 | B382 | B383 | B384 |
| H | 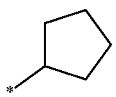 | B385 | B386 | B387 | B388 |
| H | 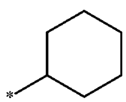 | B389 | B390 | B391 | B392 |
|  |  | B393 | B394 | B395 | B396 |
| 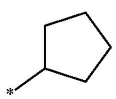 | 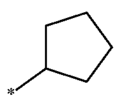 | B397 | B398 | B399 | B400 |
| 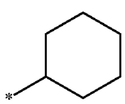 | 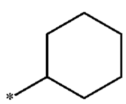 | B401 | B402 | B403 | B404 |
| H | 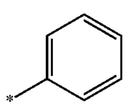 | B405 | B046 | B407 | B408 |
| H | 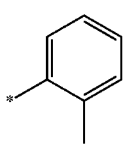 | B409 | B410 | B411 | B412 |
| H | 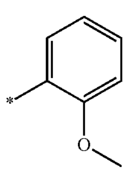 | B413 | B414 | B415 | B416 |
| H | 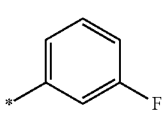 | B417 | B418 | B419 | B420 |

TABLE 2-3-continued
| | | $R_7$ | | | |
|---|---|---|---|---|---|
| | | 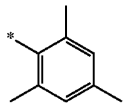 | 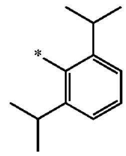 | 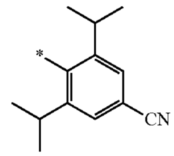 | 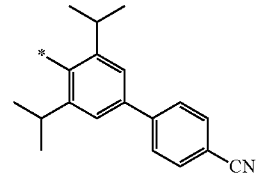 |
| $R_1$ | $R_6$ | | | | |
| H | 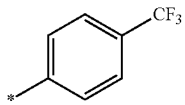 | B421 | B422 | B423 | B424 |
| H | 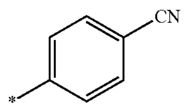 | B425 | B426 | B427 | B428 |
| H | 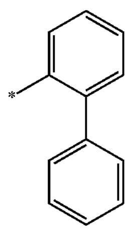 | B429 | B430 | B431 | B432 |
| 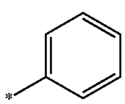 | 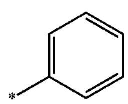 | B433 | B434 | B435 | B436 |
| 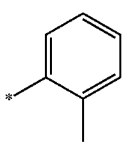 | 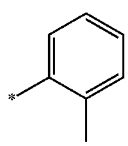 | B437 | B438 | B439 | B440 |
| 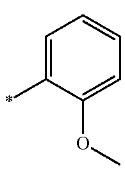 | 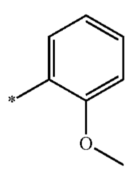 | B441 | B442 | B443 | B444 |
| 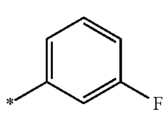 | 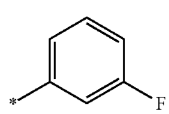 | B445 | B446 | B447 | B448 |
| 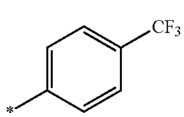 | 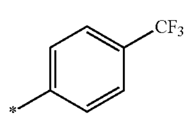 | B449 | B450 | B451 | B452 |
| 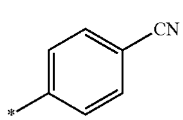 | 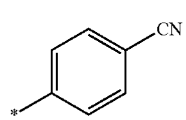 | B453 | B454 | B455 | B456 |

TABLE 2-3-continued
| | | $R_7$ | | | |
|---|---|---|---|---|---|
| $R_1$ | $R_6$ | 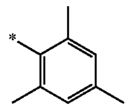 | 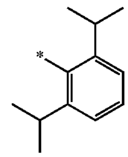 | 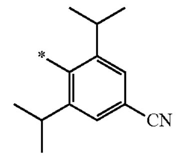 | 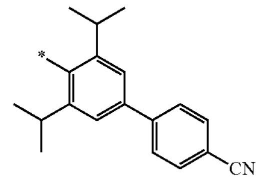 |
| 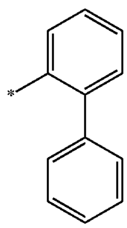 | 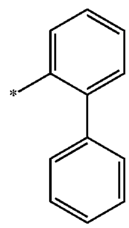 | B457 | B458 | B459 | B460 |
| H | 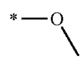 | B461 | B462 | B463 | B464 |
| H | 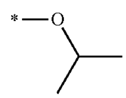 | B465 | B466 | B467 | B468 |
| 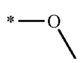 | 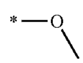 | B469 | B470 | B471 | B472 |
| 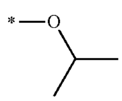 | 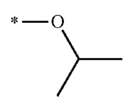 | B473 | B474 | B475 | B476 |
| H | 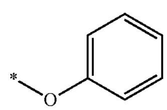 | B477 | B478 | B479 | B480 |
| H | 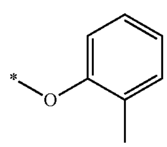 | B481 | B482 | B483 | B484 |
| H | 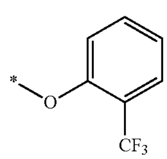 | B485 | B486 | B487 | B488 |
| H | 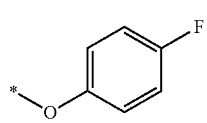 | B489 | B490 | B491 | B492 |
| H | 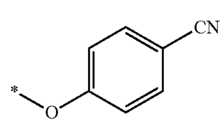 | B493 | B494 | B495 | B496 |
| H | 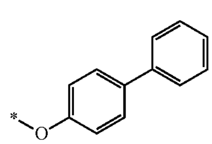 | B497 | B498 | B499 | B500 |

TABLE 2-3-continued
| $R_1$ | $R_6$ | $R_7$ | | | |
|---|---|---|---|---|---|
| | | 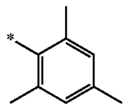 | 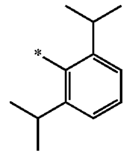 | 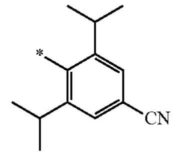 | 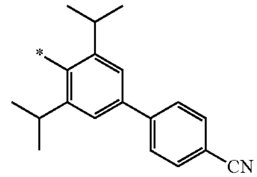 |
| 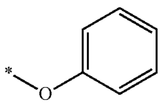 | 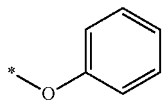 | B501 | B502 | B503 | B504 |
| 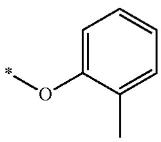 | 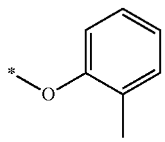 | B505 | B506 | B507 | B508 |
| 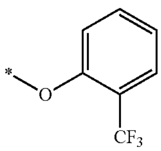 | 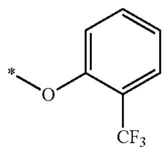 | B509 | B510 | B511 | B512 |
| 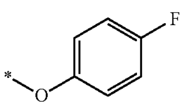 | 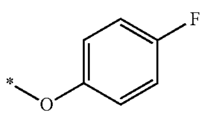 | B513 | B514 | B515 | B516 |
| 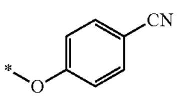 | 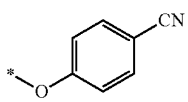 | B517 | B518 | B519 | B520 |
| 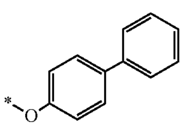 | 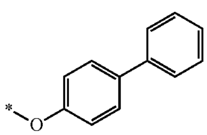 | B521 | B522 | B523 | B524 |
TABLE 2-4
| $R_1$ | $R_6$ | $R_7$ | | | |
|---|---|---|---|---|---|
| | | 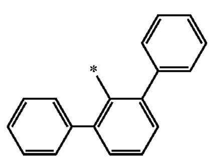 | 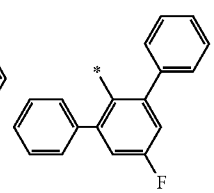 | 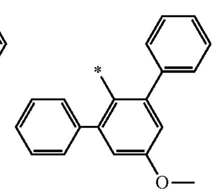 | 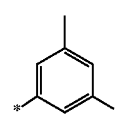 |
| H | H | B525 | B526 | B527 | B528 |
| Cl | H | B529 | B530 | B531 | B532 |
| Cl | Cl | B533 | B534 | B535 | B536 |
| Br | Br | B537 | B538 | B539 | B540 |
| H | CN | B541 | B542 | B543 | B544 |
| H | *— | B545 | B546 | B547 | B548 |
| *— | *— | B549 | B550 | B551 | B552 |
| H |  | B553 | B554 | B555 | B556 |

TABLE 2-4-continued
| | | $R_7$ | | | |
|---|---|---|---|---|---|
| $R_1$ | $R_6$ | 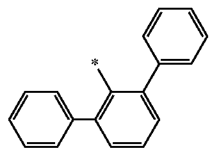 | 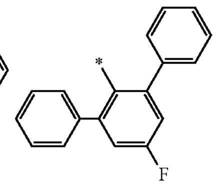 | 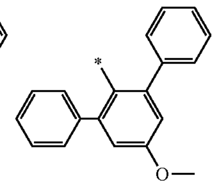 | 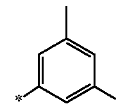 |
| H | 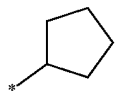 | B557 | B558 | B559 | B560 |
| H | 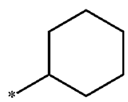 | B561 | B562 | B563 | B564 |
| 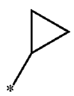 |  | B565 | B566 | B567 | B568 |
| 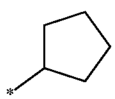 | 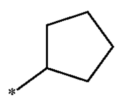 | B569 | B570 | B571 | B572 |
| 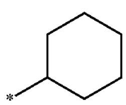 | 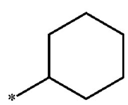 | B573 | B574 | B575 | B576 |
| H | 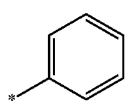 | B577 | B578 | B579 | B580 |
| 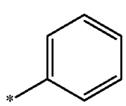 | H | B581 | B582 | B583 | B584 |
| H | 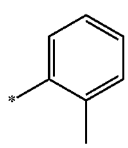 | B585 | B586 | B587 | B588 |
| H | 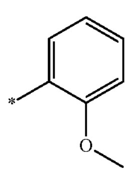 | B589 | B590 | B591 | B592 |
| H | 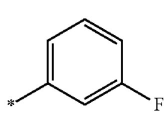 | B593 | B594 | B595 | B596 |
| H | 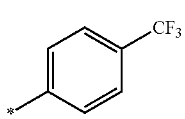 | B597 | B598 | B599 | B600 |

TABLE 2-4-continued
| | | R7 | | | |
|---|---|---|---|---|---|
| R1 | R6 | 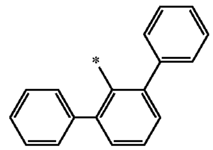 | 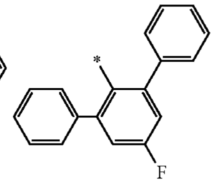 | 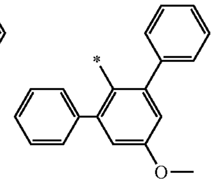 | 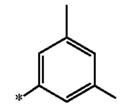 |
| H | 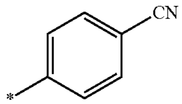 | B601 | B602 | B603 | B604 |
| H | 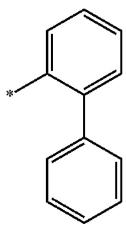 | B605 | B606 | B607 | B608 |
| 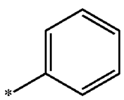 | 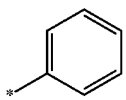 | B609 | B610 | B611 | B612 |
| 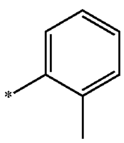 | 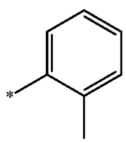 | B613 | B614 | B615 | B616 |
| 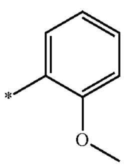 | 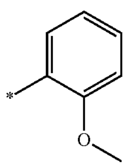 | B617 | B618 | B619 | B620 |
| 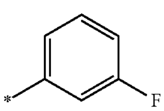 | 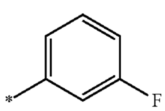 | B621 | B622 | B623 | B624 |
| 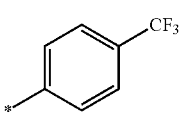 | 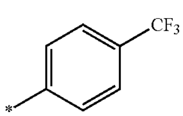 | B625 | B626 | B627 | B628 |
| 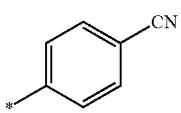 | 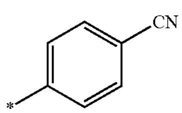 | B629 | B630 | B631 | B632 |
| 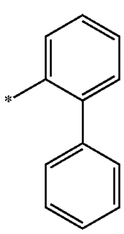 | 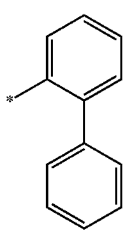 | B633 | B634 | B635 | B636 |

TABLE 2-4-continued
| R1 | R6 | R7 | | | |
|---|---|---|---|---|---|
| | | 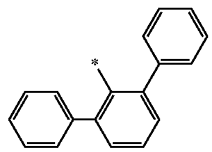 | 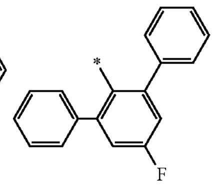 | 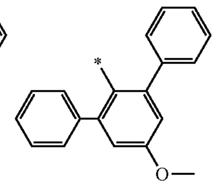 | 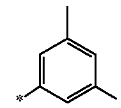 |
| H | 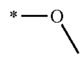 | B637 | B638 | B639 | B640 |
| H | 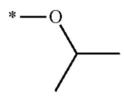 | B641 | B642 | B643 | B644 |
| 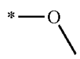 | 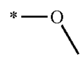 | B645 | B646 | B647 | B648 |
| 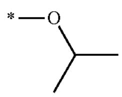 | 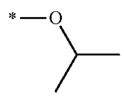 | B649 | B650 | B651 | B652 |
| H | 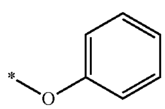 | B653 | B654 | B655 | B656 |
| H | 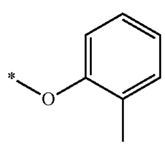 | B657 | B658 | B659 | B660 |
| H | 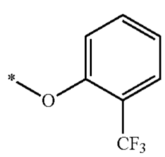 | B661 | B662 | B663 | B664 |
| H | 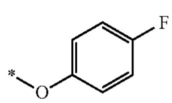 | B665 | B666 | B667 | B668 |
| H | 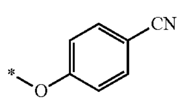 | B669 | B670 | B671 | B672 |
| H | 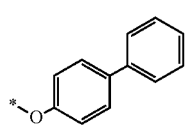 | B673 | B674 | B675 | B676 |
| 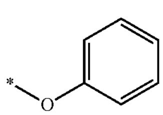 | 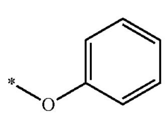 | B677 | B678 | B679 | B680 |
| 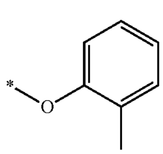 | 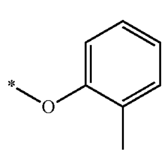 | B681 | B682 | B683 | B684 |

TABLE 2-4-continued
| R1 | R6 | R7 | | | |
|---|---|---|---|---|---|
| | | 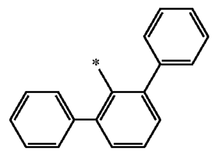 | 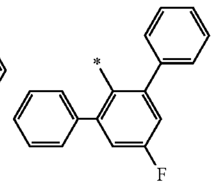 | 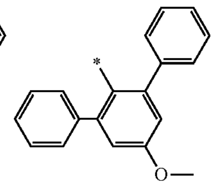 | 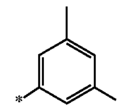 |
| 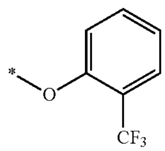 | 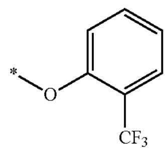 | B685 | B686 | B687 | B688 |
| 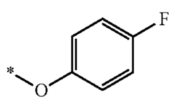 | 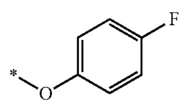 | B689 | B690 | B691 | B692 |
| 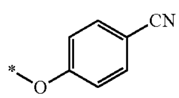 | 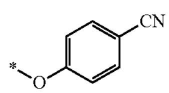 | B693 | B694 | B695 | B696 |
| 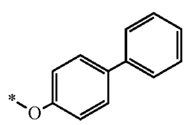 | 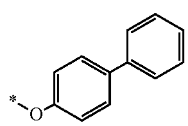 | B697 | B698 | B699 | B700 |
TABLE 2-5
| R1 | R6 | R7 | | | |
|---|---|---|---|---|---|
| | | 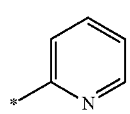 | 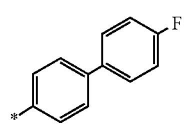 | 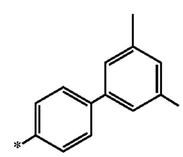 | 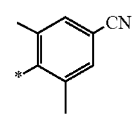 |
| H | H | B701 | B702 | B703 | B704 |
| Cl | H | B705 | B706 | B707 | B708 |
| Cl | Cl | B709 | B710 | B711 | B712 |
| Br | Br | B713 | B714 | B715 | B716 |
| H | CN | B717 | B718 | B719 | B720 |
| H | *— | B721 | B722 | B723 | B724 |
| *— | *— | B725 | B726 | B727 | B728 |
| H |  | B729 | B730 | B731 | B732 |
| H | 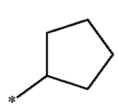 | B733 | B734 | B735 | B736 |
| H | 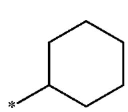 | B737 | B738 | B739 | B740 |

TABLE 2-5-continued
| | | R7 | | | |
|---|---|---|---|---|---|
| R1 | R6 | 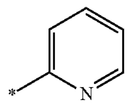 | 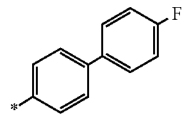 | 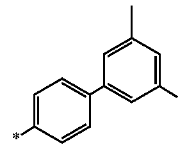 | 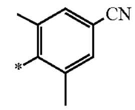 |
| 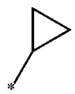 |  | B741 | B742 | B743 | B744 |
| 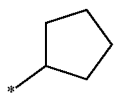 | 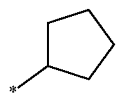 | B745 | B746 | B747 | B748 |
| 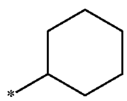 | 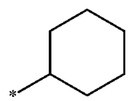 | B749 | B750 | B751 | B752 |
| H | 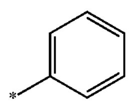 | B753 | B754 | B755 | B756 |
| H | 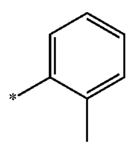 | B757 | B758 | B759 | B760 |
| H | 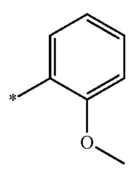 | B761 | B762 | B763 | B764 |
| H | 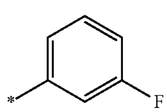 | B765 | B766 | B767 | B768 |
| H | 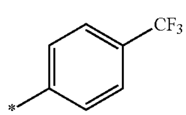 | B769 | B770 | B771 | B772 |
| H | 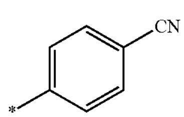 | B773 | B774 | B775 | B776 |
| H | 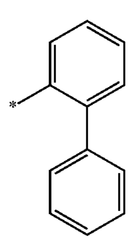 | B777 | B778 | B779 | B780 |

TABLE 2-5-continued
| R1 | R6 | R7 | | | |
|---|---|---|---|---|---|
| | | 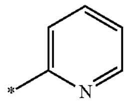 | 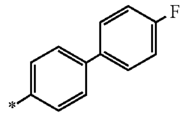 | 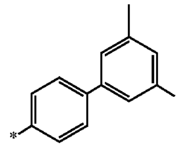 | 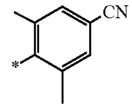 |
| 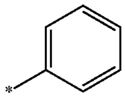 | 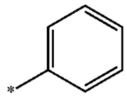 | B781 | B782 | B783 | B784 |
| 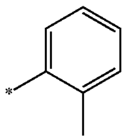 | 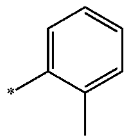 | B785 | B786 | B787 | B788 |
| 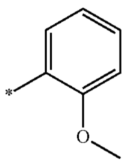 | 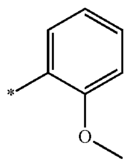 | B789 | B790 | B791 | B792 |
| 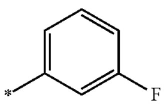 | 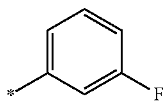 | B793 | B794 | B795 | B796 |
| 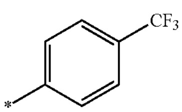 | 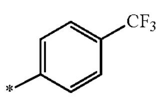 | B797 | B798 | B799 | B800 |
| 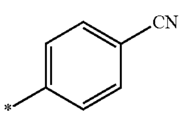 | 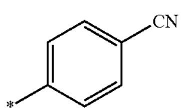 | B801 | B802 | B803 | B804 |
| 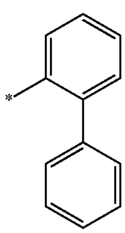 | 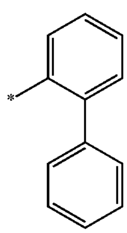 | B805 | B806 | B807 | B808 |
| H | 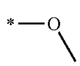 | B809 | B810 | B811 | B812 |
| H | 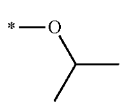 | B813 | B814 | B815 | B816 |
| 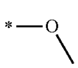 | 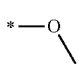 | B817 | B818 | B819 | B820 |
| 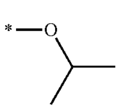 | 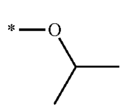 | B821 | B822 | B823 | B824 |

TABLE 2-5-continued
| | | R7 | | | |
|---|---|---|---|---|---|
| R1 | R6 | 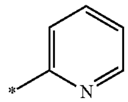 | 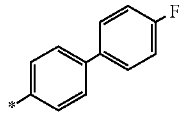 | 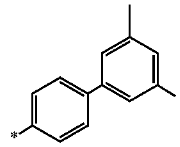 | 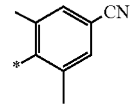 |
| H | 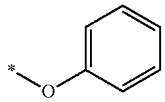 | B825 | B826 | B827 | B828 |
| H | 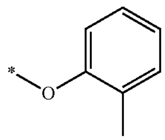 | B829 | B830 | B831 | B832 |
| H | 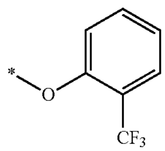 | B833 | B834 | B835 | B836 |
| H | 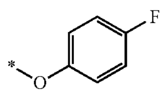 | B837 | B838 | B839 | B840 |
| H | 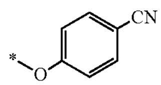 | B841 | B842 | B843 | B844 |
| H | 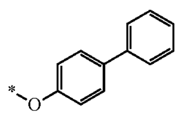 | B845 | B846 | B847 | B848 |
| 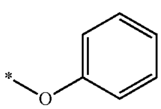 | 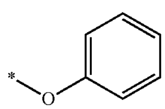 | B849 | B850 | B851 | B852 |
| 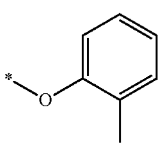 | 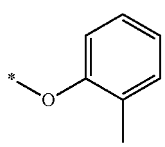 | B853 | B854 | B855 | B856 |
| 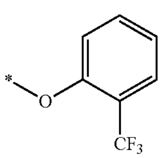 | 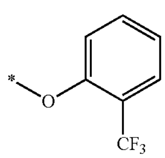 | B857 | B858 | B859 | B860 |
| 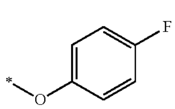 | 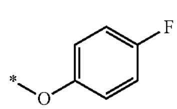 | B861 | B862 | B863 | B864 |
| 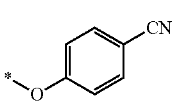 | 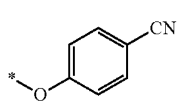 | B865 | B866 | B867 | B868 |

TABLE 2-5-continued
| R1 | R6 | R7 | | | |
|---|---|---|---|---|---|
| | | 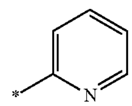 | 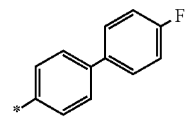 | 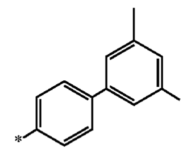 | 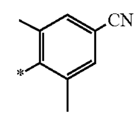 |
| 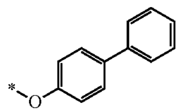 | 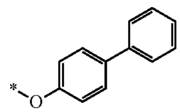 | B869 | B870 | B871 | B872 |
| 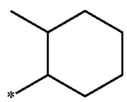 | 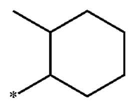 | B873 | B874 | B875 | B876 |
TABLE 2-6
| R1 | R6 | R7 | | | |
|---|---|---|---|---|---|
| | | 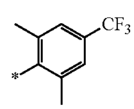 | 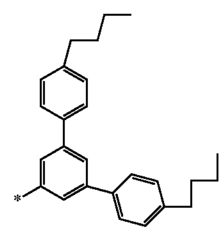 | 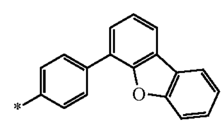 | 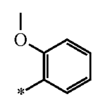 |
| H | H | B877 | B878 | B879 | B880 |
| Cl | H | B881 | B882 | B883 | B884 |
| Cl | Cl | B885 | B886 | B887 | B888 |
| Br | Br | B889 | B890 | B891 | B892 |
| H | CN | B893 | B894 | B895 | B896 |
| H | *— | B897 | B898 | B899 | B900 |
| *— | *— | B901 | B902 | B903 | B904 |
| H |  | B905 | B906 | B907 | B908 |
| H | 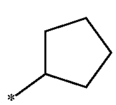 | B909 | B910 | B911 | B912 |
| 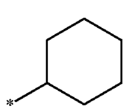 | H | B913 | B914 | B915 | B916 |
|  |  | B917 | B918 | B919 | B920 |
| 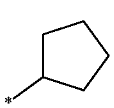 | 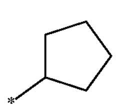 | B921 | B922 | B923 | B924 |

TABLE 2-6-continued
| | | $R_7$ | | | |
|---|---|---|---|---|---|
| $R_1$ | $R_6$ | 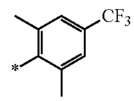 | 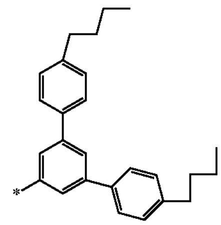 | 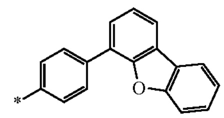 | 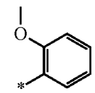 |
| 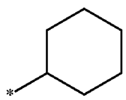 | 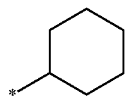 | B925 | B926 | B927 | B928 |
| H | 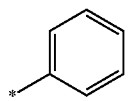 | B929 | B930 | B931 | B932 |
| H | 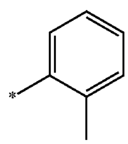 | B933 | B934 | B935 | B936 |
| H | 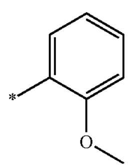 | B937 | B938 | B939 | B940 |
| H | 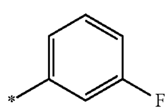 | B941 | B942 | B943 | B944 |
| H | 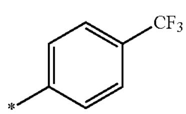 | B945 | B946 | B947 | B948 |
| H | 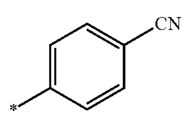 | B949 | B950 | B951 | B952 |
| H | 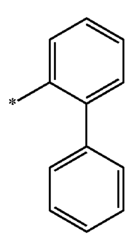 | B953 | B954 | B955 | B956 |
| 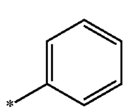 | 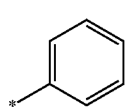 | B957 | B958 | B959 | B960 |

TABLE 2-6-continued
| | | R$_7$ | | | |
|---|---|---|---|---|---|
| R$_1$ | R$_6$ | 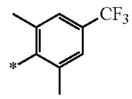 | 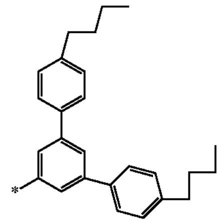 | 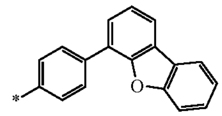 | 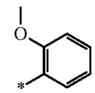 |
| 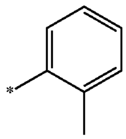 | 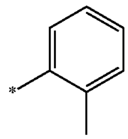 | B961 | B962 | B963 | B964 |
| 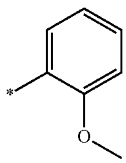 | 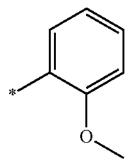 | B965 | B966 | B967 | B968 |
| 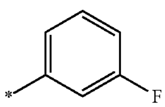 | 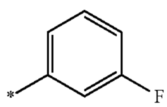 | B969 | B970 | B971 | B972 |
| 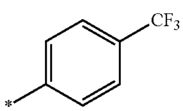 | 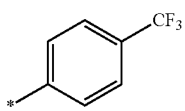 | B973 | B974 | B975 | B976 |
| 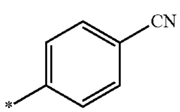 | 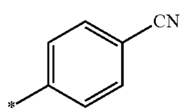 | B977 | B978 | B979 | B980 |
| 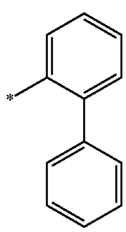 | 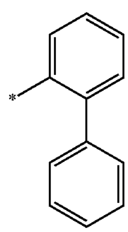 | B981 | B982 | B983 | B983 |
| H | 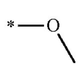 | B985 | B986 | B987 | B988 |
| H | 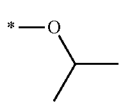 | B989 | B990 | B991 | B992 |
| 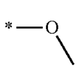 | 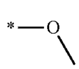 | B993 | B994 | B995 | B996 |
| 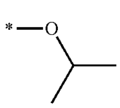 | 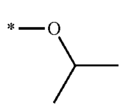 | B997 | B998 | B999 | B1000 |

TABLE 2-6-continued
| | | R7 | | | |
|---|---|---|---|---|---|
| R1 | R6 | 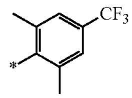 | 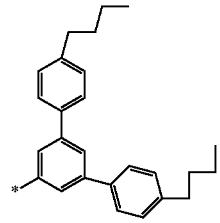 | 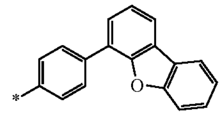 | 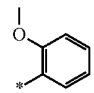 |
| H | 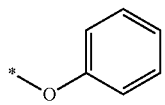 | B1001 | B1002 | B1003 | B1004 |
| H | 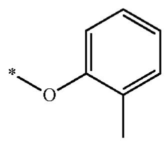 | B1005 | B1006 | B1007 | B1008 |
| H | 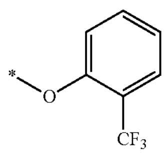 | B1009 | B1010 | B1011 | B1012 |
| H | 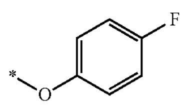 | B1013 | B1014 | B1015 | B1016 |
| H | 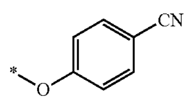 | B1017 | B1018 | B1019 | B1020 |
| H | 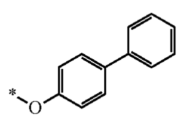 | B1021 | B1022 | B1023 | B1024 |
| 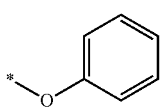 | 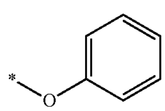 | B1025 | B1026 | B1027 | B1028 |
| 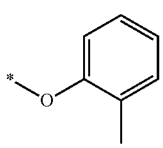 | 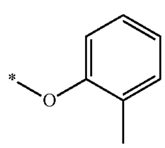 | B1029 | B1030 | B1031 | B1032 |
| 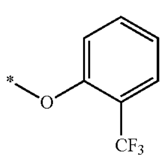 | 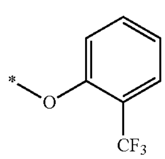 | B1033 | B1034 | B0135 | B1036 |
| 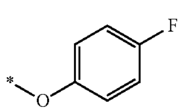 | 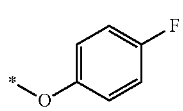 | B1037 | B1038 | B1039 | B1040 |

TABLE 2-6-continued
| R1 | R6 | R7 | | | |
|---|---|---|---|---|---|
| | | 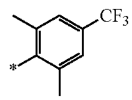 | 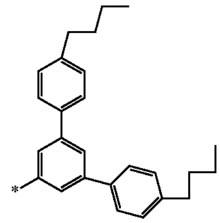 | 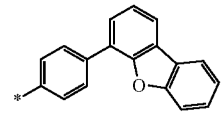 | 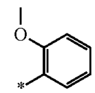 |
| 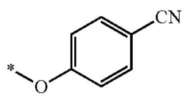 | 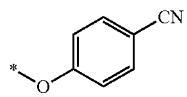 | B1041 | B1042 | B1043 | B1044 |
| 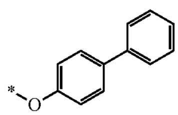 | 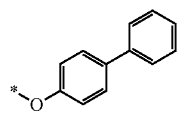 | B1045 | B1046 | B1047 | B1048 |
| 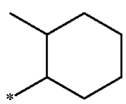 | 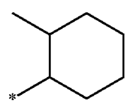 | B1049 | B1050 | B1051 | B1052 |
TABLE 2-7
| R1 | R6 | R7 | | | |
|---|---|---|---|---|---|
| | | 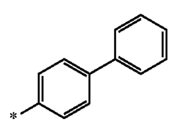 | 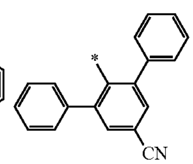 | 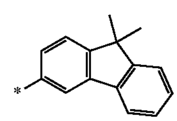 [SMILES: *c1ccc2c(c1)-c1ccccc1C2(C)C] | 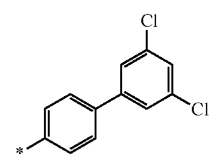 [SMILES: *c1ccc(-c2cc(Cl)cc(Cl)c2)cc1] |
| H | H | B1053 | B1054 | B1055 | B1056 |
| Cl | H | B1057 | B1058 | B1059 | B1060 |
| Cl | Cl | B1061 | B1062 | B1063 | B1064 |
| Br | Br | B1065 | B1066 | B1067 | B1068 |
| H | CN | B1069 | B1070 | B1071 | B1072 |
| H | *— | B1073 | B1074 | B1075 | B1076 |
| *— | *— | B1077 | B1078 | B1079 | B1080 |
| H |  | B1081 | B1082 | B1083 | B1084 |
| H | 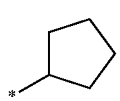 [SMILES: *C1CCCC1] | B1085 | B1086 | B1087 | B1088 |
| H | 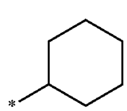 [SMILES: *C1CCCCC1] | B1089 | B1090 | B1091 | B1092 |
|  |  | B1093 | B1094 | B1095 | B1096 |
| 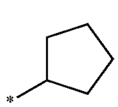 | 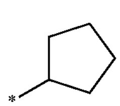 [SMILES: *C1CCCC1] | B1097 | B1098 | B1099 | B1100 |

TABLE 2-7-continued
| | | R7 | | | |
|---|---|---|---|---|---|
| R1 | R6 | 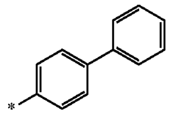 | 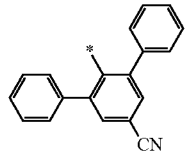 | 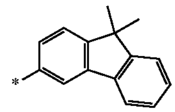 | 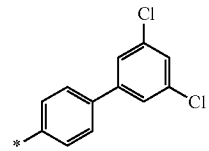 |
| 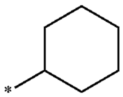 [SMILES: *C1CCCCC1] | 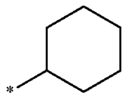 [SMILES: *C1CCCCC1] | B1101 | B1102 | B1103 | B1104 |
| H | 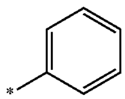 | B1105 | B1106 | B1107 | B1108 |
| H | 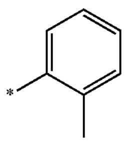 [SMILES: *c1ccccc1C] | B1109 | B1110 | B1111 | B1112 |
| H | 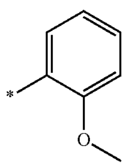 [SMILES: *c1ccccc1OC] | B1113 | B1114 | B1115 | B1116 |
| H | 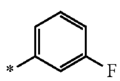 | B1117 | B1118 | B1119 | B1120 |
| H | 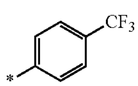 [SMILES: *c1ccc(C(F)(F)F)cc1] | B1121 | B1122 | B1123 | B1123 |
| H | 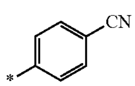 | B1124 | B1125 | B1126 | B1127 |
| H | 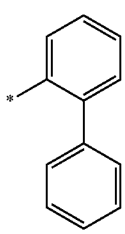 [SMILES: *c1ccccc1-c1ccccc1] | B1128 | B1129 | B1130 | B1131 |
| 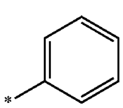 | 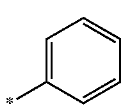 [SMILES: *c1ccccc1] | B11132 | B1133 | B1134 | B1135 |
| 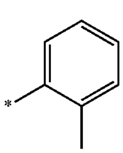 [SMILES: *c1ccccc1C] | 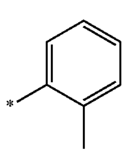 [SMILES: *c1ccccc1C] | B1136 | B1137 | B1138 | B1139 |

TABLE 2-7-continued
| | | R7 | | | |
|---|---|---|---|---|---|
| $R_1$ | $R_6$ | 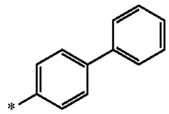 | 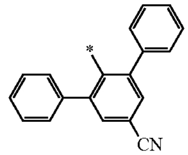 | 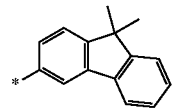 | 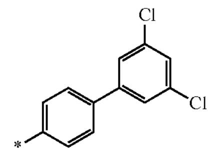 |
| 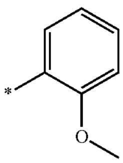 [SMILES: *c1ccccc1OC] | 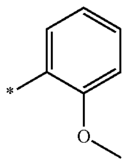 [SMILES: *c1ccccc1OC] | B1140 | B1141 | B1142 | B1143 |
| 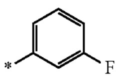 | 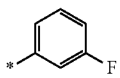 [SMILES: *c1cccc(F)c1] | B1144 | B1145 | B1146 | B1147 |
| 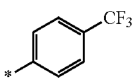 [SMILES: *c1ccc(C(F)(F)F)cc1] | 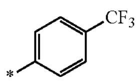 [SMILES: *c1ccc(C(F)(F)F)cc1] | B1148 | B1149 | B1150 | B1151 |
| 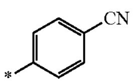 [SMILES: *c1ccc(C#N)cc1] | 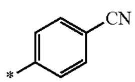 [SMILES: *c1ccc(C#N)cc1] | B1152 | B1153 | B1154 | B1155 |
| 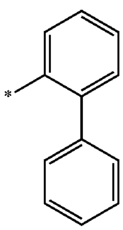 | 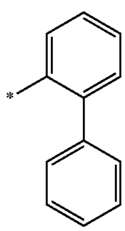 | B1156 | B1157 | B1158 | B1169 |
| H | 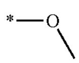 | B1160 | B1161 | B1162 | B1163 |
| H | 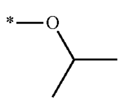 | B1164 | B1165 | B1166 | B1167 |
| 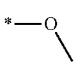 | 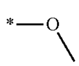 | B1168 | B1169 | B1170 | B1171 |
| 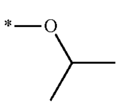 | 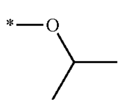 [SMILES: *OC(C)C] | B1172 | B1173 | B1174 | B1175 |
| H | 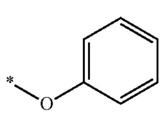 | B1176 | B1177 | B1178 | B1179 |
| H | 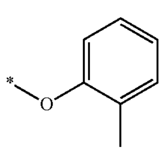 | B1180 | B1181 | B1182 | B1183 |

TABLE 2-7-continued
| | | $R_7$ | | | |
|---|---|---|---|---|---|
| $R_1$ | $R_6$ | 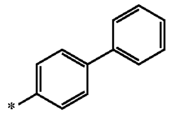 | 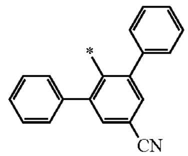 | 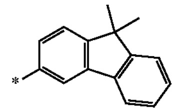 | 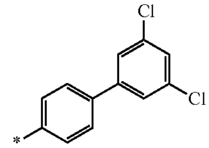 |
| H | 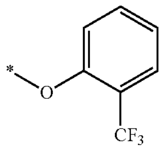 | B1184 | B1185 | B1186 | B1187 |
| H | 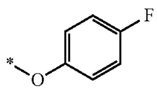 [SMILES: *Oc1ccc(F)cc1] | B1188 | B1189 | B1190 | B1191 |
| H | 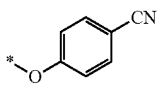 [SMILES: *Oc1ccc(C#N)cc1] | B1192 | B1193 | B1194 | B1195 |
| H | 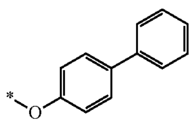 | B1196 | B1197 | B1198 | B1199 |
| 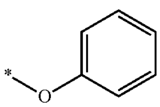 | 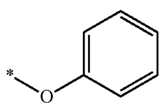 [SMILES: *Oc1ccccc1] | B1200 | B1201 | B1202 | B1203 |
| 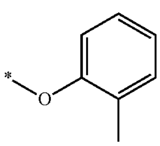 [SMILES: *Oc1ccccc1C] | 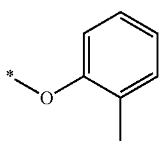 [SMILES: *Oc1ccccc1C] | B1204 | B1205 | B1206 | B1207 |
| 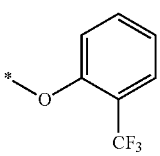 | 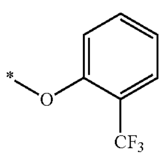 [SMILES: *Oc1ccccc1C(F)(F)F] | B1208 | B1209 | B1210 | B1211 |
| 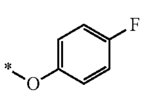 [SMILES: *Oc1ccc(F)cc1] | 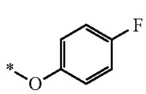 [SMILES: *Oc1ccc(F)cc1] | B1212 | B1213 | B1214 | 81215 |
| 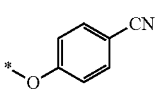 [SMILES: *Oc1ccc(C#N)cc1] | 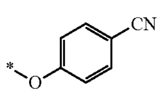 [SMILES: *Oc1ccc(C#N)cc1] | B1216 | B1217 | B1218 | B1219 |
| 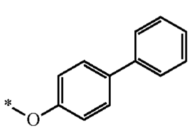 | 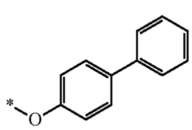 [SMILES: *Oc1ccc(-c2ccccc2)cc1] | B1220 | B1221 | B1222 | B1223 |
| 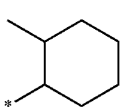 [SMILES: *C1CCCCC1C] | 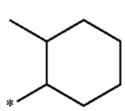 | B1224 | B1225 | B1226 | B1227 |

TABLE 2-7-continued
| R1 | R6 | R7 | | | |
|---|---|---|---|---|---|
| | | 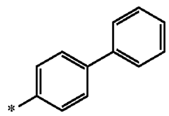 | 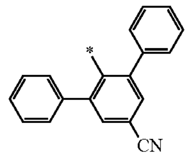 | 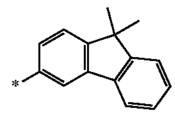 | 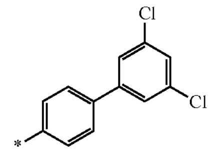 |
| 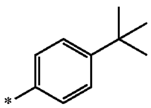 [SMILES: *c1ccc(C(C)(C)C)cc1] | H | B1228 | B1229 | B1230 | B1231 |
TABLE 2-8
| R1 | R6 | R7 | | | |
|---|---|---|---|---|---|
| | | 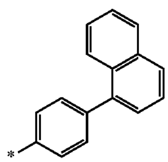 [SMILES: *c1ccc(-c2cccc3ccccc23)cc1] | 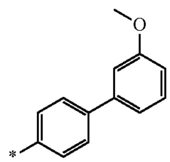 [SMILES: *c1ccc(-c2cccc(OC)c2)cc1] | 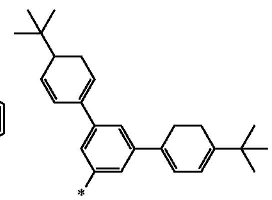 | 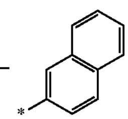 |
| H | H | B1232 | B1233 | B1234 | B1235 |
| Cl | H | B1236 | B1237 | B1237 | B1238 |
| Cl | Cl | B1239 | B1240 | B1241 | B1242 |
| Br | Br | B1243 | B1244 | B1245 | B1246 |
| H | CN | B1247 | B1248 | B1249 | B1250 |
| H | *— | B1251 | B1252 | B1253 | B1254 |
| *— | *— | B1255 | B1256 | B1257 | B1258 |
| H |  | B1259 | B1260 | B1261 | B1262 |
| H | 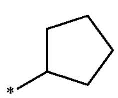 | B1263 | B1264 | B1265 | B1266 |
| H | 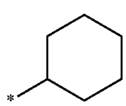 [SMILES: *C1CCCCC1] | B1267 | B1268 | B1269 | B1270 |
| 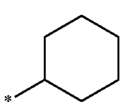 [SMILES: *C1CCCCC1] | H | B1271 | B1272 | B1273 | B1274 |
|  |  | B1275 | B1276 | B1277 | B1278 |
| 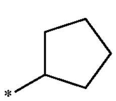 [SMILES: *C1CCCC1] | 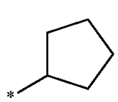 [SMILES: *C1CCCC1] | B1279 | B1280 | B1281 | B1282 |
| 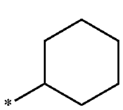 [SMILES: *C1CCCCC1] | 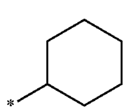 [SMILES: *C1CCCCC1] | B1283 | B1284 | B1285 | B1286 |

TABLE 2-8-continued
| | | R$_7$ | | | |
|---|---|---|---|---|---|
| R$_1$ | R$_6$ | 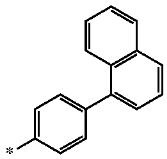 | 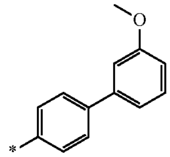 | 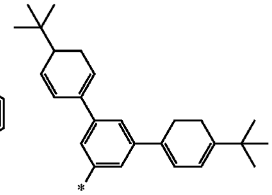 | 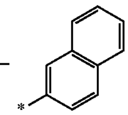 |
| H | 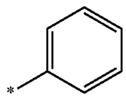 [SMILES: *c1ccccc1] | B1287 | B1288 | B1289 | B1290 |
| 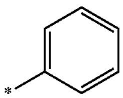 [SMILES: *c1ccccc1] | H | B1291 | B1292 | B1293 | B1294 |
| H | 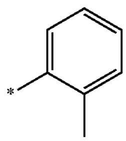 | B1295 | B1296 | B1297 | B1298 |
| H | 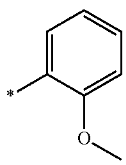 [SMILES: *c1ccccc1OC] | B1299 | B1300 | B1301 | B1302 |
| H | 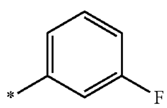 | B1303 | B1304 | B1035 | B1306 |
| H | 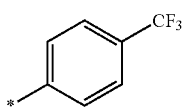 [SMILES: *c1ccc(C(F)(F)F)cc1] | B1037 | B1308 | B1309 | B1310 |
| H | 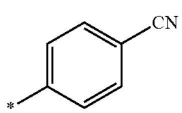 [SMILES: *c1ccc(C#N)cc1] | B1311 | B1312 | B1313 | B1314 |
| H | 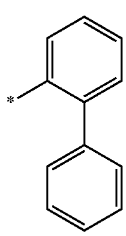 | B1315 | B1316 | B1317 | B1318 |
| 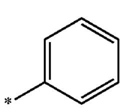 [SMILES: *c1ccccc1] | 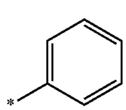 [SMILES: *c1ccccc1] | B1319 | B1320 | B1321 | B1322 |
| 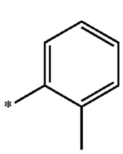 [SMILES: *c1ccccc1C] | 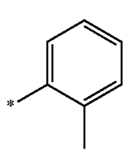 [SMILES: *c1ccccc1C] | B1323 | B1324 | B1325 | B1326 |

TABLE 2-8-continued
| | | R7 | | | |
|---|---|---|---|---|---|
| R1 | R6 | 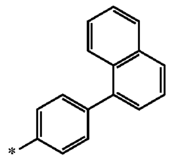 | 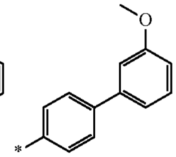 | 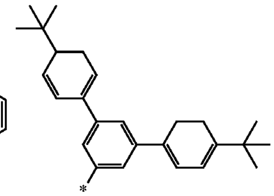 | 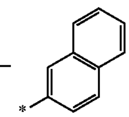 |
| 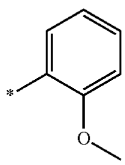 [SMILES: *c1ccccc1OC] | 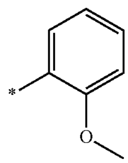 [SMILES: *c1ccccc1OC] | B1327 | B1328 | B1329 | B1330 |
| 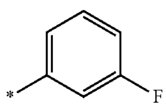 | 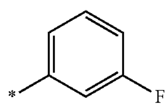 | B1331 | B1332 | B1333 | B1334 |
| 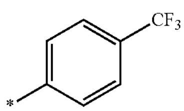 | 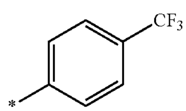 [SMILES: *c1ccc(C(F)(F)F)cc1] | B1335 | B1336 | B1337 | B1338 |
| 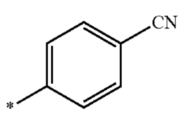 [SMILES: *c1ccc(C#N)cc1] | 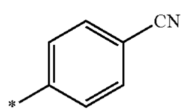 [SMILES: *c1ccc(C#N)cc1] | B1339 | B1340 | B1341 | B1342 |
| 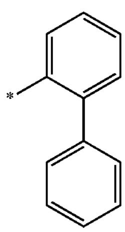 [SMILES: *c1ccccc1-c1ccccc1] | 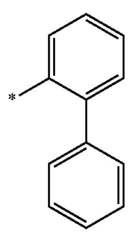 | B1343 | B1344 | B1345 | B1346 |
| H | 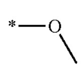 | B1347 | B1348 | B1349 | B1350 |
| H | 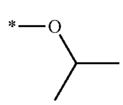 [SMILES: *OC(C)C] | B1351 | B1352 | B1353 | B1354 |
| 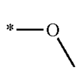 | 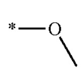 | B1355 | B1356 | B1357 | B1358 |
| 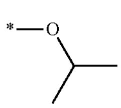 | 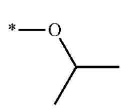 [SMILES: *OC(C)C] | B1359 | B1360 | B1361 | B1362 |
| H | 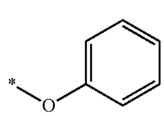 [SMILES: *Oc1ccccc1] | B1363 | B1364 | B1365 | B1366 |
| H | 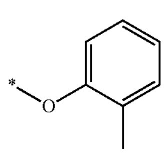 | B1367 | B1368 | B1369 | B1370 |

TABLE 2-8-continued
| R1 | R6 | R7 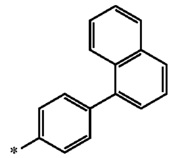 | R7 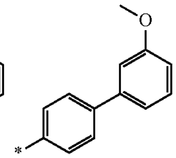 | R7 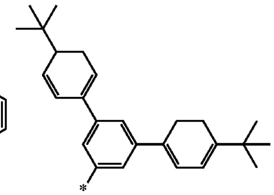 | R7 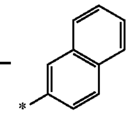 |
|---|---|---|---|---|---|
| H | 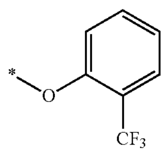 | B1371 | B1372 | B1373 | B1374 |
| H | 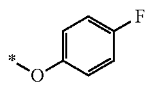 | B1375 | B1376 | B1377 | B1378 |
| H | 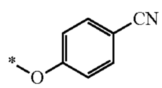 | B1379 | B1380 | B1381 | B1382 |
| H | 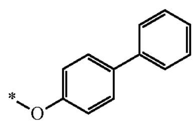 | B1383 | B1384 | B1385 | B1386 |
| 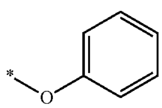 [SMILES: *Oc1ccccc1] | 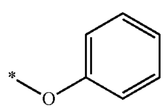 [SMILES: *Oc1ccccc1] | B1387 | B1388 | B1389 | B1390 |
| 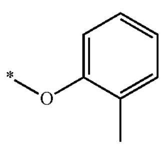 [SMILES: *Oc1ccccc1C] | 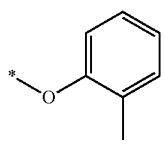 [SMILES: *Oc1ccccc1C] | B1391 | B1392 | B1303 | B1394 |
| 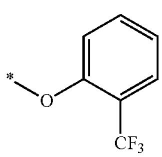 | 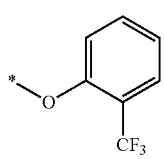 [SMILES: *Oc1ccccc1C(F)(F)F] | B1395 | B1396 | B1397 | B1393 |
| 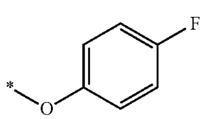 [SMILES: *Oc1ccc(F)cc1] | 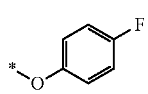 | B1399 | B1400 | B1401 | B1402 |
| 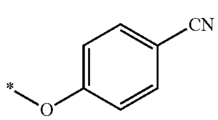 [SMILES: *Oc1ccc(C#N)cc1] | 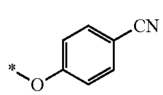 | B1403 | B1404 | B1405 | B1406 |
| 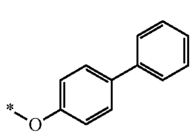 [SMILES: *Oc1ccc(-c2ccccc2)cc1] | 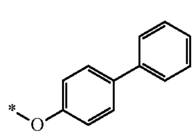 | B1407 | B1408 | B1409 | B1410 |

TABLE 2-8-continued
| | | R7 | | | |
|---|---|---|---|---|---|
| R1 | R6 | 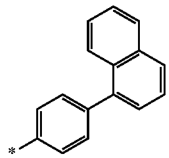 | 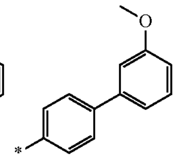 | 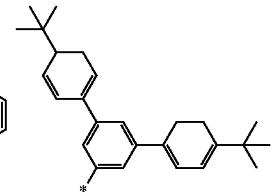 | 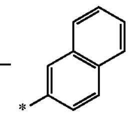 |
| 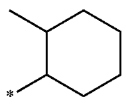 [SMILES: *C1CCCCC1C] | 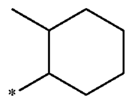 [SMILES: *C1CCCCC1C] | B1411 | B1412 | B1413 | B1414 |
| 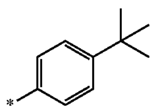 [SMILES: *c1ccc(C(C)(C)C)cc1] | H | B1415 | B1416 | B1417 | B1413 |
TABLE 2-9
| | | R7 | | |
|---|---|---|---|---|
| R1 | R6 | 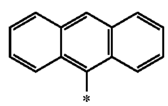 | 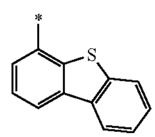 [SMILES: *c1cccc2c1sc1ccccc12] | 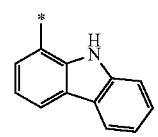 |
| H | H | B1419 | B1420 | B1421 |
| Cl | H | B1422 | B1423 | B1424 |
| Cl | Cl | B1425 | B1426 | B1427 |
| Br | Br | B1428 | B1429 | B1430 |
| H | CN | B1431 | B1432 | B1433 |
| H | *— | B1434 | B1435 | B1436 |
| *— | *— | B1437 | B1438 | B1430 |
| H |  | B1440 | B1441 | B1442 |
| H | 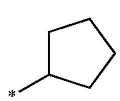 [SMILES: *C1CCCC1] | B1443 | B1444 | B1445 |
| H | 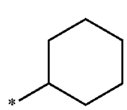 [SMILES: *C1CCCCC1] | B1446 | B1447 | B1448 |
| 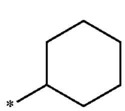 [SMILES: *C1CCCCC1] | H | B1449 | B1450 | B1451 |
|  |  | B1452 | B1453 | B1454 |
| 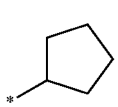 | 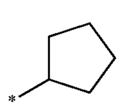 [SMILES: *C1CCCC1] | B1455 | B1456 | B1457 |

TABLE 2-9-continued
| | | R7 | | |
|---|---|---|---|---|
| R1 | R6 | 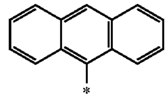 | 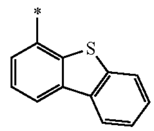 | 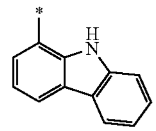 |
| 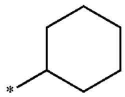 [SMILES: *C1CCCCC1] | 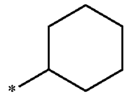 [SMILES: *C1CCCCC1] | B1458 | B1459 | B1460 |
| H | 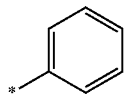 [SMILES: *c1ccccc1] | B1461 | B1462 | B1463 |
| 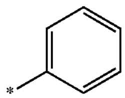 [SMILES: *c1ccccc1] | H | B1464 | B1465 | B1466 |
| H | 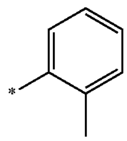 [SMILES: *c1ccccc1C] | B1467 | B1468 | B1469 |
| H | 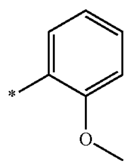 [SMILES: *c1ccccc1OC] | B1470 | B1471 | B1472 |
| H | 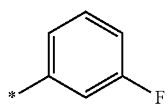 [SMILES: *c1cccc(F)c1] | B1473 | B1474 | B1475 |
| H | 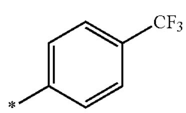 [SMILES: *c1ccc(C(F)(F)F)cc1] | B1476 | B1477 | B1478 |
| H | 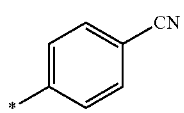 [SMILES: *c1ccc(C#N)cc1] | B1479 | B1480 | B1481 |
| H | 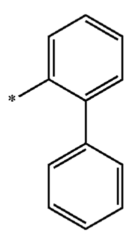 [SMILES: *c1ccccc1-c1ccccc1] | B1482 | B1483 | B1484 |
| 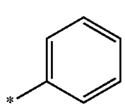 [SMILES: *c1ccccc1] | 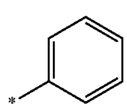 | B1485 | B1486 | B1487 |

TABLE 2-9-continued
| | | $R_7$ | | |
|---|---|---|---|---|
| $R_1$ | $R_6$ | 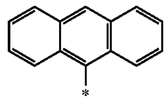 | 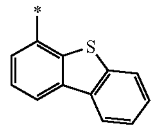 | 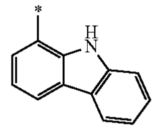 |
| 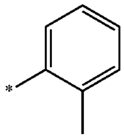 | 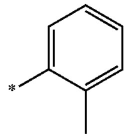 [SMILES: *c1ccccc1C] | B1488 | B1489 | B1490 |
| 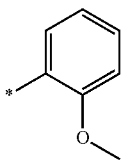 | 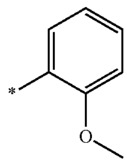 [SMILES: *c1ccccc1OC] | B1491 | B1492 | B1493 |
| 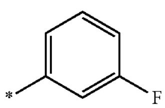 | 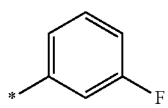 [SMILES: *c1cccc(F)c1] | B1494 | B1495 | B1496 |
| 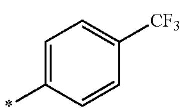 [SMILES: *c1ccc(C(F)(F)F)cc1] | 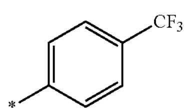 [SMILES: *c1ccc(C(F)(F)F)cc1] | B1497 | B1498 | B1499 |
| 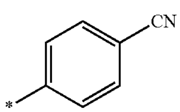 [SMILES: *c1ccc(C#N)cc1] | 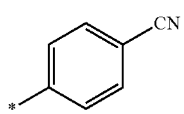 [SMILES: *c1ccc(C#N)cc1] | B1500 | B1501 | B1502 |
| 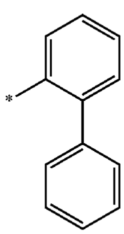 | 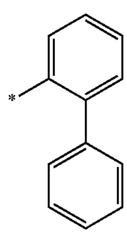 [SMILES: *c1ccccc1-c1ccccc1] | B1503 | B1504 | B1505 |
| H | 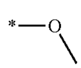 | B1506 | B1507 | B1508 |
| H | 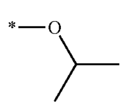 [SMILES: *OC(C)C] | B1509 | B1510 | B1511 |
| 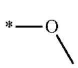 | 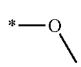 | B1512 | B1513 | B1514 |
| 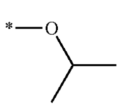 [SMILES: *OC(C)C] | 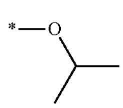 [SMILES: *OC(C)C] | B1515 | B1516 | B1517 |
| H | 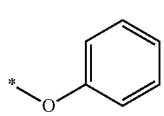 [SMILES: *Oc1ccccc1] | B1518 | B1519 | B1520 |

TABLE 2-9-continued
| | | R7 | | |
|---|---|---|---|---|
| $R_1$ | $R_6$ | 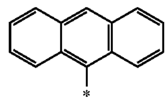 | 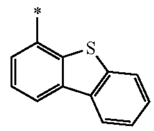 | 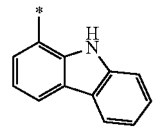 |
| 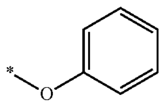 | H | B1521 | B1522 | B1523 |
| H | 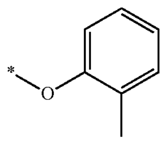 [SMILES: *Oc1ccccc1C] | B1524 | B1526 | B1526 |
| H | 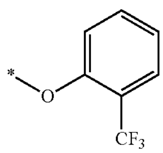 | B1527 | B1528 | B1529 |
| H | 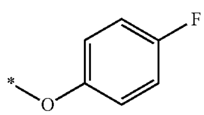 [SMILES: *Oc1ccc(F)cc1] | B1530 | B1531 | B1532 |
| H | 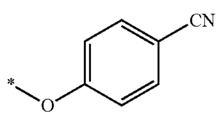 | B1533 | B1534 | B1535 |
| H | 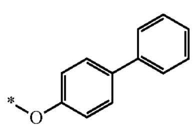 | B1536 | B1537 | B1538 |
| 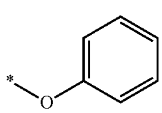 | 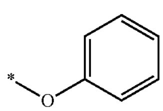 [SMILES: *Oc1ccccc1] | B1539 | B1540 | B1541 |
| 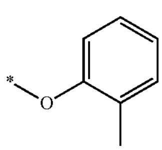 [SMILES: *Oc1ccccc1C] | 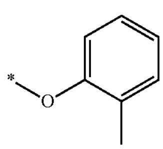 [SMILES: *Oc1ccccc1C] | B1542 | B1543 | B1544 |
| 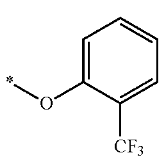 | 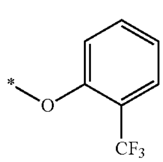 | B1545 | B1546 | B1547 |
| 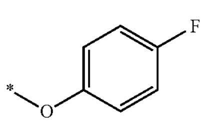 [SMILES: *Oc1ccc(F)cc1] | 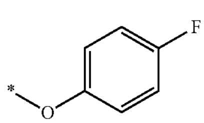 | B1548 | B1549 | B1550 |

TABLE 2-9-continued
| | | R7 | | |
|---|---|---|---|---|
| R1 | R6 | 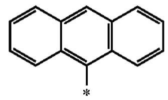 | 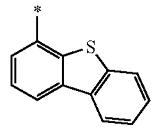 | 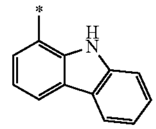 |
| 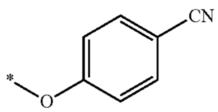 [SMILES: *Oc1ccc(C#N)cc1] | 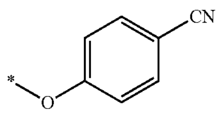 [SMILES: *Oc1ccc(C#N)cc1] | B1551 | B1552 | B1553 |
| 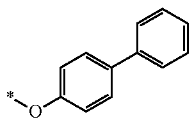 [SMILES: *Oc1ccc(-c2ccccc2)cc1] | 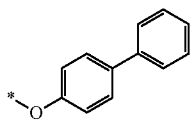 | B1554 | B1555 | B1556 |
| 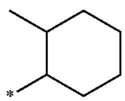 [SMILES: *C1CCCCC1C] | 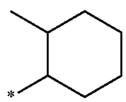 [SMILES: *C1CCCCC1C] | B1557 | B1558 | B1559 |
| 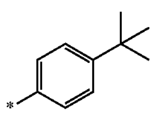 [SMILES: *c1ccc(C(C)(C)C)cc1] | H | B1560 | B1561 | B1562 |
| H | 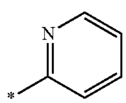 | B1563 | B1564 | B1565 |
| 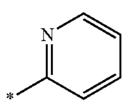 | 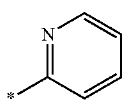 [SMILES: *c1ccccn1] | B1566 | B1567 | B1568 |
| 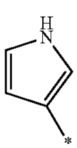 | H | B1569 | B1570 | B1571 |
| 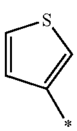 [SMILES: *c1ccsc1] | 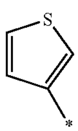 | B1572 | B1573 | B1574 |
| H | 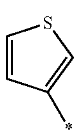 | B1575 | B1576 | B1577 |

TABLE 3-1
| | | $R_3$, $R_4$ | | | | |
|---|---|---|---|---|---|---|
| $R_2$ | $R_5$ | 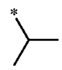 | 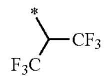 | 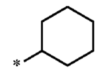 | 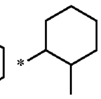 | 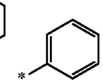 |
| 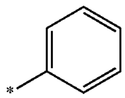 | 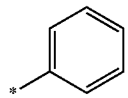 [SMILES: *c1ccccc1] | C1 | C2 | C3 | C4 | C5 |
| 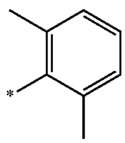 | 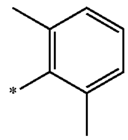 [SMILES: *c1c(C)cccc1C] | C6 | C7 | C8 | C9 | C10 |
| 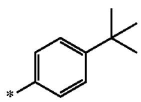 [SMILES: *c1ccc(C(C)(C)C)cc1] | 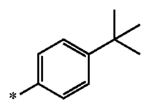 [SMILES: *c1ccc(C(C)(C)C)cc1] | C11 | C12 | C13 | C14 | C15 |
| 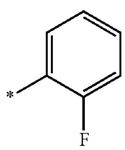 [SMILES: *c1ccccc1F] | 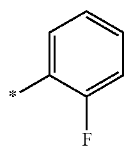 [SMILES: *c1ccccc1F] | C16 | C17 | C18 | C19 | C20 |
| 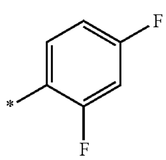 [SMILES: *c1ccc(F)cc1F] | 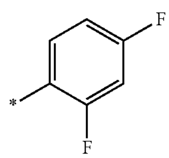 [SMILES: *c1ccc(F)cc1F] | C21 | C22 | C23 | C24 | C25 |
| 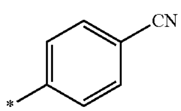 [SMILES: *c1ccc(C#N)cc1] | 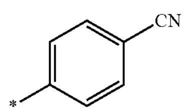 [SMILES: *c1ccc(C#N)cc1] | C26 | C27 | C28 | C29 | C30 |
| 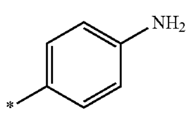 [SMILES: *c1ccc(N)cc1] | 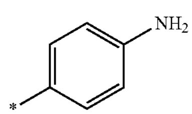 | C31 | C32 | C33 | C34 | C35 |
| 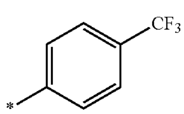 [SMILES: *c1ccc(C(F)(F)F)cc1] | 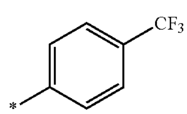 [SMILES: *c1ccc(C(F)(F)F)cc1] | C36 | C37 | C38 | C39 | C40 |
| 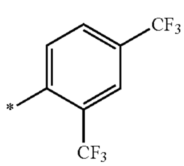 | 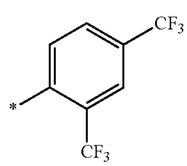 | C41 | C42 | C43 | C44 | C45 |
| 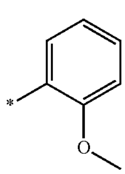 [SMILES: *c1ccccc1OC] | 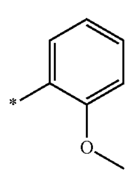 [SMILES: *c1ccccc1OC] | C46 | C47 | C48 | C49 | C50 |
| 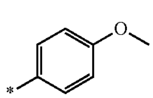 [SMILES: *c1ccc(OC)cc1] | 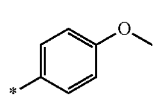 | C51 | C52 | C53 | C54 | C55 |

TABLE 3-1-continued
| | | $R_3$, $R_4$ | | | | |
|---|---|---|---|---|---|---|
| $R_2$ | $R_5$ | 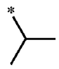 | 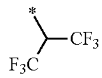 | 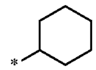 | 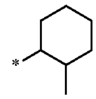 | 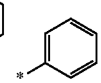 |
| 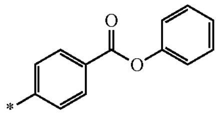 [SMILES: *c1ccc(C(=O)Oc2ccccc2)cc1] | 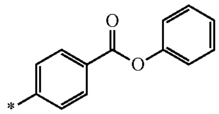 [SMILES: *c1ccc(C(=O)Oc2ccccc2)cc1] | C56 | C57 | C58 | C59 | CC0 |
| 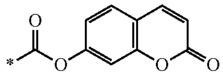 | 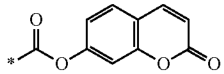 [SMILES: *C(=O)Oc1ccc2ccc(=O)oc2c1] | C61 | C62 | C63 | C64 | C65 |
| 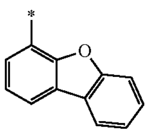 | 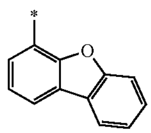 | C66 | C67 | C68 | C69 | C70 |
| 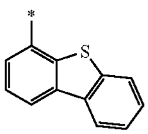 | 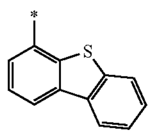 | C71 | C72 | C73 | C74 | C75 |
| 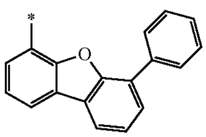 [SMILES: *c1cccc2c1oc1c(-c3ccccc3)cccc12] | 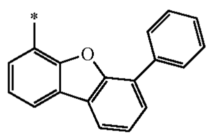 [SMILES: *c1cccc2c1oc1c(-c3ccccc3)cccc12] | C76 | C77 | C78 | C79 | C80 |
| 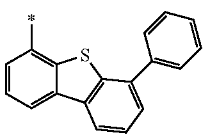 [SMILES: *c1cccc2c1sc1c(-c3ccccc3)cccc12] | 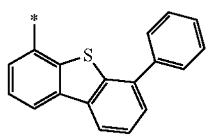 | C81 | C82 | C83 | C84 | C85 |
| 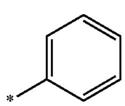 [SMILES: *c1ccccc1] | 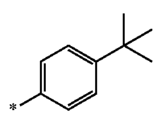 [SMILES: *c1ccc(C(C)(C)C)cc1] | C86 | C87 | C88 | C89 | C90 |
| 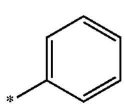 | 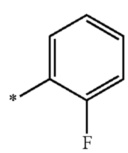 [SMILES: *c1ccccc1F] | C91 | C92 | C93 | C94 | C95 |
| 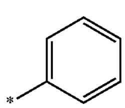 | 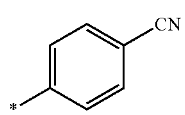 [SMILES: *c1ccc(C#N)cc1] | C96 | C97 | C98 | C99 | C100 |
| 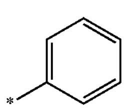 [SMILES: *c1ccccc1] | 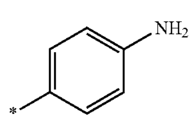 [SMILES: *c1ccc(N)cc1] | C101 | C102 | C103 | C104 | C105 |
| 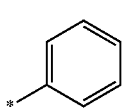 [SMILES: *c1ccccc1] | 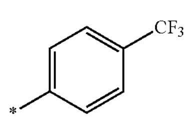 [SMILES: *c1ccc(C(F)(F)F)cc1] | C106 | C107 | C108 | C109 | C110 |

TABLE 3-1-continued
| $R_2$ | $R_5$ | $R_3$, $R_4$ 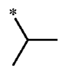 | 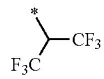 | 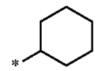 | 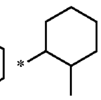 | 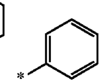 |
|---|---|---|---|---|---|---|
| 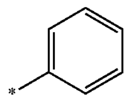 [SMILES: *c1ccccc1] | 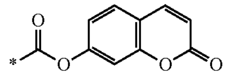 | C111 | C112 | C113 | C114 | C115 |
| 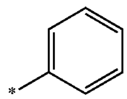 | 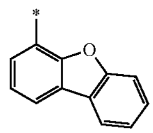 | C116 | C117 | C118 | C119 | C120 |
| 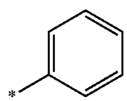 [SMILES: *c1ccccc1] | 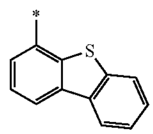 | C121 | C122 | C123 | C124 | C125 |
| 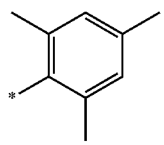 [SMILES: *c1c(C)cc(C)cc1C] | 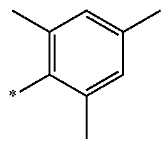 [SMILES: *c1c(C)cc(C)cc1C] | C126 | C127 | C128 | C129 | C130 |
| 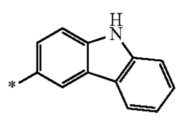 [SMILES: *c1ccc2[nH]c3ccccc3c2c1] | 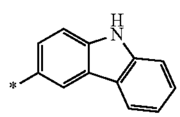 [SMILES: *c1ccc2[nH]c3ccccc3c2c1] | C131 | C132 | C133 | C134 | C135 |
| 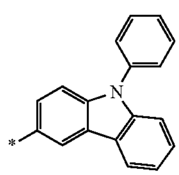 [SMILES: *c1ccc2c(c1)c1ccccc1n2-c1ccccc1] | 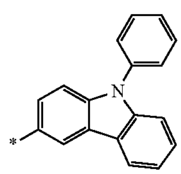 [SMILES: *c1ccc2c(c1)c1ccccc1n2-c1ccccc1] | C136 | C137 | C138 | C139 | C140 |
TABLE 3-2
| $R_2$ | $R_5$ | $R_3$, $R_4$ 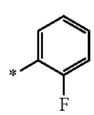 | 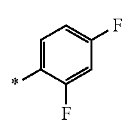 [SMILES: *c1ccc(F)cc1F] | 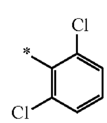 | 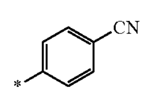 |
|---|---|---|---|---|---|
| 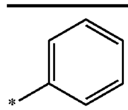 | 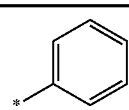 | C141 | C142 | C143 | C144 |
| 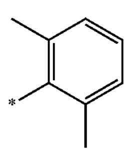 [SMILES: *c1c(C)cccc1C] | 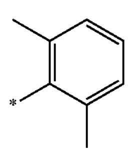 [SMILES: *c1c(C)cccc1C] | C145 | C146 | C147 | C148 |
| 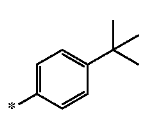 [SMILES: *c1ccc(C(C)(C)C)cc1] | 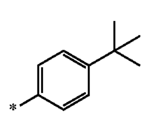 [SMILES: *c1ccc(C(C)(C)C)cc1] | C149 | C150 | C151 | C152 |

TABLE 3-2-continued
| R2 | R5 | R3, R4 | | | |
|---|---|---|---|---|---|
| | | 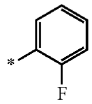 | 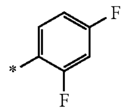 | 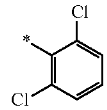 | 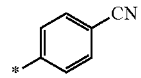 |
| 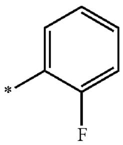 [SMILES: *c1ccccc1F] | 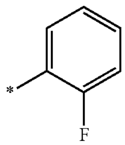 [SMILES: *c1ccccc1F] | C153 | C154 | C155 | C156 |
| 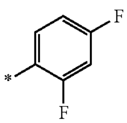 [SMILES: *c1ccc(F)cc1F] | 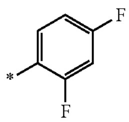 [SMILES: *c1ccc(F)cc1F] | C157 | C158 | C159 | C160 |
| 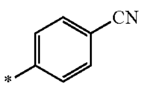 [SMILES: *c1ccc(C#N)cc1] | 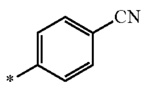 [SMILES: *c1ccc(C#N)cc1] | C161 | C162 | C163 | C164 |
| 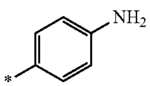 [SMILES: *c1ccc(N)cc1] | 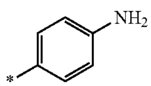 [SMILES: *c1ccc(N)cc1] | C165 | C166 | C167 | C168 |
| 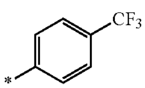 [SMILES: *c1ccc(C(F)(F)F)cc1] | 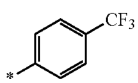 [SMILES: *c1ccc(C(F)(F)F)cc1] | C169 | C170 | C171 | C172 |
| 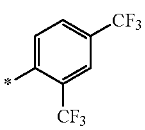 [SMILES: *c1ccc(C(F)(F)F)cc1C(F)(F)F] | 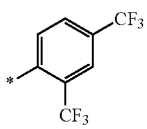 [SMILES: *c1ccc(C(F)(F)F)cc1C(F)(F)F] | C173 | C174 | C176 | C176 |
| 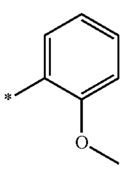 [SMILES: *c1ccccc1OC] | 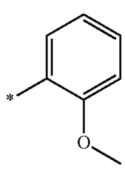 [SMILES: *c1ccccc1OC] | C177 | C178 | C179 | C180 |
| 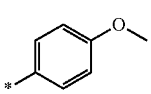 [SMILES: *c1ccc(OC)cc1] | 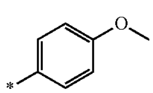 | C181 | C182 | C183 | C184 |
| 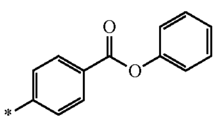 [SMILES: *c1ccc(C(=O)Oc2ccccc2)cc1] | 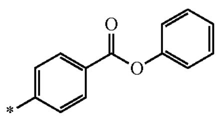 [SMILES: *c1ccc(C(=O)Oc2ccccc2)cc1] | C185 | C186 | C187 | C188 |
| 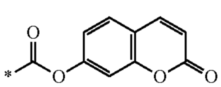 | 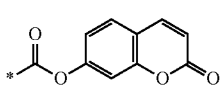 | C189 | C190 | C191 | C192 |
| 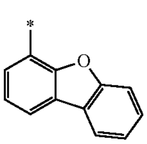 | 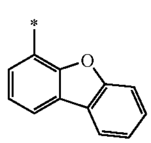 [SMILES: *c1cccc2c1oc1ccccc12] | C193 | C194 | C195 | C196 |

TABLE 3-2-continued
| | | $R_3$, $R_4$ | | | |
|---|---|---|---|---|---|
| $R_2$ | $R_5$ | 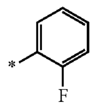 | 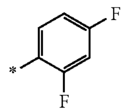 | 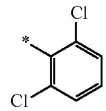 | 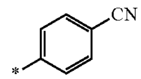 |
| 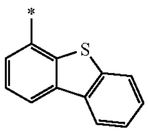 [SMILES: *c1cccc2c1sc1ccccc12] | 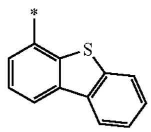 [SMILES: *c1cccc2c1sc1ccccc12] | C197 | C198 | C199 | C200 |
| 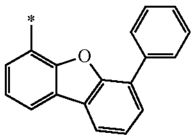 [SMILES: *c1cccc2c1oc1c(-c3ccccc3)cccc12] | 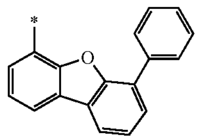 [SMILES: *c1cccc2c1oc1c(-c3ccccc3)cccc12] | C201 | C202 | C203 | C204 |
| 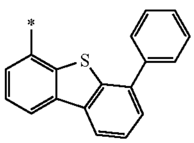 | 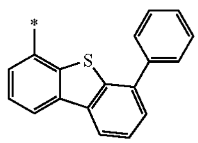 [SMILES: *c1cccc2c1sc1c(-c3ccccc3)cccc12] | C205 | C206 | C207 | C208 |
| 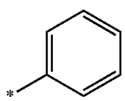 [SMILES: *c1ccccc1] | 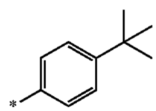 [SMILES: *c1ccc(C(C)(C)C)cc1] | C209 | C210 | C211 | C212 |
| 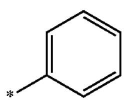 [SMILES: *c1ccccc1] | 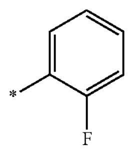 [SMILES: *c1ccccc1F] | C213 | C214 | C215 | C216 |
| 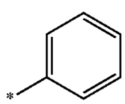 [SMILES: *c1ccccc1] | 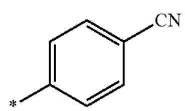 [SMILES: *c1ccc(C#N)cc1] | C217 | C218 | C219 | C220 |
| 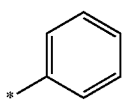 [SMILES: *c1ccccc1] | 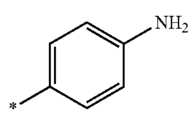 [SMILES: *c1ccc(N)cc1] | C221 | C222 | C223 | C224 |
| 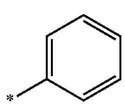 [SMILES: *c1ccccc1] | 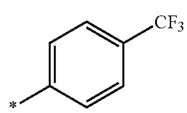 [SMILES: *c1ccc(C(F)(F)F)cc1] | C225 | C226 | C227 | C228 |
| 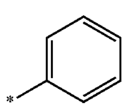 [SMILES: *c1ccccc1] | 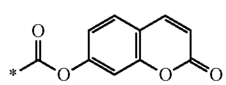 [SMILES: *C(=O)Oc1ccc2ccc(=O)oc2c1] | C229 | C230 | C231 | C232 |
| 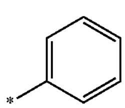 [SMILES: *c1ccccc1] | 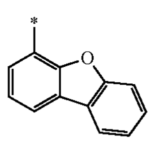 | C233 | C234 | C235 | C236 |
| 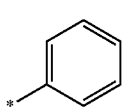 [SMILES: *c1ccccc1] | 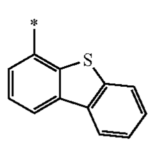 | C237 | C238 | C239 | C240 |

TABLE 3-2-continued
| R2 | R5 | R3, R4 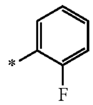 | 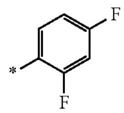 | 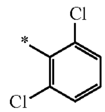 | 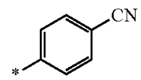 |
|---|---|---|---|---|---|
| 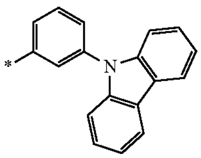 [SMILES: *c1cccc(-n2c3ccccc3c3ccccc32)c1] | 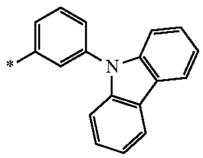 [SMILES: *c1cccc(-n2c3ccccc3c3ccccc32)c1] | C241 | C242 | C243 | C244 |
| 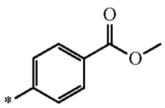 [SMILES: *c1ccc(C(=O)OC)cc1] | 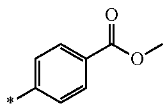 [SMILES: *c1ccc(C(=O)OC)cc1] | C245 | C246 | C247 | C248 |
TABLE 3-3
| R2 | R5 | R3, R4 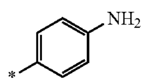 [SMILES: *c1ccc(N)cc1] | 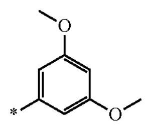 [SMILES: *c1cc(OC)cc(OC)c1] | 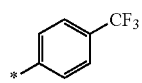 |
|---|---|---|---|---|
| 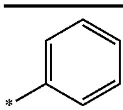 | 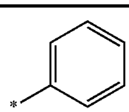 | C249 | C260 | C251 |
| 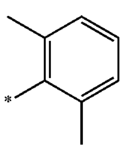 [SMILES: *c1c(C)cccc1C] | 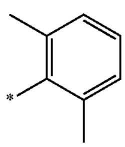 [SMILES: *c1c(C)cccc1C] | C252 | C253 | C254 |
| 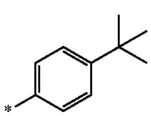 [SMILES: *c1ccc(C(C)(C)C)cc1] | 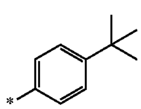 [SMILES: *c1ccc(C(C)(C)C)cc1] | C255 | C256 | C257 |
| 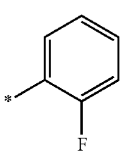 [SMILES: *c1ccccc1F] | 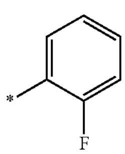 [SMILES: *c1ccccc1F] | C258 | C259 | C260 |
| 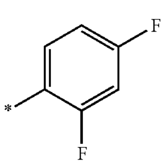 [SMILES: *c1ccc(F)cc1F] | 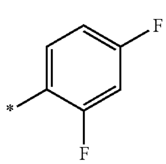 [SMILES: *c1ccc(F)cc1F] | C261 | C262 | C263 |
| 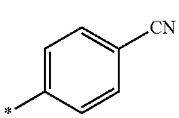 [SMILES: *c1ccc(C#N)cc1] | 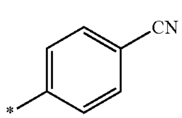 [SMILES: *c1ccc(C#N)cc1] | C264 | C265 | C266 |

TABLE 3-3-continued
| | | $R_3$, $R_4$ | | |
|---|---|---|---|---|
| $R_2$ | $R_5$ | 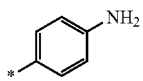 | 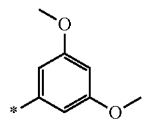 | 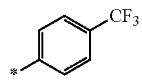 |
| 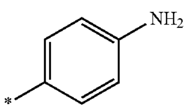 [SMILES: *c1ccc(N)cc1] | 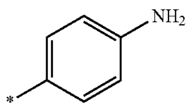 [SMILES: *c1ccc(N)cc1] | C267 | C268 | C269 |
| 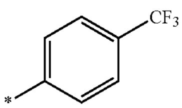 | 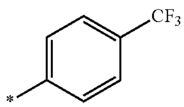 | C270 | C271 | C272 |
| 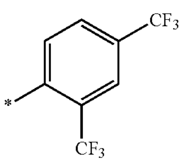 | 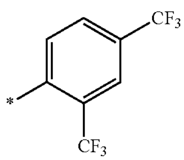 | C273 | C274 | C275 |
| 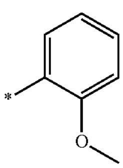 [SMILES: *c1ccccc1OC] | 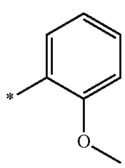 [SMILES: *c1ccccc1OC] | C276 | C277 | C278 |
| 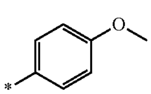 [SMILES: *c1ccc(OC)cc1] | 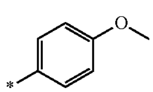 | C279 | C280 | C281 |
| 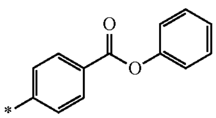 [SMILES: *c1ccc(C(=O)Oc2ccccc2)cc1] | 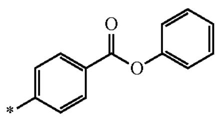 [SMILES: *c1ccc(C(=O)Oc2ccccc2)cc1] | C282 | C283 | C284 |
| 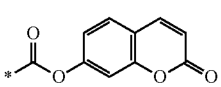 | 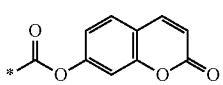 [SMILES: *C(=O)Oc1ccc2ccc(=O)oc2c1] | C285 | C286 | C287 |
| 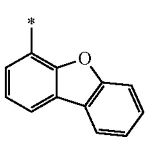 | 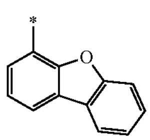 | C288 | C289 | C290 |
| 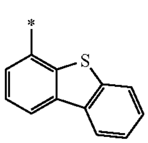 [SMILES: *c1cccc2c1sc1ccccc12] | 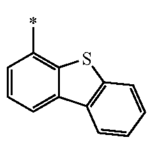 [SMILES: *c1cccc2c1sc1ccccc12] | C291 | C292 | C293 |
| 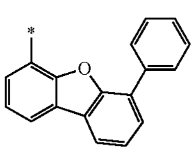 [SMILES: *c1cccc2c1oc1c(-c3ccccc3)cccc12] | 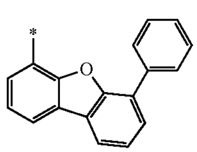 [SMILES: *c1cccc2c1oc1c(-c3ccccc3)cccc12] | C294 | C295 | C296 |

TABLE 3-3-continued
| | | $R_3$, $R_4$ | | |
|---|---|---|---|---|
| $R_2$ | $R_5$ | 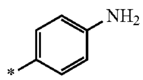 | 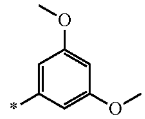 | 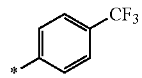 |
| 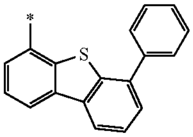 [SMILES: *c1cccc2c1sc1c(-c3ccccc3)cccc12] | 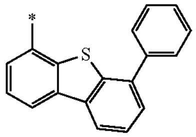 [SMILES: *c1cccc2c1sc1c(-c3ccccc3)cccc12] | C297 | C298 | C299 |
| 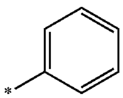 [SMILES: *c1ccccc1] | 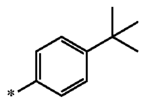 [SMILES: *c1ccc(C(C)(C)C)cc1] | C300 | C301 | C302 |
| 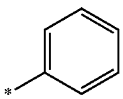 | 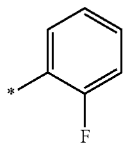 [SMILES: *c1ccccc1F] | C303 | C304 | C305 |
| 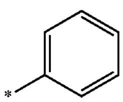 [SMILES: *c1ccccc1] | 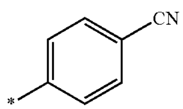 [SMILES: *c1ccc(C#N)cc1] | C306 | C307 | C308 |
| 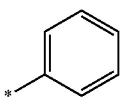 [SMILES: *c1ccccc1] | 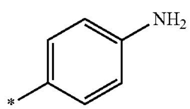 | C309 | C310 | C311 |
| 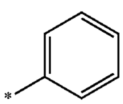 [SMILES: *c1ccccc1] | 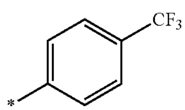 | C312 | C313 | C314 |
| 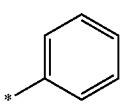 [SMILES: *c1ccccc1] | 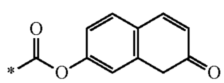 [SMILES: *C(=O)Oc1ccc2c(c1)CC(=O)C=C2] | C315 | C316 | C317 |
| 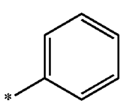 [SMILES: *c1ccccc1] | 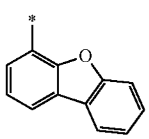 [SMILES: *c1cccc2c1oc1ccccc12] | C318 | C319 | C320 |
| 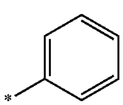 [SMILES: *c1ccccc1] | 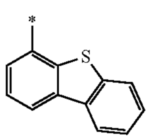 | C321 | C322 | C323 |
| 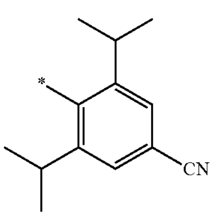 [SMILES: *c1c(C(C)C)cc(C#N)cc1C(C)C] | 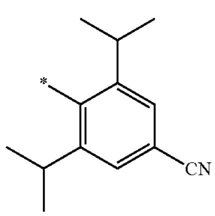 [SMILES: *c1c(C(C)C)cc(C#N)cc1C(C)C] | C324 | C325 | C326 |

TABLE 3-3-continued
| | | $R_3$, $R_4$ | | |
|---|---|---|---|---|
| $R_2$ | $R_5$ | 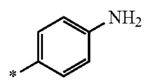 | 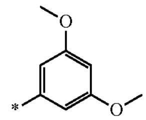 | 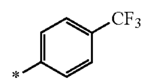 |
| 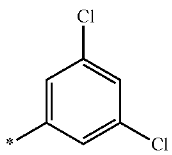 [SMILES: *c1cc(Cl)cc(Cl)c1] | 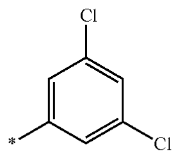 [SMILES: *c1cc(Cl)cc(Cl)c1] | C327 | C328 | C329 |
TABLE 3-4
| | | $R_3$, $R_4$ | | | |
|---|---|---|---|---|---|
| $R_2$ | $R_5$ | 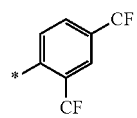 | 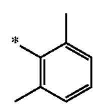 | 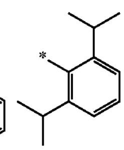 | 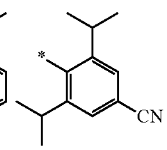 |
| 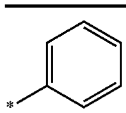 | 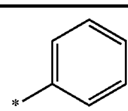 | C330 | C331 | C332 | C333 |
| 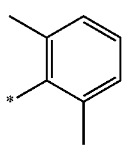 | 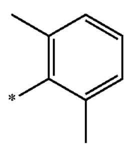 | C334 | C335 | C336 | C337 |
| 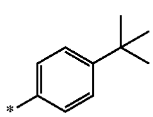 [SMILES: *c1ccc(C(C)(C)C)cc1] | 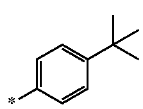 [SMILES: *c1ccc(C(C)(C)C)cc1] | C338 | C339 | C340 | C341 |
| 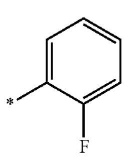 [SMILES: *c1ccccc1F] | 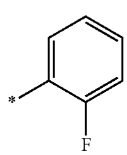 [SMILES: *c1ccccc1F] | C342 | C343 | C344 | C345 |
| 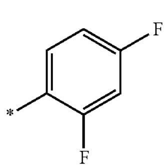 [SMILES: *c1ccc(F)cc1F] | 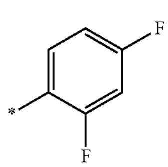 [SMILES: *c1ccc(F)cc1F] | C346 | C347 | C348 | C349 |
| 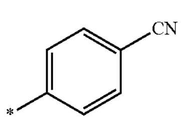 [SMILES: *c1ccc(C#N)cc1] | 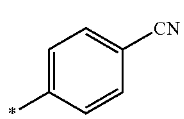 [SMILES: *c1ccc(C#N)cc1] | C350 | C351 | C352 | C353 |
| 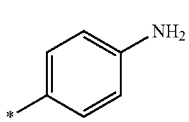 [SMILES: *c1ccc(N)cc1] | 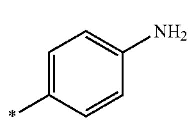 | C354 | C356 | C356 | C357 |

TABLE 3-4-continued
| | | $R_3$, $R_4$ | | | |
|---|---|---|---|---|---|
| $R_2$ | $R_5$ | 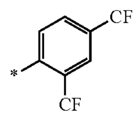 | 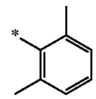 | 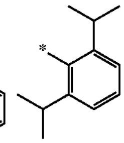 | 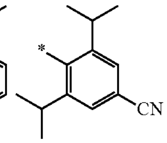 |
| 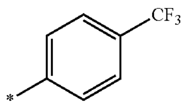 [SMILES: *c1ccc(C(F)(F)F)cc1] | 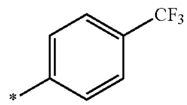 [SMILES: *c1ccc(C(F)(F)F)cc1] | C358 | C359 | C360 | C361 |
| 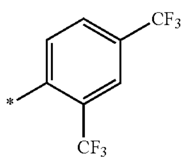 | 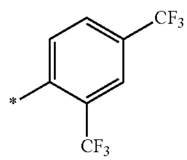 | C362 | C363 | C364 | C365 |
| 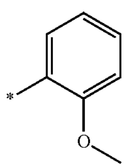 | 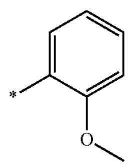 [SMILES: *c1ccccc1OC] | C366 | C367 | C368 | C369 |
| 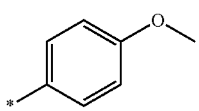 [SMILES: *c1ccc(OC)cc1] | 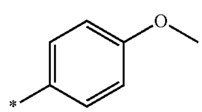 [SMILES: *c1ccc(OC)cc1] | C370 | C371 | C372 | C373 |
| 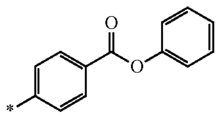 [SMILES: *c1ccc(C(=O)Oc2ccccc2)cc1] | 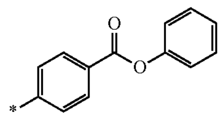 [SMILES: *c1ccc(C(=O)Oc2ccccc2)cc1] | C374 | C375 | C376 | C377 |
| 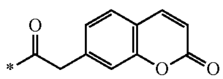 [SMILES: *C(=O)Cc1ccc2ccc(=O)oc2c1] | 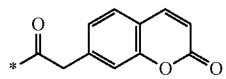 [SMILES: *C(=O)Cc1ccc2ccc(=O)oc2c1] | C378 | C379 | C380 | C381 |
| 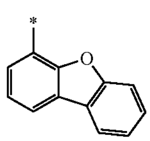 | 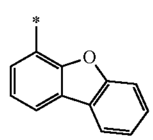 | C382 | C383 | C384 | C385 |
| 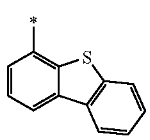 [SMILES: *c1cccc2c1sc1ccccc12] | 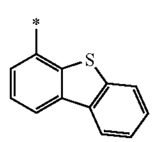 [SMILES: *c1cccc2c1sc1ccccc12] | C386 | C387 | C388 | C389 |
| 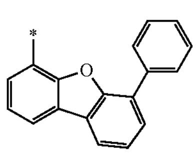 [SMILES: *c1cccc2c1oc1c(-c3ccccc3)cccc12] | 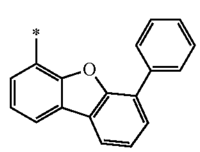 | C390 | C391 | C392 | C393 |
| 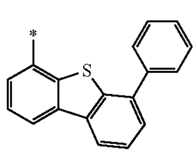 [SMILES: *c1cccc2c1sc1c(-c3ccccc3)cccc12] | 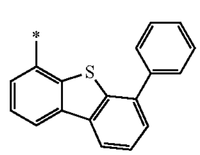 | C394 | C395 | C396 | C397 |

TABLE 3-4-continued
| R2 | R5 | R3, R4 | | | |
|---|---|---|---|---|---|
| | | 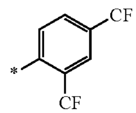 | 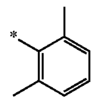 | 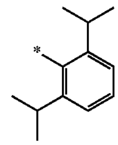 | 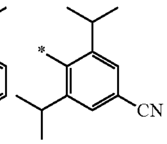 |
| 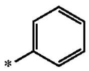 | 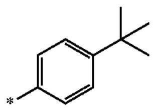 [SMILES: *c1ccc(C(C)(C)C)cc1] | C398 | C399 | C400 | C401 |
| 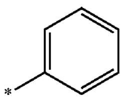 | 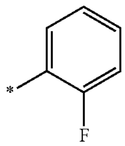 [SMILES: *c1ccccc1F] | C402 | C403 | C404 | C405 |
| 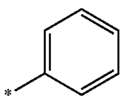 [SMILES: *c1ccccc1] | 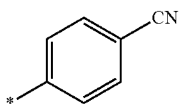 [SMILES: *c1ccc(C#N)cc1] | C406 | C407 | C408 | C409 |
| 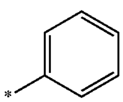 | 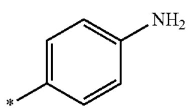 [SMILES: *c1ccc(N)cc1] | C410 | C411 | C412 | C413 |
| 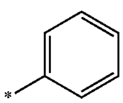 [SMILES: *c1ccccc1] | 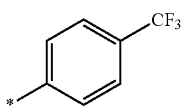 | C414 | C415 | C416 | C417 |
| 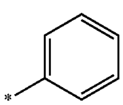 [SMILES: *c1ccccc1] | 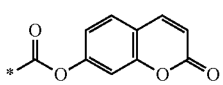 | C418 | C419 | C420 | C421 |
| 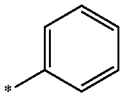 [SMILES: *c1ccccc1] | 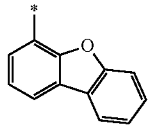 [SMILES: *c1cccc2c1oc1ccccc12] | C422 | C423 | C424 | C425 |
| 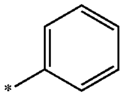 | 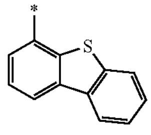 | C426 | C427 | C428 | C429 |

TABLE 3-5
| | | $R_3$, $R_4$ | | |
|---|---|---|---|---|
| $R_2$ | $R_5$ | 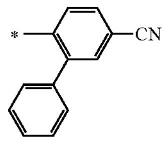 | 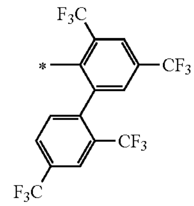 | 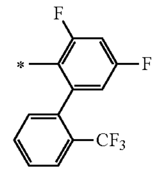 |
| 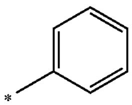 | 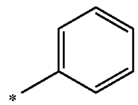 | C430 | C431 | C432 |
| 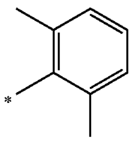 | 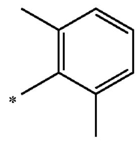 | C433 | C434 | C435 |
| 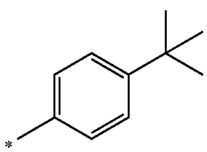 | 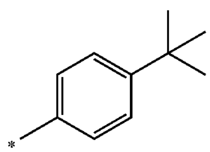 | C436 | C437 | C438 |
| 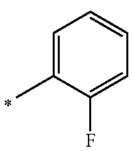 | 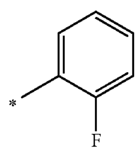 | C439 | C440 | C441 |
| 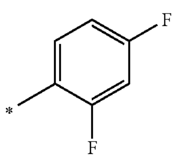 | 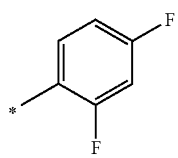 | C442 | C443 | C444 |
| 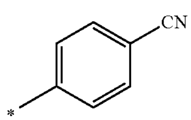 | 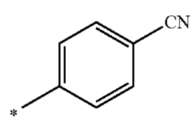 | C445 | C446 | C447 |
| 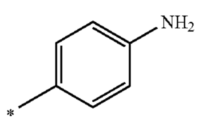 | 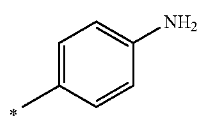 | C448 | C449 | C450 |
| 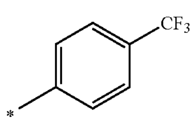 | 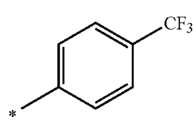 | C451 | C452 | C453 |
| 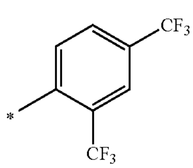 | 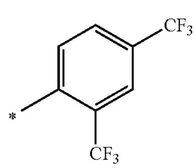 | C454 | C455 | C456 |

TABLE 3-5-continued
| | | R3, R4 | | |
|---|---|---|---|---|
| R2 | R5 | 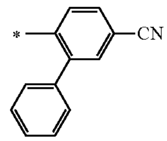 | 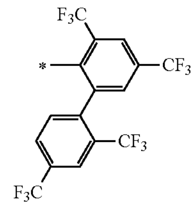 | 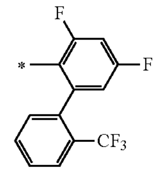 |
| 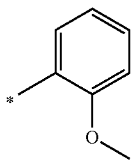 | 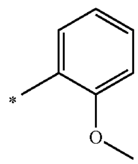 | C457 | C458 | C459 |
| 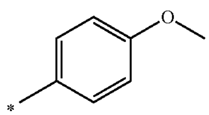 | 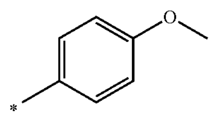 | C460 | C461 | C462 |
| 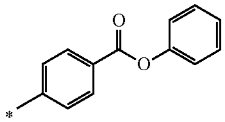 | 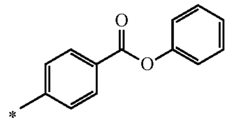 | C463 | C464 | C465 |
| 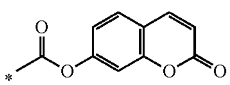 | 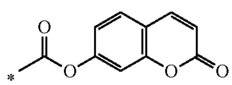 | C466 | C467 | C468 |
| 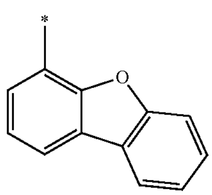 | 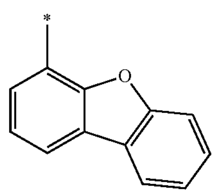 | C469 | C470 | C471 |
| 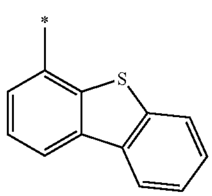 | 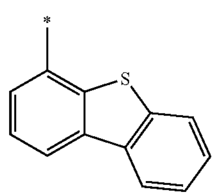 | C472 | C473 | C474 |
| 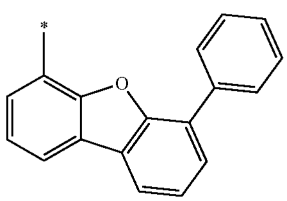 | 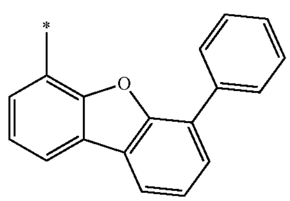 | C475 | C476 | C477 |
| 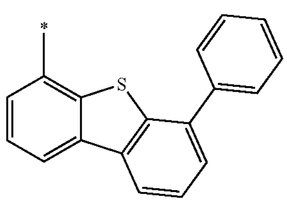 | 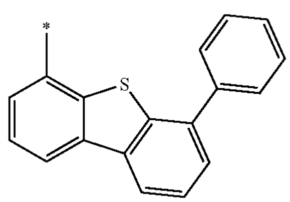 | C478 | C479 | C480 |

TABLE 3-5-continued
| R2 | R5 | R3, R4 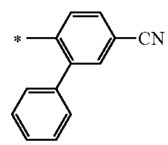 | 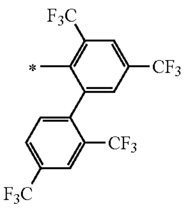 | 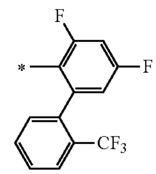 |
|---|---|---|---|---|
| 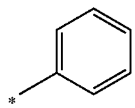 | 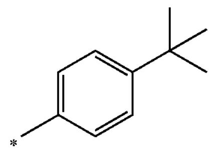 | C481 | C482 | C483 |
| 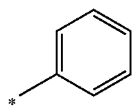 | 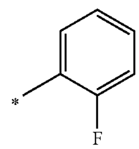 | C484 | C485 | C486 |
| 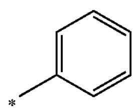 | 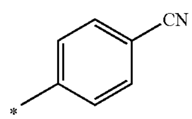 | C487 | C488 | C489 |
| 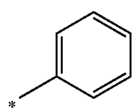 | 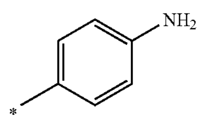 | C490 | C491 | C492 |
| 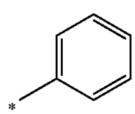 | 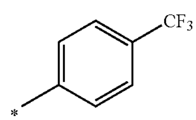 | C493 | C494 | C495 |
| 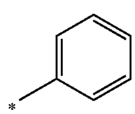 | 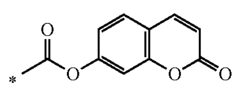 | C496 | C497 | C498 |
| 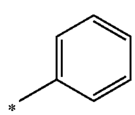 | 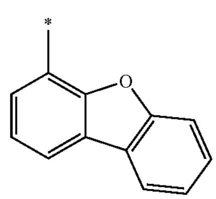 | C499 | C500 | C501 |
| 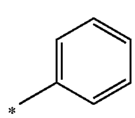 | 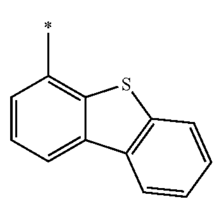 | C502 | C503 | C504 |

TABLE 3-6
| $R_2$ | $R_5$ | $R_3$, $R_4$ | | |
|---|---|---|---|---|
| | | 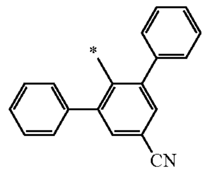 | 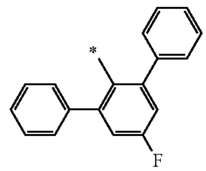 [SMILES: Cc1c(-c2ccccc2)cc(F)cc1-c1ccccc1] | 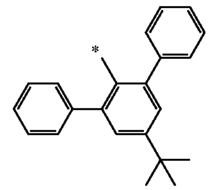 [SMILES: Cc1c(-c2ccccc2)cc(C(C)(C)C)cc1-c1ccccc1] |
| 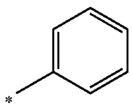 | 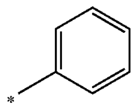 | C505 | C506 | C507 |
| 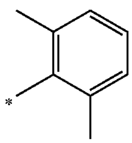 | 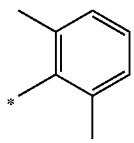 | C508 | C509 | C510 |
| 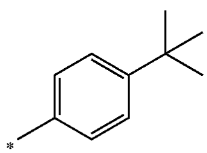 | 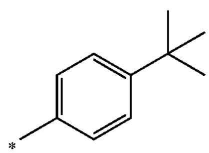 | C511 | C512 | C513 |
| 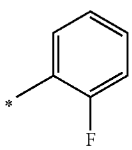 | 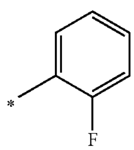 | C514 | C515 | C516 |
| 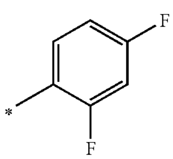 | 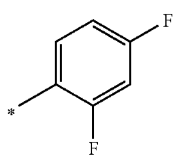 | C517 | C518 | C519 |
| 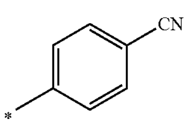 | 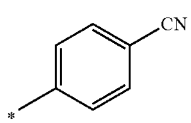 | C520 | C521 | C522 |
| 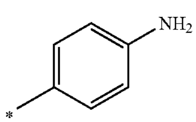 | 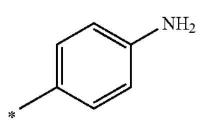 | C523 | C524 | C525 |
| 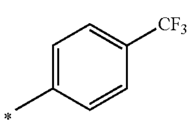 | 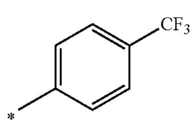 | C526 | C527 | C528 |
| 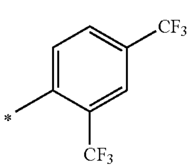 | 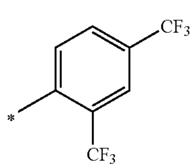 | C529 | C530 | C531 |

TABLE 3-6-continued
| | | $R_3$, $R_4$ | | |
|---|---|---|---|---|
| $R_2$ | $R_5$ | 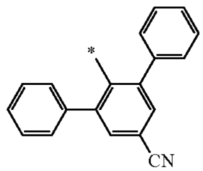 | 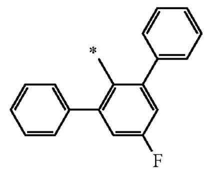 | 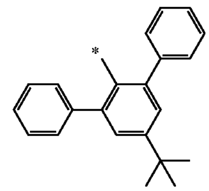 |
| 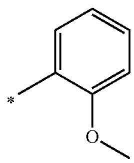 | 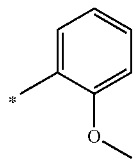 | C532 | C533 | C534 |
| 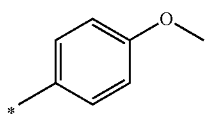 | 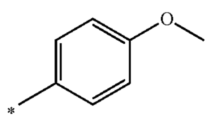 | C535 | C536 | C537 |
| 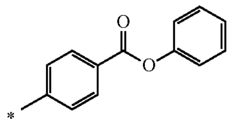 | 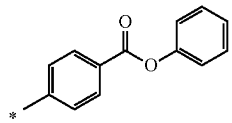 | C538 | C539 | C540 |
| 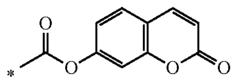 | 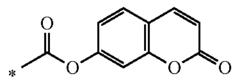 | C541 | C542 | C543 |
| 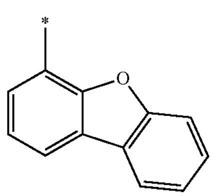 | 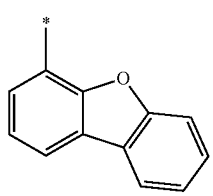 | C544 | C545 | C546 |
| 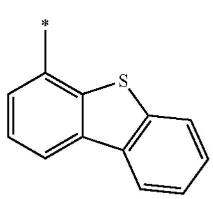 | 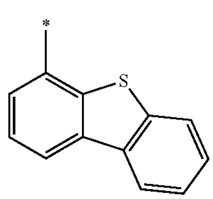 | C547 | C548 | C549 |
| 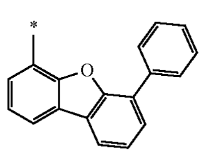 | 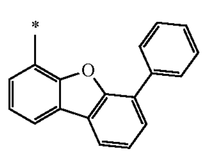 | C550 | C551 | C552 |
| 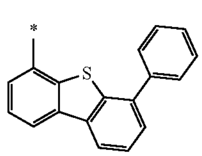 | 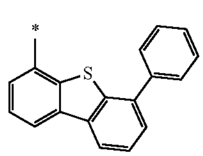 | C553 | C554 | C555 |

TABLE 3-6-continued
| | | R3, R4 | | |
|---|---|---|---|---|
| R2 | R5 | 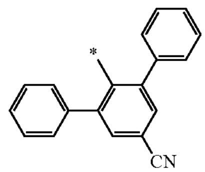 | 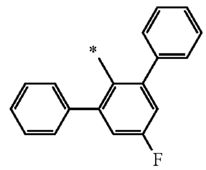 | 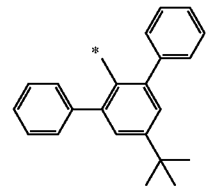 |
| 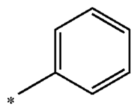 | 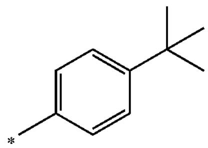 | C556 | C557 | C558 |
| 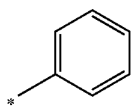 | 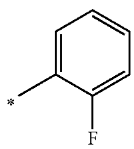 | C559 | C560 | C561 |
| 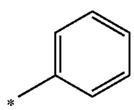 | 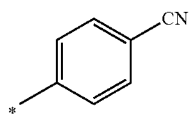 | C562 | C563 | C564 |
| 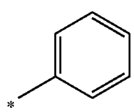 | 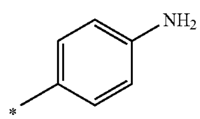 | C565 | C566 | C567 |
| 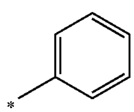 | 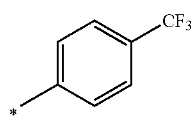 | C568 | C569 | C570 |
| 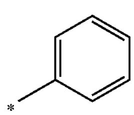 | 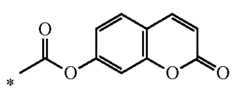 | C571 | C572 | C573 |
| 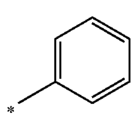 | 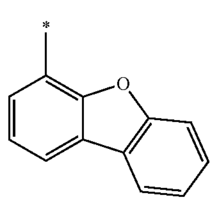 | C574 | C575 | C576 |
| 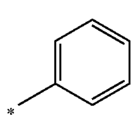 | 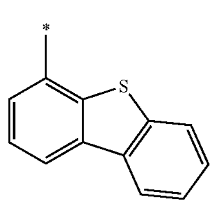 | C577 | C578 | C579 |

TABLE 3-6-continued
| | | $R_3$, $R_4$ | | |
|---|---|---|---|---|
| | | 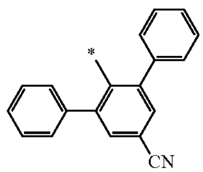 | 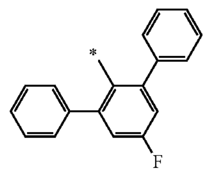 | 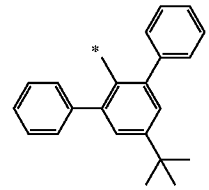 |
| $R_2$ | $R_5$ | | | |
| 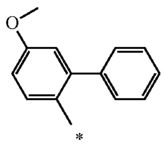 | 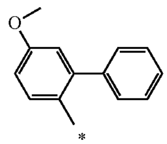 | C580 | C581 | C582 |
| 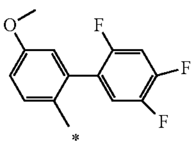 [SMILES: COc1ccc(C)c(-c2cc(F)c(F)cc2F)c1] | 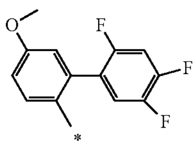 [SMILES: COc1ccc(C)c(-c2cc(F)c(F)cc2F)c1] | C583 | C584 | C585 |
TABLE 3-7
| | | $R_3$, $R_4$ | | |
|---|---|---|---|---|
| | | 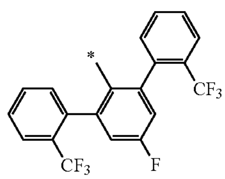 | 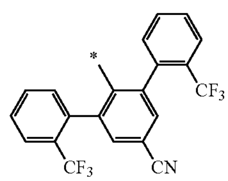 | 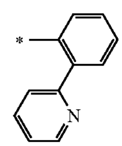 |
| $R_2$ | $R_5$ | | | |
| 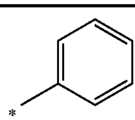 | 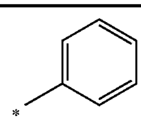 | C586 | C587 | C588 |
| 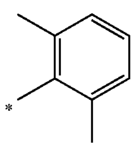 | 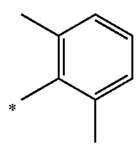 | C589 | C590 | C591 |
| 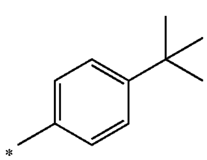 | 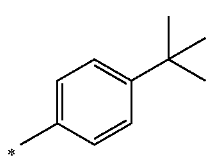 | C592 | C593 | C594 |
| 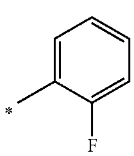 | 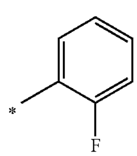 | C595 | C596 | C597 |
| 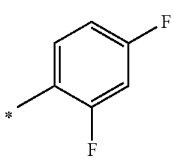 | 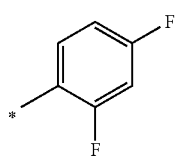 | C598 | C599 | C600 |

TABLE 3-7-continued
| | | $R_3$, $R_4$ | | |
|---|---|---|---|---|
| $R_2$ | $R_5$ | 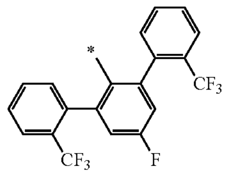 | 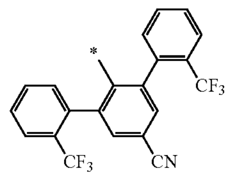 | 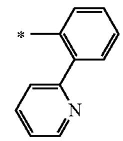 |
| 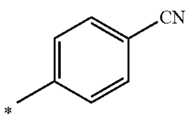 | 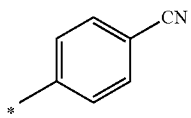 | C601 | C602 | C603 |
| 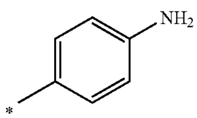 | 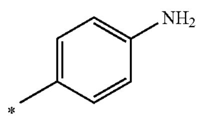 | C604 | C605 | C606 |
| 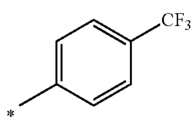 | 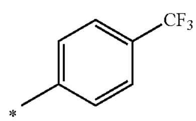 | C607 | C608 | C609 |
| 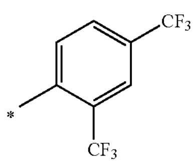 | 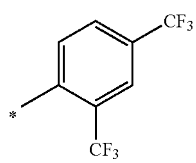 | C610 | C611 | C612 |
| 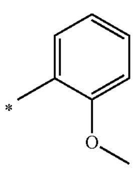 | 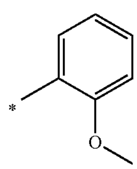 | C613 | C614 | C615 |
| 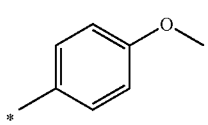 | 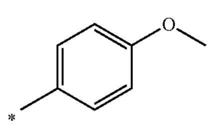 | C616 | C617 | C618 |
| 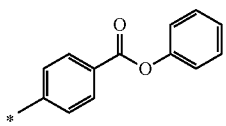 | 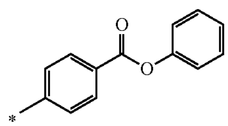 | C619 | C620 | C621 |
| 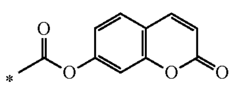 | 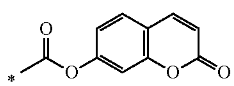 | C622 | C623 | C624 |
| 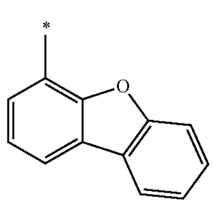 | 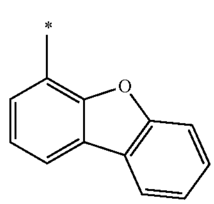 | C625 | C626 | C627 |

TABLE 3-7-continued
| | | R3, R4 | | |
|---|---|---|---|---|
| R2 | R5 | 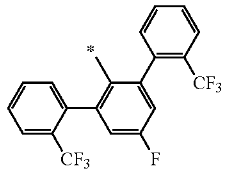 | 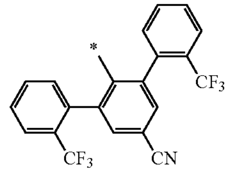 | 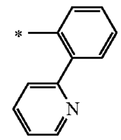 |
| 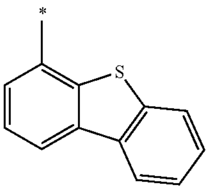 | 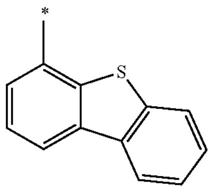 | C628 | C629 | C630 |
| 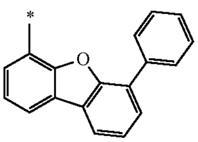 | 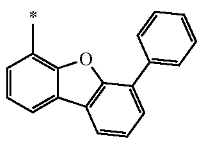 | C631 | C632 | C633 |
| 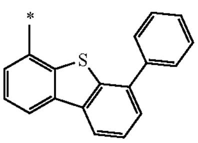 | 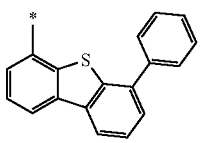 | C634 | C635 | C636 |
| 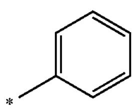 | 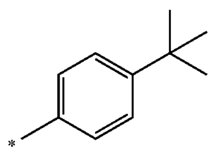 | C637 | C638 | C639 |
| 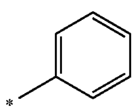 | 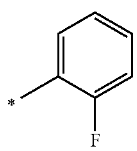 | C640 | C641 | C642 |
| 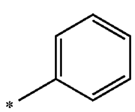 | 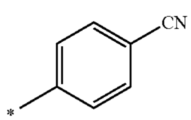 | C643 | C644 | C645 |
| 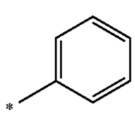 | 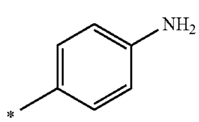 | C646 | C647 | C648 |
| 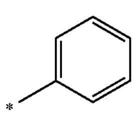 | 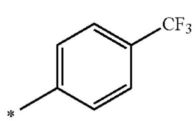 | C649 | C650 | C651 |
| 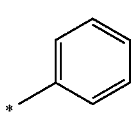 | 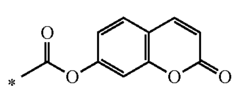 | C652 | C653 | C654 |

TABLE 3-7-continued
| R2 | R5 | R3, R4 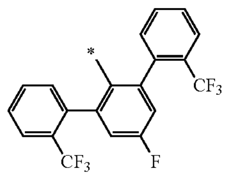 | 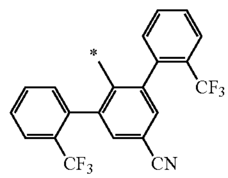 | 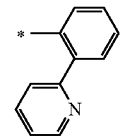 |
|---|---|---|---|---|
| 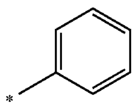 | 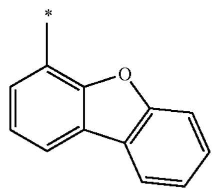 | C655 | C656 | C657 |
| 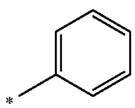 | 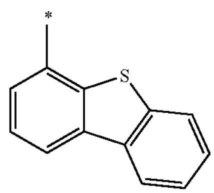 | C658 | C659 | C660 |
TABLE 3-8
| R2 | R5 | R3, R4 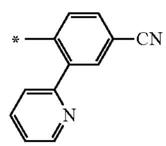 | 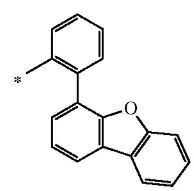 | 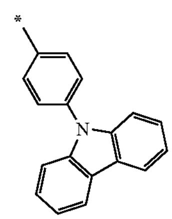 |
|---|---|---|---|---|
| 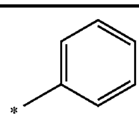 | 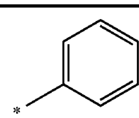 | C661 | C662 | C663 |
| 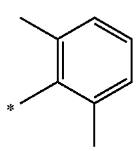 | 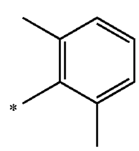 | C664 | C665 | C666 |
| 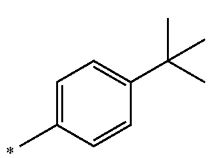 | 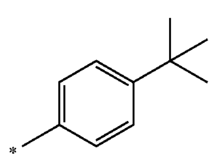 | C667 | C668 | C669 |
| 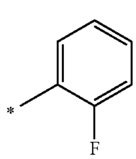 | 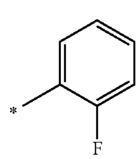 | C670 | C671 | C672 |

TABLE 3-8-continued
| | | R3, R4 | | |
|---|---|---|---|---|
| R2 | R5 | 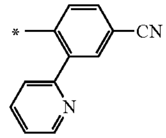 | 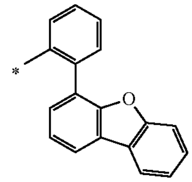 | 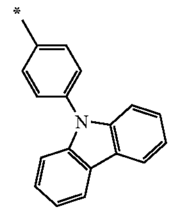 |
| 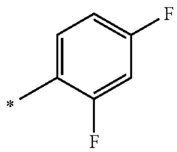 | 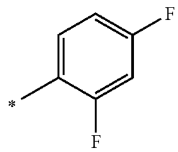 | C673 | C674 | C675 |
| 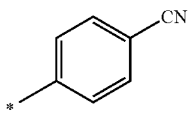 | 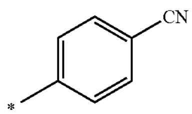 | C676 | C677 | C678 |
| 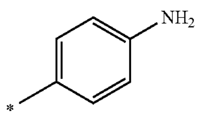 | 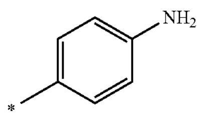 | C679 | C680 | C681 |
| 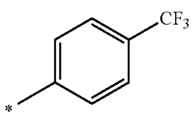 | 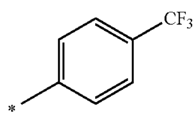 | C682 | C683 | C684 |
| 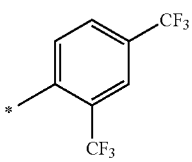 | 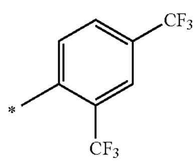 | C685 | C686 | C687 |
| 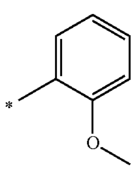 | 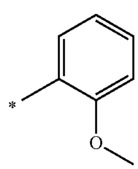 | C688 | C689 | C690 |
| 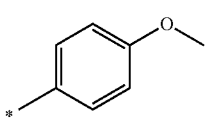 | 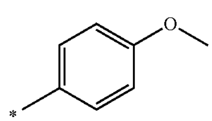 | C691 | C692 | C693 |
| 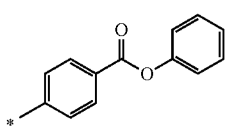 | 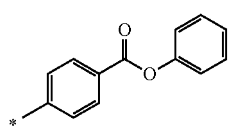 | C694 | C695 | C696 |
| 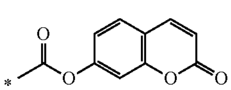 | 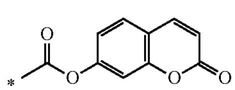 | C697 | C698 | C699 |

TABLE 3-8-continued
| | | $R_3$, $R_4$ | | |
|---|---|---|---|---|
| $R_2$ | $R_5$ | 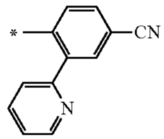 | 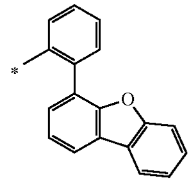 | 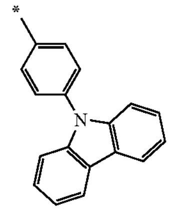 |
| 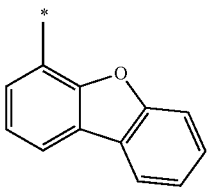 | 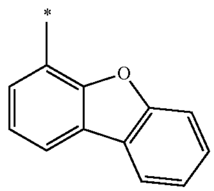 | C700 | C701 | C702 |
| 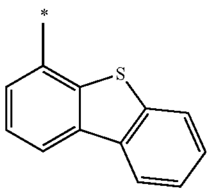 | 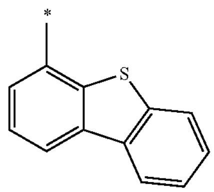 | C703 | C704 | C705 |
| 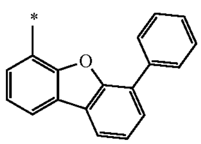 | 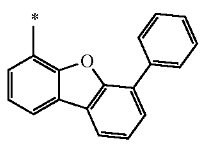 | C706 | C707 | C708 |
| 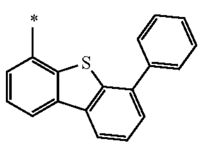 | 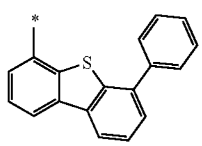 | C709 | C710 | C711 |
| 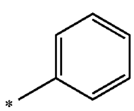 | 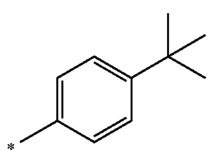 | C712 | C713 | C714 |
| 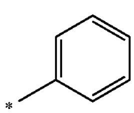 | 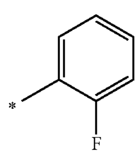 | C715 | C716 | C717 |
| 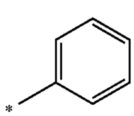 | 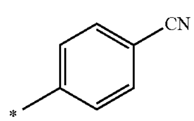 | C718 | C719 | C720 |
| 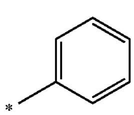 | 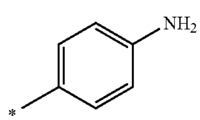 | C721 | C722 | C723 |

TABLE 3-8-continued
| R2 | R5 | R3, R4 | | |
|---|---|---|---|---|
| | | 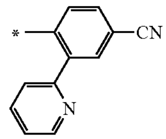 | 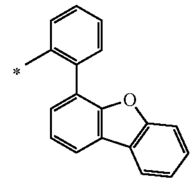 | 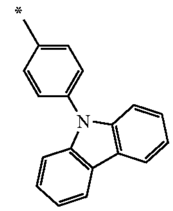 |
| 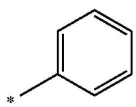 | 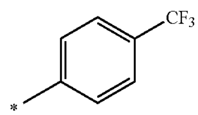 | C724 | C725 | C726 |
| 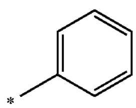 | 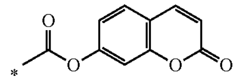 | C727 | C728 | C729 |
| 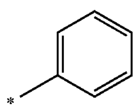 | 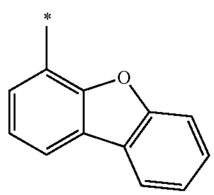 | C730 | C731 | C732 |
| 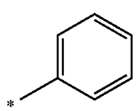 | 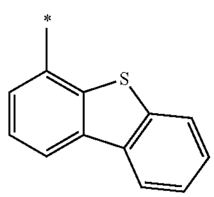 | C733 | C734 | C735 |
| 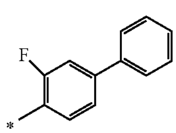 | 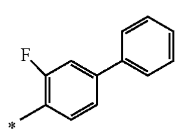 | C736 | C737 | C738 |
| 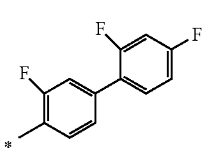 | 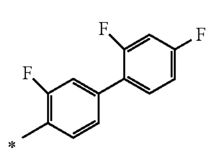 | C739 | C740 | C741 |
| 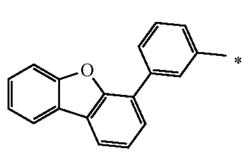 | 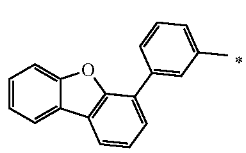 | C742 | C743 | C744 |

TABLE 3-9
| | | R3, R4 | | |
|---|---|---|---|---|
| R2 | R5 | 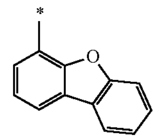 | 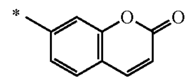 | 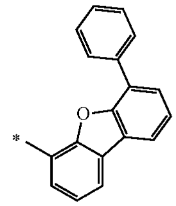 |
| 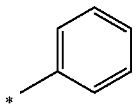 | 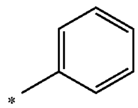 | C745 | C746 | C747 |
| 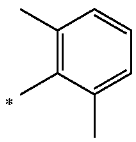 | 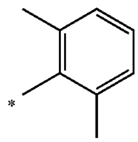 | C748 | C749 | C750 |
| 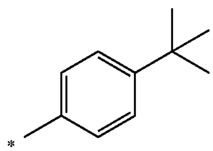 | 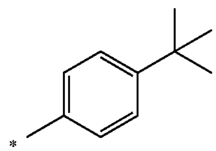 | C751 | C752 | C753 |
| 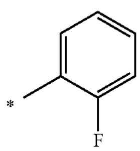 | 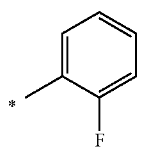 | C754 | C755 | C756 |
| 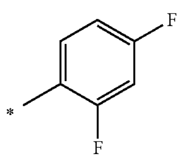 | 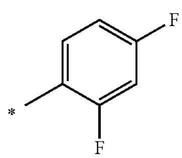 | C757 | C758 | C759 |
| 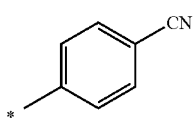 | 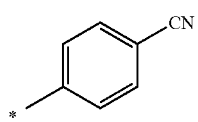 | C760 | C761 | C762 |
| 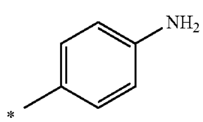 | 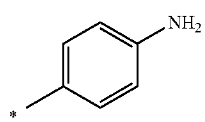 | C763 | C764 | C765 |
| 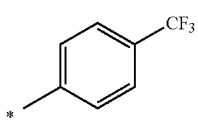 | 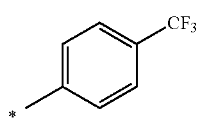 | C766 | C767 | C768 |
| 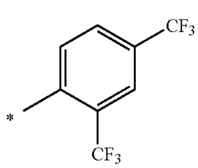 | 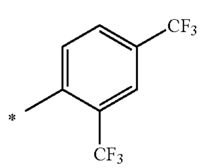 | C769 | C770 | C771 |

TABLE 3-9-continued
| | | R3, R4 | | |
|---|---|---|---|---|
| R2 | R5 | 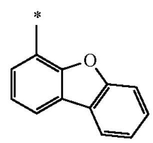 | 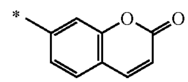 | 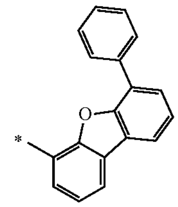 |
| 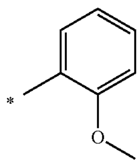 | 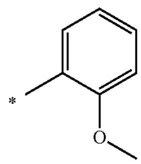 | C772 | C773 | C774 |
| 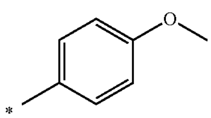 | 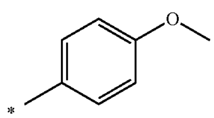 | C775 | C776 | C777 |
| 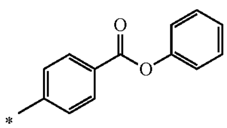 | 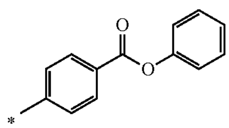 | C778 | C779 | C780 |
| 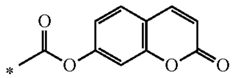 | 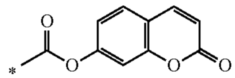 | C781 | C782 | C783 |
| 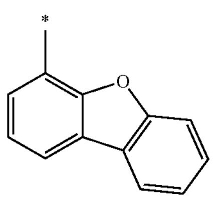 | 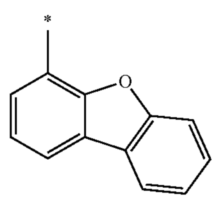 | C784 | C785 | C786 |
| 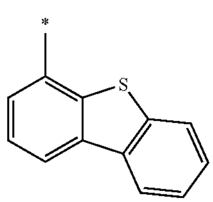 | 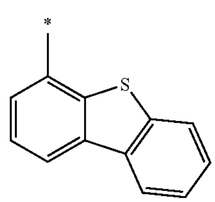 | C787 | C788 | C789 |
| 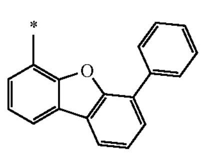 | 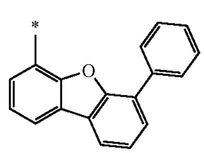 | C790 | C791 | C792 |
| 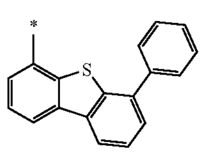 | 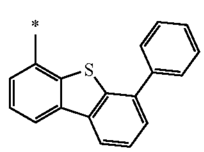 | C793 | C794 | C795 |

TABLE 3-9-continued
| | | $R_3$, $R_4$ | | |
|---|---|---|---|---|
| $R_2$ | $R_5$ | 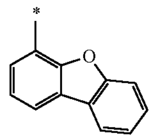 | 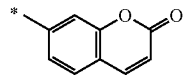 | 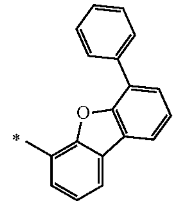 |
| 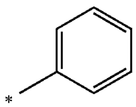 | 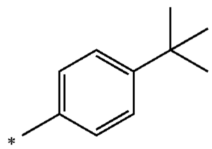 | C796 | C797 | C798 |
| 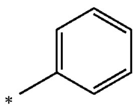 | 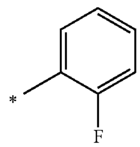 | C799 | C800 | C801 |
| 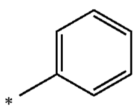 | 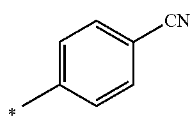 | C802 | C803 | C804 |
| 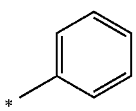 | 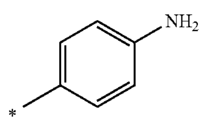 | C805 | C806 | C807 |
| 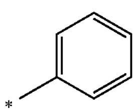 | 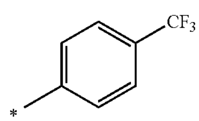 | C808 | C809 | C810 |
| 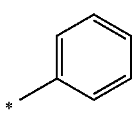 | 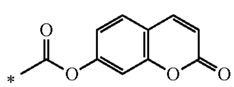 | C811 | C812 | C813 |
| 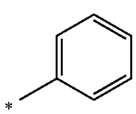 | 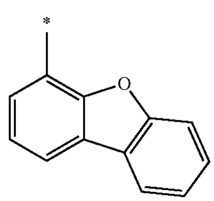 | C814 | C815 | C816 |
| 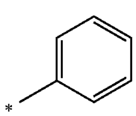 | 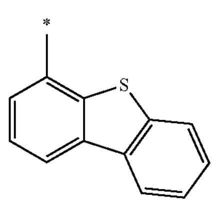 | C817 | C818 | C819 |
| 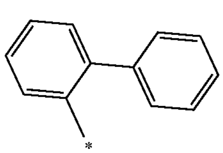 | 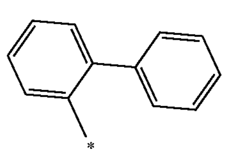 | C820 | C821 | C822 |

TABLE 3-9-continued
| | | $R_3$, $R_4$ | | |
|---|---|---|---|---|
| $R_2$ | $R_5$ | 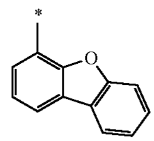 | 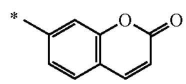 | 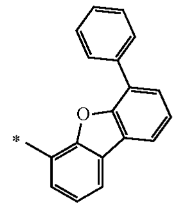 |
| 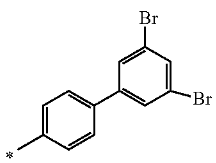 | 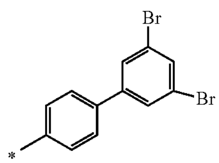 | C823 | C824 | C825 |
| 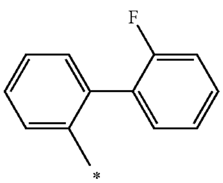 | 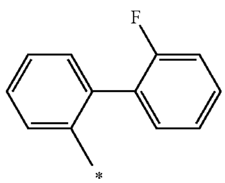 | C826 | C827 | C828 |
| 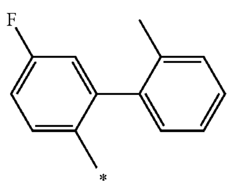 | 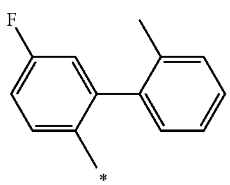 | C829 | C830 | C831 |
| 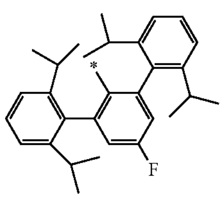 | 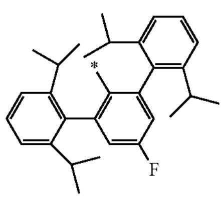 | C832 | C833 | C834 |
| 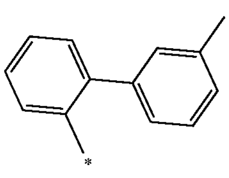 | 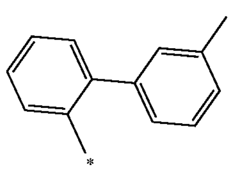 | C835 | C836 | C837 |
| 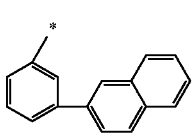 | 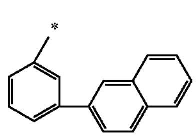 | C838 | C839 | C840 |

TABLE 3-10
| | | R3, R4 | | |
|---|---|---|---|---|
| R2 | R5 | 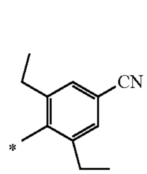 | 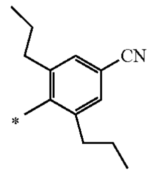 | 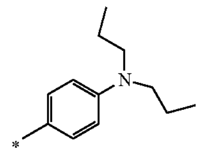 |
| 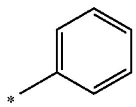 | 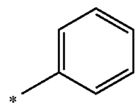 | C841 | C842 | C843 |
| 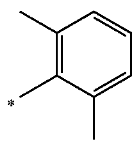 | 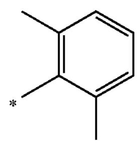 | C844 | C845 | C846 |
| 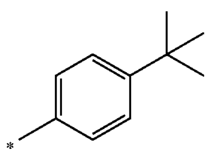 | 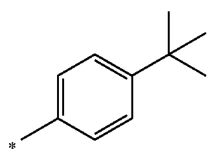 | C847 | C848 | C849 |
| 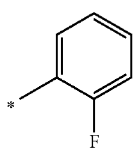 | 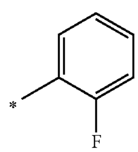 | C850 | C851 | C852 |
| 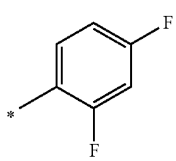 | 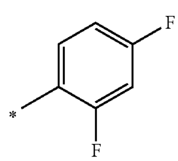 | C853 | C854 | C855 |
| 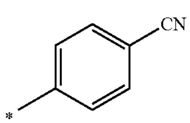 | 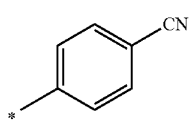 | C856 | C857 | C858 |
| 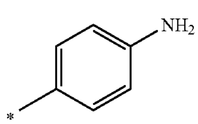 | 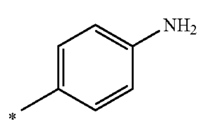 | C859 | C860 | C861 |
| 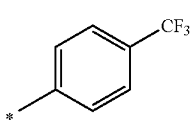 | 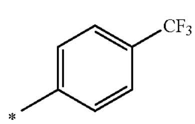 | C862 | C863 | C864 |
| 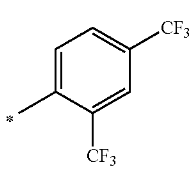 | 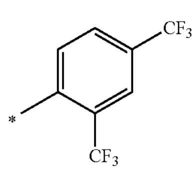 | C865 | C866 | C867 |

TABLE 3-10-continued
| | | R3, R4 | | |
|---|---|---|---|---|
| R2 | R5 | 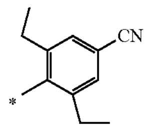 | 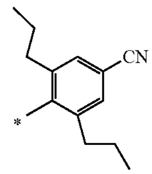 | 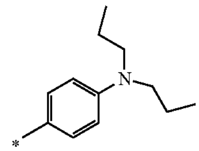 |
| 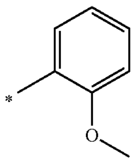 | 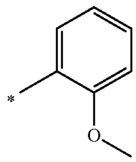 | C868 | C869 | C870 |
| 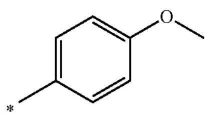 | 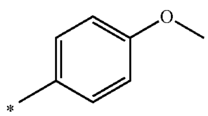 | C871 | C872 | C873 |
| 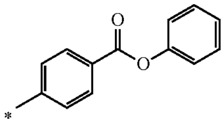 | 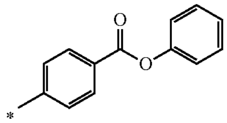 | C874 | C875 | C876 |
| 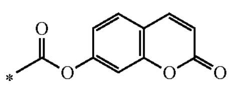 | 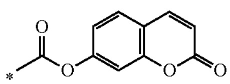 | C877 | C878 | C879 |
| 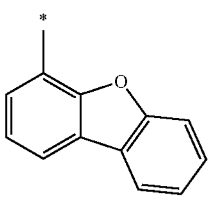 | 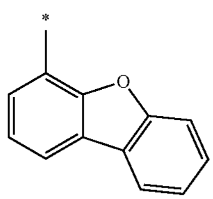 | C880 | C881 | C882 |
| 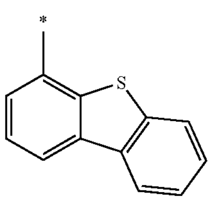 | 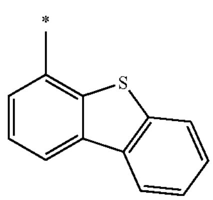 | C883 | C884 | C885 |
| 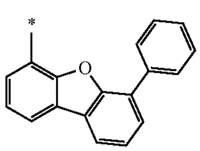 | 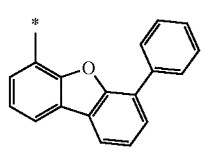 | C886 | C887 | C888 |
| 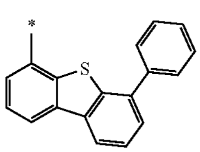 | 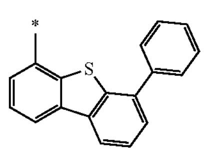 | C889 | C890 | C891 |

TABLE 3-10-continued
| | | R3, R4 | | |
|---|---|---|---|---|
| R2 | R5 | 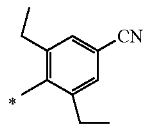 | 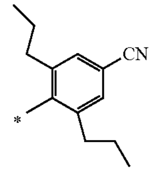 | 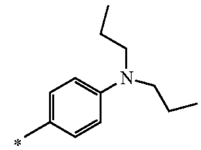 |
| 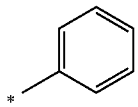 | 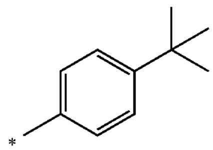 | C892 | C893 | C894 |
| 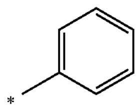 | 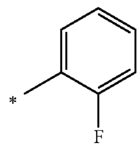 | C895 | C896 | C897 |
| 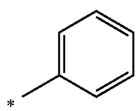 | 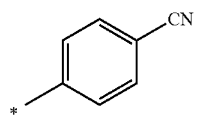 | C898 | C899 | C900 |
| 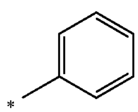 | 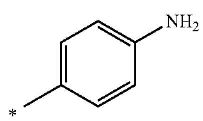 | C901 | C902 | C903 |
| 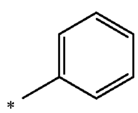 | 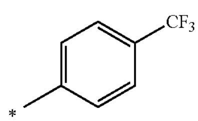 | C904 | C905 | C906 |
| 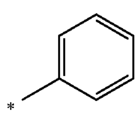 | 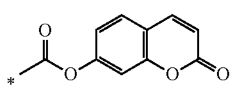 | C907 | C908 | C909 |
| 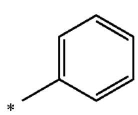 | 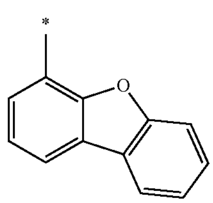 | C910 | C911 | C912 |
| 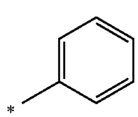 | 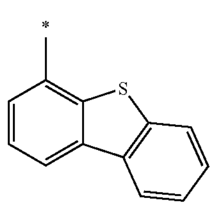 | C913 | C914 | C915 |

TABLE 3-11
| | | $R_3$, $R_4$ | | | |
|---|---|---|---|---|---|
| $R_2$ | $R_5$ | 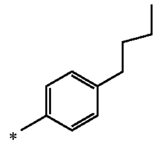 | 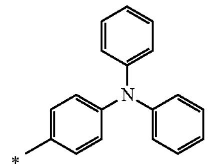 | 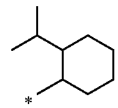 | 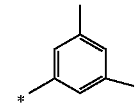 |
| 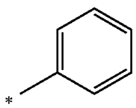 | 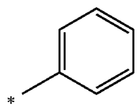 | C916 | C917 | C918 | C919 |
| 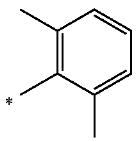 | 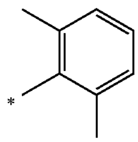 | C920 | C921 | C922 | C923 |
| 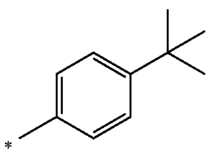 | 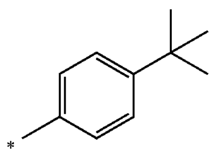 | C924 | C925 | C926 | C927 |
| 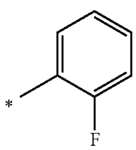 | 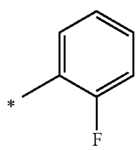 | C928 | C929 | C930 | C931 |
| 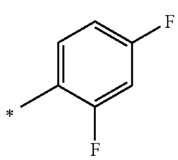 | 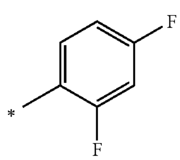 | C932 | C933 | C934 | C935 |
| 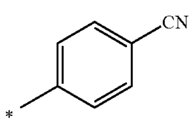 | 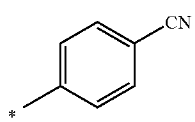 | C936 | C937 | C938 | C939 |
| 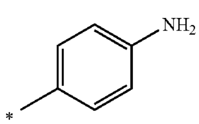 | 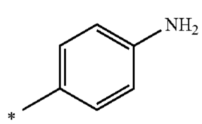 | C940 | C941 | C942 | C943 |
| 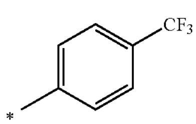 | 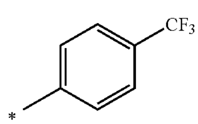 | C944 | C945 | C946 | C947 |
| 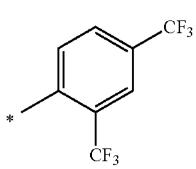 | 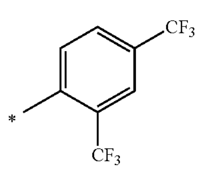 | C948 | C949 | C950 | C951 |

TABLE 3-11-continued
| | | R3, R4 | | | |
|---|---|---|---|---|---|
| R2 | R5 | 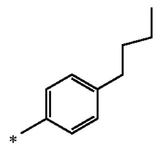 | 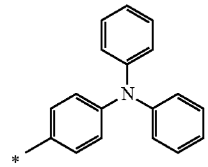 | 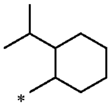 | 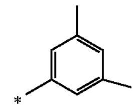 |
| 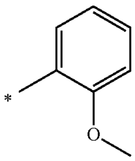 | 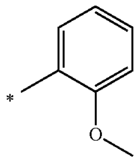 | C952 | C953 | C954 | C955 |
| 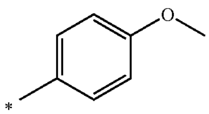 | 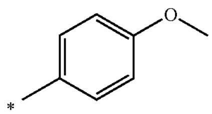 | C956 | C957 | C958 | C959 |
| 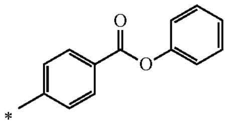 | 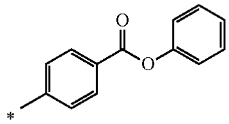 | C960 | C961 | C962 | C963 |
| 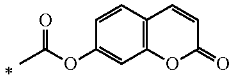 | 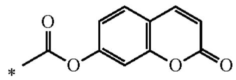 | C964 | C965 | C966 | C967 |
| 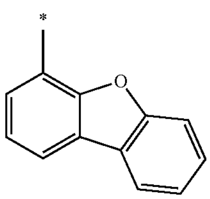 | 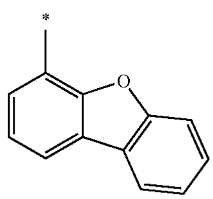 | C968 | C969 | C970 | C971 |
| 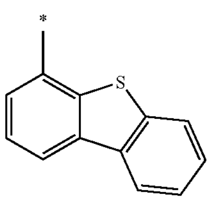 | 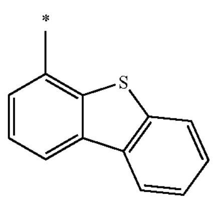 | C972 | C973 | C974 | C975 |
| 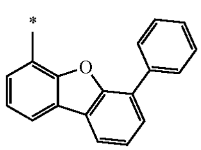 | 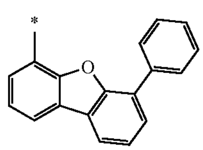 | C976 | C977 | C978 | C979 |
| 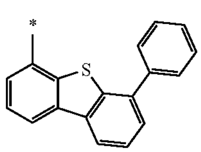 | 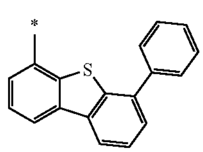 | C980 | C981 | C982 | C983 |
| 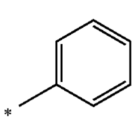 | 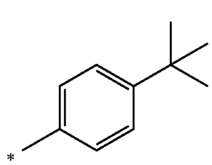 | C984 | C985 | C986 | C987 |

TABLE 3-11-continued
| | | R3, R4 | | | |
|---|---|---|---|---|---|
| R2 | R5 | 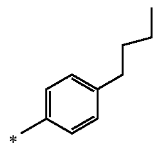 | 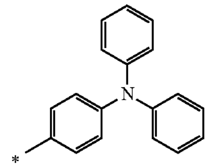 | 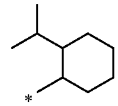 | 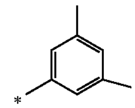 |
| 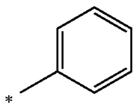 | 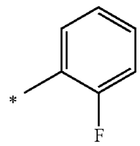 | C988 | C989 | C990 | C991 |
| 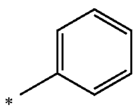 | 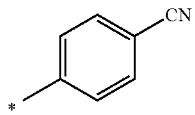 | C992 | C993 | C994 | C995 |
| 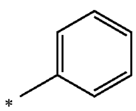 | 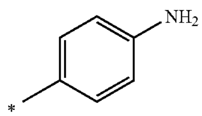 | C996 | C997 | C998 | C999 |
| 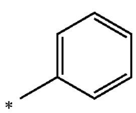 | 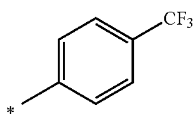 | C1000 | C1001 | C1002 | C1003 |
| 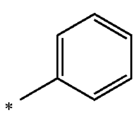 | 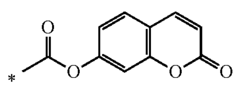 | C1004 | C1005 | C1006 | C1007 |
| 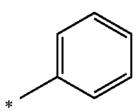 | 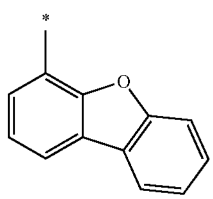 | C1008 | C1009 | C1010 | C1011 |
| 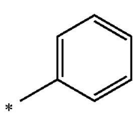 | 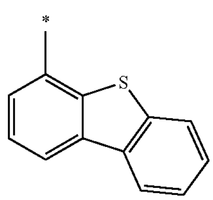 | C1012 | C1013 | C1014 | C1015 |
| 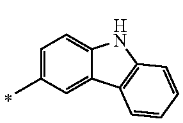 | 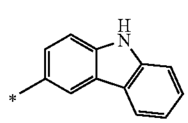 | C1016 | C1017 | C1018 | C1019 |

TABLE 3-12
| R$_2$ | R$_5$ | R$_3$, R$_4$ | | | |
|---|---|---|---|---|---|
| | | 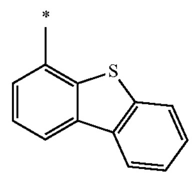 | 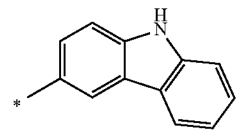 | 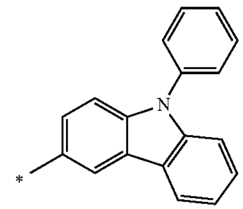 [SMILES: Cc1ccc2c(c1)c1ccccc1n2-c1ccccc1] | 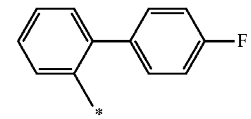 |
| 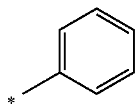 | 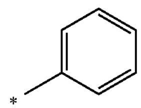 | C1020 | C1021 | C1022 | C1023 |
| 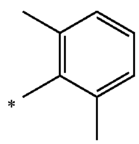 | 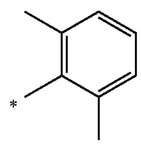 | C1024 | C1025 | C1026 | C1027 |
| 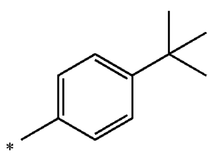 | 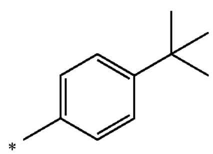 | C1028 | C1029 | C1030 | C1031 |
| 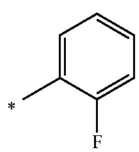 | 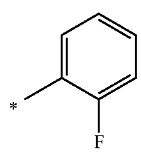 | C1032 | C1033 | C1034 | C1035 |
| 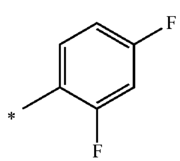 | 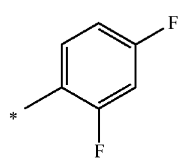 | C1036 | C1037 | C1038 | C1039 |

TABLE 3-12-continued
| | | R3, R4 | | | |
|---|---|---|---|---|---|
| $R_2$ | $R_5$ | 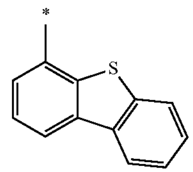 | 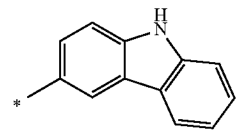 | 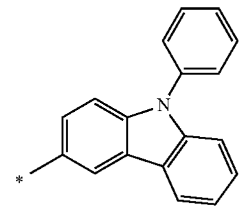 | 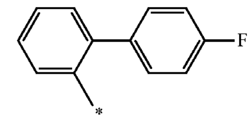 |
| 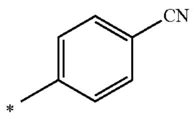 | 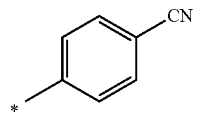 | C1040 | C1041 | C1042 | C1043 |
| 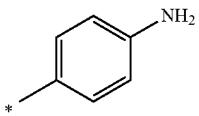 | 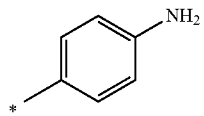 | C1044 | C1045 | C1046 | C1047 |
| 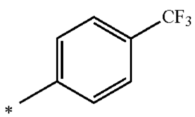 | 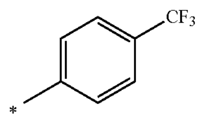 | C1048 | C1049 | C1050 | C1051 |
| 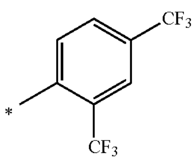 | 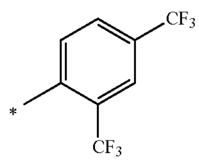 | C1052 | C1053 | C1054 | C1055 |
| 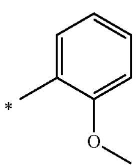 | 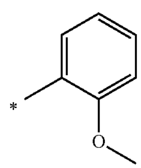 | C1056 | C1057 | C1058 | C1059 |

TABLE 3-12-continued
| R₂ | R₅ | R₃, R₄ 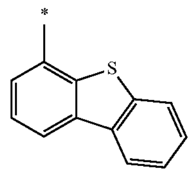 | 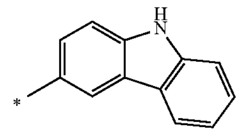 | 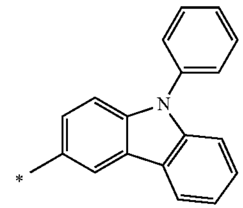 | 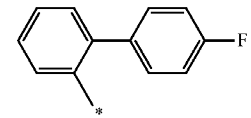 |
|---|---|---|---|---|---|
| 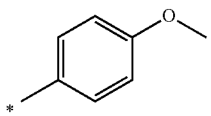 | 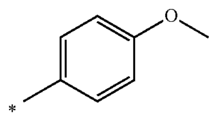 | C1060 | C1061 | C1062 | C1063 |
| 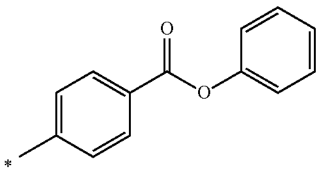 | 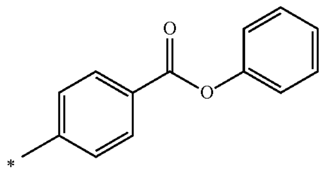 | C1064 | C1065 | C1066 | C1067 |
| 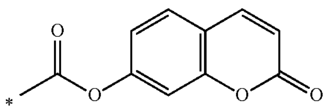 | 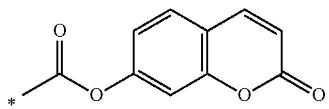 | C1068 | C1069 | C1070 | C1071 |
| 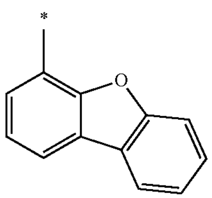 | 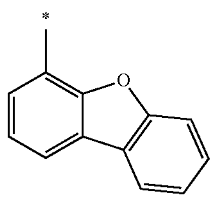 | C1072 | C1073 | C1074 | C1075 |
| 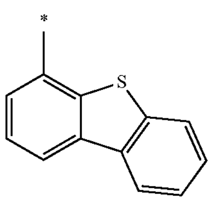 | 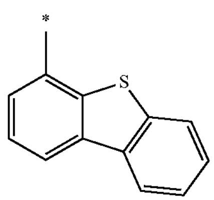 | C1076 | C1077 | C1078 | C1079 |

TABLE 3-12-continued
| | | R3, R4 | | | |
|---|---|---|---|---|---|
| R2 | R5 | 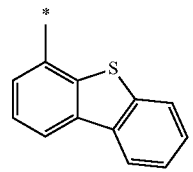 | 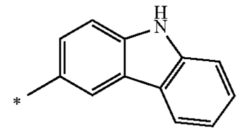 | 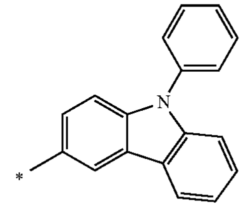 | 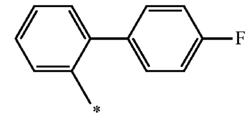 |
| 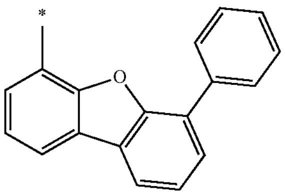 | 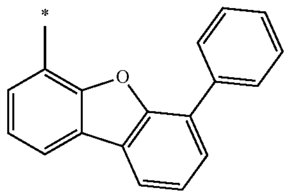 | C1080 | C1081 | C1082 | C1083 |
| 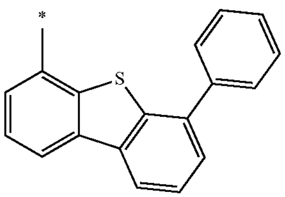 | 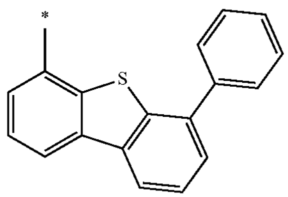 | C1084 | C1085 | C1086 | C1087 |
| 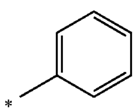 | 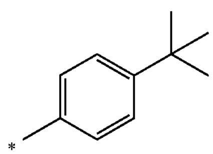 | C1088 | C1089 | C1090 | C1091 |
| 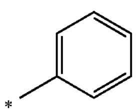 | 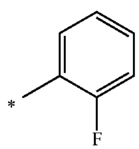 | C1092 | C1093 | C1094 | C1095 |

TABLE 3-12-continued
| $R_2$ | $R_5$ | $R_3$, $R_4$ | | | |
|---|---|---|---|---|---|
| | | 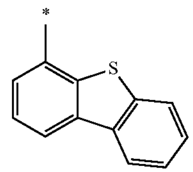 | 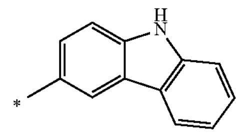 | 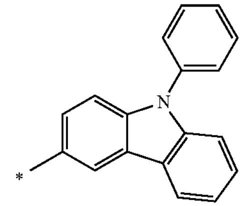 | 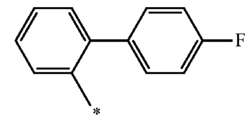 |
| 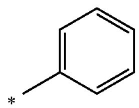 | 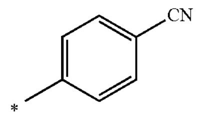 | C1096 | C1097 | C1098 | C1099 |
| 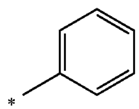 | 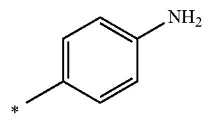 | C1100 | C1101 | C1102 | C1103 |
| 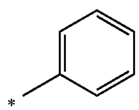 | 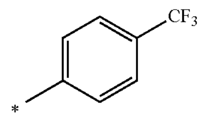 | C1104 | C1105 | C1106 | C1107 |
| 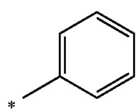 | 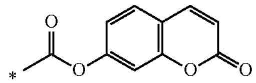 | C1108 | C1109 | C1110 | C1111 |
| 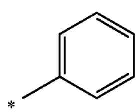 | 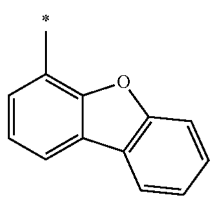 | C1112 | C1113 | C1114 | C1115 |

TABLE 3-12-continued
| R2 | R5 | R3, R4 | | | |
|---|---|---|---|---|---|
| | | 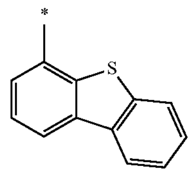 | 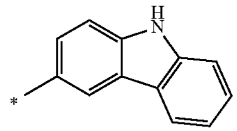 | 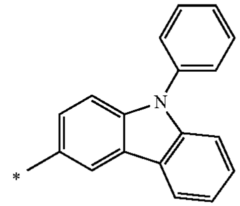 | 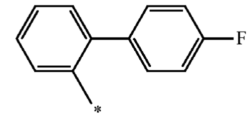 |
| 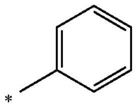 | 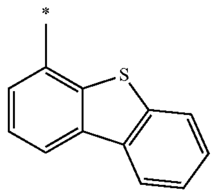 | C1116 | C1117 | C1118 | C1119 |
| 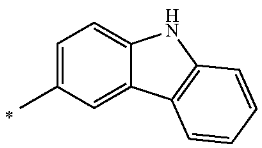 | 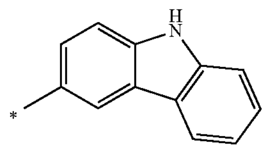 | C1120 | C1121 | C1122 | C1123 |
| 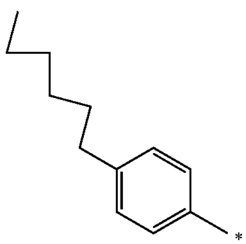 | 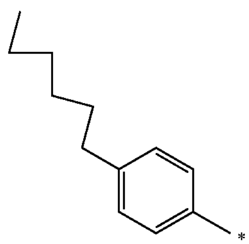 | C1124 | C1125 | C1126 | C1127 |
| 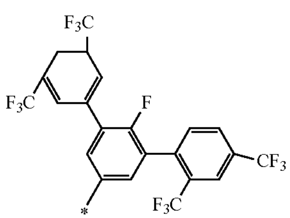 | 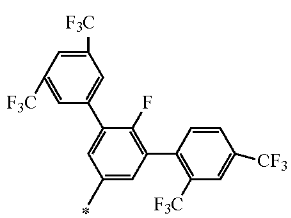 | C1128 | C1129 | C1130 | C1131 |

TABLE 3-12-continued
| R₂ | R₅ | R₃, R₄ | | | |
|---|---|---|---|---|---|
| | | 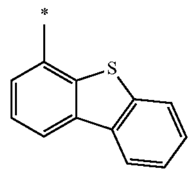 | 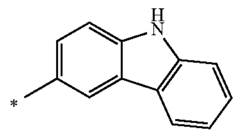 | 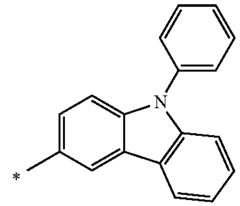 | 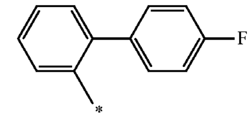 |
| 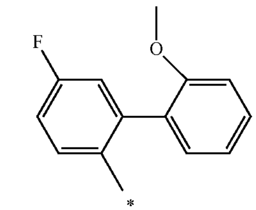 | 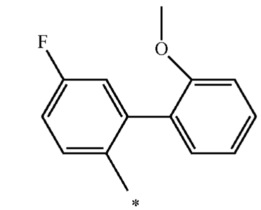 | C1132 | C1133 | C1134 | C1135 |
| 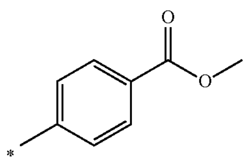 | 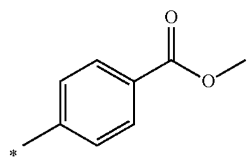 | C1136 | C1137 | C1138 | C1139 |
| 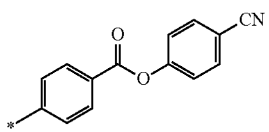 | 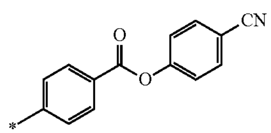 | C1140 | C1141 | C1142 | C1143 |
| 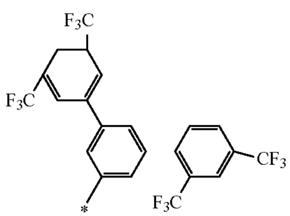 | 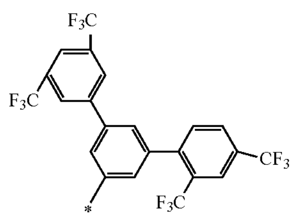 | C1144 | C1145 | C1146 | C1147 |

TABLE 3-12-continued
| R_2 | R_5 | R_3, R_4 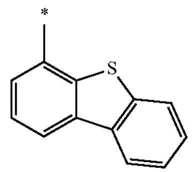 | 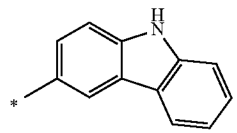 | 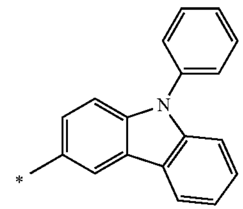 | 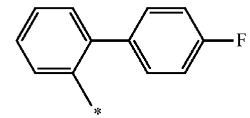 |
|---|---|---|---|---|---|
| 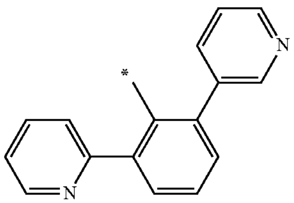 [SMILES: Cc1c(-c2cccnc2)cccc1-c1ccccn1] | 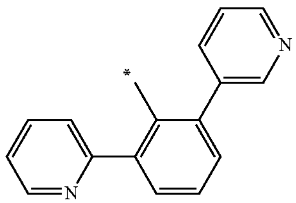 [SMILES: Cc1c(-c2cccnc2)cccc1-c1ccccn1] | C1148 | C1149 | C1150 | C1151 |
| 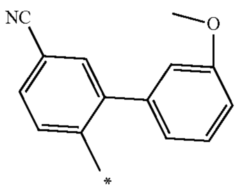 [SMILES: COc1cccc(-c2cc(C#N)ccc2C)c1] | 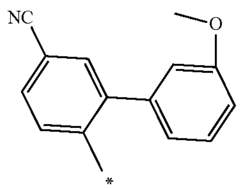 [SMILES: COc1cccc(-c2cc(C#N)ccc2C)c1] | C1152 | C1153 | C1154 | C1155 |
| 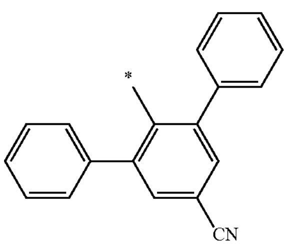 [SMILES: Cc1c(-c2ccccc2)cc(C#N)cc1-c1ccccc1] | 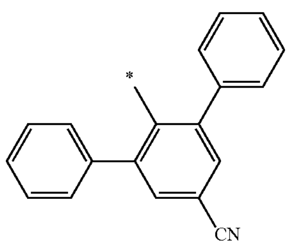 [SMILES: Cc1c(-c2ccccc2)cc(C#N)cc1-c1ccccc1] | C1156 | C1157 | C1158 | C1159 |
| 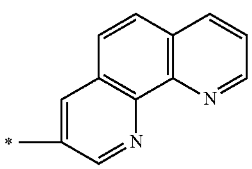 | 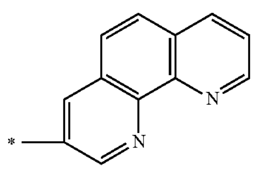 | C1160 | C1161 | C1162 | C1163 |

TABLE 3-12-continued
| | | R3, R4 | | | |
|---|---|---|---|---|---|
| | | 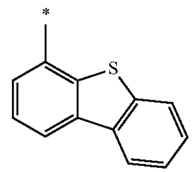 | 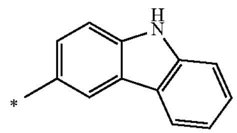 | 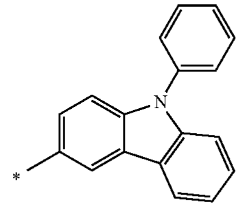 | 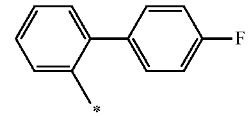 |
| R2 | R5 | C1164 | C1165 | C1166 | C1167 |
| 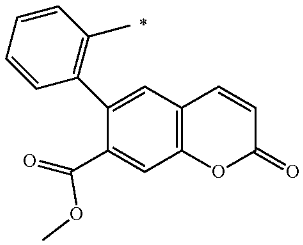 [SMILES: COC(=O)c1cc2oc(=O)ccc2cc1-c1ccccc1C] | 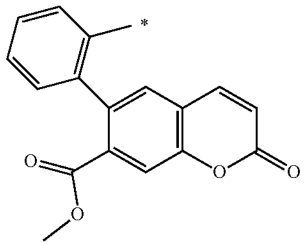 [SMILES: COC(=O)c1cc2oc(=O)ccc2cc1-c1ccccc1C] | | | | |

TABLE 3-13
| | | R3, R4 | | | |
|---|---|---|---|---|---|
| $R_2$ | $R_5$ | 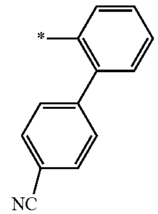 [SMILES: *c1ccccc1-c1ccc(C#N)cc1] | 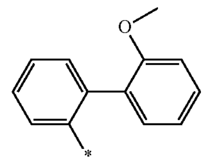 [SMILES: *c1ccccc1-c1ccccc1OC] | 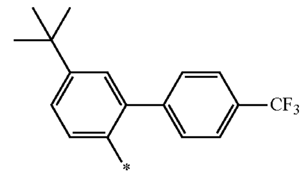 [SMILES: *c1ccc(C(C)(C)C)cc1-c1ccc(C(F)(F)F)cc1] | 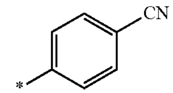 [SMILES: *c1ccc(C#N)cc1] |
| 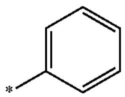 [SMILES: *c1ccccc1] | 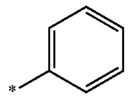 [SMILES: *c1ccccc1] | C1168 | C1169 | C1170 | C1171 |
| 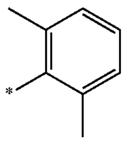 [SMILES: *c1c(C)cccc1C] | 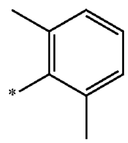 [SMILES: *c1c(C)cccc1C] | C1172 | C1173 | C1174 | C1175 |
| 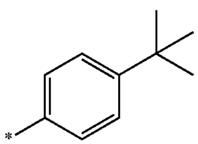 | 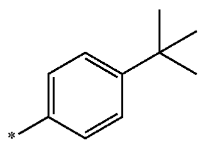 [SMILES: *c1ccc(C(C)(C)C)cc1] | C1176 | C1177 | C1178 | C1179 |
| 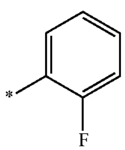 [SMILES: *c1ccccc1F] | 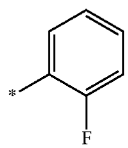 | C1180 | C1181 | C1182 | C1183 |
| 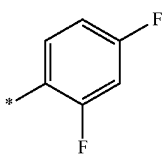 | 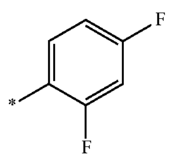 | C1184 | C1185 | C1186 | C1187 |

TABLE 3-13-continued
| R2 | R5 | R3, R4 | | | |
|---|---|---|---|---|---|
| | | 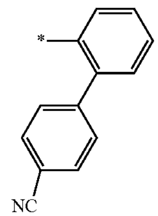 | 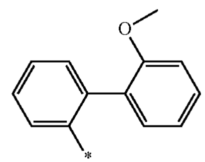 | 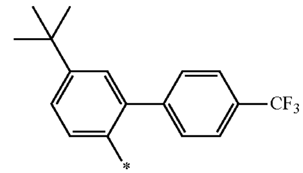 | 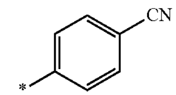 |
| 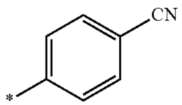 | 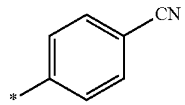 | C1188 | C1189 | C1190 | C1191 |
| 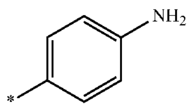 | 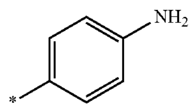 | C1192 | C1193 | C1194 | C1195 |
| 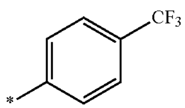 | 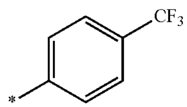 | C1196 | C1197 | C1198 | C1199 |
| 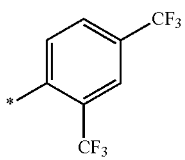 | 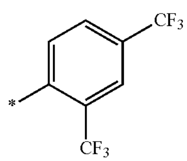 | C1200 | C1201 | C1202 | C1203 |
| 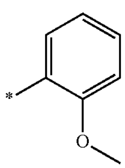 | 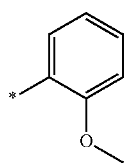 [SMILES: *c1ccccc1OC] | C1204 | C1205 | C1206 | C1207 |
| 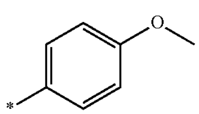 | 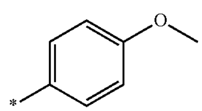 | C1208 | C1209 | C1210 | C1211 |

TABLE 3-13-continued
| | | $R_3$, $R_4$ | | | |
|---|---|---|---|---|---|
| $R_2$ | $R_5$ | 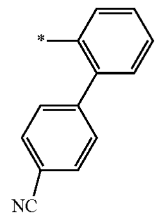 | 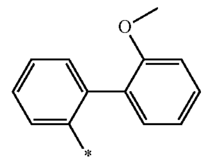 | 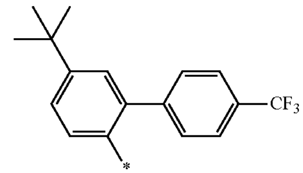 | 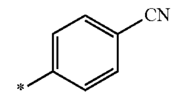 |
| 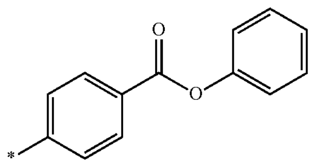 [SMILES: *c1ccc(C(=O)Oc2ccccc2)cc1] | 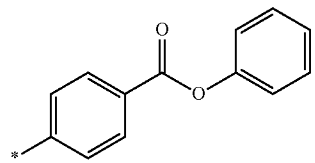 [SMILES: *c1ccc(C(=O)Oc2ccccc2)cc1] | C1212 | C1213 | C1214 | C1215 |
| 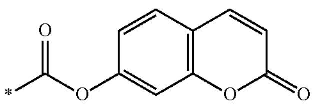 | 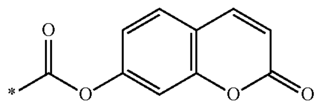 | C1216 | C1217 | C1218 | C1219 |
| 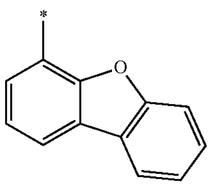 [SMILES: *c1cccc2c1oc1ccccc12] | 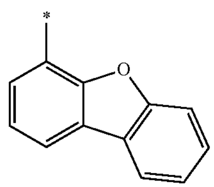 [SMILES: *c1cccc2c1oc1ccccc12] | C1220 | C1221 | C1222 | C1223 |
| 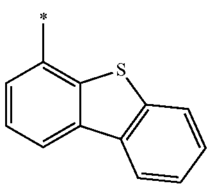 [SMILES: *c1cccc2c1sc1ccccc12] | 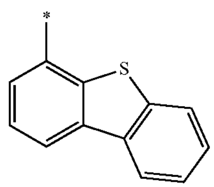 [SMILES: *c1cccc2c1sc1ccccc12] | C1224 | C1225 | C1226 | C1227 |

TABLE 3-13-continued
| | | R3, R4 | | | |
|---|---|---|---|---|---|
| R2 | R5 | 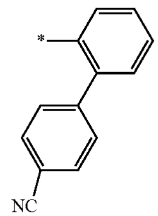 | 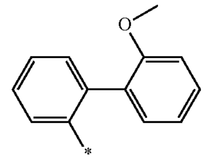 | 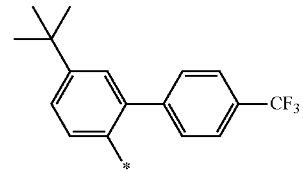 | 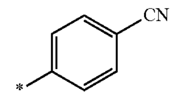 |
| 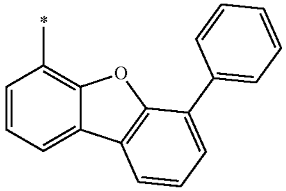 [SMILES: *c1cccc2c1oc1c(-c3ccccc3)cccc12] | 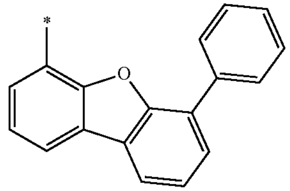 | C1228 | C1229 | C1230 | C1231 |
| 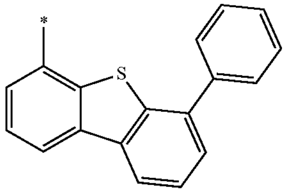 [SMILES: *c1cccc2c1sc1c(-c3ccccc3)cccc12] | 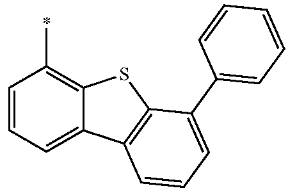 | C1232 | C1233 | C1234 | C1235 |
| 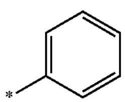 | 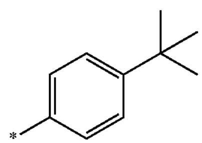 [SMILES: *c1ccc(C(C)(C)C)cc1] | C1236 | C1237 | C1238 | C1239 |
| 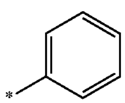 [SMILES: *c1ccccc1] | 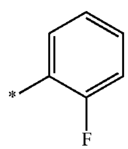 | C1240 | C1241 | C1242 | C1243 |
| 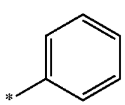 | 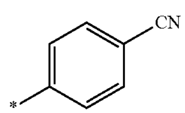 | C1244 | C1245 | C1246 | C1247 |

TABLE 3-13-continued
| | | R3, R4 | | | |
|---|---|---|---|---|---|
| R2 | R5 | 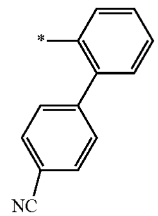 | 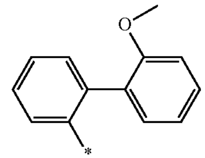 | 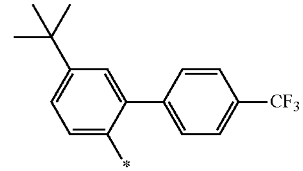 | 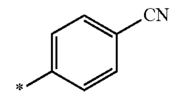 |
| 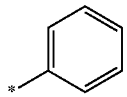 [SMILES: *c1ccccc1] | 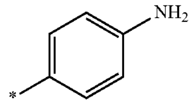 | C1248 | C1249 | C1250 | C1251 |
| 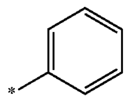 [SMILES: *c1ccccc1] | 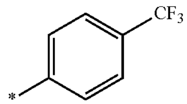 | C1252 | C1253 | C1254 | C1255 |
| 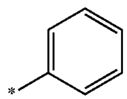 | 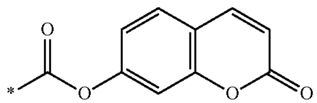 | C1256 | C1257 | C1258 | C1259 |
| 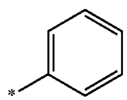 [SMILES: *c1ccccc1] | 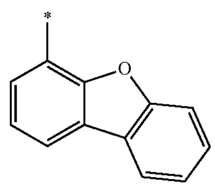 [SMILES: *c1cccc2c1oc1ccccc12] | C1260 | C1261 | C1262 | C1263 |
| 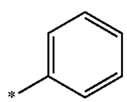 [SMILES: *c1ccccc1] | 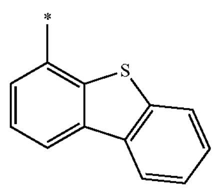 [SMILES: *c1cccc2c1sc1ccccc12] | C1264 | C1265 | C1266 | C1267 |

TABLE 3-13-continued
| R2 | R5 | R3, R4 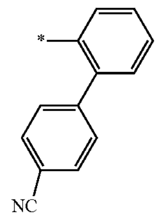 | R3, R4 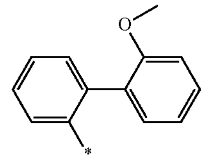 | R3, R4 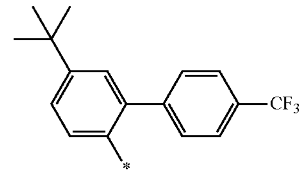 | R3, R4 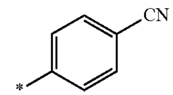 |
|---|---|---|---|---|---|
| 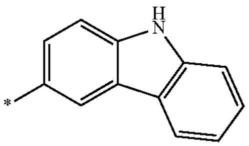 [SMILES: *c1ccc2[nH]c3ccccc3c2c1] | 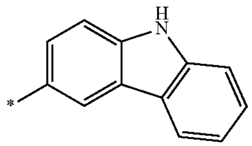 [SMILES: *c1ccc2[nH]c3ccccc3c2c1] | C1268 | C1269 | C1270 | C1271 |
| 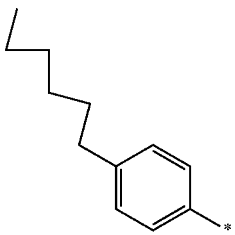 [SMILES: *c1ccc(CCCCCC)cc1] | 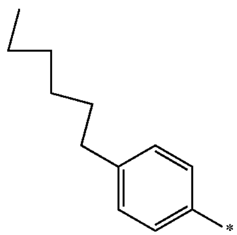 [SMILES: *c1ccc(CCCCCC)cc1] | C1272 | C1273 | C1274 | C1275 |
| 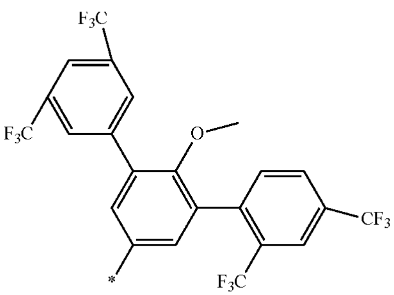 | 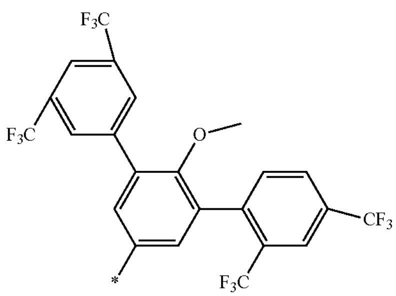 [SMILES: *c1cc(-c2cc(C(F)(F)F)cc(C(F)(F)F)c2)c(OC)c(-c2ccc(C(F)(F)F)cc2C(F)(F)F)c1] | C1276 | C1277 | C1278 | C1279 |

TABLE 3-13-continued
| R2 | R5 | R3, R4 | | | |
|---|---|---|---|---|---|
| | | 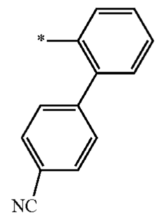 | 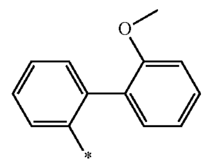 | 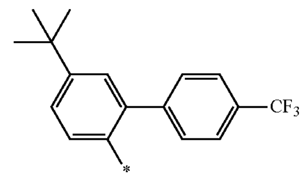 | 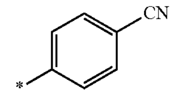 |
| 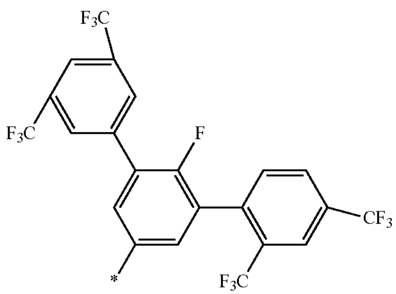 | 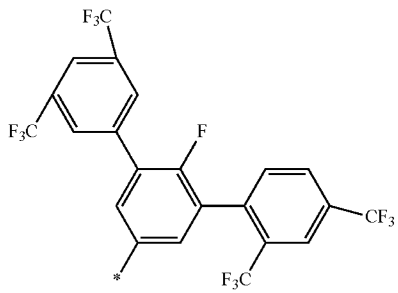 | C1280 | C1281 | C1282 | C1283 |
| 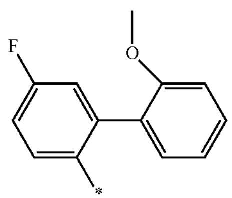 | 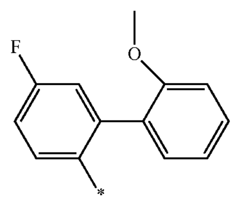 | C1284 | C1285 | C1286 | C1287 |
| 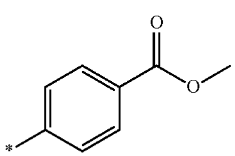 | 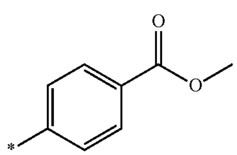 | C1288 | C1289 | C1290 | C1291 |
| 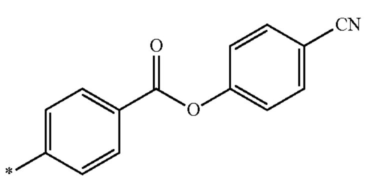 [SMILES: *c1ccc(C(=O)Oc2ccc(C#N)cc2)cc1] | 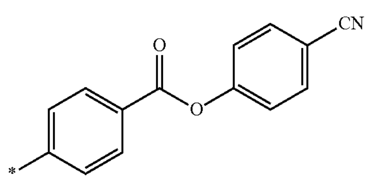 [SMILES: *c1ccc(C(=O)Oc2ccc(C#N)cc2)cc1] | C1292 | C1293 | C1294 | C1295 |

TABLE 3-13-continued
| R2 | R5 | R3, R4 | | | |
|---|---|---|---|---|---|
| | | 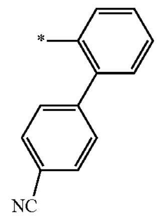 | 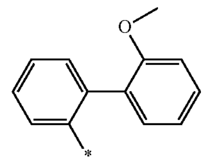 | 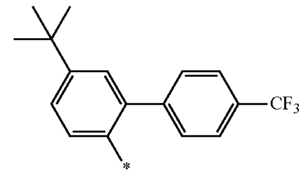 | 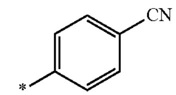 |
| 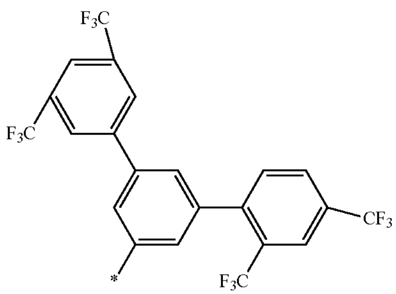 | 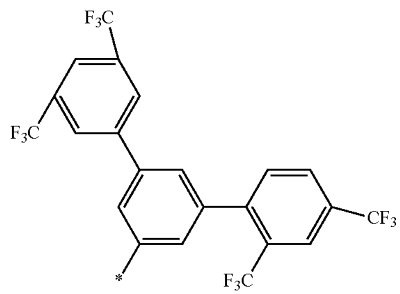 [SMILES: *c1cc(-c2cc(C(F)(F)F)cc(C(F)(F)F)c2)cc(-c2ccc(C(F)(F)F)cc2C(F)(F)F)c1] | C1296 | C1297 | C1298 | C1299 |
| 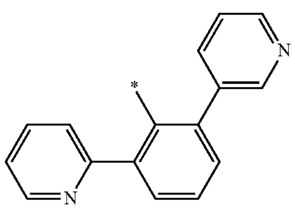 [SMILES: *c1c(-c2cccnc2)cccc1-c1ccccn1] | 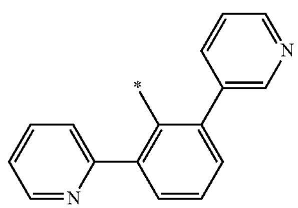 [SMILES: *c1c(-c2cccnc2)cccc1-c1ccccn1] | C1300 | C1301 | C1302 | C1303 |
| 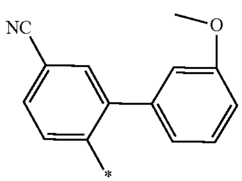 | 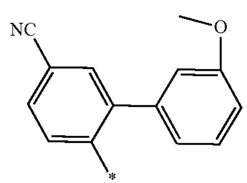 | C1304 | C1305 | C1306 | C1307 |

TABLE 3-13-continued
| R2 | R5 | R3, R4 | | | |
|---|---|---|---|---|---|
| | | 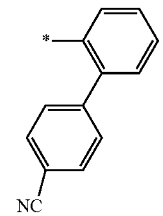 | 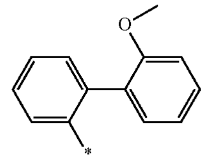 | 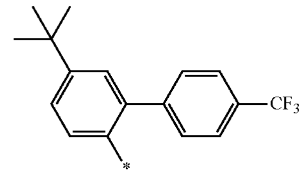 | 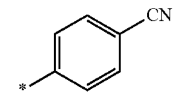 |
| 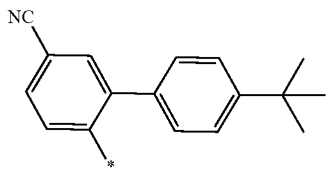 | 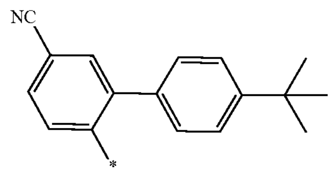 | C1308 | C1309 | C1310 | C1311 |
| 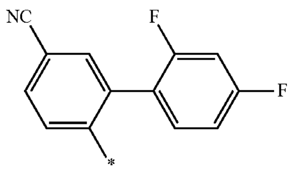 | 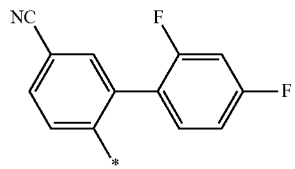 | C1312 | C1313 | C1314 | C1315 |
| 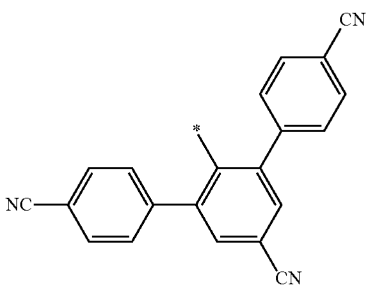 [SMILES: *c1c(-c2ccc(C#N)cc2)cc(C#N)cc1-c1ccc(C#N)cc1] | 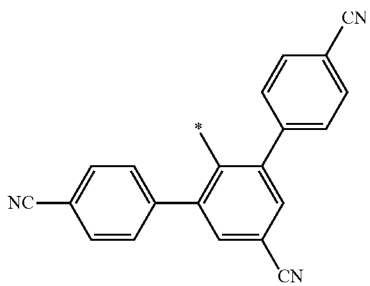 [SMILES: *c1c(-c2ccc(C#N)cc2)cc(C#N)cc1-c1ccc(C#N)cc1] | C1316 | C1317 | C1318 | C1319 |
| 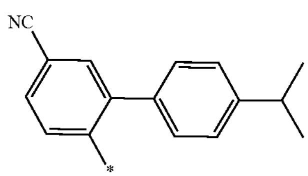 [SMILES: *c1ccc(C#N)cc1-c1ccc(C(C)C)cc1] | 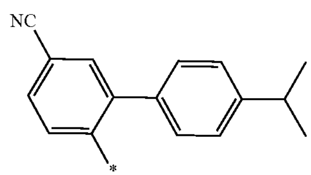 | C1320 | C1321 | C1322 | C1323 |

TABLE 3-13-continued
| R2 | R5 | R3, R4 | | | |
|---|---|---|---|---|---|
| | | 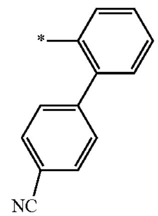 | 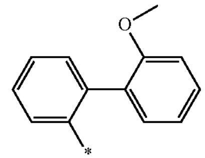 | 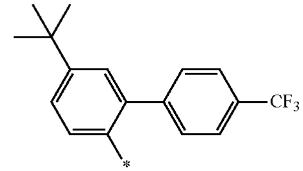 | 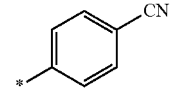 |
| 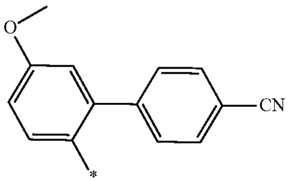 [SMILES: *c1ccc(OC)cc1-c1ccc(C#N)cc1] | 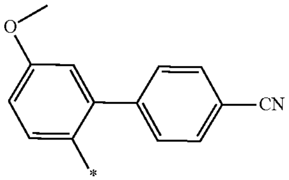 [SMILES: *c1ccc(OC)cc1-c1ccc(C#N)cc1] | C1324 | C1325 | C1326 | C1327 |
| 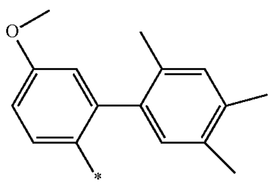 | 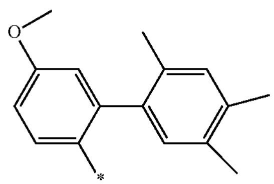 | C1328 | C1329 | C1330 | C1331 |
| 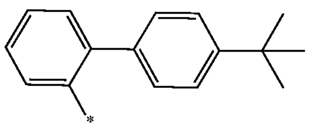 | 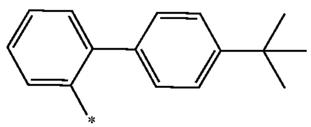 [SMILES: *c1ccccc1-c1ccc(C(C)(C)C)cc1] | C1332 | C1333 | C1334 | C1335 |
| 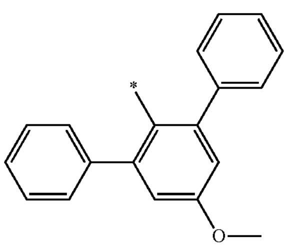 [SMILES: *c1c(-c2ccccc2)cc(OC)cc1-c1ccccc1] | 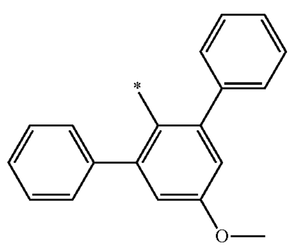 [SMILES: *c1c(-c2ccccc2)cc(OC)cc1-c1ccccc1] | C1336 | C1337 | C1338 | C1339 |

TABLE 3-13-continued
| R2 | R5 | R3, R4 | | | |
|---|---|---|---|---|---|
| | | 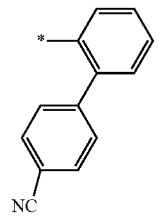 | 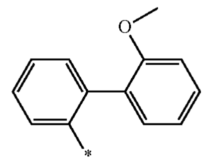 | 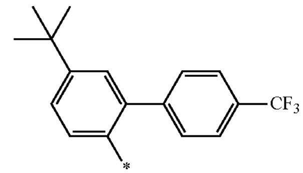 | 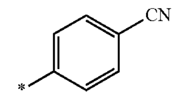 |
| 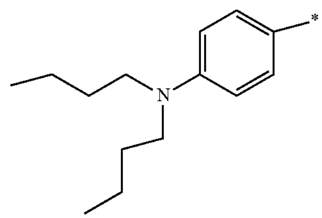 [SMILES: *c1ccc(N(CCCC)CCCC)cc1] | 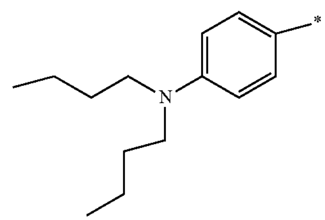 [SMILES: *c1ccc(N(CCCC)CCCC)cc1] | C1340 | C1341 | C1342 | C1343 |
| 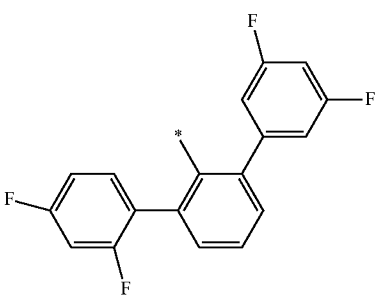 | 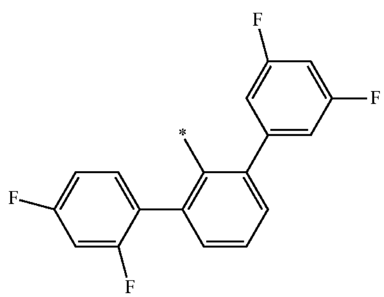 [SMILES: *c1c(-c2cc(F)cc(F)c2)cccc1-c1ccc(F)cc1F] | C1344 | C1345 | C1346 | C1347 |

TABLE 3-14
| | | R3, R4 | |
|---|---|---|---|
| R2 | R5 | 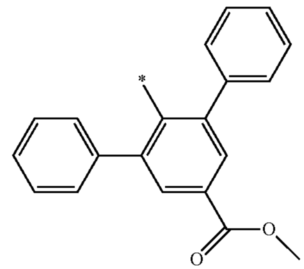 [SMILES: *c1c(-c2ccccc2)cc(C(=O)OC)cc1-c1ccccc1] | 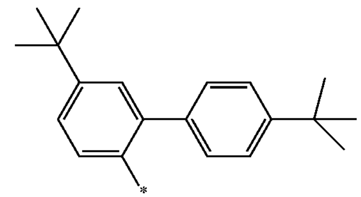 [SMILES: *c1ccc(C(C)(C)C)cc1-c1ccc(C(C)(C)C)cc1] |
| 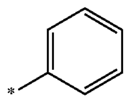 [SMILES: *c1ccccc1] | 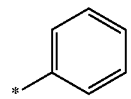 | C1348 | C1349 |
| 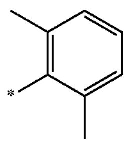 [SMILES: *c1c(C)cccc1C] | 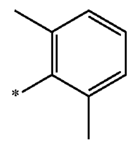 | C1350 | C1351 |
| 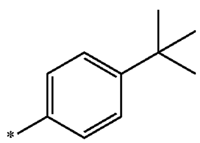 [SMILES: *c1ccc(C(C)(C)C)cc1] | 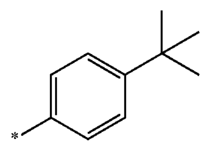 [SMILES: *c1ccc(C(C)(C)C)cc1] | C1352 | C1353 |
| 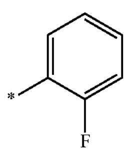 [SMILES: *c1ccccc1F] | 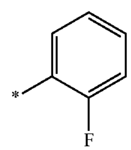 | C1354 | C1355 |
| 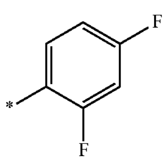 | 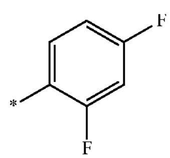 | C1356 | C1357 |

TABLE 3-14-continued
| $R_2$ | $R_5$ | $R_3, R_4$: 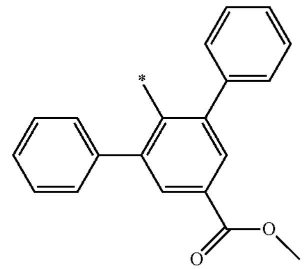 | $R_3, R_4$: 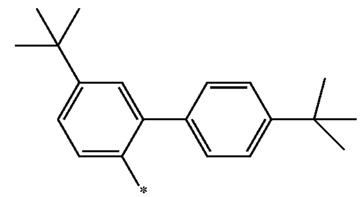 |
|---|---|---|---|
| 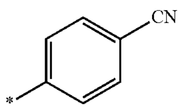 | 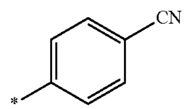 | C1358 | C1359 |
| 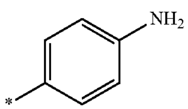 | 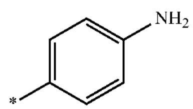 | C1360 | C1361 |
| 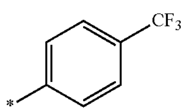 | 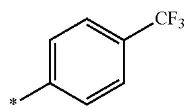 | C1362 | C1363 |
| 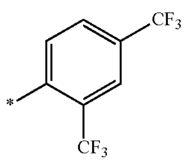 | 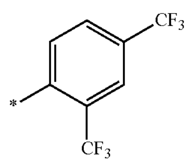 | C1364 | C1365 |
| 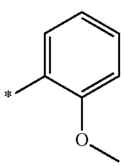 [SMILES: *c1ccccc1OC] | 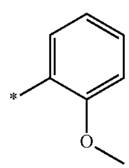 | C1366 | C1367 |

TABLE 3-14-continued
| | | R3, R4 | |
|---|---|---|---|
| $R_2$ | $R_5$ | 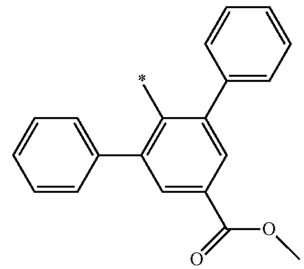 | 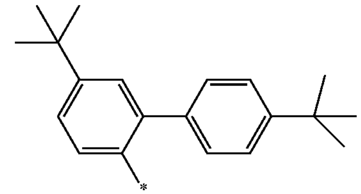 |
| 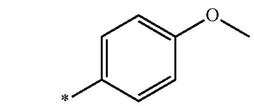 [SMILES: *c1ccc(OC)cc1] | 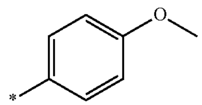 | C1368 | C1369 |
| 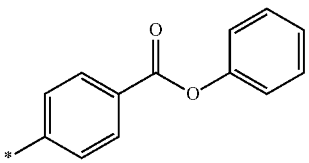 [SMILES: *c1ccc(C(=O)Oc2ccccc2)cc1] | 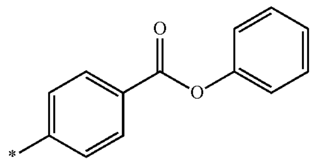 [SMILES: *c1ccc(C(=O)Oc2ccccc2)cc1] | C1370 | C1371 |
| 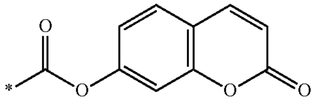 | 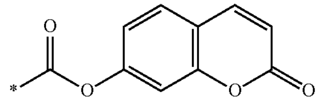 | C1372 | C1373 |
| 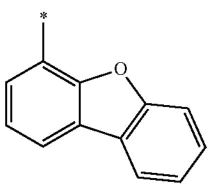 | 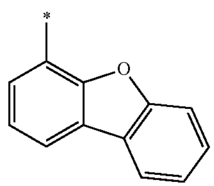 [SMILES: *c1cccc2c1oc1ccccc12] | C1374 | C1375 |
| 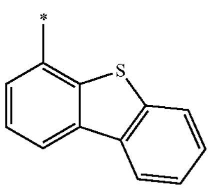 [SMILES: *c1cccc2c1sc1ccccc12] | 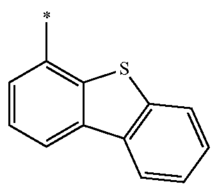 | C1376 | C1377 |

TABLE 3-14-continued
| $R_2$ | $R_5$ | $R_3$, $R_4$: 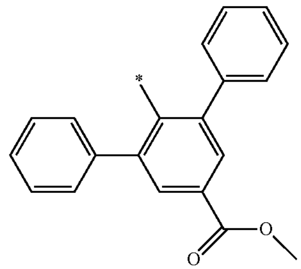 | $R_3$, $R_4$: 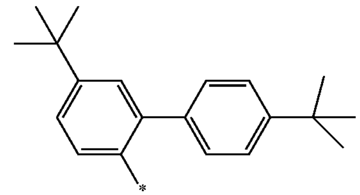 |
|---|---|---|---|
| 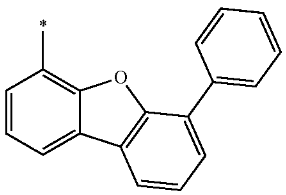 [SMILES: *c1cccc2c1oc1c(-c3ccccc3)cccc12] | 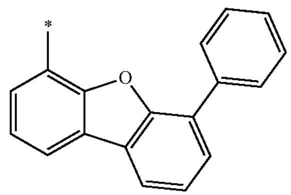 [SMILES: *c1cccc2c1oc1c(-c3ccccc3)cccc12] | C1378 | C1379 |
| 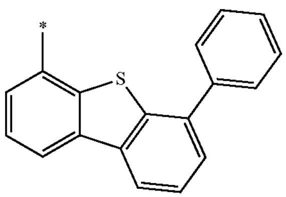 | 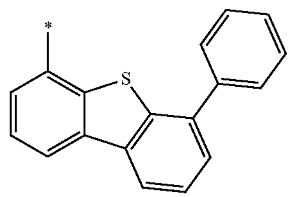 | C1380 | C1381 |
| 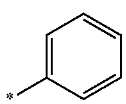 | 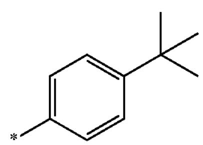 | C1382 | C1383 |
| 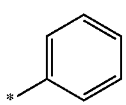 [SMILES: *c1ccccc1] | 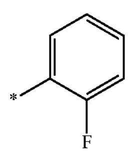 | C1384 | C1385 |

TABLE 3-14-continued
| R2 | R5 | R3, R4: 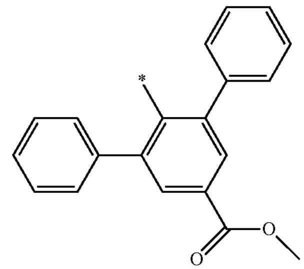 | R3, R4: 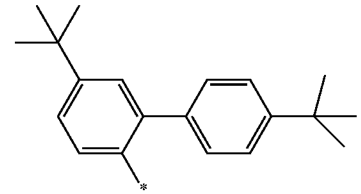 |
|---|---|---|---|
| 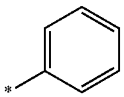 [SMILES: *c1ccccc1] | 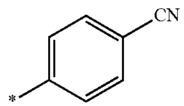 | C1386 | C1387 |
| 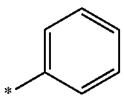 [SMILES: *c1ccccc1] | 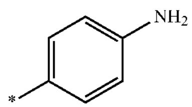 | C1388 | C1389 |
| 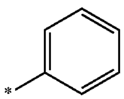 [SMILES: *c1ccccc1] | 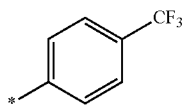 | C1390 | C1391 |
| 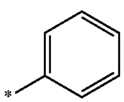 | 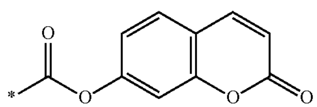 | C1392 | C1393 |
| 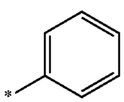 | 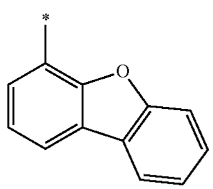 [SMILES: *c1cccc2c1oc1ccccc12] | C1394 | C1395 |

TABLE 3-14-continued
| | | R3, R4 | |
|---|---|---|---|
| R2 | R5 | 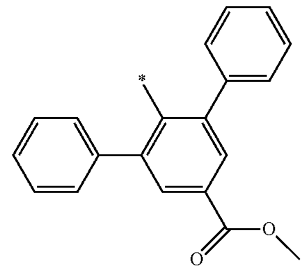 | 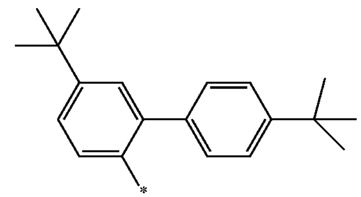 |
| 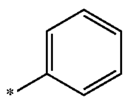 | 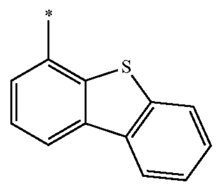 | C1396 | C1397 |
| 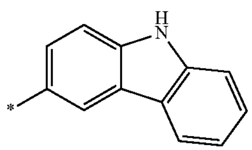 [SMILES: *c1ccc2[nH]c3ccccc3c2c1] | 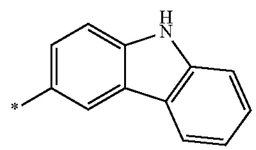 [SMILES: *c1ccc2[nH]c3ccccc3c2c1] | C1398 | C1399 |
| 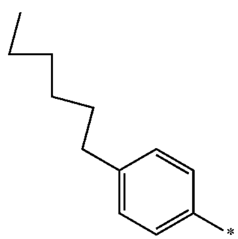 [SMILES: *c1ccc(CCCCCC)cc1] | 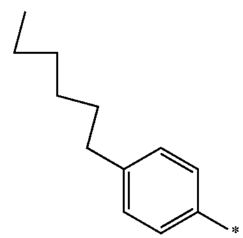 [SMILES: *c1ccc(CCCCCC)cc1] | C1400 | C1401 |

TABLE 3-14-continued
| R2 | R5 | R3, R4: 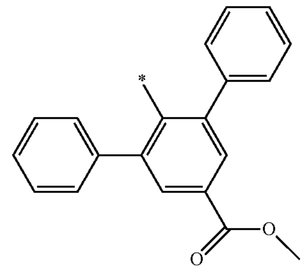 | R3, R4: 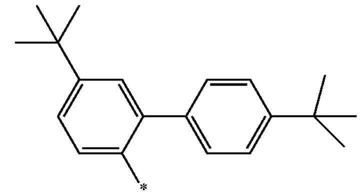 |
|---|---|---|---|
| 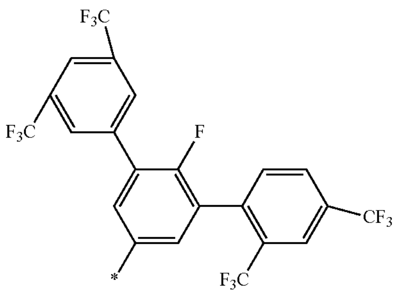 | 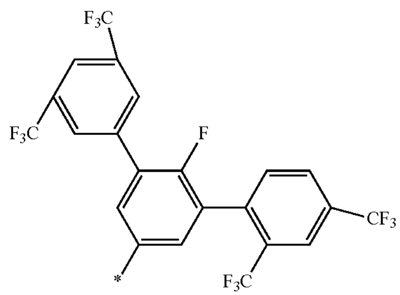 | C1402 | C1403 |
| 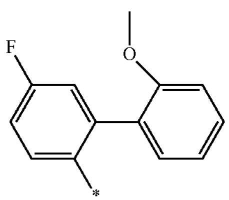 [SMILES: *c1ccc(F)cc1-c1ccccc1OC] | 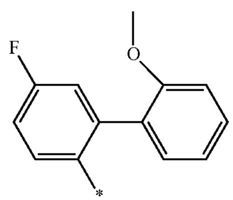 | C1404 | C1405 |
| 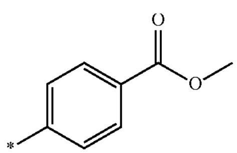 [SMILES: *c1ccc(C(=O)OC)cc1] | 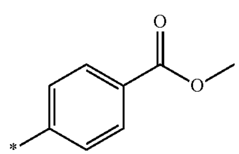 | C1406 | C1407 |

TABLE 3-14-continued
| R2 | R5 | R3, R4: 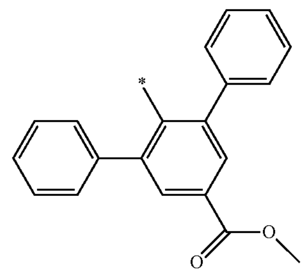 | R3, R4: 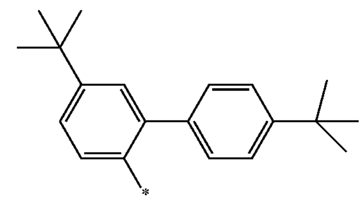 |
|---|---|---|---|
| 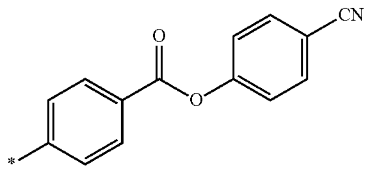 [SMILES: *c1ccc(C(=O)Oc2ccc(C#N)cc2)cc1] | 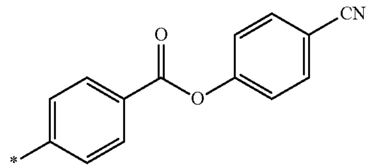 [SMILES: *c1ccc(C(=O)Oc2ccc(C#N)cc2)cc1] | C1408 | C1409 |
| 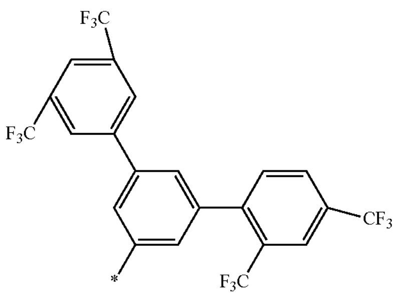 [SMILES: *c1cc(-c2cc(C(F)(F)F)cc(C(F)(F)F)c2)cc(-c2ccc(C(F)(F)F)cc2C(F)(F)F)c1] | 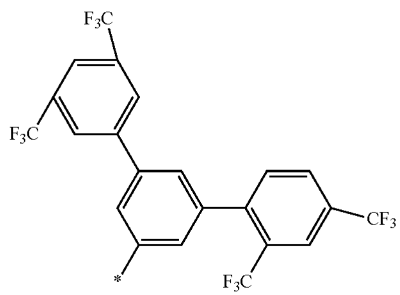 [SMILES: *c1cc(-c2cc(C(F)(F)F)cc(C(F)(F)F)c2)cc(-c2ccc(C(F)(F)F)cc2C(F)(F)F)c1] | C1410 | C1411 |
| 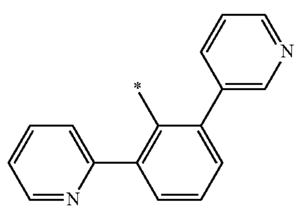 [SMILES: *c1c(-c2cccnc2)cccc1-c1ccccn1] | 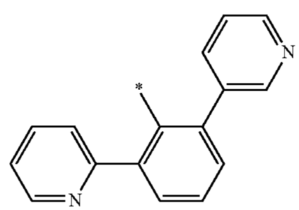 [SMILES: *c1c(-c2cccnc2)cccc1-c1ccccn1] | C1412 | C1413 |

TABLE 3-14-continued
| R₂ | R₅ | R₃, R₄ 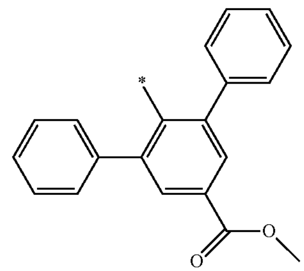 | 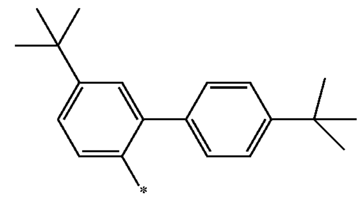 |
|---|---|---|---|
| 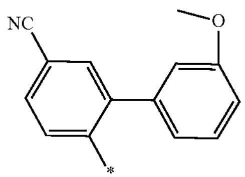 [SMILES: *c1ccc(C#N)cc1-c1cccc(OC)c1] | 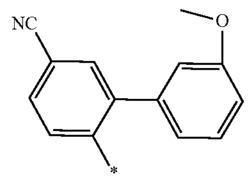 | C1414 | C1415 |
| 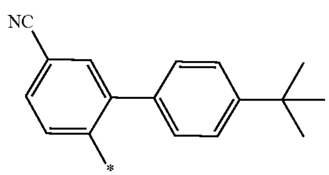 | 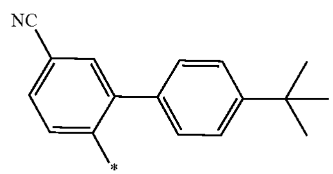 | C1416 | C1417 |
| 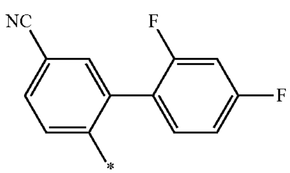 | 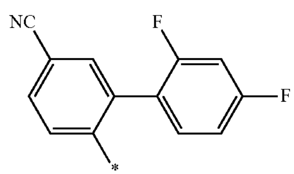 | C1418 | C1419 |

TABLE 3-14-continued
| R₂ | R₅ | R₃, R₄ 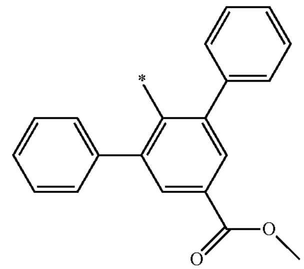 | 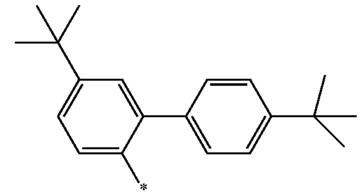 |
|---|---|---|---|
| 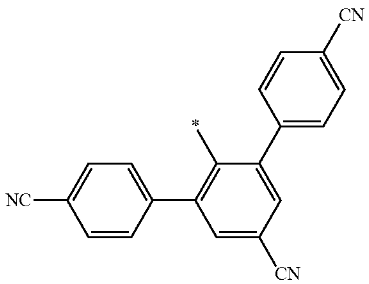 [SMILES: *c1c(-c2ccc(C#N)cc2)cc(C#N)cc1-c1ccc(C#N)cc1] | 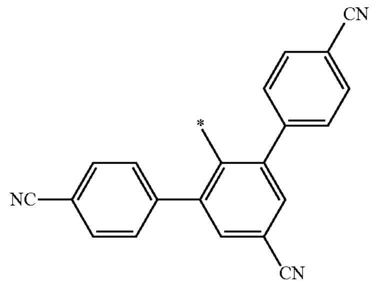 [SMILES: *c1c(-c2ccc(C#N)cc2)cc(C#N)cc1-c1ccc(C#N)cc1] | C1420 | C1421 |
| 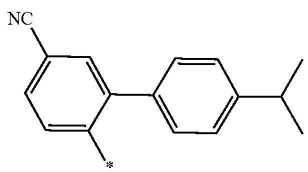 [SMILES: *c1ccc(C#N)cc1-c1ccc(C(C)C)cc1] | 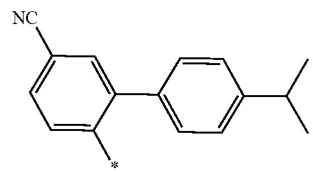 [SMILES: *c1ccc(C#N)cc1-c1ccc(C(C)C)cc1] | C1422 | C1423 |
| 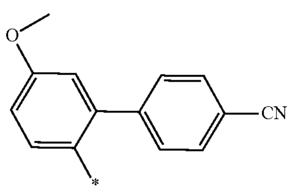 [SMILES: *c1ccc(OC)cc1-c1ccc(C#N)cc1] | 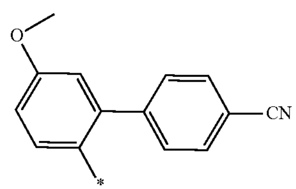 [SMILES: *c1ccc(OC)cc1-c1ccc(C#N)cc1] | C1424 | C1425 |

TABLE 3-14-continued
| R2 | R5 | R3, R4: 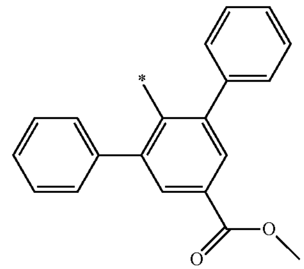 | R3, R4: 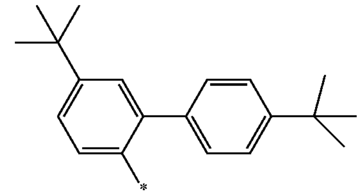 |
|---|---|---|---|
| 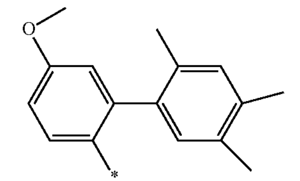 [SMILES: *c1ccc(OC)cc1-c1cc(C)c(C)cc1C] | 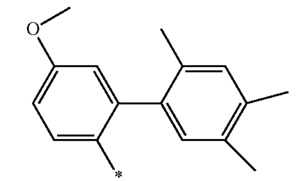 | C1426 | C1427 |
| 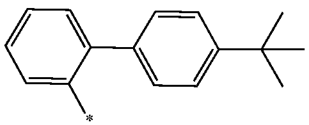 [SMILES: *c1ccccc1-c1ccc(C(C)(C)C)cc1] | 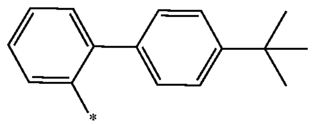 | C1428 | C1429 |
| 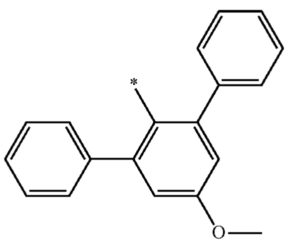 [SMILES: *c1c(-c2ccccc2)cc(OC)cc1-c1ccccc1] | 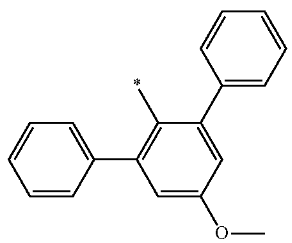 [SMILES: *c1c(-c2ccccc2)cc(OC)cc1-c1ccccc1] | C1430 | C1431 |

TABLE 3-14-continued
| R<sub></sub> | | R₃, R₄ | |
|---|---|---|---|
| $R_2$ | $R_5$ | 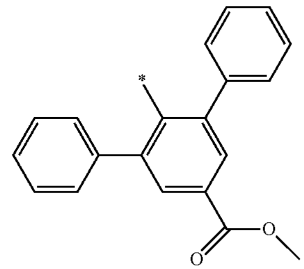 | 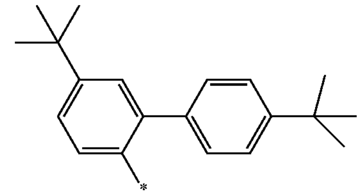 |
| 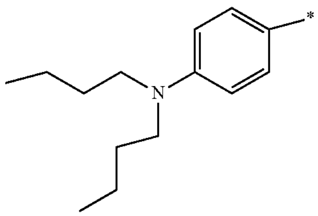 [SMILES: *c1ccc(N(CCCC)CCCC)cc1] | 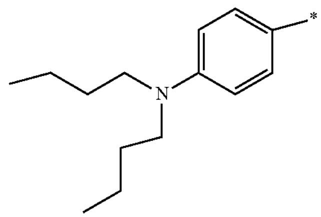 [SMILES: *c1ccc(N(CCCC)CCCC)cc1] | C1432 | C1433 |
| 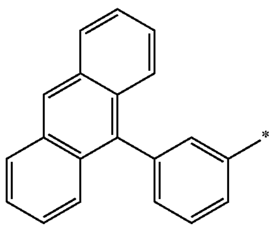 [SMILES: *c1cccc(-c2c3ccccc3cc3ccccc23)c1] | 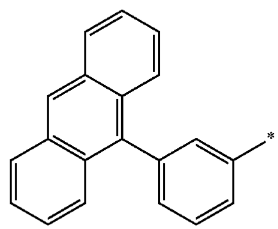 [SMILES: *c1cccc(-c2c3ccccc3cc3ccccc23)c1] | C1434 | C1435 |

In Tables 1-1 to 1-4, 2-1 to 2-9, and 3-1 to 3-14 in one embodiment of the present specification, * means a position bonding to Chemical Formula 1.

In one embodiment of the present specification, the compounds represented by Chemical Formula 1 are referred to as [1-1 to 1-4]-[2-1 to 2-9]-[3-1 to 3-14] according to the above-described Tables 1-1 to 1-4, 2-1 to 2-9, and 3-1 to 3-14, and specifically, for example, the compound of A1-B328-C437 has a structure as the following Structure 1, and the compound of A21-B423-C628 has a structure as the following Structure 2.

[Structure 1]

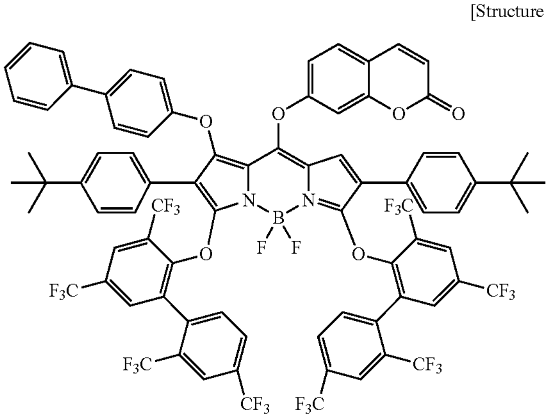

[Structure 2]

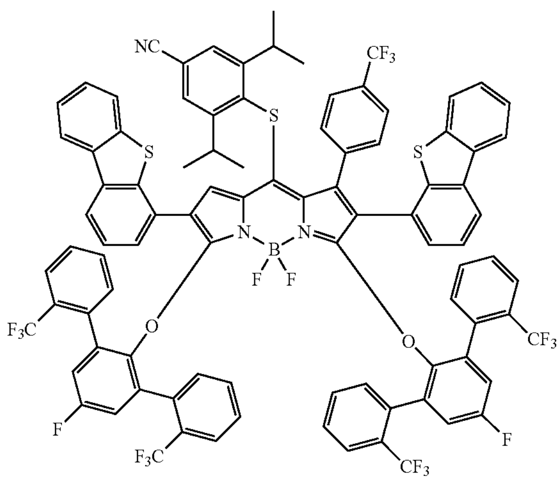

According to one embodiment of the present specification, the compound represented by Chemical Formula 1 has a maximum light emission peak present in 500 nm to 550 nm in a film state. Such a compound emits green light.

According to one embodiment of the present specification, the compound represented by Chemical Formula 1 has a maximum light emission peak present in 520 nm to 550 nm in a film state, and the light emission peak has a full width at half maximum of 50 nm or less. Having such a small full width at half maximum may further increase color gamut. Herein, it is the better that the light emission peak of the compound represented by Chemical Formula 1 has a smaller full width at half maximum.

According to one embodiment of the present specification, the compound represented by Chemical Formula 1 has a maximum light emission peak present in 580 nm to 680 nm in a film state. Such a compound emits red light.

According to one embodiment of the present specification, the compound represented by Chemical Formula 1 has a maximum light emission peak present in 580 nm to 680 nm in a film state, and the light emission peak has a full width at half maximum of 60 nm or less. Having such a small full width at half maximum may further increase color gamut. Herein, the light emission peak of the compound represented by Chemical Formula 1 may have a full width at half maximum of 5 nm or greater.

According to one embodiment of the present specification, the compound represented by Chemical Formula 1 has quantum efficiency of 0.8 or greater.

In the present specification, the "film state" means, instead of a solution state, a state prepared to a film form with the compound represented by Chemical Formula 1 alone or by mixing the compound represented by Chemical Formula 1 with other components that do not affect measurements of full width at half maximum and quantum efficiency.

In the present specification, the full width at half maximum means a width of a light emission peak at a half of the maximum height in a maximum light emission peak of the light emitting from the compound represented by Chemical Formula 1.

In the present specification, the quantum efficiency may be measured using methods known in the art, and for example, may be measured using an integrating sphere.

According to one embodiment of the present specification, the core of the compound represented by Chemical Formula 1 may be prepared using a general preparation method of a reaction formula as below, however, the preparation method is not limited thereto.

[Reaction Formula]

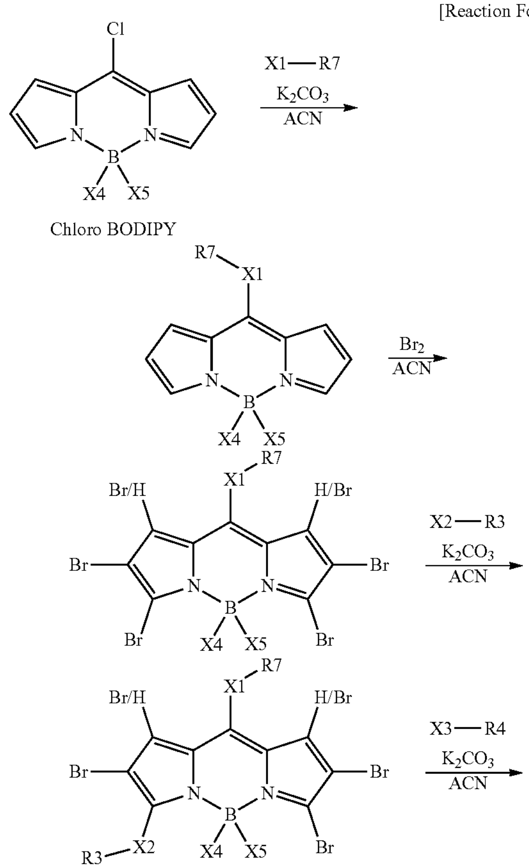

-continued

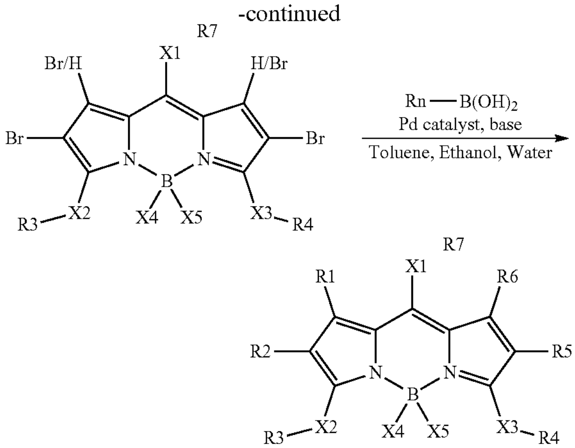

In the reaction formula, substituents have the same definitions as above. For example, X4 and X5 of the reaction formula may each have the same definition as in Chemical Formula 1 described above, and may be fluorine.

One embodiment of the present specification provides a color conversion film including a resin matrix; and the compound represented by Chemical Formula 1 dispersed into the resin matrix.

The content of the compound represented by Chemical Formula 1 in the color conversion film may be in a range of 0.001% by weight to 10% by weight.

The color conversion film may include one type of the compound represented by Chemical Formula 1, or may include two or more types thereof. For example, the color conversion film may include one type of compound emitting green light among the compounds represented by Chemical Formula 1. As another example, the color conversion film may include one type of compound emitting red light among the compounds represented by Chemical Formula 1. As another example, the color conversion film may include one type of compound emitting green light and one type of compound emitting red light among the compounds represented by Chemical Formula 1.

The color conversion film may further include additional fluorescent substances in addition to the compound represented by Chemical Formula 1. When using a light source emitting blue light, the color conversion film preferably includes both a green light emitting fluorescent substance and a red light emitting fluorescent substance. In addition, when using a light source emitting blue light and green light, the color conversion film may only include a red light emitting fluorescent substance. However, the color conversion film is not limited thereto, and even when using a light source emitting blue light, the color conversion film may only include a red light emitting compound when a separate film including a green light emitting fluorescent substance is laminated. On the other hand, even when using a light source emitting blue light, the color conversion film may only include a green light emitting compound when a separate film including a red light emitting fluorescent substance is laminated.

The color conversion film may further include a resin matrix; and an additional layer including a compound dispersed into the resin matrix and emitting light in a wavelength different from the wavelength of the compound represented by Chemical Formula 1. The compound emitting light in a wavelength different from the wavelength of the compound represented by Chemical Formula 1 may also be the compound represented by Chemical Formula 1, or may be other known fluorescent substances.

The resin matrix material is preferably a thermoplastic polymer or a thermocurable polymer. Specifically, a poly(meth)acryl-based such as polymethyl methacrylate (PMMA), a polycarbonate (PC)-based, a polystyrene (PS)-based, a polyarylene (PAR)-based, a polyurethane (TPU)-based, a styrene-acrylonitrile (SAN)-based, a polyvinylidene fluoride (PVDF)-based, a modified polyvinylidene fluoride (modified-PVDF)-based and the like may be used as the resin matrix material.

According to one embodiment of the present specification, the color conversion film according to the embodiments described above additionally includes light diffusing particles. By dispersing light diffusing particles into the color conversion film instead of a light diffusing film used in the art for enhancing luminance, higher luminance may be exhibited compared to using a separate light diffusing film, and an adhering process may be skipped as well.

As the light diffusing particles, particles having a high refractive index with the resin matrix may be used, and examples thereof may include $TiO_2$, silica, borosilicate, alumina, sapphire, air or other gases, air- or gas-filled hollow beads or particles (for example, air/gas-filled glass or polymers); polystyrene, polycarbonate, polymethyl methacrylate, acryl, methyl methacrylate, styrene, melamine resin, formaldehyde resin, or polymer particles including melamine and formaldehyde resins, or any suitable combination thereof.

The light diffusing particles may have particle diameters in a range of 0.1 μm to 5 μm, for example, in a range of 0.3 μm to 1 μm. The content of the light diffusing particles may be determined as necessary, and for example, may be in a range of approximately 1 part by weight to 30 parts by weight based on 100 parts by weight of the resin matrix.

The color conversion film according to the embodiments described above may have a thickness of 2 μm to 200 μm. Particularly, the color conversion film may exhibit high luminance even with a small thickness of 2 μm to 20 μm. This is due to the fact that the content of the fluorescent substance molecules included in the unit volume is higher compared to quantum dots.

The color conversion film according to the embodiments described above may have a substrate provided on one surface. This substrate may function as a support when preparing the color conversion film. Types of the substrate are not particularly limited, and the material or thickness is not limited as long as it is transparent and is capable of functioning as the support. Herein, being transparent means having visible light transmittance of 70% or higher. For example, a PET film may be used as the substrate.

The color conversion film described above may be prepared by coating a resin solution in which the compound represented by Chemical Formula 1 described above is dissolved on a substrate and drying the result, or by extruding and filming the compound represented by Chemical Formula 1 described above together with a resin.

The compound represented by Chemical Formula 1 is dissolved in the resin solution, and therefore, the compound represented by Chemical Formula 1 is uniformly distributed in the solution. This is different from a quantum dot film preparation process that requires a separate dispersion process.

As for the resin solution in which the compound represented by Chemical Formula 1 is dissolved, the preparation method is not particularly limited as long as the compound represented by Chemical Formula 1 and the resin described above are dissolved in the solution.

According to one example, the resin solution in which the compound represented by Chemical Formula 1 is dissolved may be prepared using a method of preparing a first solution by dissolving the compound represented by Chemical Formula 1 in a solvent, preparing a second solution by dissolving a resin in a solvent, and mixing the first solution and the second solution. When mixing the first solution and the second solution, it is preferable that these be uniformly mixed. However, the method is not limited thereto, and a method of simultaneously adding and dissolving the compound represented by Chemical Formula 1 and a resin in a solvent, a method of dissolving the compound represented by Chemical Formula 1 in a solvent and subsequently adding and dissolving a resin, a method of dissolving a resin in a solvent and then subsequently adding and dissolving the compound represented by Chemical Formula 1, and the like, may be used.

As the resin included in the solution, the resin matrix material described above, a monomer curable to this resin matrix resin, or a mixture thereof, may be used. For example, the monomer curable to the resin matrix resin includes a (meth)acryl-based monomer, and this may be formed to a resin matrix material by UV curing. When using such a curable monomer, an initiator required for curing may be further added as necessary.

The solvent is not particularly limited as long as it is capable of being removed by drying afterword while having no adverse effects on the coating process. Non-limiting examples of the solvent may include toluene, xylene, acetone, chloroform, various alcohol-based solvents, methylethyl ketone (MEK), methylisobutyl ketone (MIBK), ethyl acetate (EA), butyl acetate (BA), dimethylformamide (DMF), dimethylacetamide (DMAc), dimethyl sulfoxide (DMSO), N-methyl-pyrrolidone (NMP) and the like, and one type or a mixture of two or more types may be used. When the first solution and the second solution are used, solvents included in each of the solutions may be the same as or different from each other. Even when different types of solvents are used in the first solution and the second solution, these solvents preferably have compatibility so as to be mixed with each other.

The process of coating the resin solution in which the compound represented by Chemical Formula 1 is dissolved on a substrate may use a roll-to-roll process. For example, a process of unwinding a substrate from a substrate-wound roll, coating the resin solution in which the compound represented by Chemical Formula 1 is dissolved on one surface of the substrate, drying the result, and then winding the result again on the roll may be used. When a roll-to-roll process is used, viscosity of the resin solution is preferably determined in a range capable of conducting the process, and for example, may be determined in a range of 200 cps to 2,000 cps.

As the coating method, various known methods may be used, and for example, a die coater may be used, or various bar coating methods such as a comma coater and a reverse comma coater may be used.

After the coating, a drying process is conducted. The drying process may be conducted under a condition required to remove a solvent. For example, a color conversion film including a fluorescent substance including the compound represented by Chemical Formula 1 having target thickness and concentration may be obtained on a substrate by carrying out the drying in an oven located close to a coater under a condition to sufficiently evaporate a solvent, in a direction of the substrate progressing during the coating process.

When a monomer curable to the resin matrix resin is used as the resin included in the solution, curing, for example, UV curing, may be conducted prior to or at the same time as the drying.

When the compound represented by Chemical Formula 1 is filmed by being extruded with a resin, extrusion methods known in the art may be used, and for example, the color conversion film may be prepared by extruding the compound represented by Chemical Formula 1 with a resin such as a polycarbonate (PC)-based, a poly(meth)acryl-based and a styrene-acrylonitrile (SAN)-based.

According to one embodiment of the present specification, the color conversion film may have a protective film or a barrier film provided on at least one surface. As the protective film or the barrier film, those known in the art may be used.

Another embodiment of the present specification provides a backlight unit including the color conversion film described above. The backlight unit may have backlight unit constitutions known in the art except for including the color conversion film. For example, FIG. 1 illustrates one example. According to FIG. 1, the color conversion film according to the embodiments described above is provided on a surface opposite to a surface facing a reflecting plate of a light guide plate. FIG. 1 illustrates a constitution including a light source and a reflecting plate surrounding the light source, however, the constitution is not limited to such a structure, and may vary depending on the backlight unit structure known in the art. In addition, as the light source, a direct type as well as a side chain type may be used, and the reflecting plate or the reflective layer may not be included or may be replaced with other constituents as necessary, and when necessary, additional films such as a light diffusing film, a light concentrating film and a luminance enhancing film may be further provided. Preferably, a light concentrating film and a luminance enhancing film are further provided on the color conversion film.

In the constitution of the backlight unit as in FIG. 1, a scattering pattern may be provided as necessary on the upper surface or a lower surface of the light guide plate. Light introduced into the light guide plate has non-uniform light distribution due to repetition of optical processes such as reflection, total reflection, refraction or transmission, and the scattering pattern may be used to induce the non-uniform light distribution to uniform brightness.

Another embodiment of the present application uses a display apparatus including the backlight unit described above. This display apparatus is not particularly limited as long as it includes the above-described backlight unit as a constituent. For example, the display apparatus includes a display module and a backlight unit. FIG. 2 illustrates a structure of the display apparatus. However, the structure is not limited thereto, and between the display module and the backlight unit, additional films such as a light diffusing film, a light concentrating film and a luminance enhancing film may be further provided as necessary.

Hereinafter, the present specification will be described in detail with reference to examples. However, the examples according to the present specification may be modified to various other forms, and the scope of the present specification is not to be construed as being limited to the examples described below. Examples of the present specification are provided in order to more fully describe the present specification to those having average knowledge in the art.

PREPARATION EXAMPLE

The compound according to one embodiment of the present specification may be prepared using the following Synthesis Methods 1 to 14.

[Synthesis Method 1]

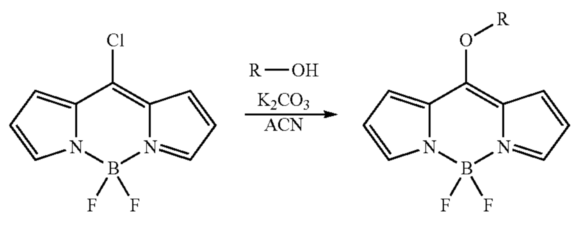

Chloro BODIPY (1 equivalent), R—OH (1 equivalent) and potassium carbonate (1.2 equivalents) were introduced into an acetonitrile (ACN) solvent, and the result was stirred while heating. After the reaction was finished, the result was extracted using water and chloroform, and the organic layer was dried with anhydrous magnesium sulfate. The solvent was dried through a vacuum distillation apparatus, and produced solids were filtered using a methanol solvent to obtain a target material.

[Synthesis Method 2]

After dissolving a starting material (1 equivalent) in an acetonitrile solvent, N-bromosuccinimide (NBS) was slowly introduced thereto at room temperature. When connecting 5 Brs, N-bromosuccinimide was used in 6 equivalents, and for 6 Brs, 10 equivalents were used. The reaction was conducted through stirring while heating, and when the reaction was finished, the result was cooled to room temperature, and then sufficiently stirred after introducing a sodium thiosulfate solution thereto. The organic layer was separated and dried with anhydrous magnesium sulfate, and the solvent was dried using a vacuum distillation apparatus. After the drying, solids were filtered using a methanol solvent to obtain a target material.

[Synthesis Method 3]

After dissolving a starting material (1 equivalent) in a dichloromethane (DCM) solvent, the result was stirred at −78° C. under the nitrogen atmosphere. Bromine (4 equivalents) diluted to 10 times in an acetonitrile solvent was slowly added dropwise thereto. During the dropwise addition, the temperature was continuously maintained so that the temperature did not rise. After the stepwise addition, the reaction progress was checked, and when the reaction was finished, a sodium thiosulfate solution and a potassium carbonate solution were introduced thereto, and the result was stirred for a sufficient period of time. The organic layer was separated, washed once more with water, and dried using anhydrous magnesium sulfate. After the drying, produced solids were filtered using a methanol solvent to obtain a target material.

[Synthesis Method 4]

After dissolving a starting material (1 equivalent) in an acetonitrile solvent, aryl alcohol/alkyl alcohol (3 equivalents) and potassium carbonate (5 equivalents) to use in the reaction were added thereto, and the result was stirred while heating. When the reaction was finished, the result was cooled to room temperature, and then extracted using water and chloroform. The organic layer was dried using anhydrous magnesium sulfate, and then the solvent was dried through a vacuum distillation apparatus. Produced solids were filtered using methanol to obtain a target material.

[Synthesis Method 5]

A starting material (1 equivalent) having halogen and a material having boronic acid were introduced using toluene and ethanol, potassium carbonate was dissolved in water, and these were stirred together while heating. For one Suzuki coupling, the boronic acid was used in 1.1 equivalents, and for two Suzuki couplings, 3 equivalents were used. Tetrakistriphenylphosphine palladium ($Pd(PPh_3)_4$) was used in 0.01 equivalents to conduct the reaction. After the reaction was finished, the result was cooled to room temperature, and extracted using water and ethyl acetate. The organic layer was dried using anhydrous magnesium sulfate, and the solvent was dried through a vacuum distillation apparatus. Produced solids were filtered using a methanol solvent to obtain a target material.

[Synthesis Method 6]

After dissolving a starting material (1 equivalent) in an acetonitrile solvent, N-chlorosuccinimide (NCS) was slowly added dropwise thereto. To make 5 Cls, the N-chlorosuccinimide was used in 7 equivalents, and for 6 Cls, 10 equivalents were used. After the dropwise addition was completed, the reaction was progressed through stirring while heating, and after the reaction was finished, the result was cooled to room temperature, and sufficiently stirred using a sodium thiosulfate solution. The organic layer was separated, and then dried using anhydrous magnesium sulfate, and the solvent was dried through a vacuum distillation apparatus. Produced solids were filtered using a methanol solvent to obtain a target material.

[Synthesis Method 7]

After dissolving a starting material in a dichloromethane solvent, the result was stirred at 0° C. under the nitrogen atmosphere. Trimethylsilyl cyanide (TMS-CN) and boron trifluoride ethyl ether ($BF_3OEt_2$) were slowly added dropwise thereto. For one cyanide substitution, the trimethylsilyl cyanide was used in 5 equivalents and the boron trifluoride ethyl ether was used in 2 equivalents, and for two cyanide substitution, 15 equivalents and 5 equivalents were respectively used. When the reaction was finished, the result was extracted using water and chloroform, and the organic layer was dried using anhydrous magnesium sulfate. The solvent was dried through a vacuum distillation apparatus, and produced solids were filtered using a methanol solvent to obtain a target material.

[Synthesis Method 8]

After dissolving a starting material (1 equivalent) in a dimethylformamide (DMF) solvent, a cycloalkyl-boron trifluoride potassium salt was introduced thereto, and manganese triacetate dihydrate ($Mn(OAc)_3 2H_2O$) was introduced thereto. For one cycloalkyl, the corresponding cycloalkyl was used in 1.5 equivalents and the manganese was used in 3 equivalents, and for two cycloalkyls, the cycloalkyl was used in 3 equivalents and the manganese was used in 5 equivalents. When the reaction was finished, water was introduced thereto, and produced solids were filtered through filtration. The solids were dissolved again in chloroform, and the result was dried using anhydrous magnesium sulfate. Produced solids were filtered using a methanol solvent to obtain a target material.

[Synthesis Method 9]

After introducing a dichloroethane (DCE) solvent to a flask at 0° C. under the nitrogen atmosphere, phosphorous oxychloride ($POCl_3$) and dimethylformamide were introduced thereto in 1:1, and the result was stirred for approximately 1 hour. After introducing a starting material (1 equivalent) to the flask, the reaction was progressed through stirring while heating. To make one aldehyde, the phosphorous oxychloride was used in 3 equivalents to prepare a solution, and to make two aldehydes, 10 equivalents were used to prepare a solution. When checking the reaction progress, a small amount was taken out, washed with a sodium bicarbonate solution, and then checked. After the reaction was finished, the flask was immersed in ice water, and then the result was neutralized by slowly adding a sodium bicarbonate solution thereto. After finishing the neutralization, the organic layer was separated, dried using anhydrous magnesium sulfate, and produced solids were filtered using a methanol solvent to obtain a target material.

[Synthesis Method 10]

After dissolving a starting material in a tetrahydrofuran (THF) solvent, sulfamic acid corresponding to 3 equivalents per 1 equivalent of aldehyde to oxidize was dissolved in water, and these were stirred together. The temperature was lowered to 0° C. after 30 minutes, and sodium chloride (1.2 equivalents) dissolved in water was slowly introduced thereto. After the reaction was completed, a sodium thiosulfate solution was introduced thereto, and after stirring the result, the organic layer was separated. The separated organic layer was dried using anhydrous magnesium sulfate, and the solvent was removed through a vacuum distillation apparatus. Produced solids were filtered using a methanol solvent to obtain a target material.

[Synthesis Method 11]

A starting material including an acid and a starting material including an alcohol were dissolved in chloroform with 1.05 equivalent of the alcohol for 1 equivalent of the acid. Ethyl-3-(3-dimethylaminopropyl)carbodiimide (EDC) and dimethylaminopyridine (DMAP) were introduced thereto in 1.1 equivalents each with respect to the acid, and the result was stirred while heating. After the reaction was finished, the result was extracted using water and chloroform, and the organic layer was dried using anhydrous magnesium sulfate. Produced solids were filtered using methanol to obtain a target material.

[Synthesis Method 12]

After stirring palladium acetate ($Pd(OAc)_2$) and Xantphos (Sigma-Aldrich, CAS Number 161265-03-8/4,5-bis(diphenylphosphino)-9,9-dimethylxanthene) in a dimethylformamide solvent, the result was introduced to a starting material having halogen placed in a flask at room temperature under the nitrogen atmosphere. After approximately 5 minutes, the result was introduced to a flask in which an indium starting material and diisopropylethylamine (DIPEA) were stirred in a dimethylformamide solvent using a cannula (double ended needle), and the result was stirred while heating. After the reaction was finished, the result was extracted using a sodium bicarbonate solution and chloroform, and the organic layer was dried using anhydrous magnesium sulfate. Produced solids were filtered using methanol to obtain a target material.

[Synthesis Method 13]

After dissolving a starting material (1 equivalent) in dichloromethane, aluminum chloride (5 equivalents) was introduced thereto, and the result was stirred. Heptafluorobutanol ($C_3F_7CH_2OH$) (3 equivalents) was introduced thereto, the result was stirred while heating, and when the reaction was finished, the result was extracted using water and chloroform. The organic layer was dried using anhydrous magnesium sulfate, and after removing the solvent through a vacuum distillation apparatus, produced solids were filtered using methanol to obtain a target material.

[Synthesis Method 14]

After dissolving a starting material (1 equivalent) and t-butyl ethynylbenzene (2.1 equivalents) in an anhydrous tetrahydrofuran solvent, the flask was maintained under the nitrogen atmosphere at −78° C. for approximately 1 hour. n-BuLi (2.05 equivalents) was slowly added dropwise thereto, and the temperature was raised to room temperature. When the reaction was finished, the result was extracted using water and chloroform, and the organic layer was dried using anhydrous magnesium sulfate. The solvent was removed through a vacuum distillation apparatus, and produced solids were filtered using methanol to obtain a target material.

Preparation Example 1

Compound 1

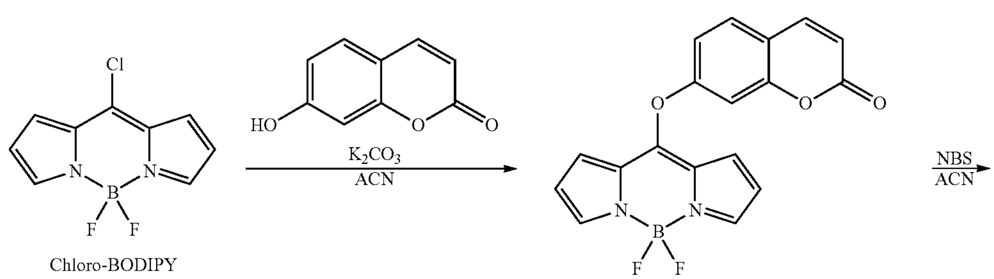

1-1

-continued
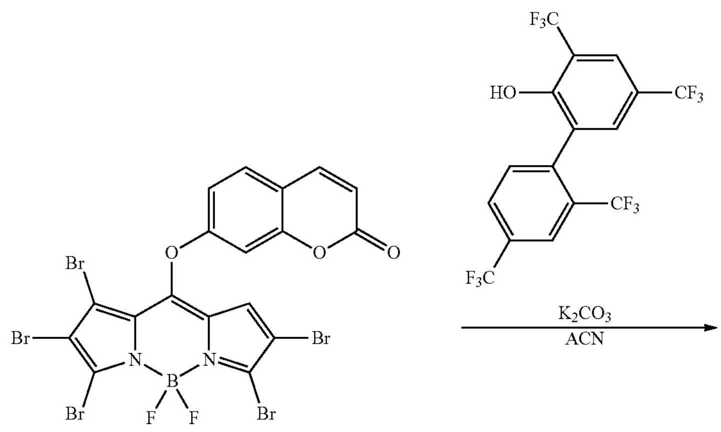
1-2
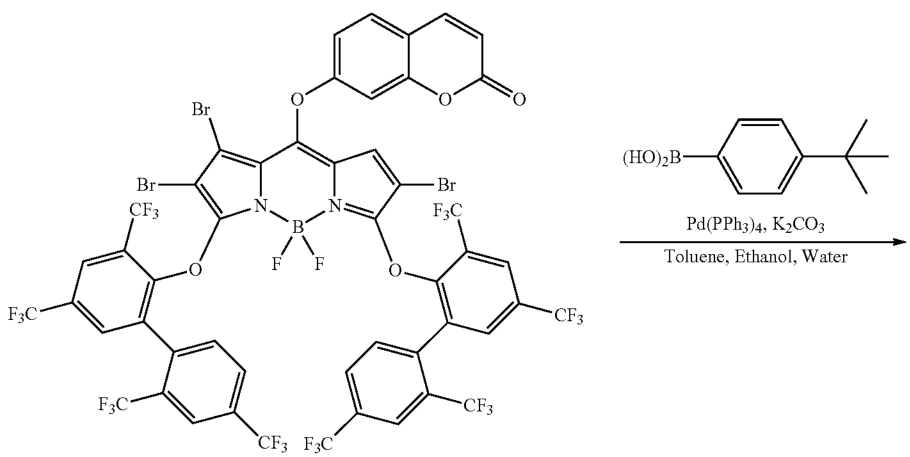
1-3
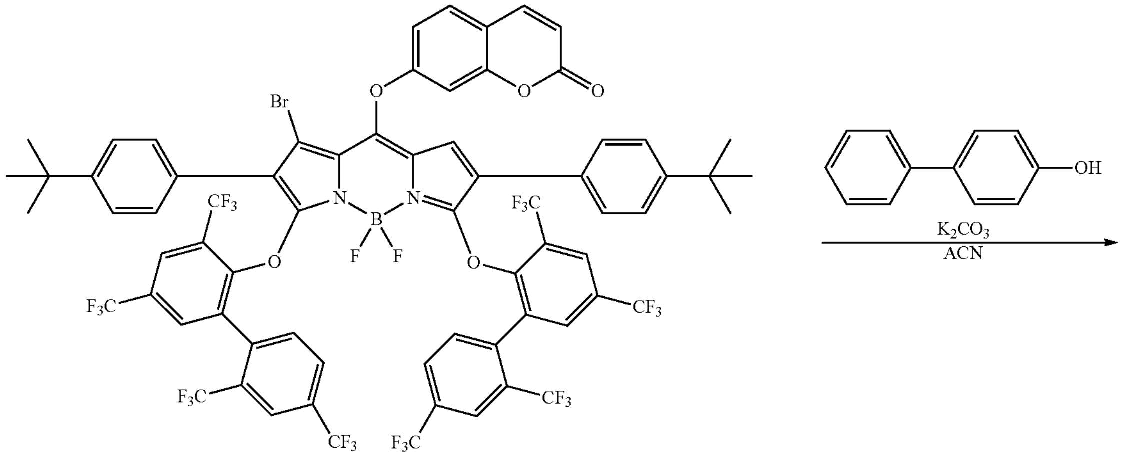
1-4

-continued

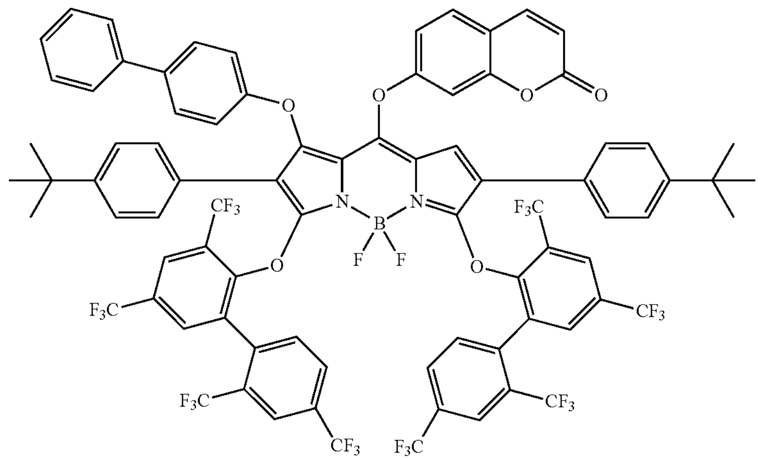

1

(Synthesis of 1-1)

Synthesis was progressed according to Synthesis Method 1 using chloro BODIPY and 7-hydroxycoumarin. Compound 1-1 was obtained in 6.6 g (yield 85%).

(Synthesis of 1-2)

Synthesis was progressed according to Synthesis Method 2 using Compound 1-1 and N-bromosuccinimide. Compound 1-2 was obtained in 9.1 g (yield 72%).

(Synthesis of 1-3)

Synthesis was progressed according to Synthesis Method 4 using Compound 1-2 and tetrakistrifluoromethylbiphenylol. Compound 1-3 was obtained in 14.3 g (yield 81%).

(Synthesis of 1-4)

Synthesis was progressed according to Synthesis Method 5 using Compound 1-3 and t-butylphenylboronic acid. Compound 1-4 was obtained in 11.4 g (yield 76%).

(Synthesis of Compound 1)

Synthesis was progressed according to Synthesis Method 4 using Compound 1-4 and biphenylol. Final Compound 1 was obtained in 9.7 g (yield 84%) through column chromatography.

HR LC/MS/MS m/z calculated for $C_{82}H_{51}BF_{26}N_2O_6$ (M+): 1664.3425; found: 1664.3428

Preparation Example 2

Compound 2

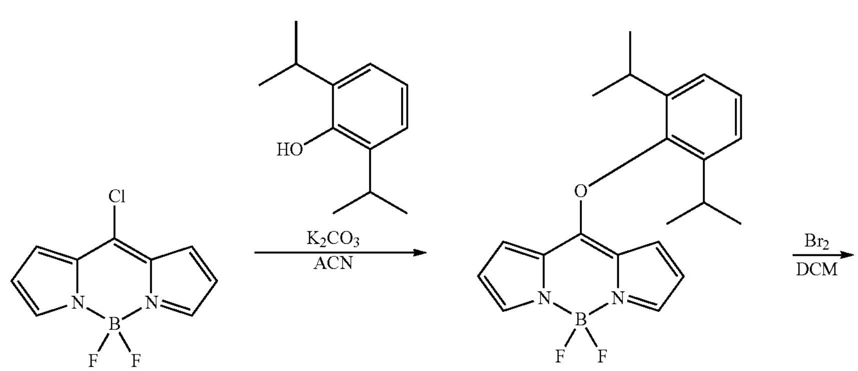

Chloro BODIPY 2-1

-continued

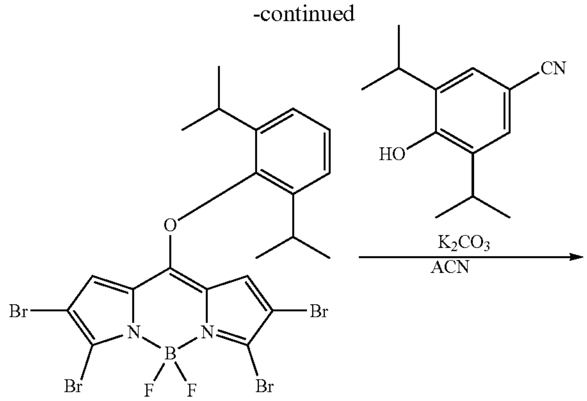

2-2

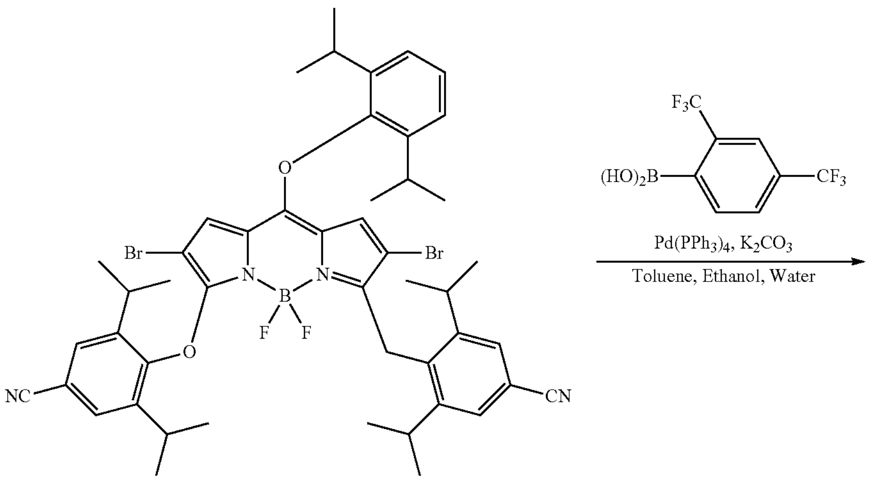

2-3

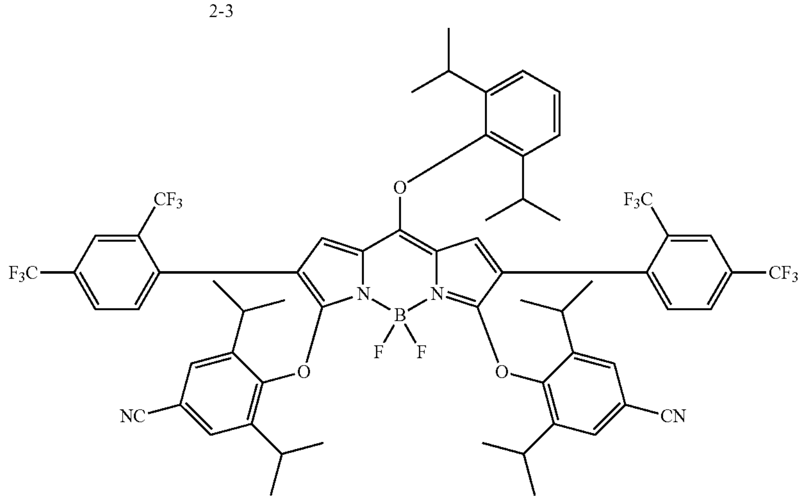

2

(Synthesis of 2-1)

Synthesis was progressed according to Synthesis Method 1 using chloro BODIPY and 2,6-diisopropylphenol. Compound 2-1 was obtained in 14.1 g (yield 87%).

(Synthesis of 2-2)

Synthesis was progressed according to Synthesis Method 3 using Compound 2-1 and bromine. Compound 2-2 was obtained in 23.1 g (yield 89%).

(Synthesis of 2-3)

Synthesis was progressed according to Synthesis Method 4 using Compound 2-2 and 4-cyano-2,6-diisopropylphenol. Compound 2-3 was obtained in 10.5 g (yield 77%).

(Synthesis of Compound 2)

Synthesis was progressed according to Synthesis Method 5 using Compound 2-3 and 2,4-ditrifluoromethylboronic acid. Compound 2 was obtained in 11.1 g (yield 86%).

HR LC/MS/MS m/z calculated for $C_{63}H_{57}BF_{14}N_4O_3$ (M+): 1194.4300; found: 1194.4296

Preparation Example 3
Compound 3
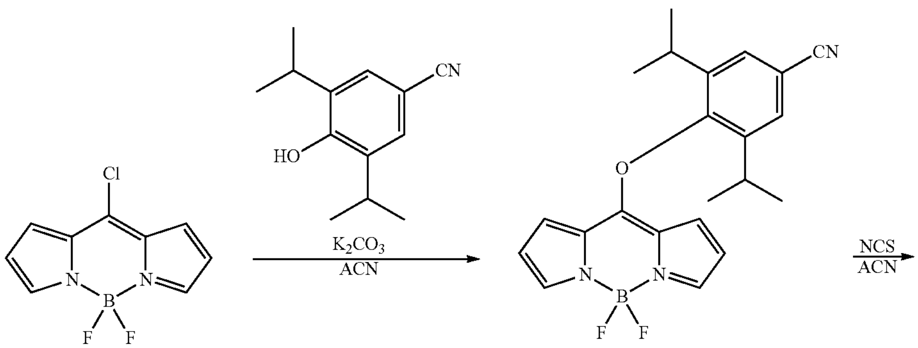
Chloro BODIPY 3-1
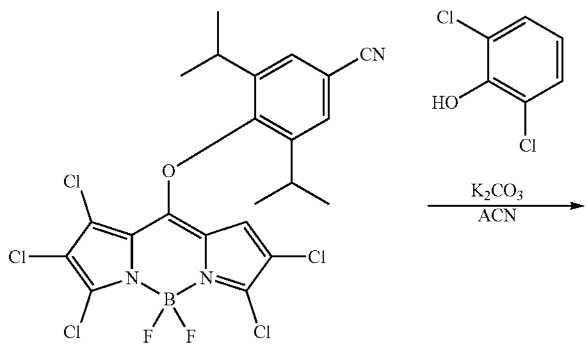
3-2
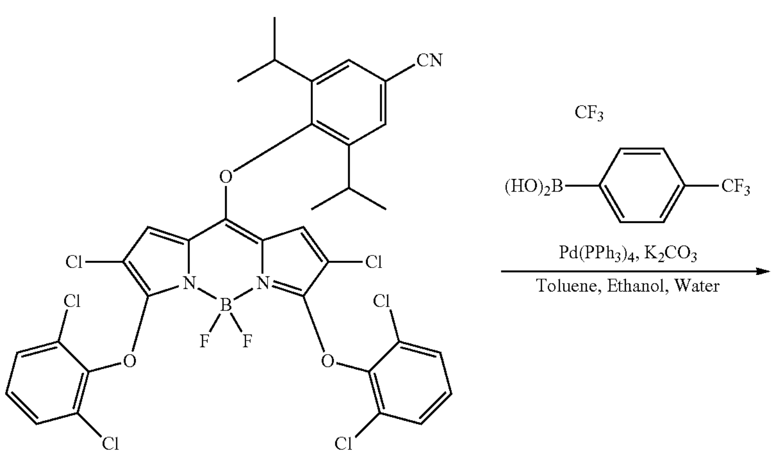
3-3

-continued

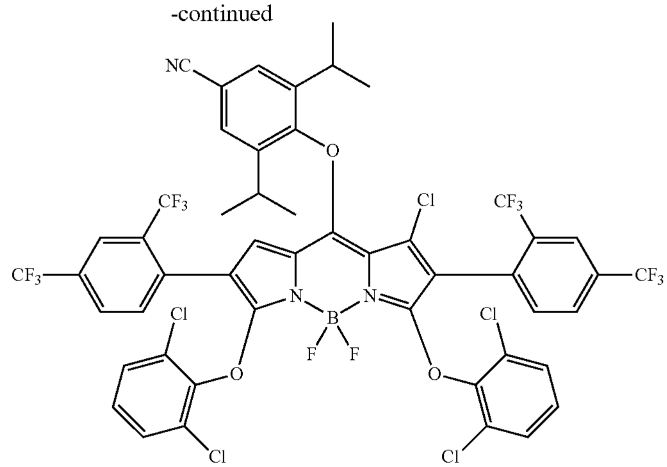

3

(Synthesis of 3-1)

Synthesis was progressed according to Synthesis Method 1 using chloro BODIPY and 4-cyano-2,6-diisopropylphenol. Compound 3-1 was obtained in 15.5 g (yield 89%).

(Synthesis of 3-2)

Synthesis was progressed according to Synthesis Method 6 using Compound 3-1. Compound 3-2 was obtained in 9.8 g (yield 68%).

(Synthesis of 3-3)

Synthesis was progressed according to Synthesis Method 4 using Compound 3-2 and 2,6-dichlorophenol. Compound 3-3 was obtained in 7.4 g (yield 59%).

(Synthesis of Compound 3)

Synthesis was progressed according to Synthesis Method 5 using Compound 3-3 and 2,4-ditrifluoromethylboronic acid. Compound 3 was obtained in 8.0 g (yield 76%).

HR LC/MS/MS m/z calculated for $C_{50}H_{29}BCl_5F_{14}N_3O_3$ (M+): 1171.0521; found: 1171.0525

Preparation Example 4

Compound 4

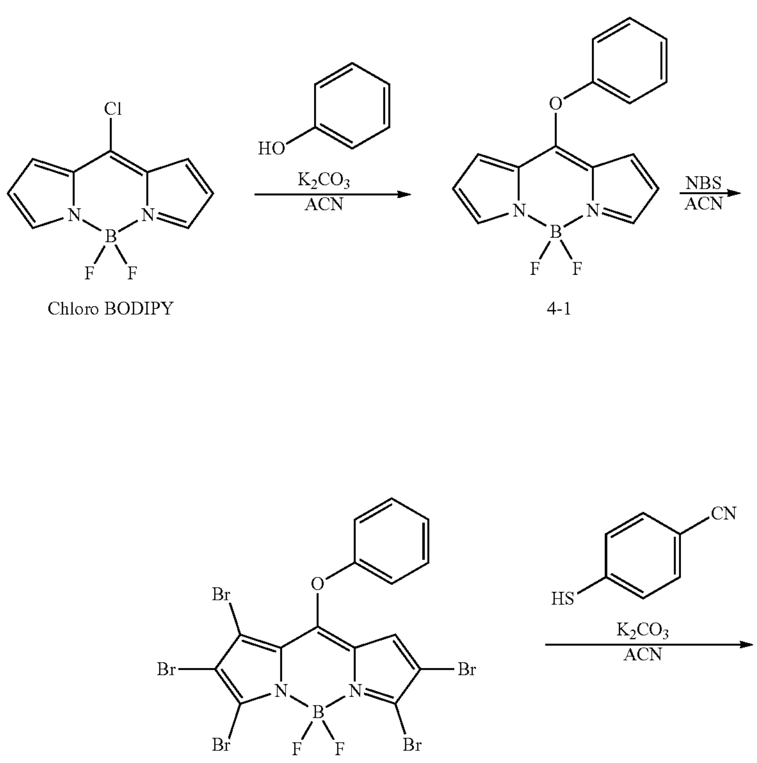

-continued

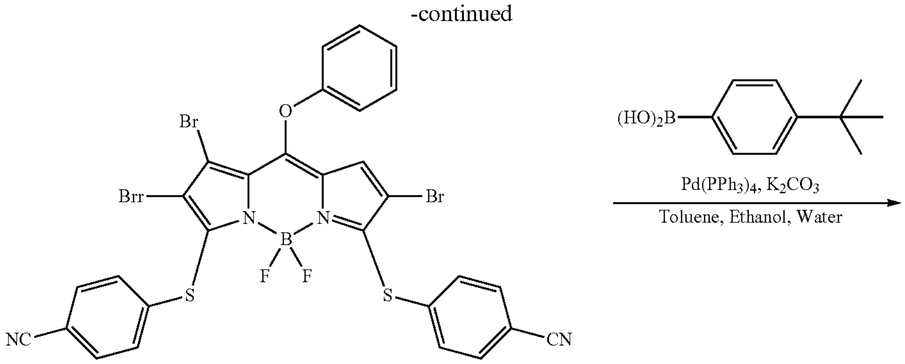

4-3

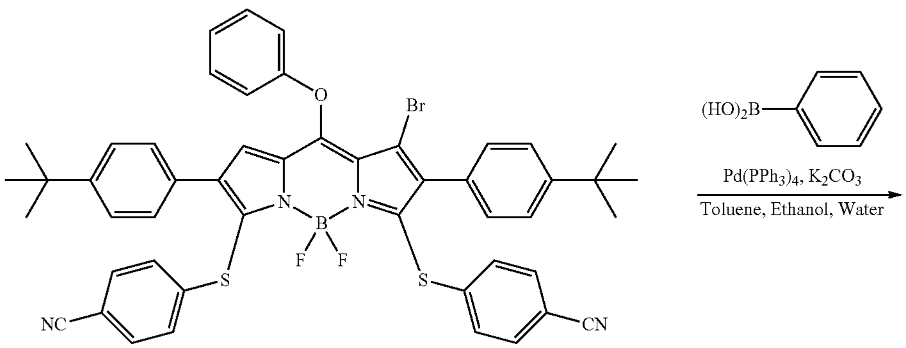

4-4

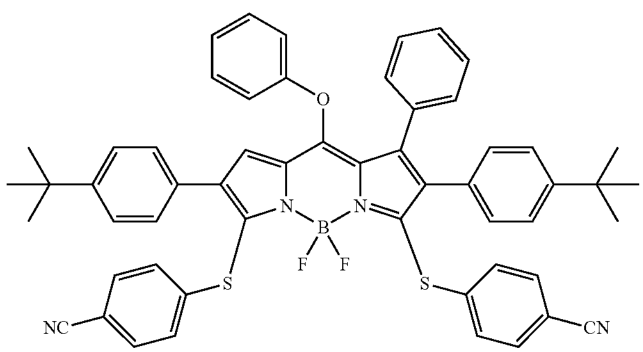

4

(Synthesis of 4-1)

Synthesis was progressed according to Synthesis Method 1 using chloro BODIPY and phenol. Compound 4-1 was obtained in 5.6 g (yield 90%).

(Synthesis of 4-2)

Synthesis was progressed according to Synthesis Method 2 using Compound 4-1. Compound 4-2 was obtained in 9.7 g (yield 81%).

(Synthesis of 4-3)

Synthesis was progressed according to Synthesis Method 4 using Compound 4-2 and cyanobenzenethiol. Compound 4-3 was obtained in 9.4 g (yield 90%).

(Synthesis of 4-4)

Synthesis was progressed according to Synthesis Method 5 using Compound 4-3 and t-butylbenzeneboronic acid. Compound 4-4 was obtained in 8.4 g (yield 82%).

(Synthesis of Compound 4)

Synthesis was progressed according to Synthesis Method 5 using Compound 4-4 and benzeneboronic acid. Compound 4 was obtained in 6.3 g (yield 79%).

HR LC/MS/MS m/z calculated for $C_{55}H_{45}BF_2N_4OS_2$ (M+): 890.3096; found: 890.3094

Preparation Example 5
Compound 5
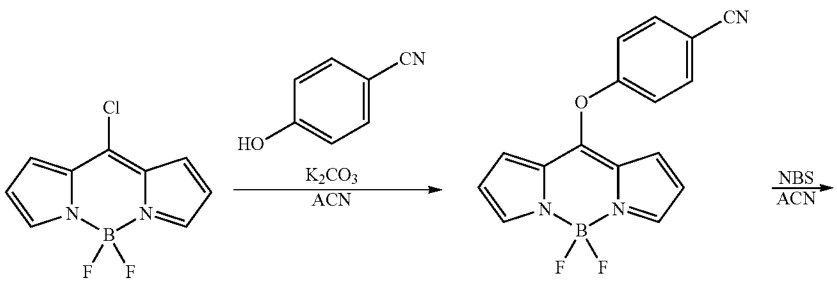
Chloro BODIPY 5-1
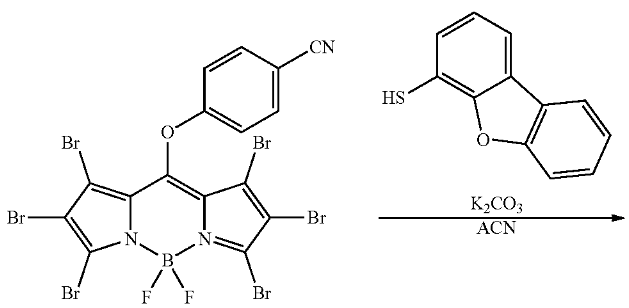
5-2
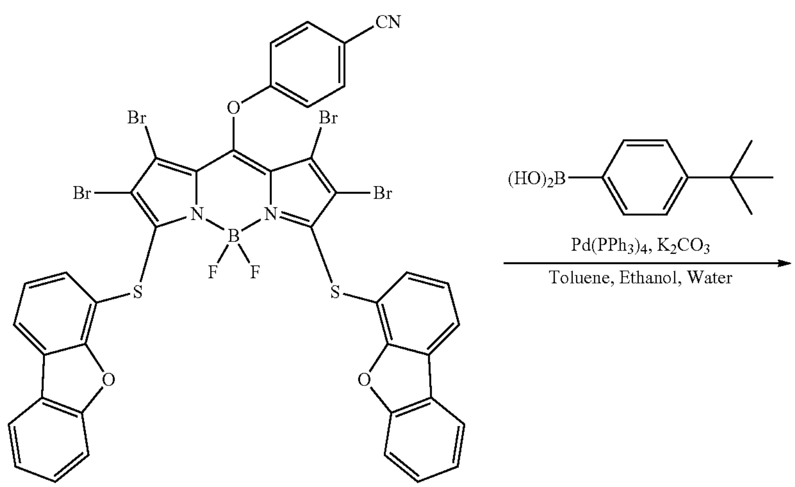
5-3

-continued
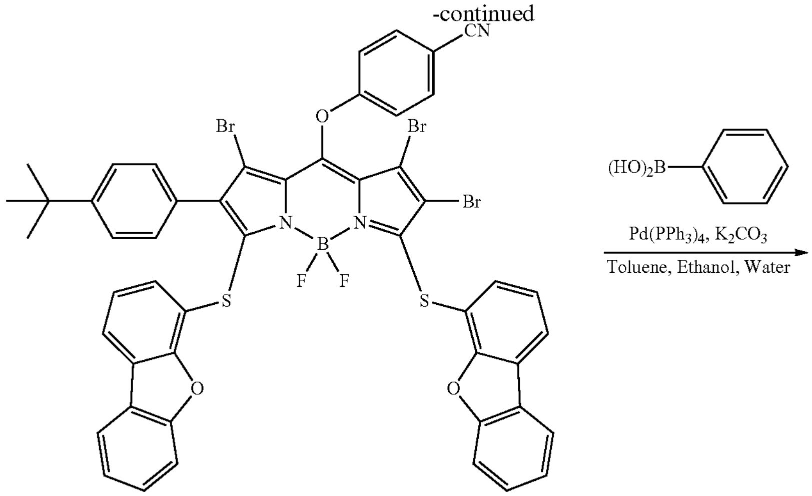
5-4
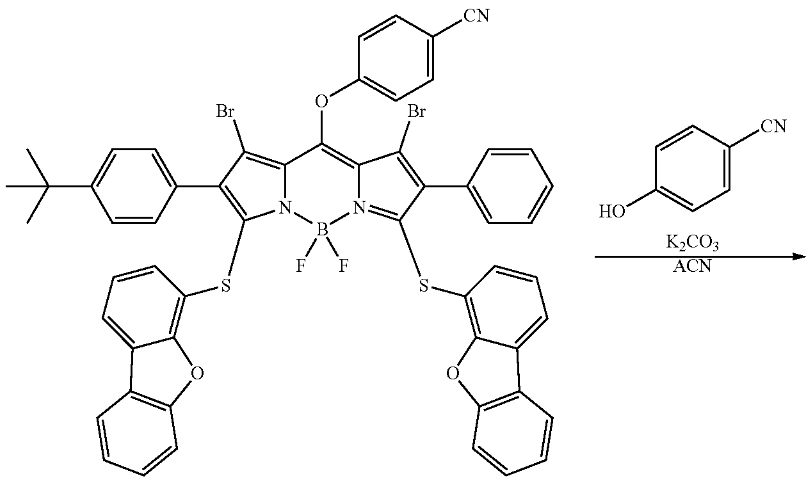
5-5
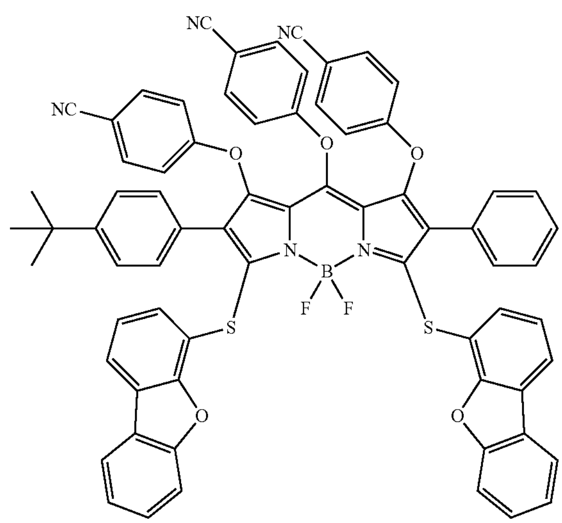
5
(Synthesis of 5-1)
Synthesis was progressed according to Synthesis Method 1 using chloro BODIPY and cyanophenol. Compound 5-1 was obtained in 6.2 g (yield 91%).
(Synthesis of 5-2)
Synthesis was progressed according to Synthesis Method 2 using Compound 5-1. Compound 5-2 was obtained in 13.1 g (yield 86%).

(Synthesis of 5-3)

Synthesis was progressed according to Synthesis Method 4 using Compound 5-2 and dibenzofuran-4-thiol. Compound 5-3 was obtained in 14.8 g (yield 87%).

(Synthesis of 5-4)

Synthesis was progressed according to Synthesis Method 5 using Compound 5-3 and t-butylbenzeneboronic acid. Compound 5-4 was obtained in 11.2 g (yield 76%).

(Synthesis of 5-5)

Synthesis was progressed according to Synthesis Method 5 using Compound 5-4 and benzeneboronic acid. Compound 5-5 was obtained in 7.9 g (yield 76%).

(Synthesis of Compound 5)

Synthesis was progressed according to Synthesis Method 4 using Compound 5-5 and cyanophenol. Compound 5 was obtained in 6.4 g (yield 86%).

HR LC/MS/MS m/z calculated for $C_{70}H_{44}BF_2N_5O_5S_2$ (M+): 1147.2845; found: 1147.2850

Preparation Example 6

Compound 6

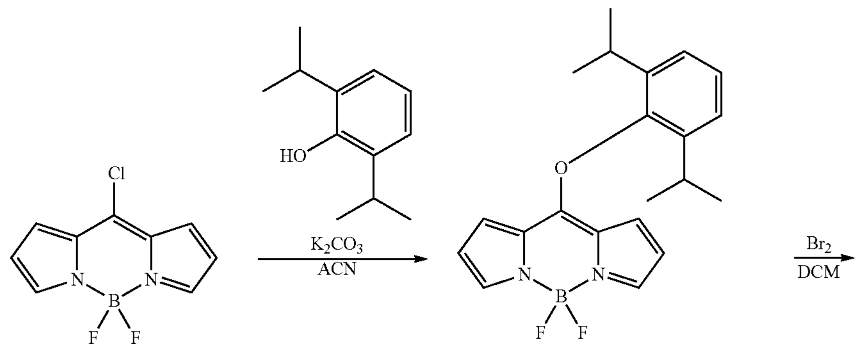

Chloro BODIPY 2-1

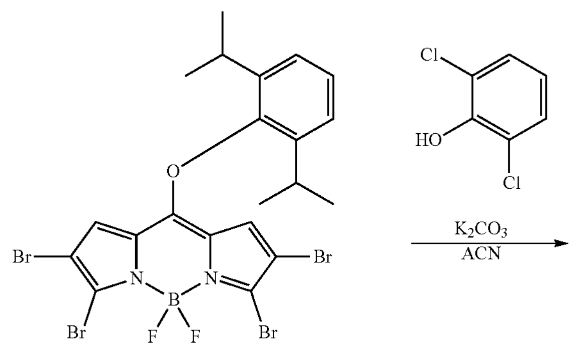

2-2

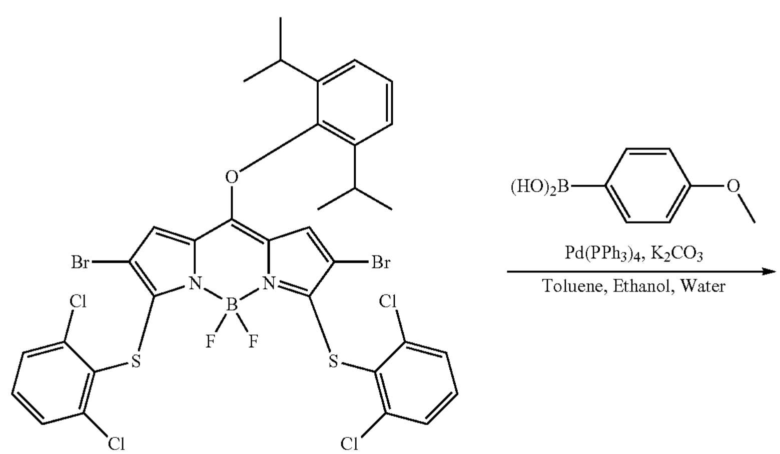

6-1

-continued

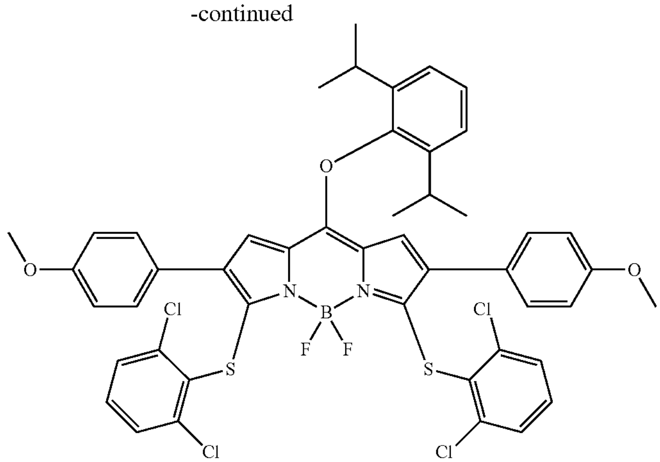

6

(Synthesis of 6-1)

Synthesis was progressed according to Synthesis Method 4 using Compound 2-2 and dichlorobenzenethiol. Compound 6-1 was obtained in 5.0 g (yield 78%).

(Synthesis of Compound 6)

Synthesis was progressed according to Synthesis Method 5 using Compound 6-1 and 4-methoxyphenylboronic acid. Compound 6 was obtained in 4.8 g (yield 90%).

HR LC/MS/MS m/z calculated for $C_{47}H_{39}BCl_4F_2N_2O_3S_2$ (M+): 932.1217; found: 932.1215

Preparation Example 7

Compound 7

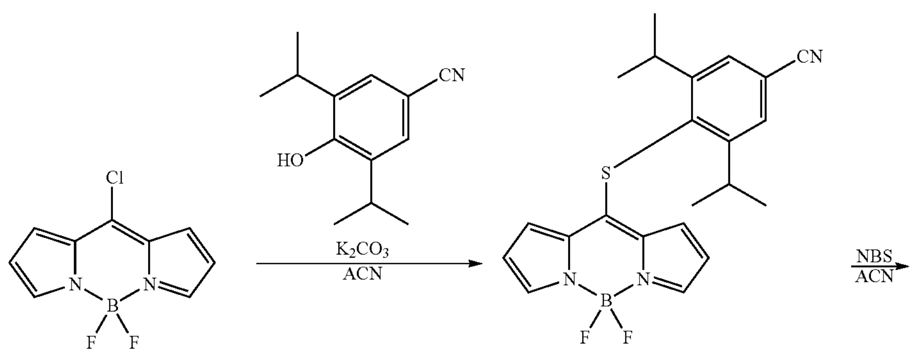

Chloro BODIPY 7-1

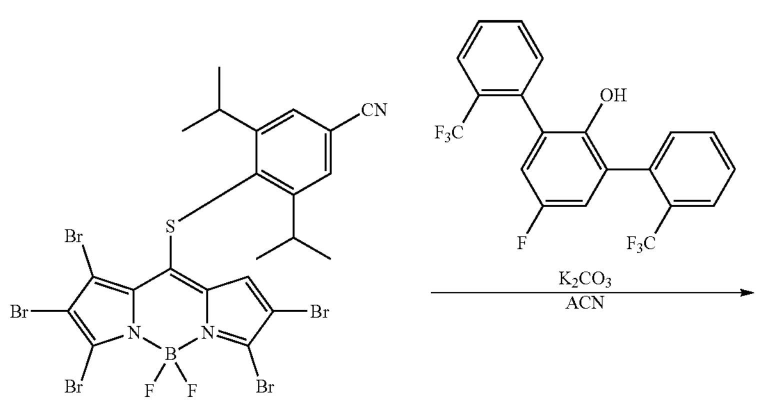

7-2

-continued
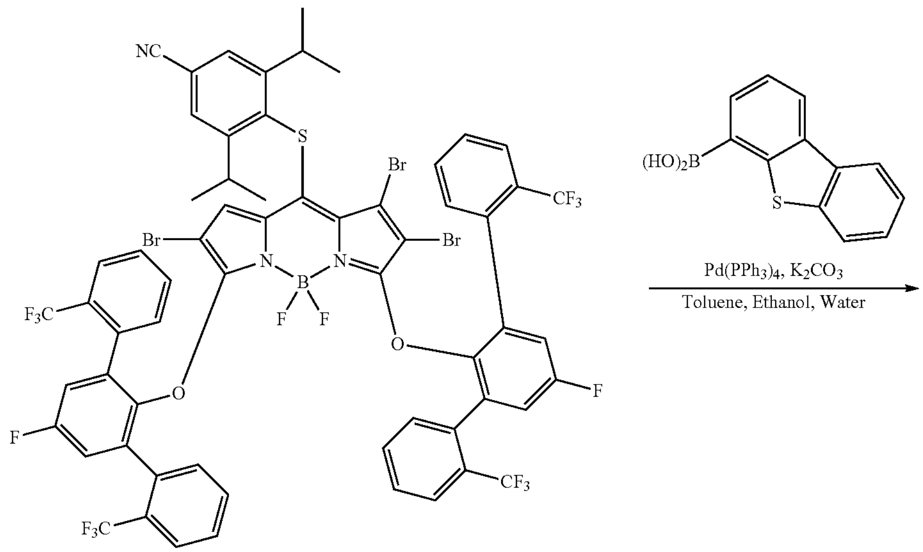
7-3
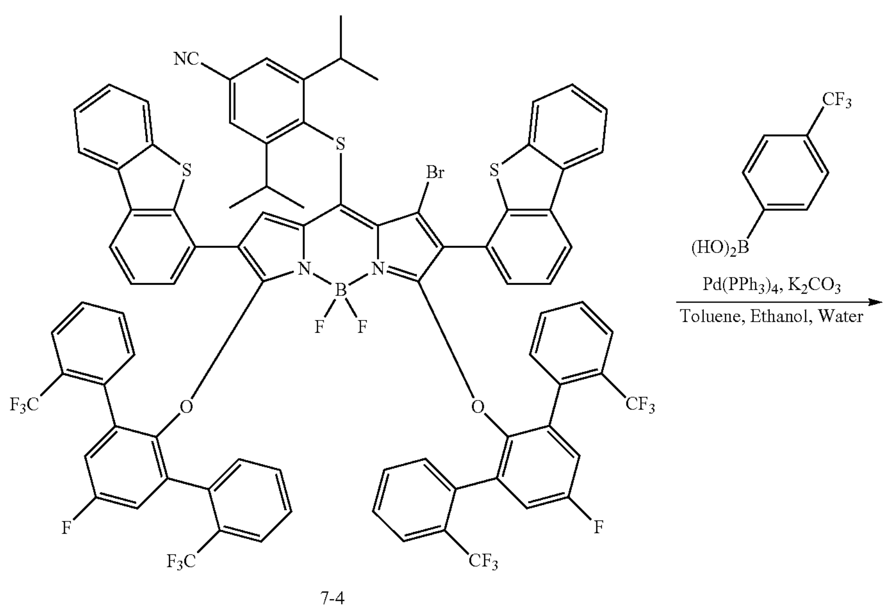
7-4

-continued

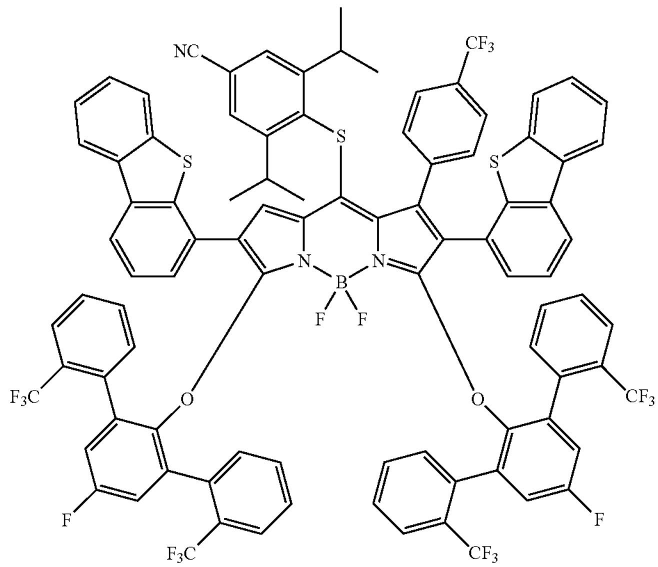

7

(Synthesis of 7-1)

Synthesis was progressed according to Synthesis Method 1 using chloro BODIPY and 4-cyano-2,6-diisopropylbenzenethiol. Compound 7-1 was obtained in 5.8 g (yield 64%).

(Synthesis of 7-2)

Synthesis was progressed according to Synthesis Method 2 using Compound 7-1. Compound 7-2 was obtained in 7.2 g (yield 73%).

(Synthesis of 7-3)

Synthesis was progressed according to Synthesis Method 4 using Compound 7-2 and 5'-fluoro-2,2"-bis(trifluoromethyl)terphenyl-2'-ol. Compound 7-3 was obtained in 9.5 g (yield 76%).

(Synthesis of 7-4)

Synthesis was progressed according to Synthesis Method 5 using Compound 7-3 and dibenzothiopheneboronic acid. Compound 7-4 was obtained in 7.0 g (yield 68%).

(Synthesis of Compound 7)

Synthesis was progressed according to Synthesis Method 5 using Compound 7-4 and 4-trifluoromethylphenylboronic acid. Compound 7 was obtained in 5.3 g (yield 73%).

HR LC/MS/MS m/z calculated for $C_{93}H_{55}BF_{19}N_3O_2S_3$ (M+): 1713.3246; found: 1713.3242

Preparation Example 8

Compound 8

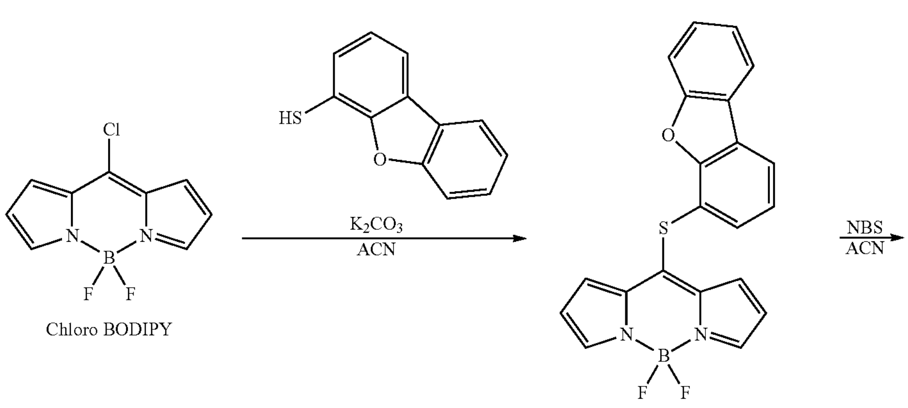

8-1

-continued
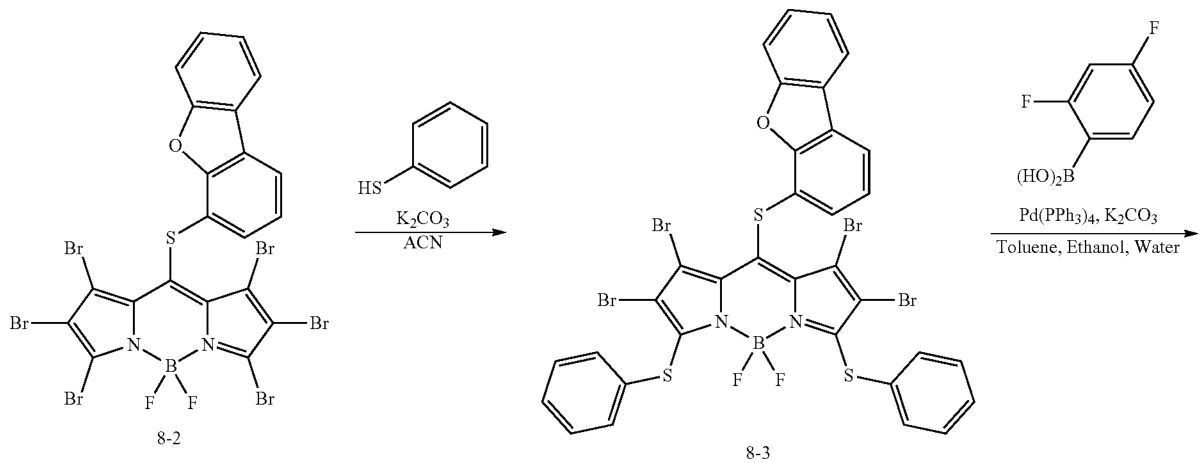
8-2 8-3
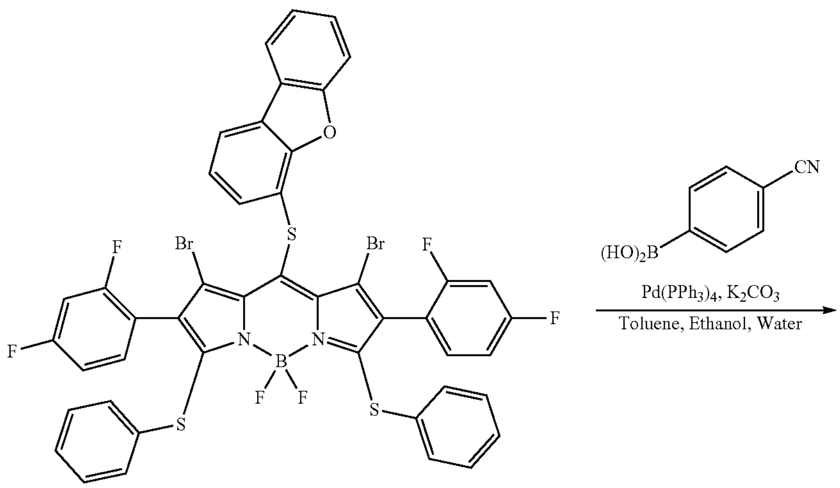
8-4
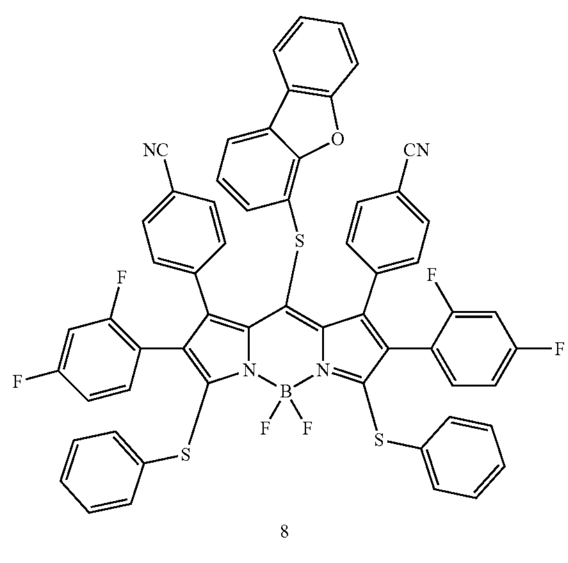
8

(Synthesis of 8-1)

Synthesis was progressed according to Synthesis Method 1 using chloro BODIPY and dibenzofuran-4-thiol. Compound 8-1 was obtained in 6.8 g (yield 79%).

(Synthesis of 8-2)

Synthesis was progressed according to Synthesis Method 2 using Compound 8-1. Compound 8-2 was obtained in 11.2 g (yield 84%).

(Synthesis of 8-3)

Synthesis was progressed according to Synthesis Method 4 using Compound 8-2 and benzenethiol. Compound 8-3 was obtained in 8.6 g (yield 81%).

(Synthesis of 8-4)

Synthesis was progressed according to Synthesis Method 5 using Compound 8-3 and 2,4-difluorobenzeneboronic acid. Compound 8-4 was obtained in 6.5 g (yield 76%).

(Synthesis of Compound 8)

Synthesis was progressed according to Synthesis Method 5 using Compound 8-4 and 4-cyanobenzeneboronic acid. Compound 8 was obtained in 4.8 g (yield 77%).

HR LC/MS/MS m/z calculated for $C_{59}H_{31}BF_6N_4OS_3$ (M+): 1032.1657; found: 1032.1653

Preparation Example 9

Compound 9

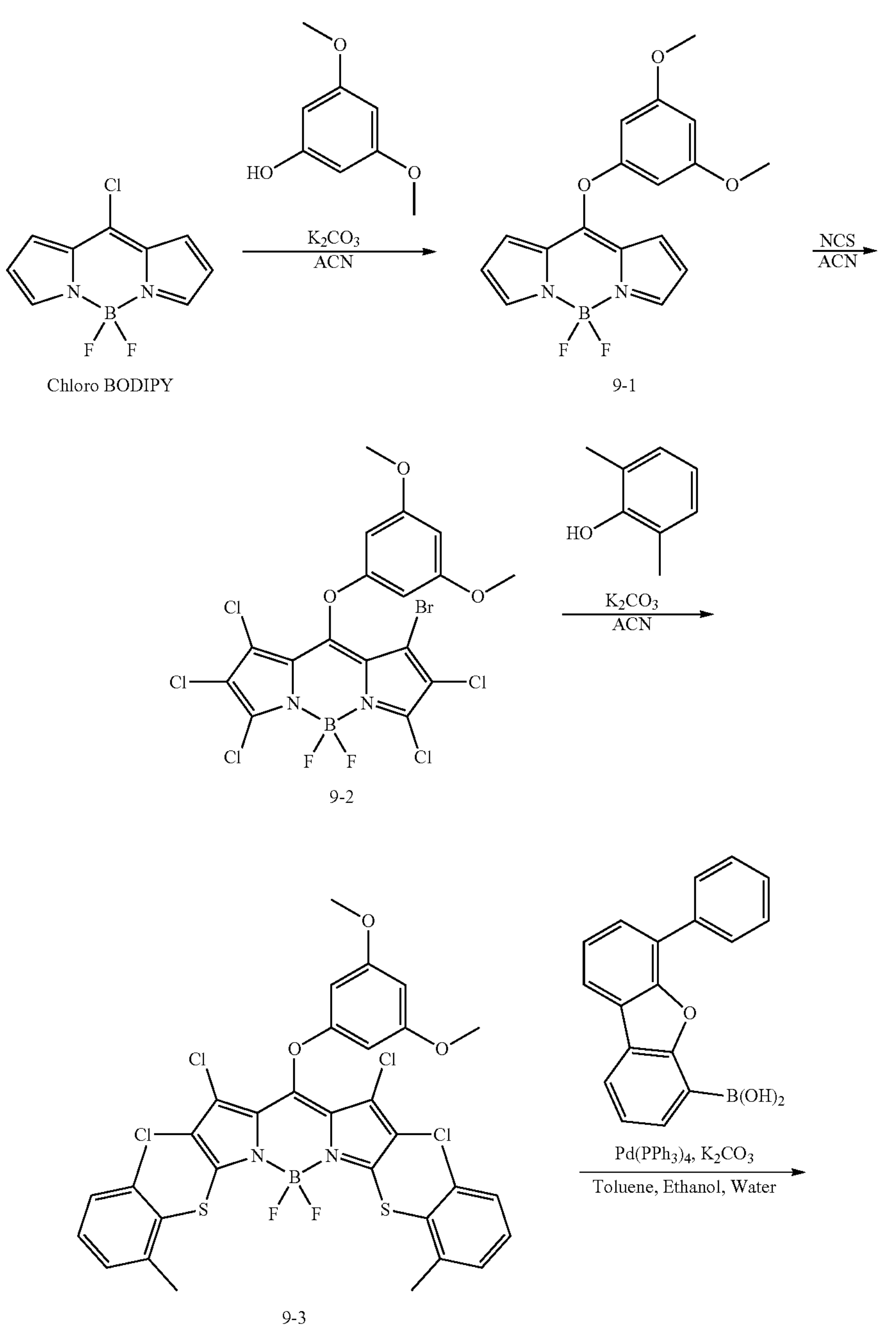

-continued

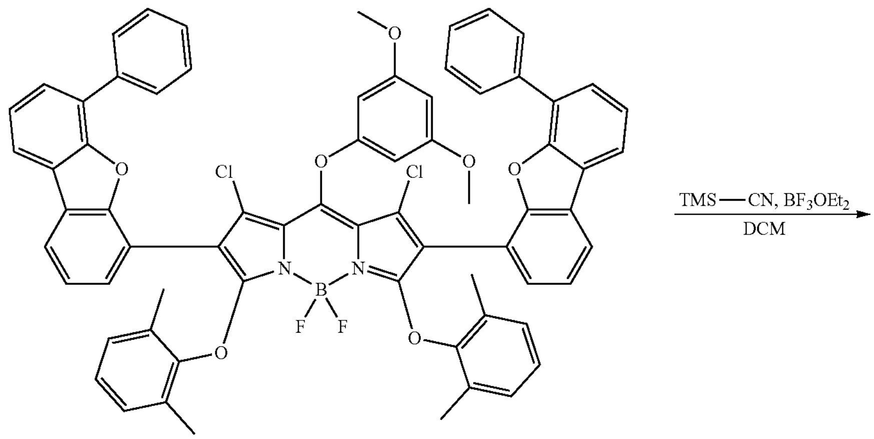

9-4

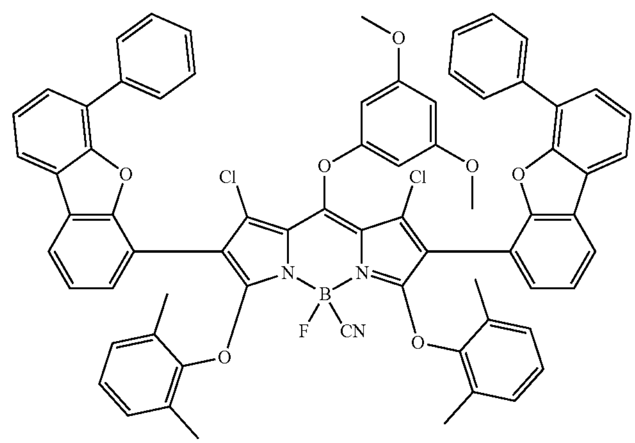

9

(Synthesis of 9-1)

Synthesis was progressed according to Synthesis Method 1 using chloro BODIPY and 3,5-dimethoxyphenol. Compound 9-1 was obtained in 6.5 g (yield 86%).

(Synthesis of 9-2)

Synthesis was progressed according to Synthesis Method 6 using Compound 9-1. Compound 9-2 was obtained in 7.0 g (yield 73%).

(Synthesis of 9-3)

Synthesis was progressed according to Synthesis Method 4 using Compound 9-2 and 2,6-dimethylphenol. Compound 9-3 was obtained in 7.0 g (yield 76%).

(Synthesis of 9-4)

Synthesis was progressed according to Synthesis Method 5 using Compound 9-3 and 6-phenyl-dibenzofuranyl-4-boronic acid. Compound 9-4 was obtained in 6.1 g (yield 65%).

(Synthesis of Compound 9)

Synthesis was progressed according to Synthesis Method 7 using Compound 9-4. Compound 9 was obtained in 2.7 g (yield 45%).

HR LC/MS/MS m/z calculated for $C_{70}H_{49}BCl_2FN_3O_7$ (M+): 1143.3025; found: 1143.3027

Preparation Example 10
Compound 10
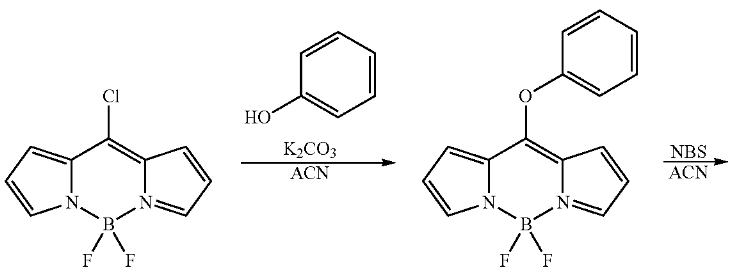
Chloro BODIPY 4-1
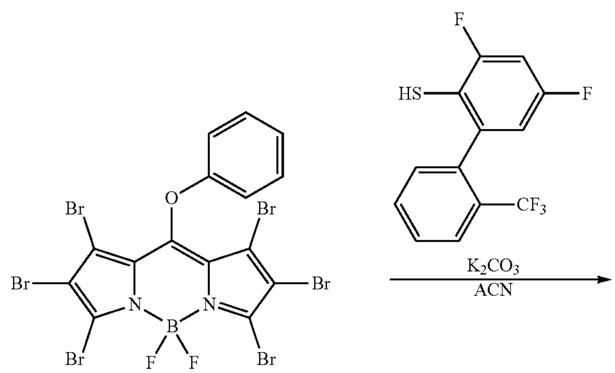
10-1
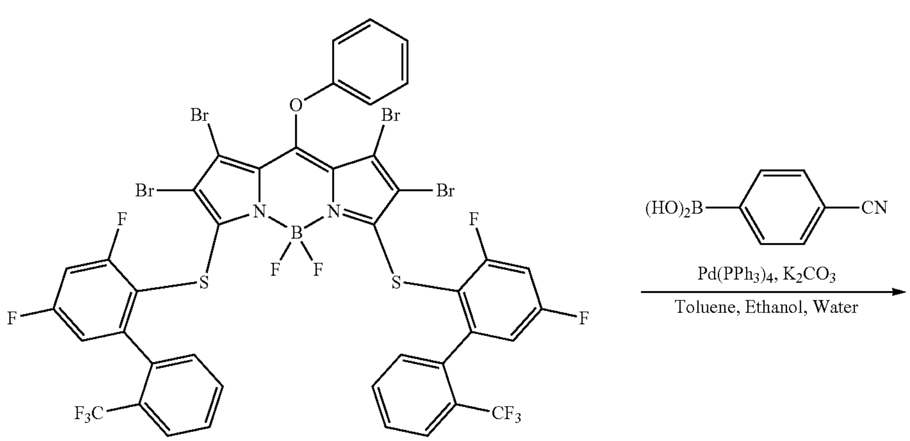
10-2

-continued
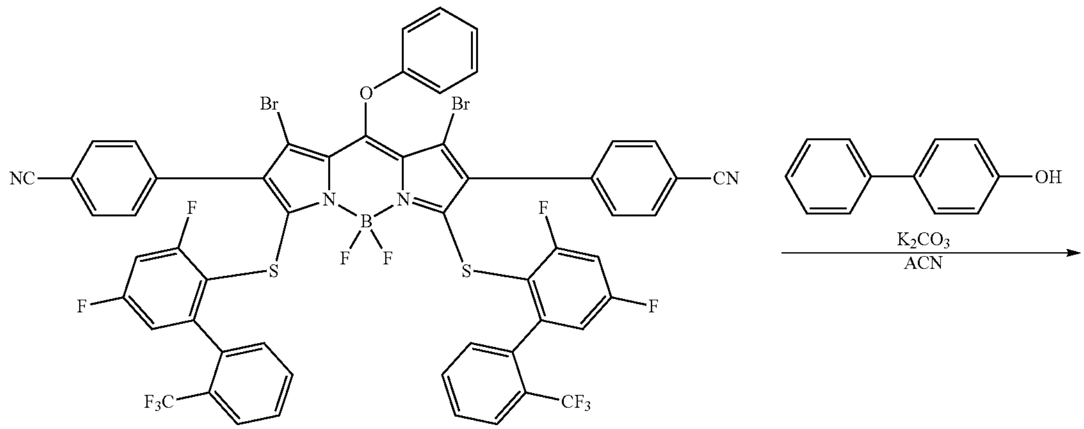
10-3
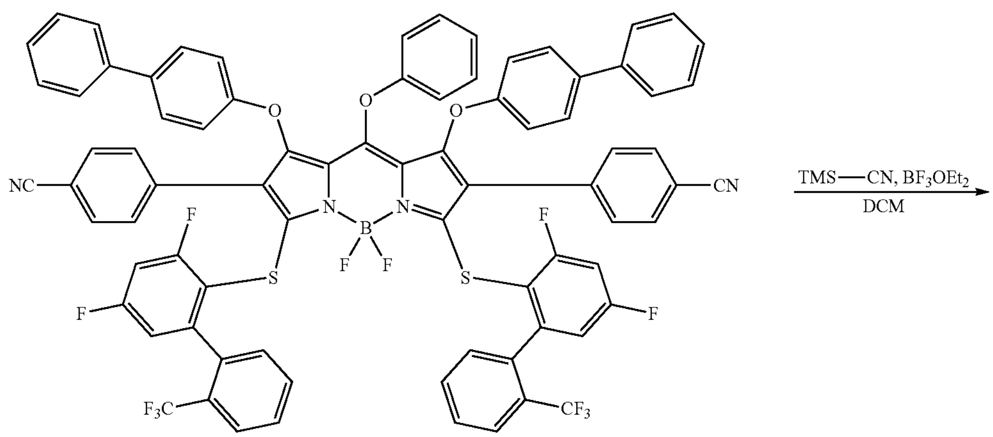
10-4
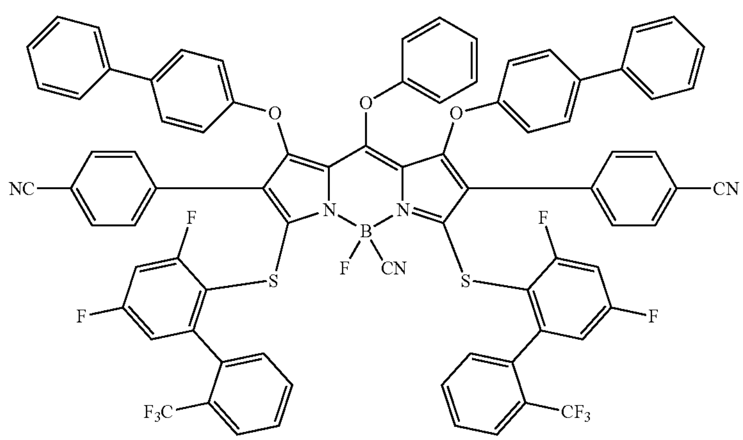
10

(Synthesis of 10-1)

Synthesis was progressed according to Synthesis Method 2 using Compound 4-1. Compound 10-1 was obtained in 11.5 g (yield 86%).

(Synthesis of 10-2)

Synthesis was progressed according to Synthesis Method 4 using Compound 10-1 and 2-(2'-trifluoromethylphenyl)-4,6-difluorobenzenethiol. Compound 10-2 was obtained in 13.5 g (yield 79%).

(Synthesis of 10-3)

Synthesis was progressed according to Synthesis Method 5 using Compound 10-2 and 4-cyanophenylboronic acid. Compound 10-3 was obtained in 10.8 g (yield 80%).

(Synthesis of 10-4)

Synthesis was progressed according to Synthesis Method 5 using Compound 10-3 and biphenyl-4-ol. Compound 10-4 was obtained in 8.3 g (yield 72%).

(Synthesis of Compound 10)

Synthesis was progressed according to Synthesis Method 7 using Compound 10-4. Compound 10 was obtained in 4.1 g (yield 51%).

HR LC/MS/MS m/z calculated for $C_{80}H_{43}BF_{11}N_5O_3S_2$ (M+): 1405.2725; found: 1405.2730

Preparation Example 11

Compound 11

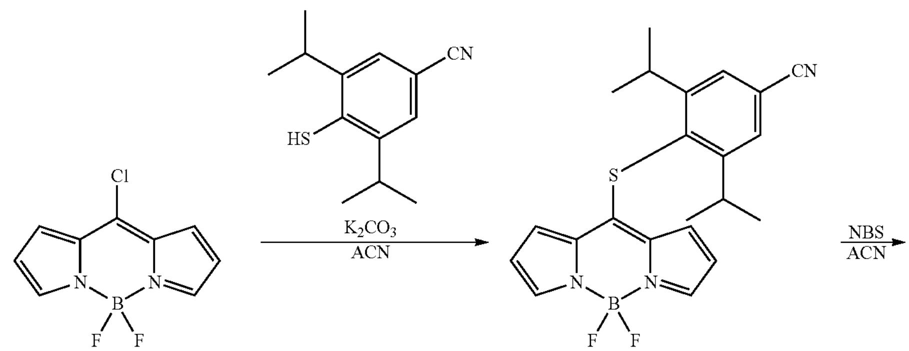

Chloro BODIPY 7-1

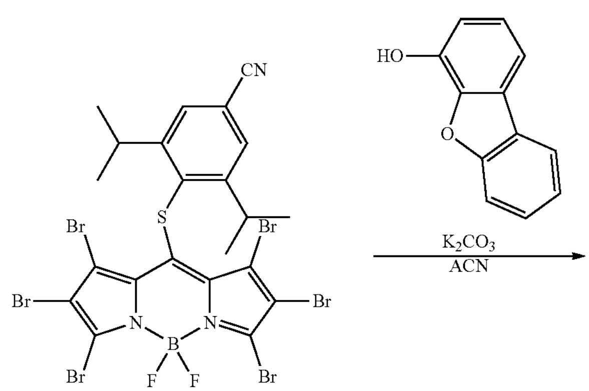

11-1

-continued
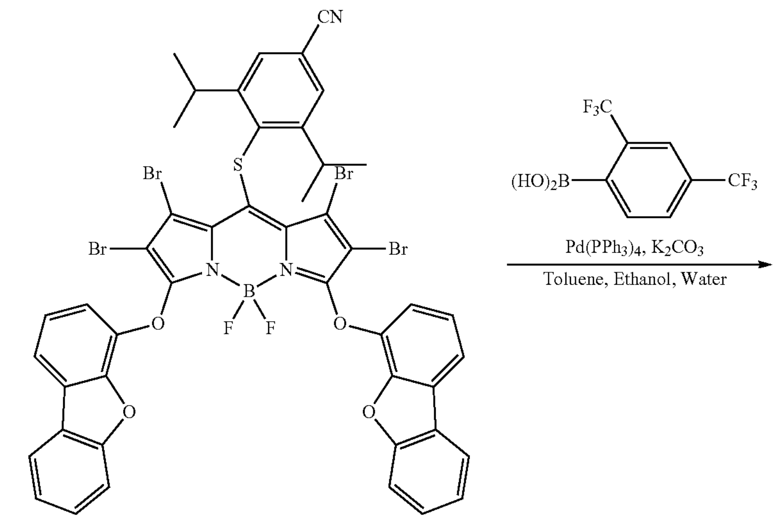
11-2
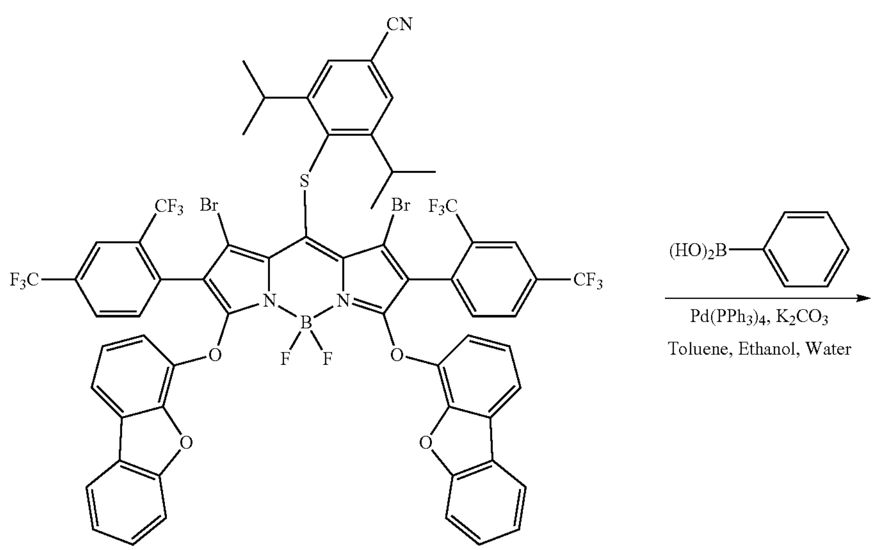
11-3

-continued

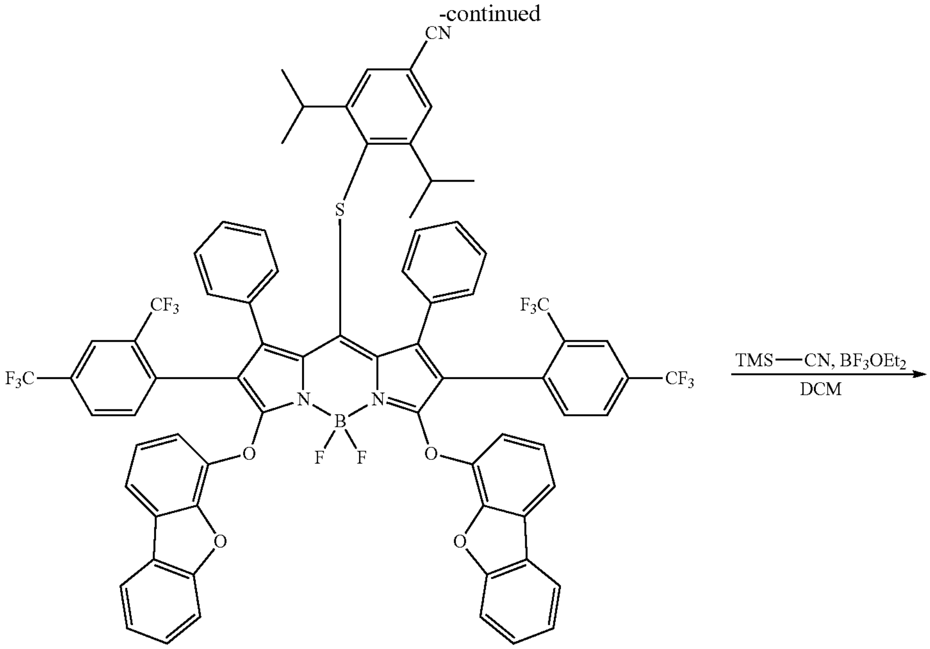

11-4

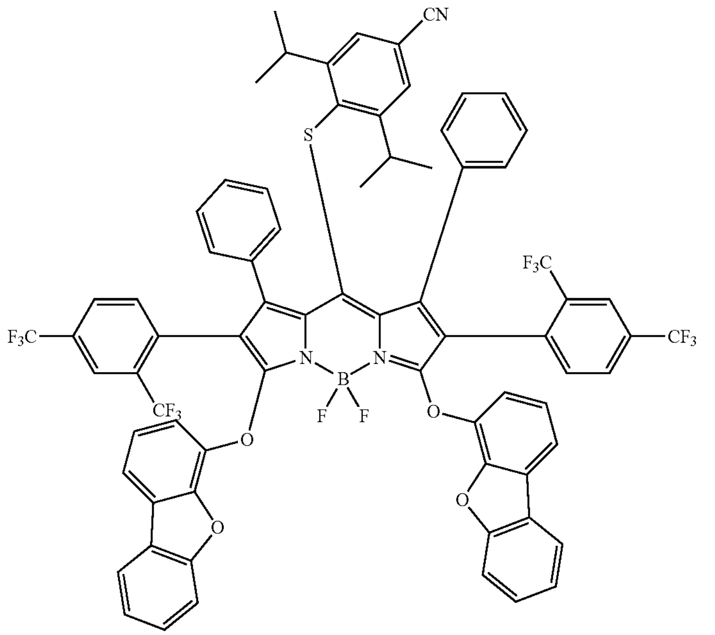

11

(Synthesis of 11-1)

Synthesis was progressed according to Synthesis Method 2 using Compound 7-1. Compound 11-1 was obtained in 9.1 g (yield 84%).

(Synthesis of 11-2)

Synthesis was progressed according to Synthesis Method 4 using Compound 11-1 and dibenzofuran-4-ol. Compound 11-2 was obtained in 8.7 g (yield 79%).

(Synthesis of 11-3)

Synthesis was progressed according to Synthesis Method 5 using Compound 11-2 and 2,4-di(trifluoromethyl)phenylboronic acid. Compound 11-3 was obtained in 7.2 g (yield 72%).

(Synthesis of 11-4)

Synthesis was progressed according to Synthesis Method 5 using Compound 11-3 and phenylboronic acid. Compound 11-4 was obtained in 4.7 g (yield 68%).

(Synthesis of Compound 11)

Synthesis was progressed according to Synthesis Method 7 using Compound 11-4. Compound 11 was obtained in 2.0 g (yield 49%).

HR LC/MS/MS m/z calculated for $C_{75}H_{46}BF_{13}N_4O_4S$ (M+): 1356.3125; found: 1356.3129

Preparation Example 12
Compound 12
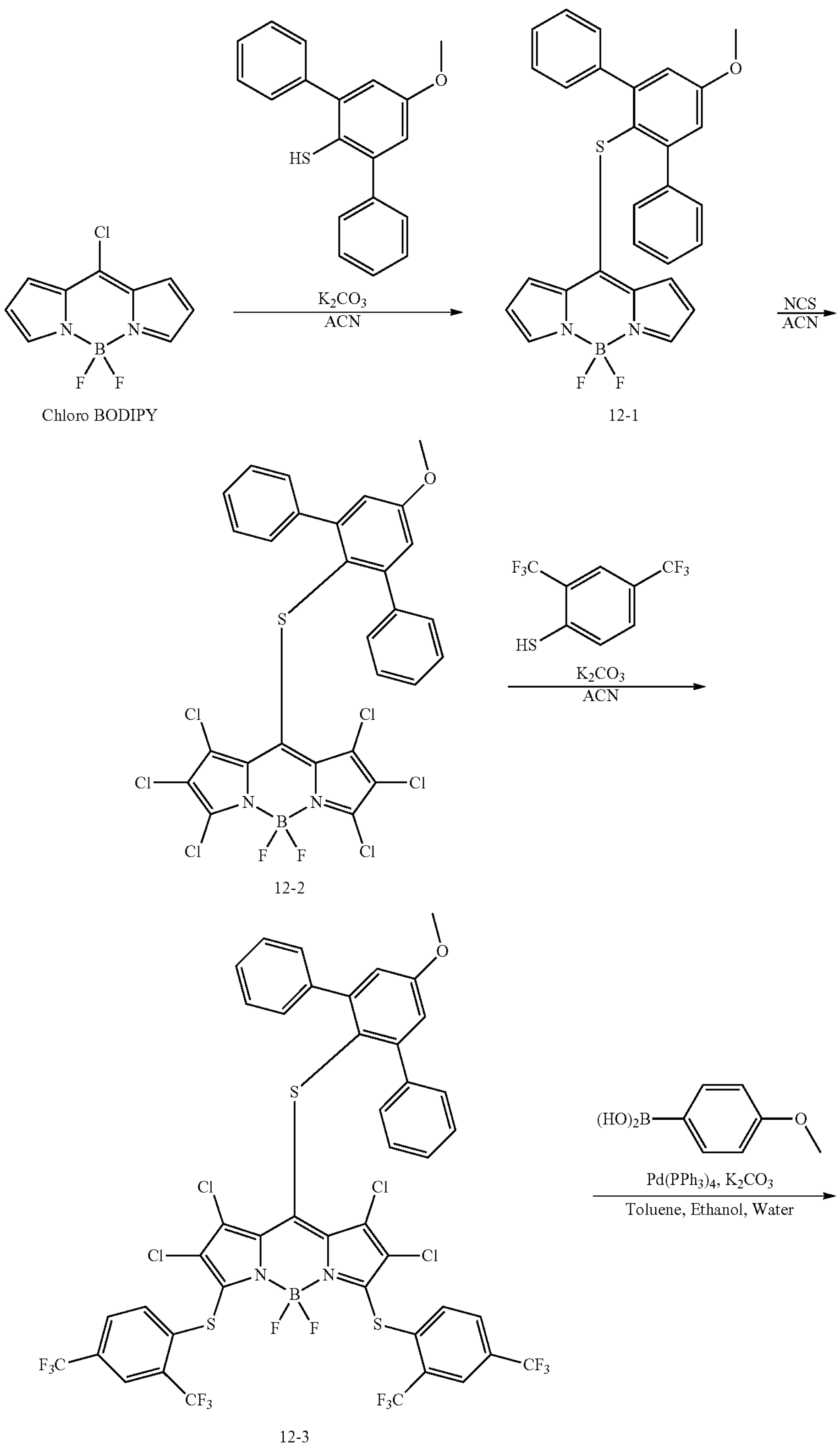

-continued

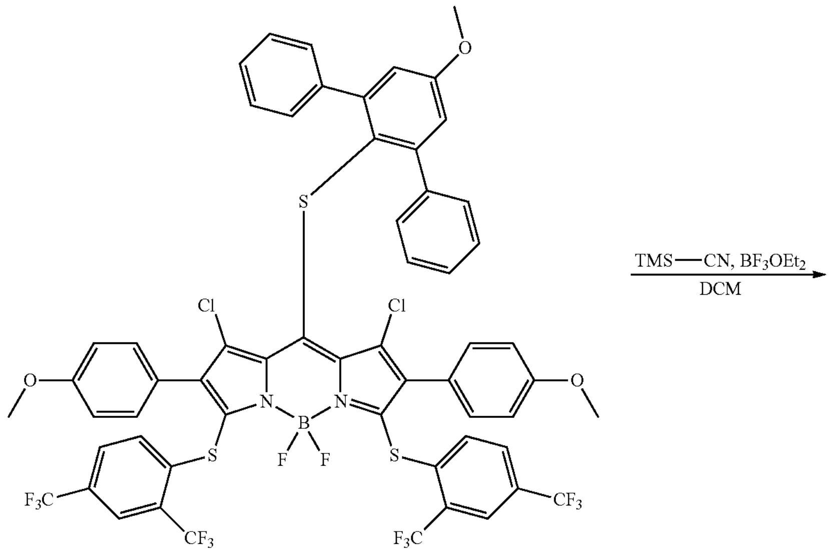

12-4

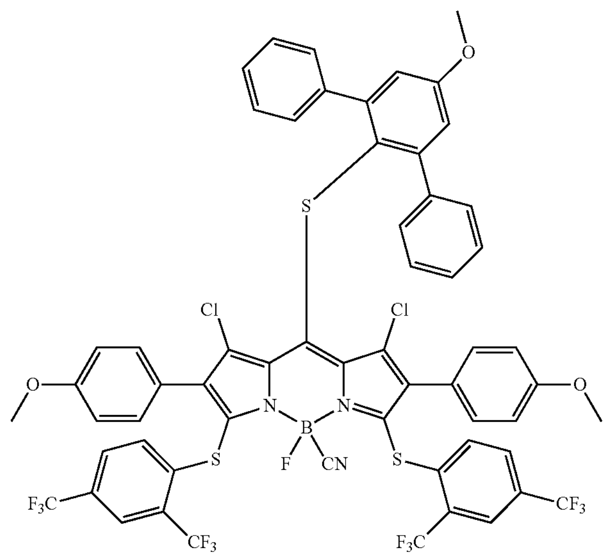

12

(Synthesis of 12-1)

Synthesis was progressed according to Synthesis Method 1 using chloro BODIPY and 5'-methoxy-terphenyl-2'-thiol. Compound 12-1 was obtained in 8.1 g (yield 76%).

(Synthesis of 12-2)

Synthesis was progressed according to Synthesis Method 6 using Compound 12-1. Compound 12-2 was obtained in 7.9 g (yield 69%).

(Synthesis of 12-3)

Synthesis was progressed according to Synthesis Method 4 using Compound 12-2 and 2,4-di(trifluoromethyl)benzenethiol. Compound 12-3 was obtained in 7.2 g (yield 64%).

(Synthesis of 12-4)

Synthesis was progressed according to Synthesis Method 5 using Compound 12-3 and 4-methoxyphenylboronic acid. Compound 12-4 was obtained in 6.8 g (yield 86%).

(Synthesis of Compound 12)

Synthesis was progressed according to Synthesis Method 7 using Compound 12-4. Compound 12 was obtained in 3.0 g (yield 49%).

HR LC/MS/MS m/z calculated for $C_{59}H_{35}BCl_2F_{13}N_3O_3S_3$ (M+): 1257.1103; found: 1257.1106

Preparation Example 13
Compound 13
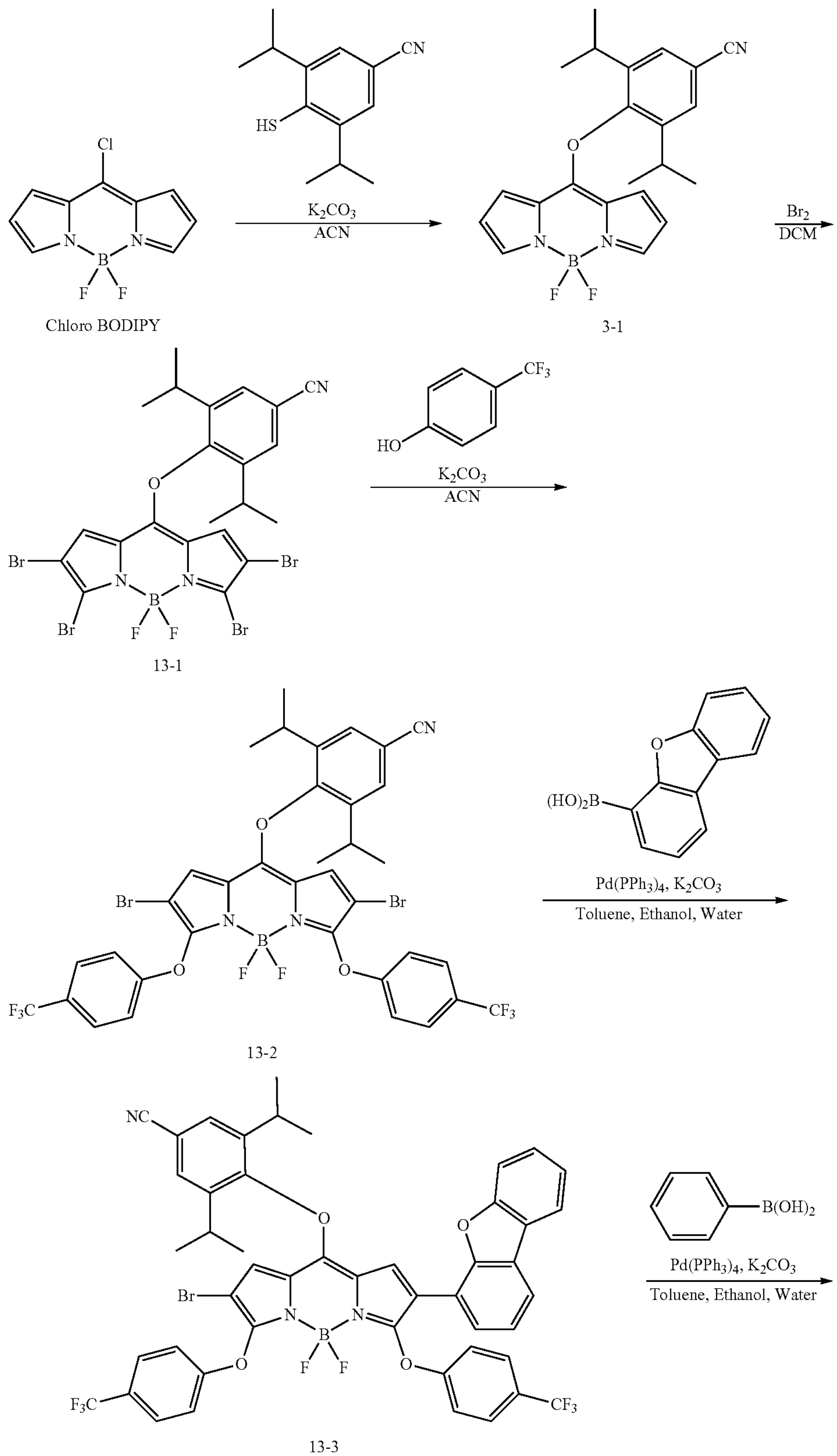

-continued

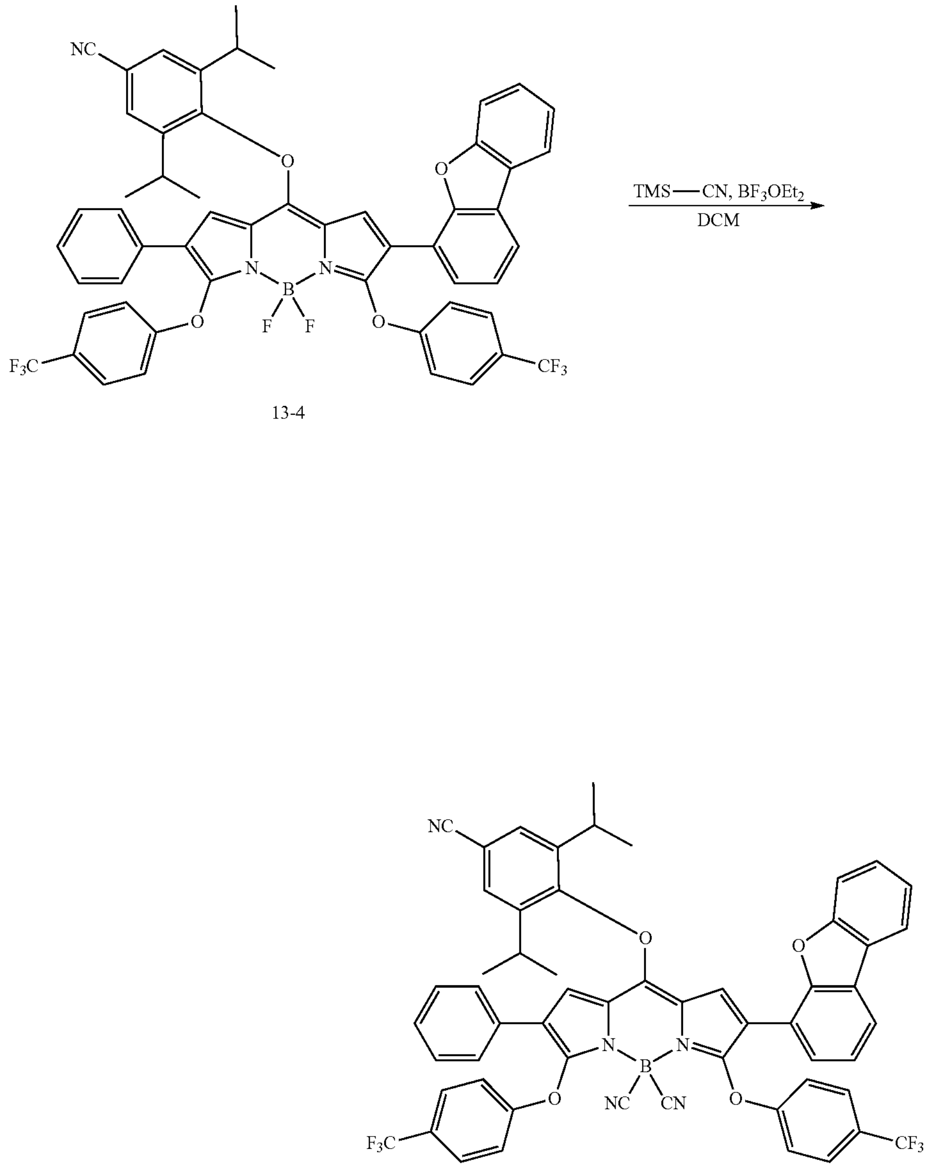

13-4

13

(Synthesis of 13-1)

Synthesis was progressed according to Synthesis Method 3 using Compound 3-1. Compound 13-1 was obtained in 7.9 g (yield 88%).

(Synthesis of 13-2)

Synthesis was progressed according to Synthesis Method 4 using Compound 13-1 and 4-trifluoromethylphenol. Compound 13-2 was obtained in 7.3 g (yield 85%).

(Synthesis of 13-3)

Synthesis was progressed according to Synthesis Method 5 using Compound 13-2 and dibenzofuranyl-4-boronic acid. Compound 13-3 was obtained in 5.2 g (yield 68%).

(Synthesis of 13-4)

Synthesis was progressed according to Synthesis Method 5 using Compound 13-3 and phenylboronic acid. Compound 13-4 was obtained in 4.3 g (yield 86%).

(Synthesis of Compound 13)

Synthesis was progressed according to Synthesis Method 7 using Compound 13-4. Compound 13 was obtained in 1.8 g (yield 44%).

HR LC/MS/MS m/z calculated for $C_{56}H_{38}BF_6N_5O_4$ (M+): 696.2921; found: 696.2918

Preparation Example 14
Compound 14
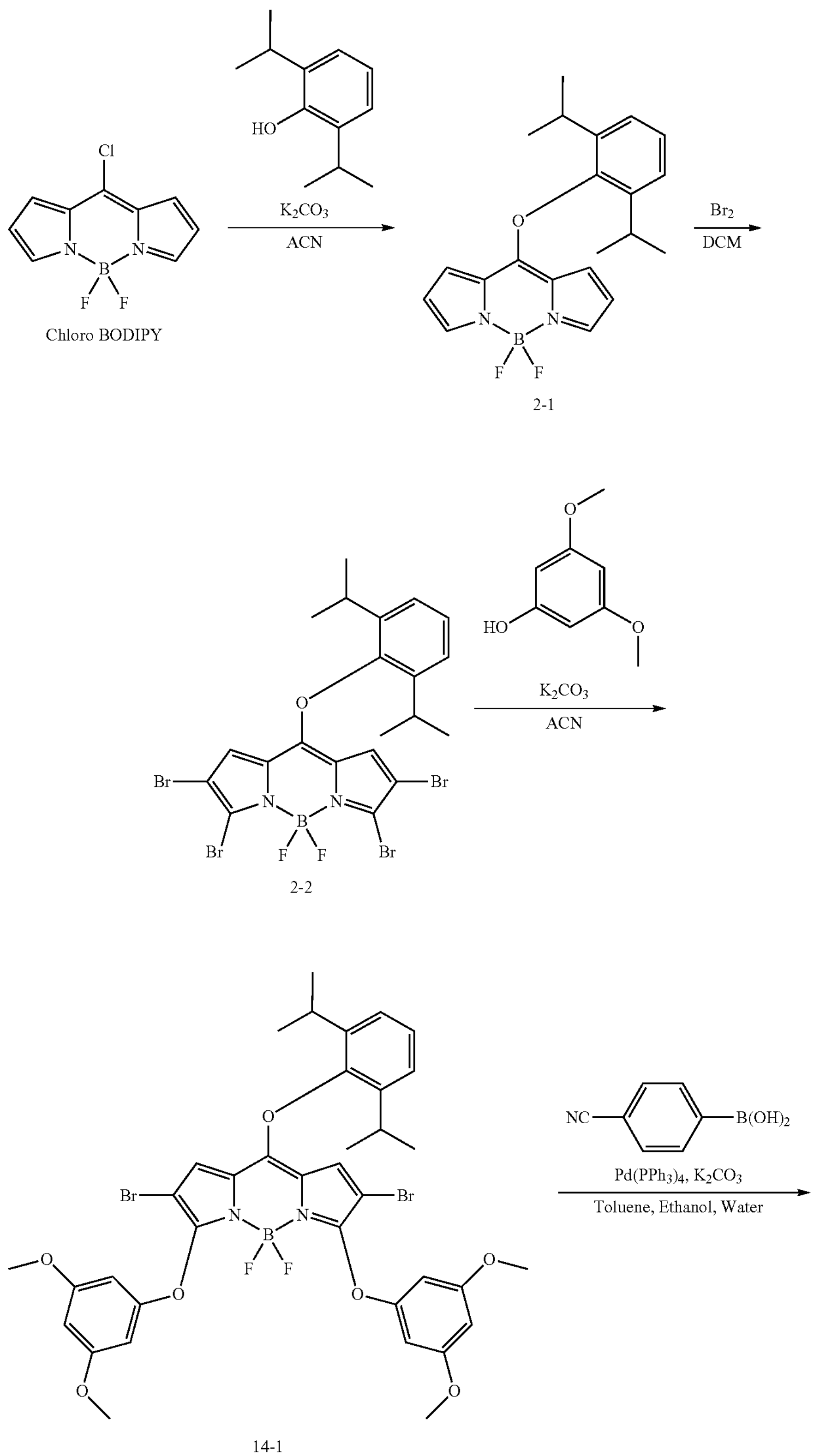

-continued
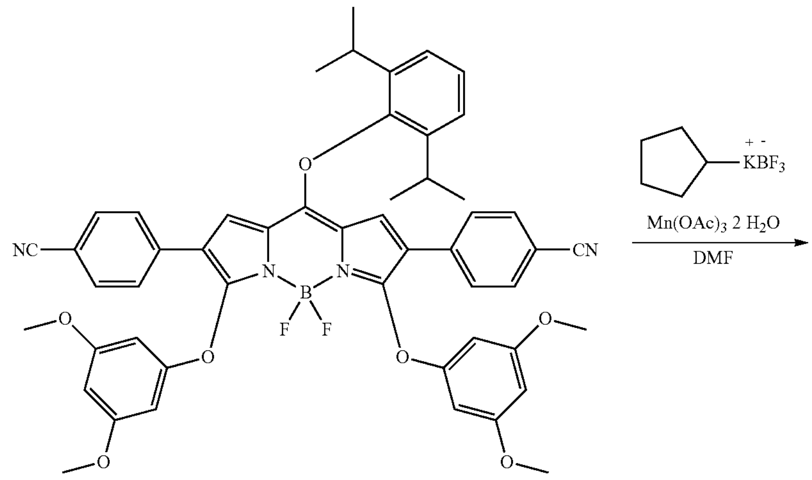
14-2
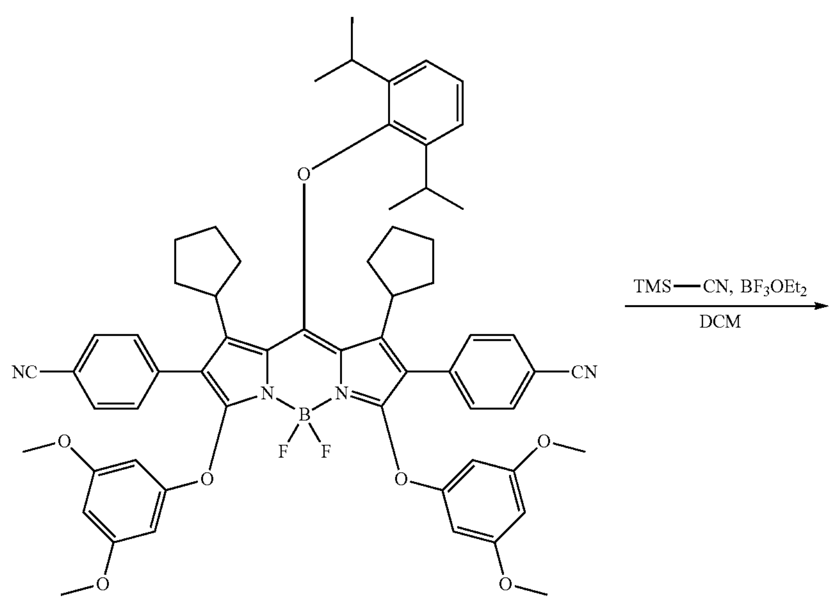
14-3

-continued

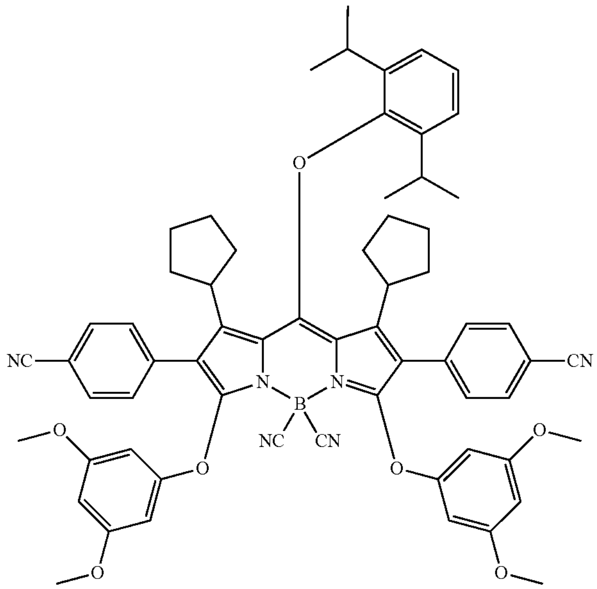

14

(Synthesis of 14-1)

Synthesis was progressed according to Synthesis Method 4 using Compound 2-2 and 3,5-dimethoxyphenol. Compound 14-1 was obtained in 4.8 g (yield 79%).

(Synthesis of 14-2)

Synthesis was progressed according to Synthesis Method 5 using Compound 14-1 and 4-cyanophenylboronic acid. Compound 14-2 was obtained in 3.8 g (yield 89%).

(Synthesis of 14-3)

Synthesis was progressed according to Synthesis Method 8 using Compound 14-2 and cyclopentyl potassium trifluoroborate. Compound 14-3 was obtained in 2.1 g (yield 61%).

(Synthesis of Compound 14)

Synthesis was progressed according to Synthesis Method 7 using Compound 14-3. Compound 14 was obtained in 1.6 g (yield 78%).

HR LC/MS/MS m/z calculated for $C_{63}H_{61}BN_6O_7$ (M+): 1024.4695; found: 1024.4693

Preparation Example 15

Compound 15

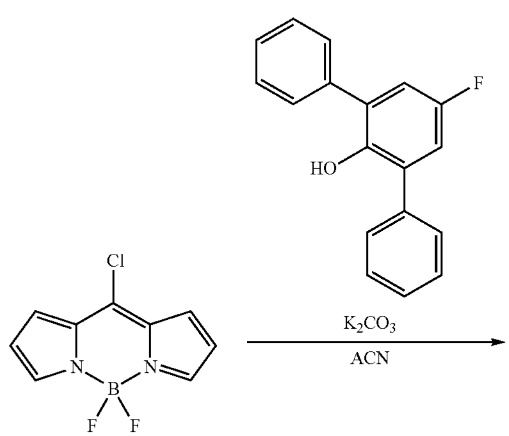

Chloro BODIPY

-continued
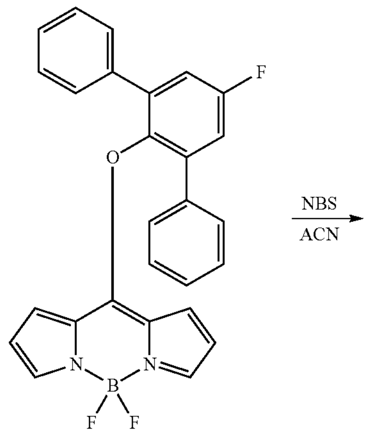
15-1
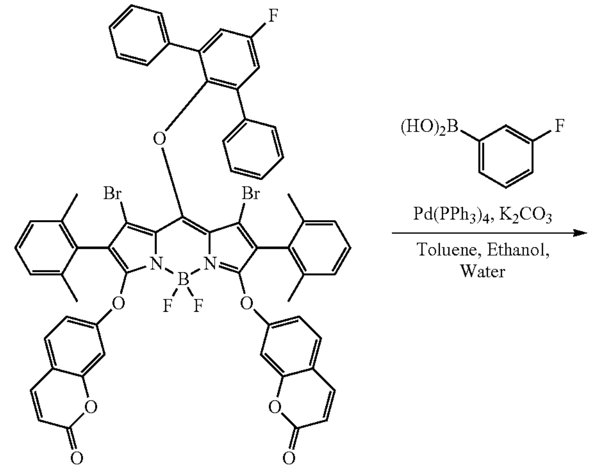
15-4
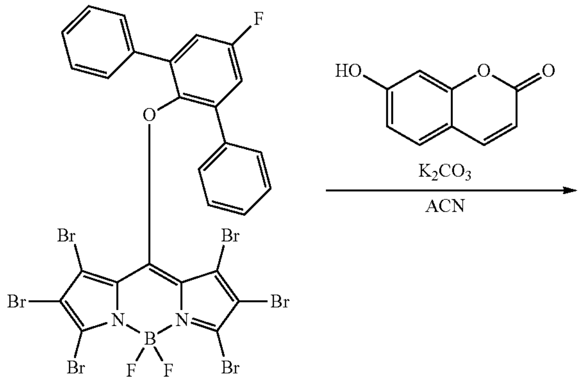
15-2
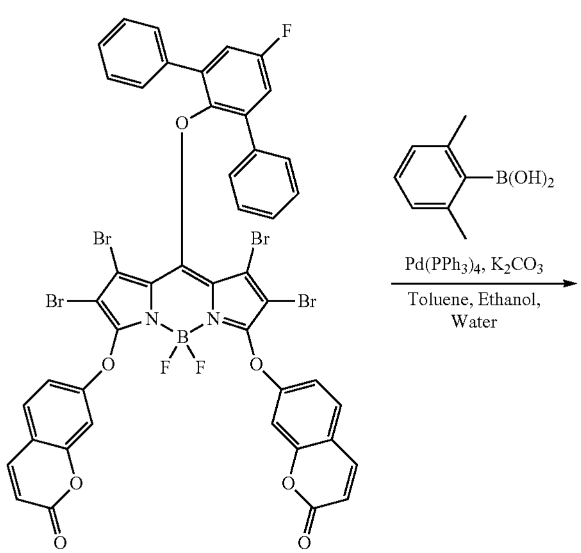
15-3
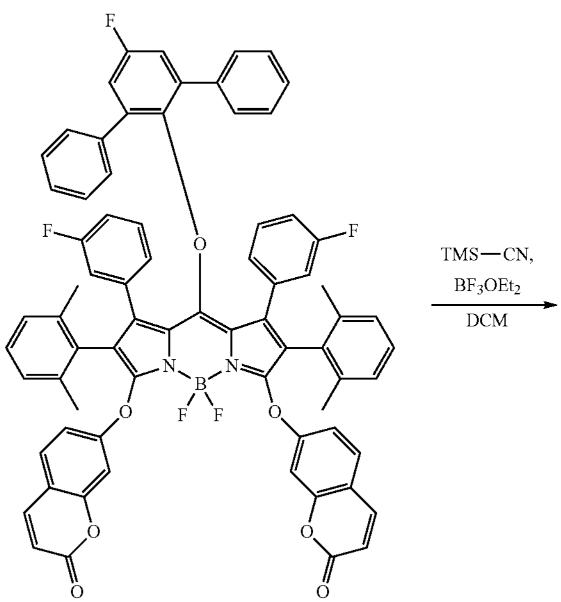
15-5

-continued

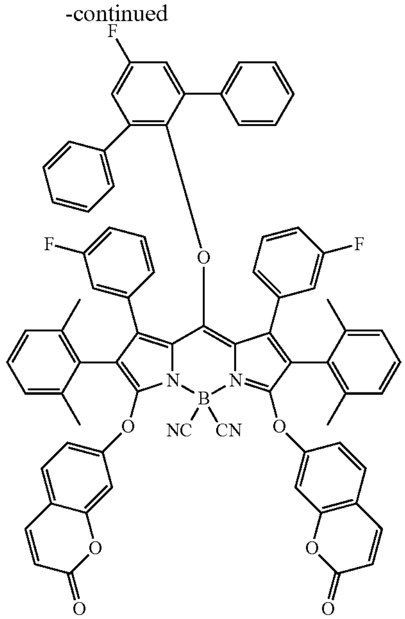

15

(Synthesis of 15-1)

Synthesis was progressed according to Synthesis Method 1 using chloro BODIPY and 5'-fluoro-terphenyl-2'-ol. Compound 15-1 was obtained in 7.2 g (yield 72%).

(Synthesis of 15-2)

Synthesis was progressed according to Synthesis Method 2 using Compound 15-1. Compound 15-2 was obtained in 12.2 g (yield 85%).

(Synthesis of 15-3)

Synthesis was progressed according to Synthesis Method 4 using Compound 15-2 and 7-hydroxycoumarin. Compound 15-3 was obtained in 11.6 g (yield 82%).

(Synthesis of 15-4)

Synthesis was progressed according to Synthesis Method 5 using Compound 15-3 and 2,6-dimethylphenylboronic acid. Compound 15-4 was obtained in 9.1 g (yield 79%).

(Synthesis of 15-5)

Synthesis was progressed according to Synthesis Method 5 using Compound 15-4 and 3-fluorophenylboronic acid. Compound 15-5 was obtained in 6.3 g (yield 68%).

(Synthesis of Compound 15)

Synthesis was progressed according to Synthesis Method 7 using Compound 15-5. Compound 15 was obtained in 4.4 g (yield 73%).

HR LC/MS/MS m/z calculated for $C_{75}H_{48}BF_3N_4O_7$ (M+): 1184.3568; found: 1184.3571

Preparation Example 16

Compound 16

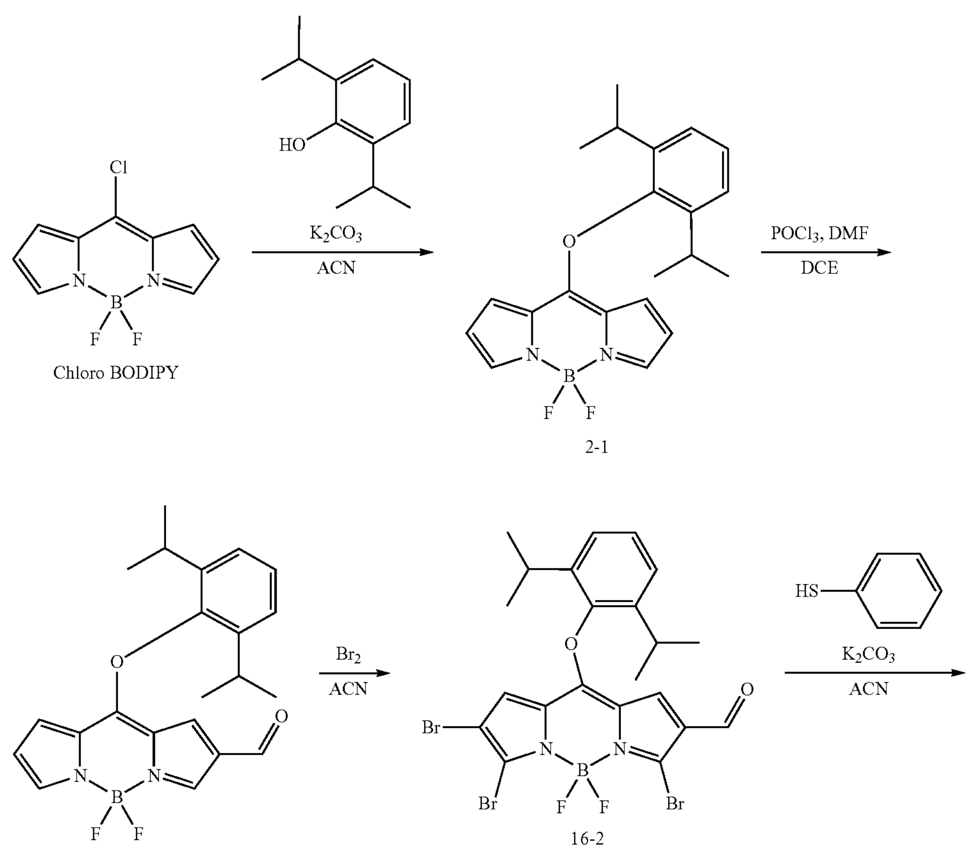

-continued
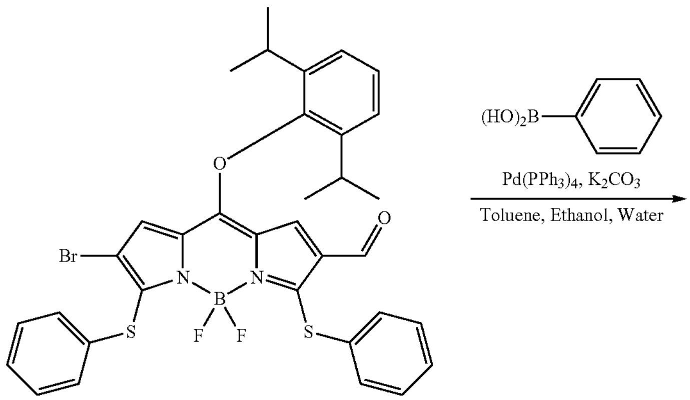
16-3
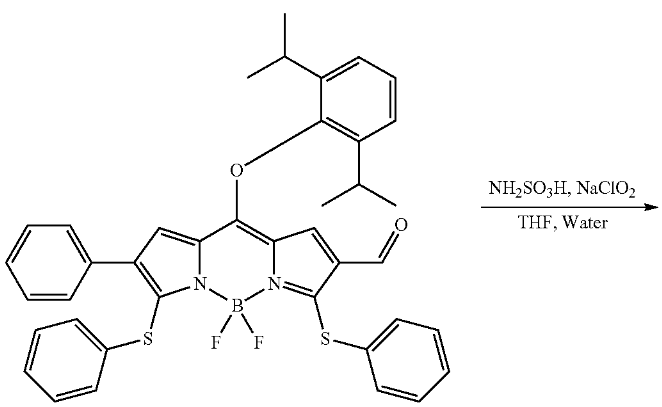
16-4
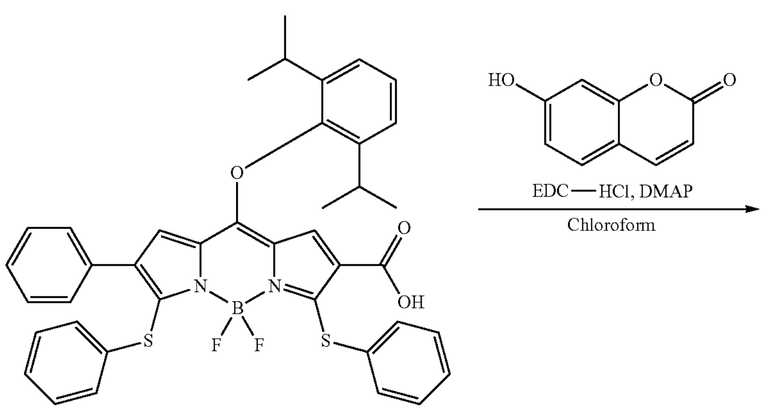
16-5

-continued

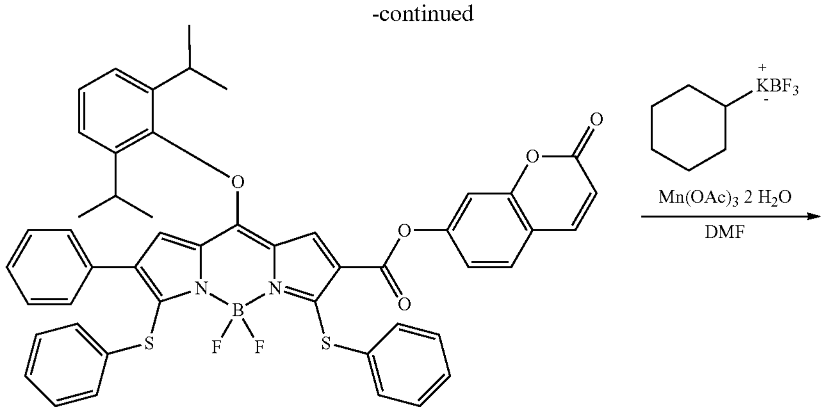

16-6

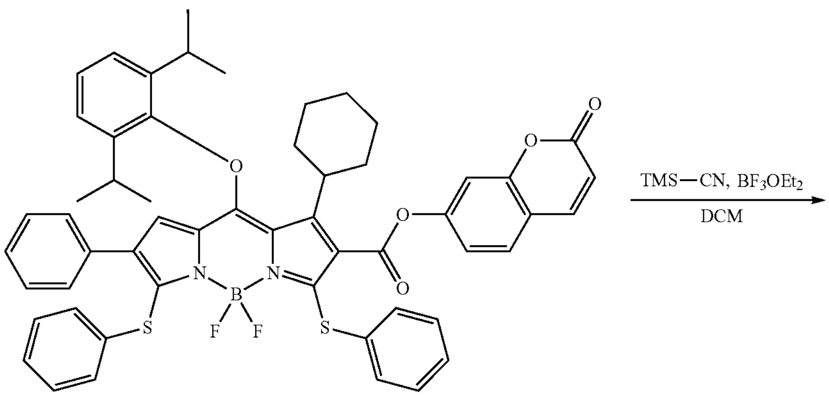

16-7

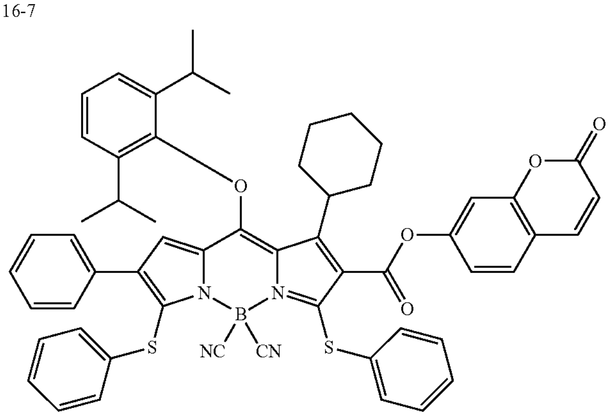

16

(Synthesis of 16-1)

Synthesis was progressed according to Synthesis Method 9 using Compound 2-1. Compound 16-1 was obtained in 4.3 g (yield 80%).

(Synthesis of 16-2)

Synthesis was progressed according to Synthesis Method 3 using Compound 16-1. Compound 16-2 was obtained in 5.0 g (yield 79%).

(Synthesis of 16-3)

Synthesis was progressed according to Synthesis Method 4 using Compound 16-2 and benzenethiol. Compound 16-3 was obtained in 4.7 g (yield 86%).

(Synthesis of 16-4)

Synthesis was progressed according to Synthesis Method 5 using Compound 16-3 and benzeneboronic acid. Compound 16-4 was obtained in 3.2 g (yield 81%).

(Synthesis of 16-5)

Synthesis was progressed according to Synthesis Method 10 using Compound 16-4. Compound 16-5 was obtained in 2.2 g (yield 72%).

(Synthesis of 16-6)

Synthesis was progressed according to Synthesis Method 11 using Compound 16-5 and 7-hydroxycoumarin. Compound 16-6 was obtained in 2.2 g (yield 91%).

(Synthesis of 16-7)

Synthesis was progressed according to Synthesis Method 8 using Compound 16-6 and cyclohexyl potassium trifluoroborate. Compound 16-7 was obtained in 1.5 g (yield 68%).

(Synthesis of Compound 16)

Synthesis was progressed according to Synthesis Method 7 using Compound 16-7. Compound 16 was obtained in 1.4 g (yield 91%).

HR LC/MS/MS m/z calculated for $C_{57}H_{49}BN_4O_5S_2$ (M+): 944.3237; found: 944.3235

Preparation Example 17

Compound 17

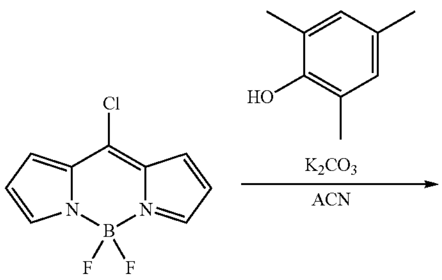

Chloro BODIPY

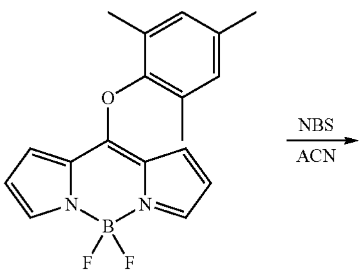

17-1

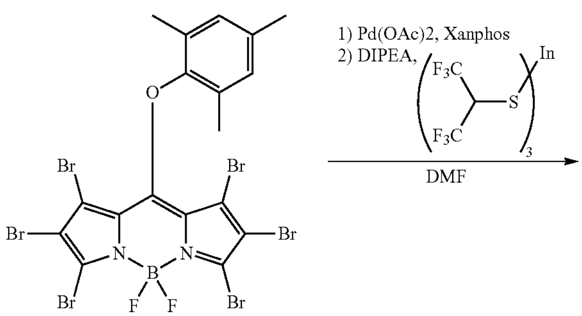

17-2

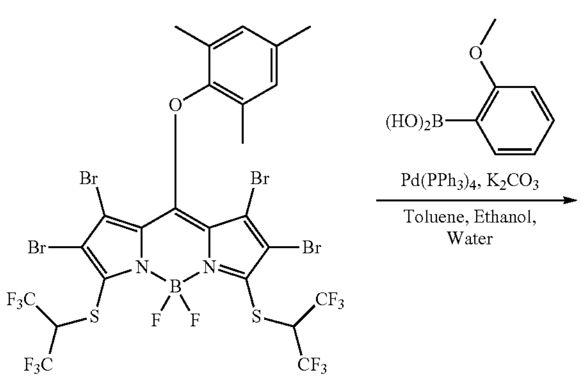

17-3

-continued

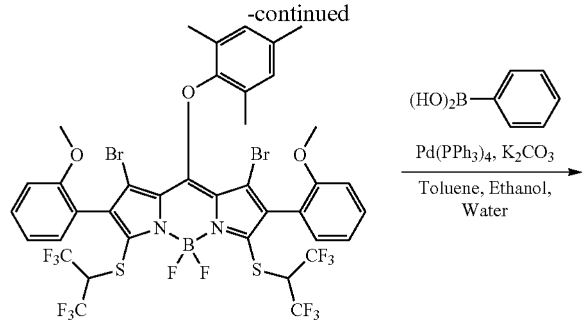

17-4

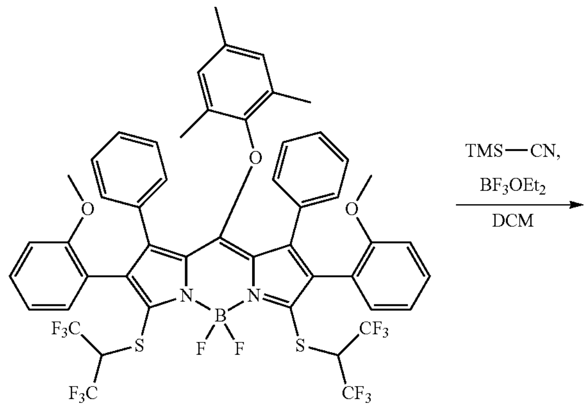

17-5

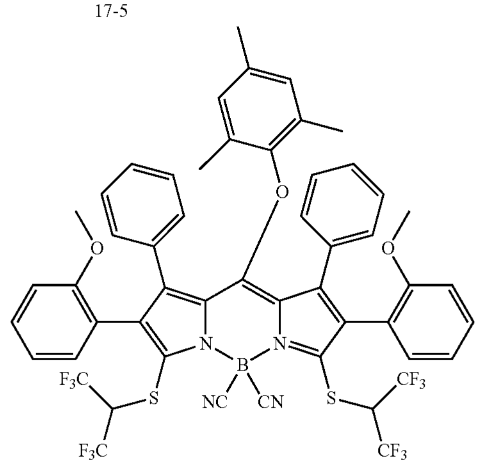

17

(Synthesis of 17-1)

Synthesis was progressed according to Synthesis Method 1 using chloro BODIPY and 2,4,6-trimethylphenol. Compound 17-1 was obtained in 6.2 g (yield 86%).

(Synthesis of 17-2)

Synthesis was progressed according to Synthesis Method 2 using Compound 17-1. Compound 17-2 was obtained in 12.4 g (yield 84%).

(Synthesis of 17-3)

Synthesis was progressed according to Synthesis Method 12 using Compound 17-2 and indium hexafluoropropane-2-thiolate. Compound 17-3 was obtained in 6.3 g (yield 42%).

(Synthesis of 17-4)

Synthesis was progressed according to Synthesis Method 5 using Compound 17-3 and 2-methoxyphenylboronic acid. Compound 17-4 was obtained in 5.4 g (yield 86%).

(Synthesis of 17-5)

Synthesis was progressed according to Synthesis Method 5 using Compound 17-4 and phenylboronic acid. Compound 17-5 was obtained in 3.6 g (yield 72%).

(Synthesis of Compound 17)

Synthesis was progressed according to Synthesis Method 7 using Compound 17-5. Compound 17 was obtained in 2.3 g (yield 76%).

HR LC/MS/MS m/z calculated for $C_{52}H_{37}BF_{12}N_4O_3S_2$ (M+): 1068.2209; found: 1068.2213

Preparation Example 18

Compound 18

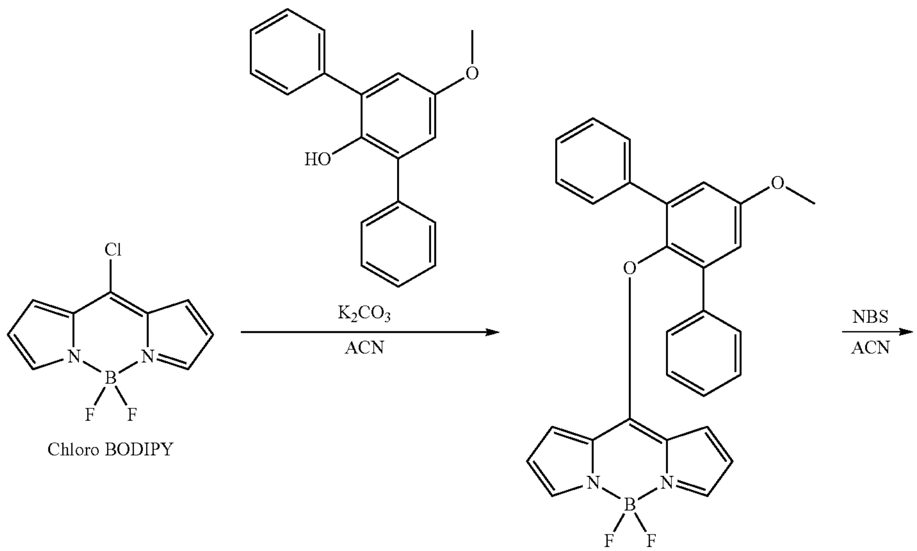

Chloro BODIPY 18-1

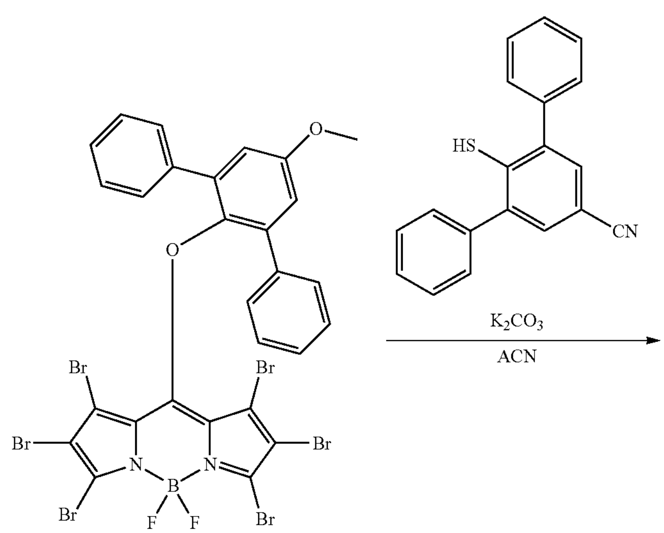

18-2

-continued
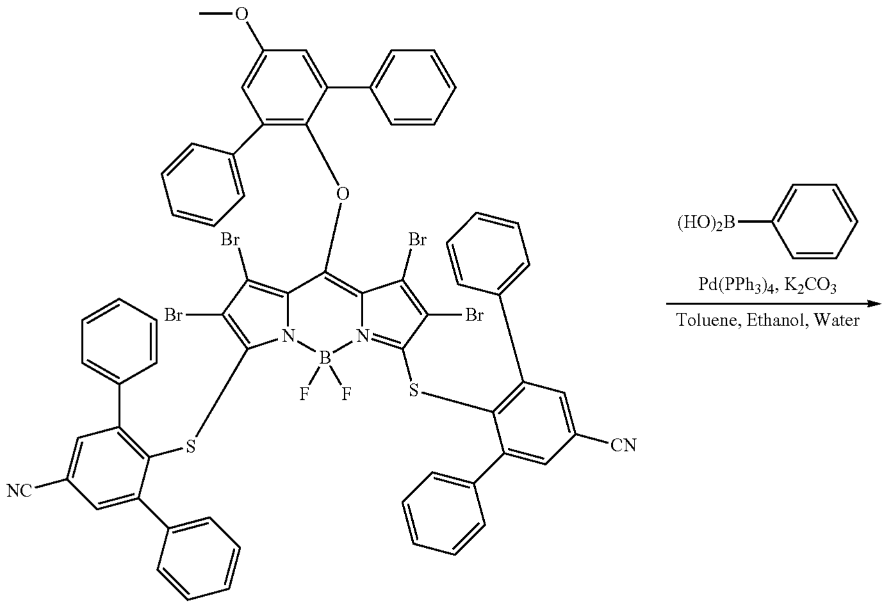
18-3
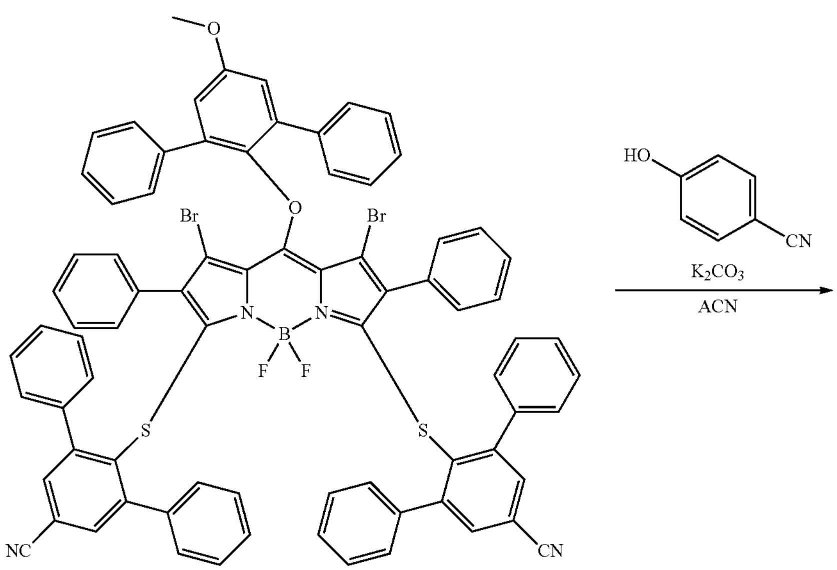
18-4

-continued

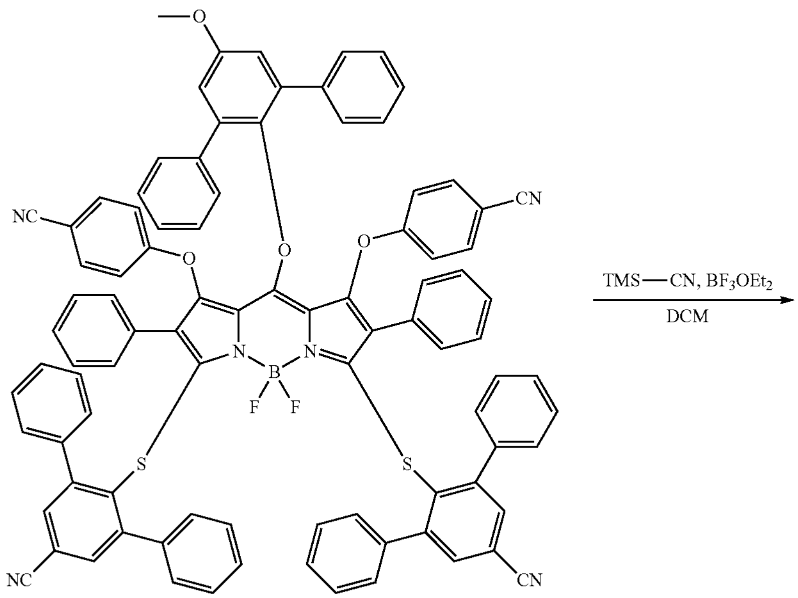

18-5

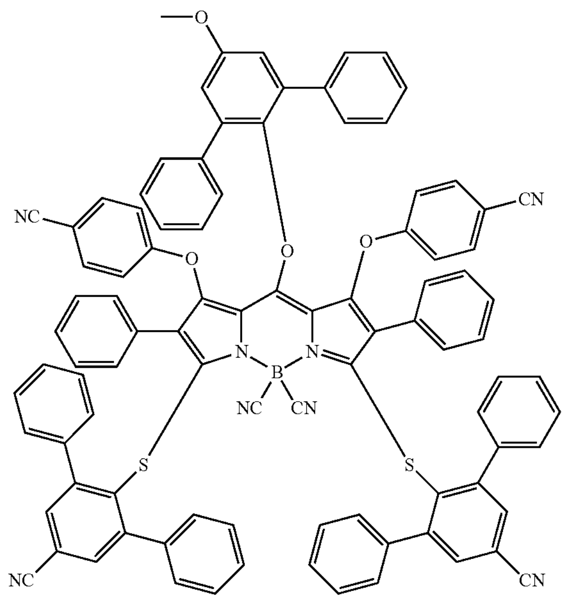

18

(Synthesis of 18-1)

Synthesis was progressed according to Synthesis Method 1 using chloro BODIPY and 5'-methoxyterphenyl-2'-ol. Compound 18-1 was obtained in 8.9 g (yield 86%).

(Synthesis of 18-2)

Synthesis was progressed according to Synthesis Method 2 using Compound 18-1. Compound 18-2 was obtained in 13.1 g (yield 81%).

(Synthesis of 18-3)

Synthesis was progressed according to Synthesis Method 4 using Compound 18-2 and 5'-cyanoterphenyl-2'-thiol. Compound 18-3 was obtained in 14.2 g (yield 76%).

(Synthesis of 18-4)

Synthesis was progressed according to Synthesis Method 5 using Compound 18-3 and benzeneboronic acid. Compound 18-4 was obtained in 11.6 g (yield 83%).

(Synthesis of 18-5)

Synthesis was progressed according to Synthesis Method 4 using Compound 18-4 and 4-cyanophenol. Compound 18-5 was obtained in 8.7 g (yield 75%).

(Synthesis of Compound 18)

Synthesis was progressed according to Synthesis Method 7 using Compound 18-5. Compound 18 was obtained in 5.8 g (yield 72%).

HR LC/MS/MS m/z calculated for $C_{94}H_{57}BN_8O_4S_2$ (M+): 1436.4037; found: 1436.4040

Preparation Example 19
Compound 19
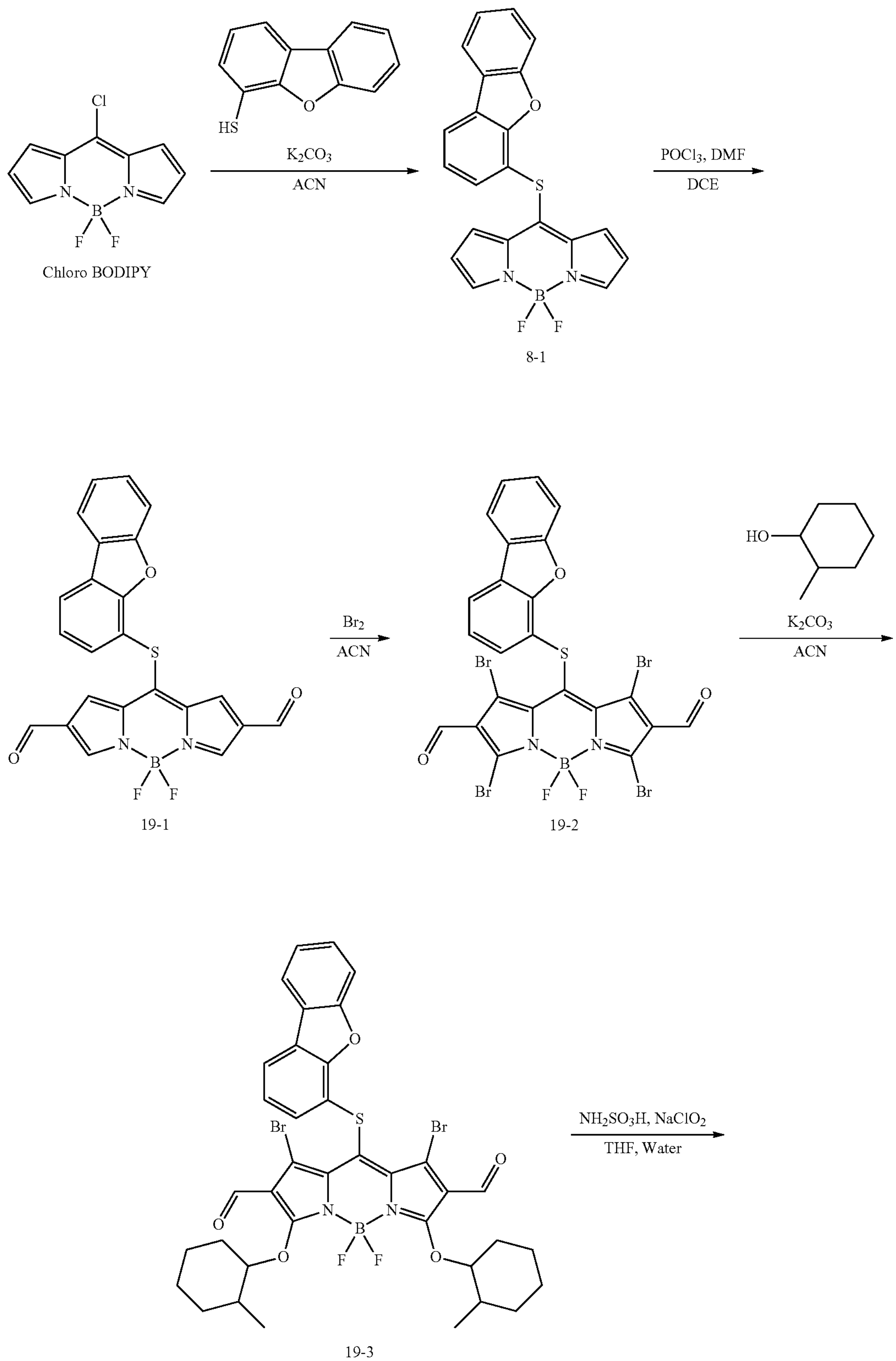

-continued
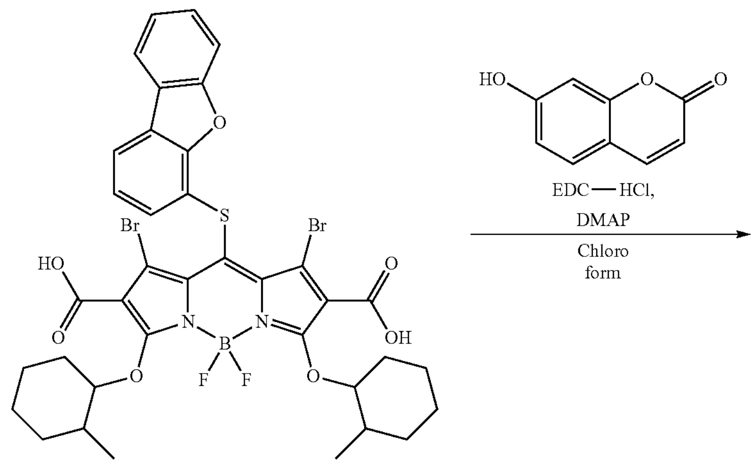
19-4
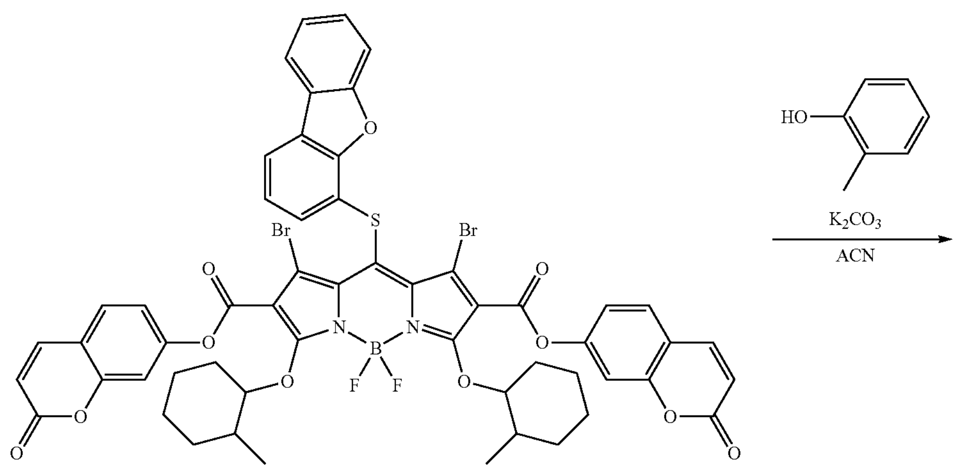
19-5
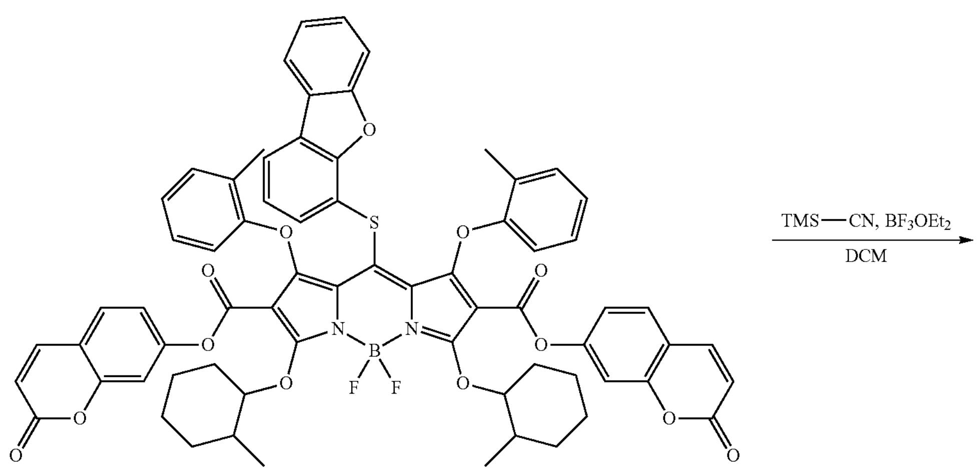
19-6

-continued

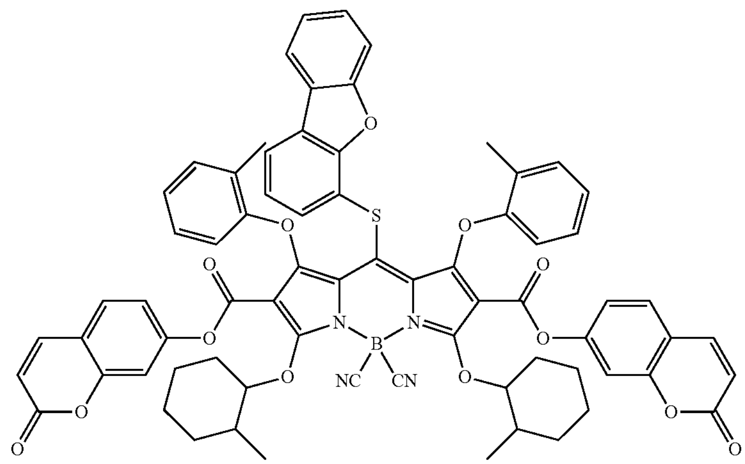

19

(Synthesis of 19-1)

Synthesis was progressed according to Synthesis Method 9 using Compound 8-1. Compound 19-1 was obtained in 4.8 g (yield 84%).

(Synthesis of 19-2)

Synthesis was progressed according to Synthesis Method 3 using Compound 19-1. Compound 19-2 was obtained in 5.9 g (yield 86%).

(Synthesis of 19-3)

Synthesis was progressed according to Synthesis Method 4 using Compound 19-2 and 2-methylcyclohexanol. Compound 19-3 was obtained in 3.5 g (yield 64%).

(Synthesis of 19-4)

Synthesis was progressed according to Synthesis Method 10 using Compound 19-3. Compound 19-4 was obtained in 2.5 g (yield 79%).

(Synthesis of 19-5)

Synthesis was progressed according to Synthesis Method 11 using Compound 19-4 and 7-hydroxycoumarin. Compound 19-5 was obtained in 2.4 g (yield 91%).

(Synthesis of 19-6)

Synthesis was progressed according to Synthesis Method 4 using Compound 19-5 and 2-methylphenol. Compound 19-6 was obtained in 2.0 g (yield 96%).

(Synthesis of Compound 19)

Synthesis was progressed according to Synthesis Method 7 using Compound 19-6. Compound 19 was obtained in 1.6 g (yield 86%).

HR LC/MS/MS m/z calculated for $C_{71}H_{57}BN_4O_{13}S$ (M+): 1216.3736; found: 1216.3739

Preparation Example 20

Compound 20

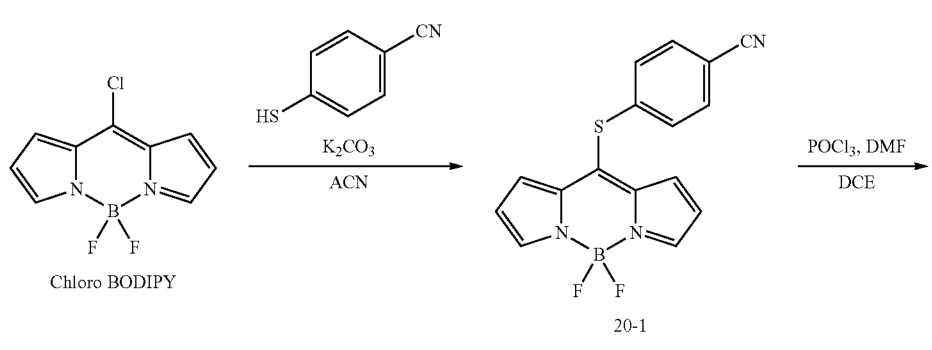

-continued
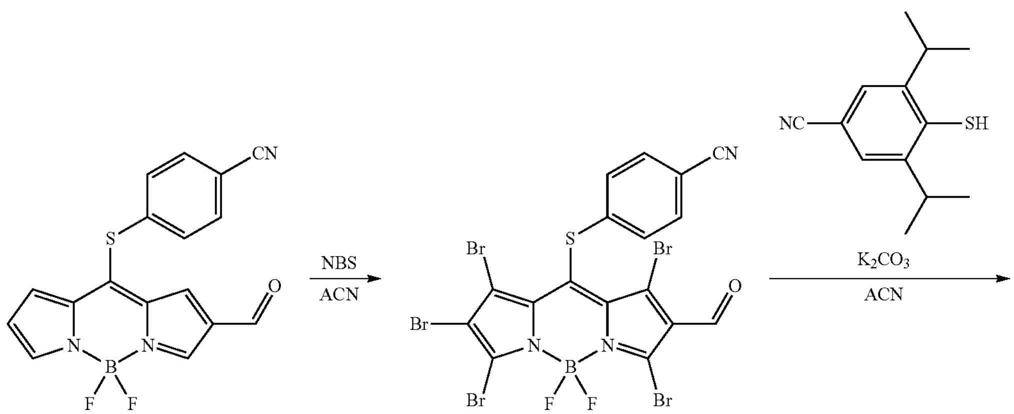
20-2 20-3
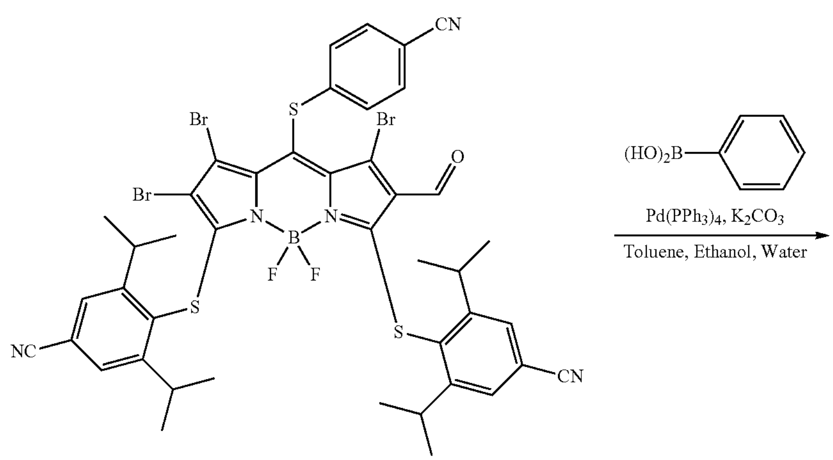
20-4
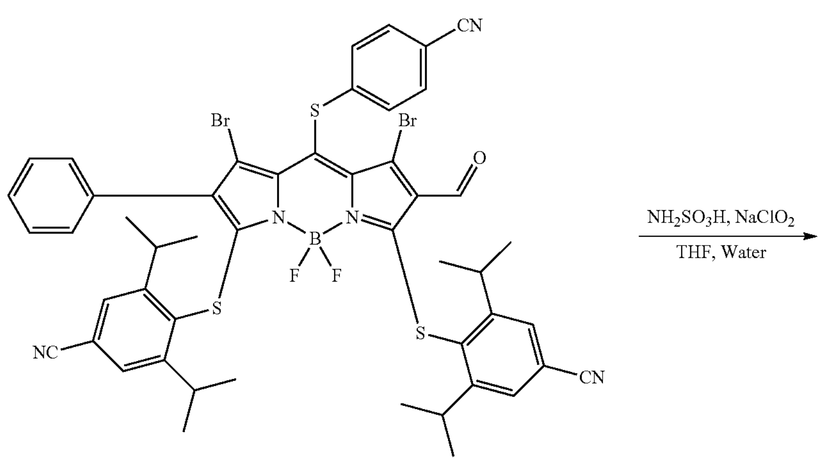
20-5

-continued

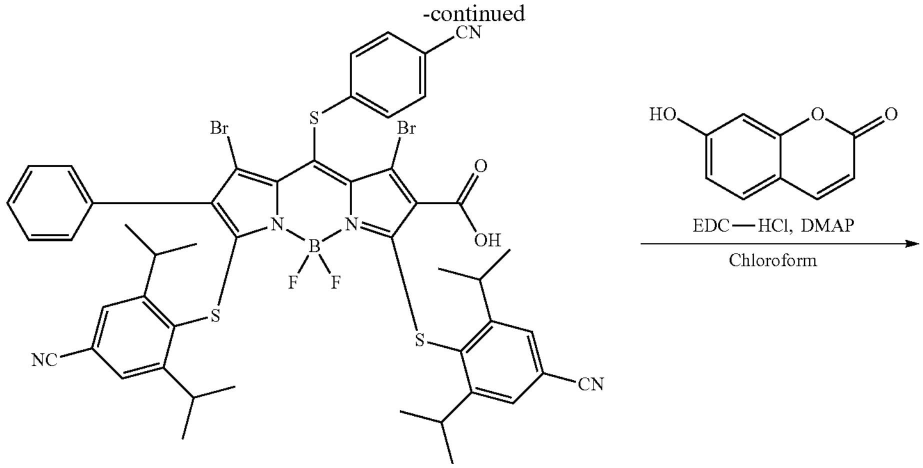

20-6

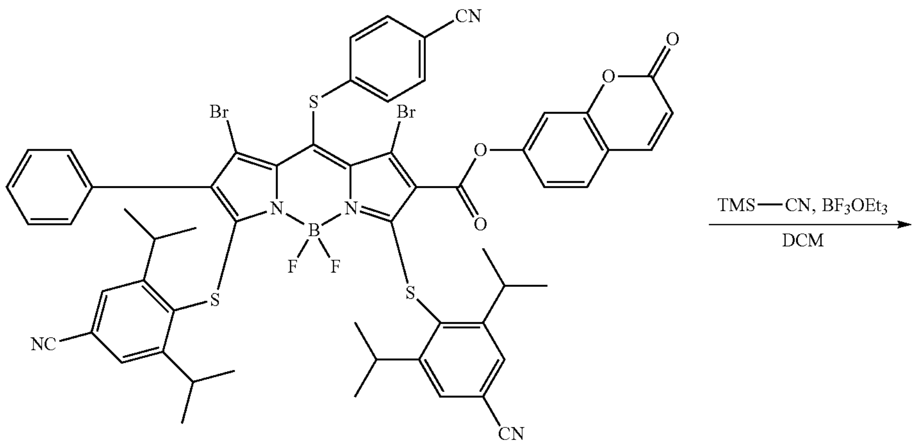

20-7

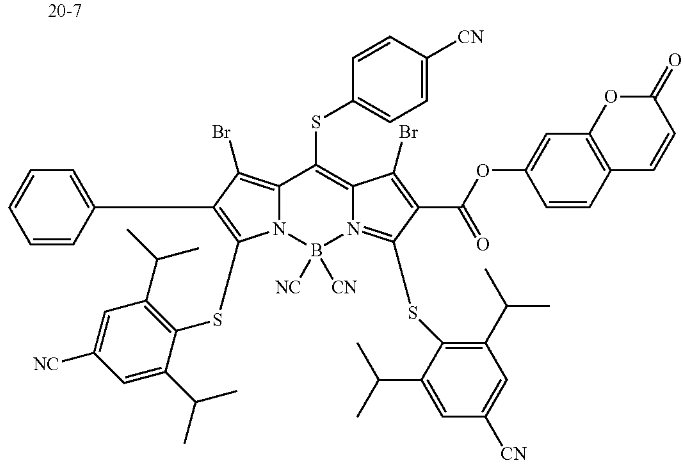

20

(Synthesis of 20-1)

Synthesis was progressed according to Synthesis Method 1 using chloro BODIPY and 4-mercaptobenzonitrile. Compound 20-1 was obtained in 6.2 g (yield 86%).

(Synthesis of 20-2)

Synthesis was progressed according to Synthesis Method 9 using Compound 20-1. Compound 20-2 was obtained in 5.3 g (yield 82%).

(Synthesis of 20-3)

Synthesis was progressed according to Synthesis Method 2 using Compound 20-2. Compound 20-3 was obtained in 7.8 g (yield 74%).

(Synthesis of 20-4)

Synthesis was progressed according to Synthesis Method 4 using Compound 20-3 and 4-cyano-2,6-diisopropylbenzenethiol. Compound 20-4 was obtained in 7.4 g (yield 77%).

(Synthesis of 20-5)

Synthesis was progressed according to Synthesis Method 5 using Compound 20-4 and benzeneboronic acid. Compound 20-5 was obtained in 5.0 g (yield 72%).

(Synthesis of 20-6)

Synthesis was progressed according to Synthesis Method 10 using Compound 20-5. Compound 20-6 was obtained in 3.5 g (yield 68%).

(Synthesis of 20-7)

Synthesis was progressed according to Synthesis Method 11 using Compound 20-6 and 7-hydroxycoumarin. Compound 20-7 was obtained in 3.1 g (yield 91%).

(Synthesis of Compound 20)

Synthesis was progressed according to Synthesis Method 7 using Compound 20-7. Compound 20 was obtained in 2.5 g (yield 84%).

HR LC/MS/MS m/z calculated for $C_{60}H_{46}BBr_2N_7O_4S_3$ (M+): 1193.1233; found: 1193.1230

Preparation Example 21

Compound 21

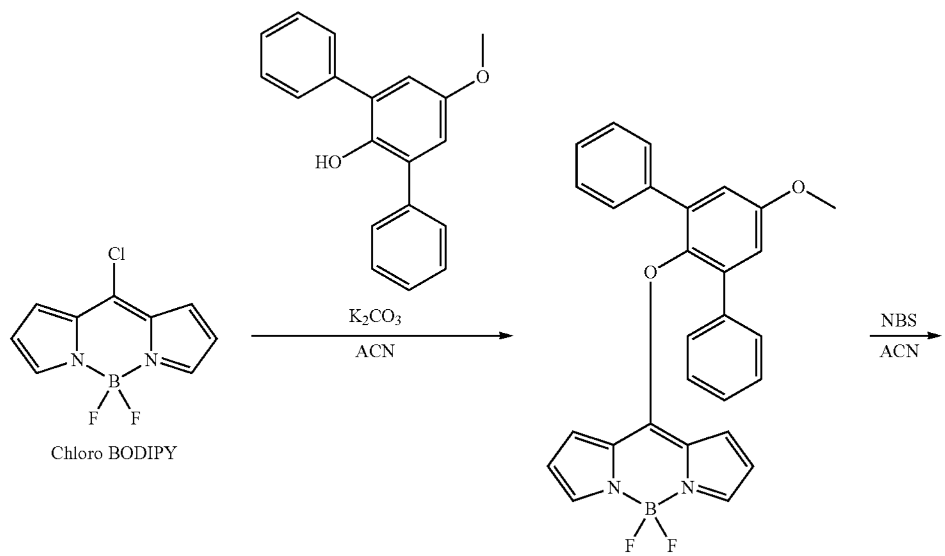

18-1

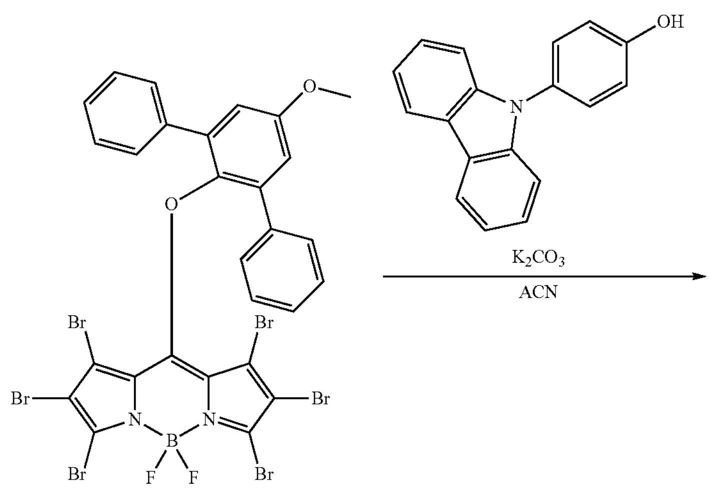

18-2

-continued
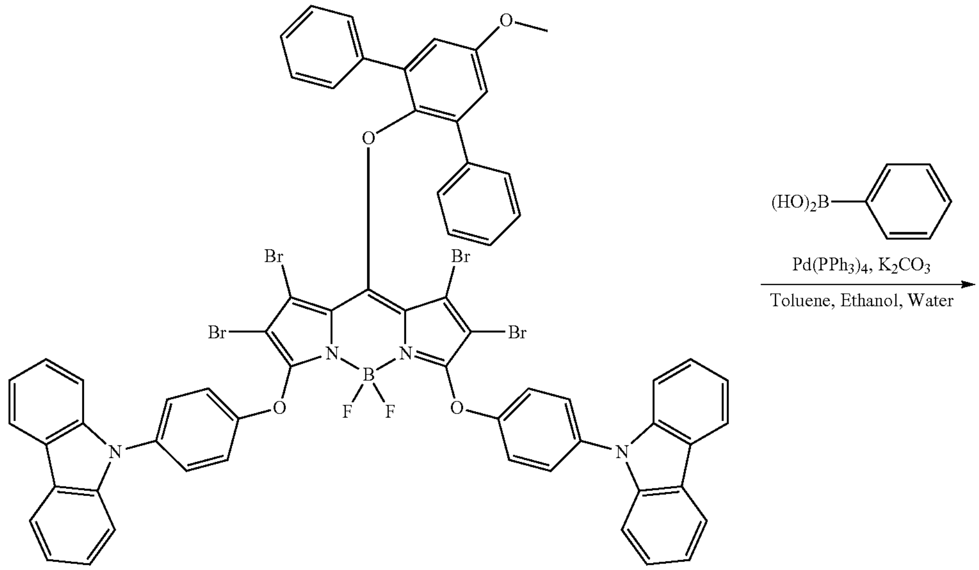
21-1
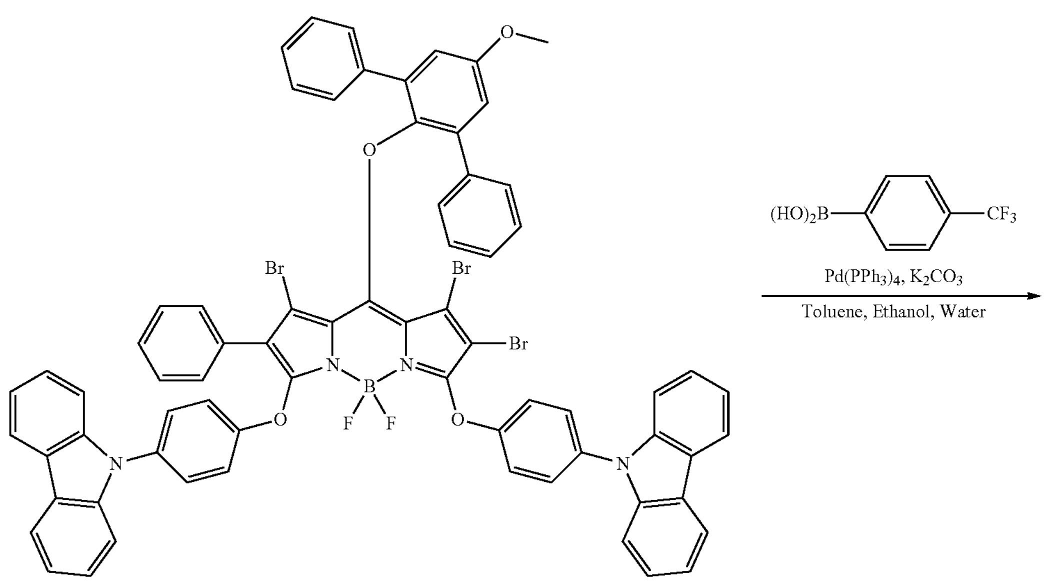
21-2

-continued
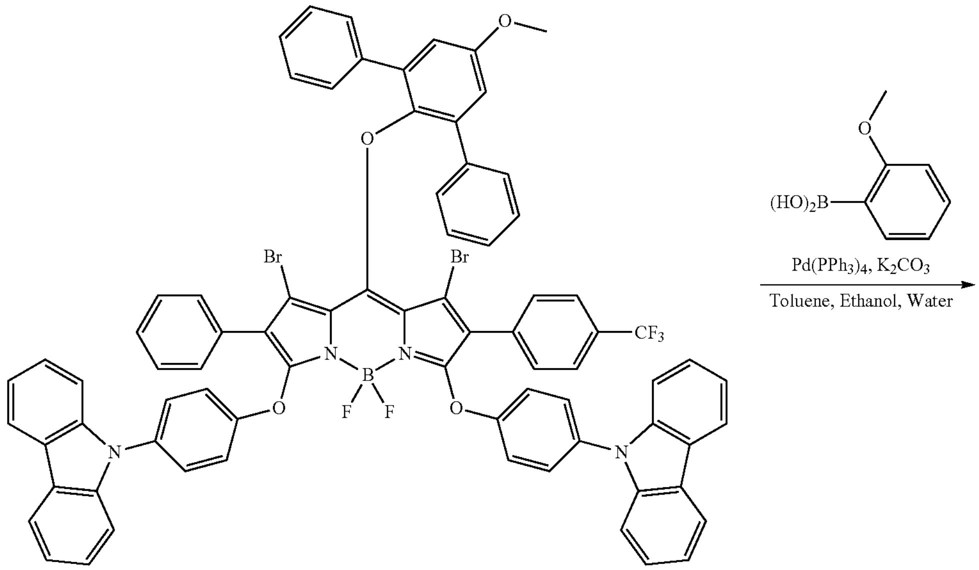
21-3
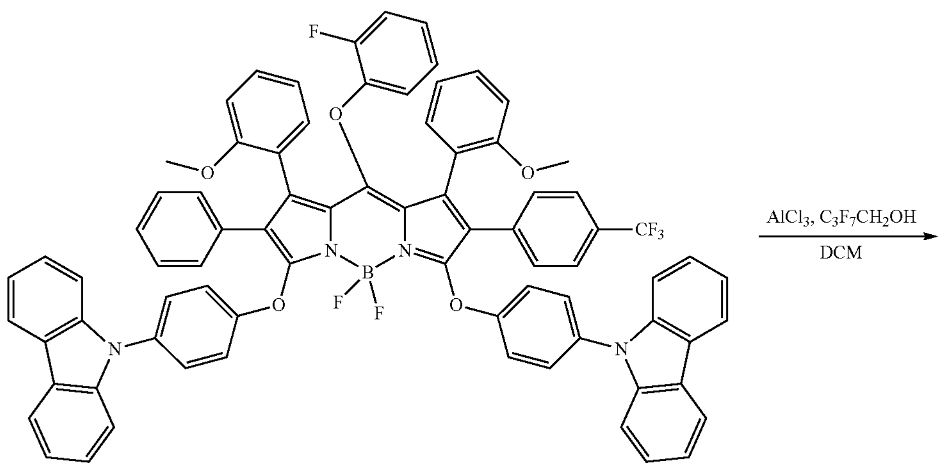
21-4
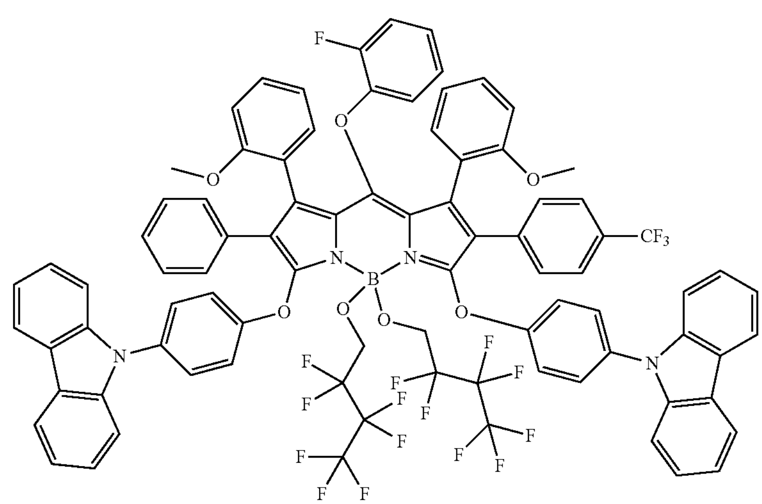
21

(Synthesis of 21-1)

Synthesis was progressed according to Synthesis Method 4 using Compound 18-2 and 4-(9H-carbazol-9-yl)phenol. Compound 21-1 was obtained in 10.5 g (yield 76%).

(Synthesis of 21-2)

Synthesis was progressed according to Synthesis Method 5 using Compound 21-1 and benzeneboronic acid. Compound 21-2 was obtained in 6.8 g (yield 68%).

(Synthesis of 21-3)

Synthesis was progressed according to Synthesis Method 5 using Compound 21-2 and 4-trifluoromethylphenylboronic acid. Compound 21-3 was obtained in 4.7 g (yield 75%).

(Synthesis of 21-4)

Synthesis was progressed according to Synthesis Method 5 using Compound 21-3 and 2-methoxyphenylboronic acid. Compound 21-4 was obtained in 3.0 g (yield 81%).

(Synthesis of Compound 21)

Synthesis was progressed according to Synthesis Method 13 using Compound 21-4. Compound 21 was obtained in 1.3 g (yield 51%).

HR LC/MS/MS m/z calculated for $C_{86}H_{55}BF_{18}N_4O_7$ (M+): 1608.3876; found: 1608.3872

Preparation Example 22

Compound 22

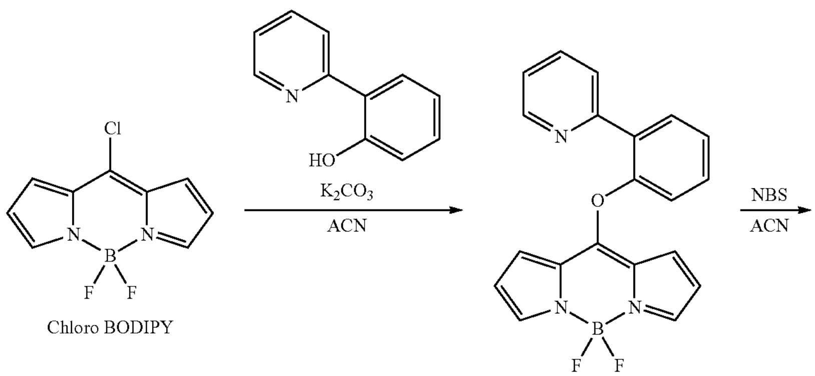

22-1

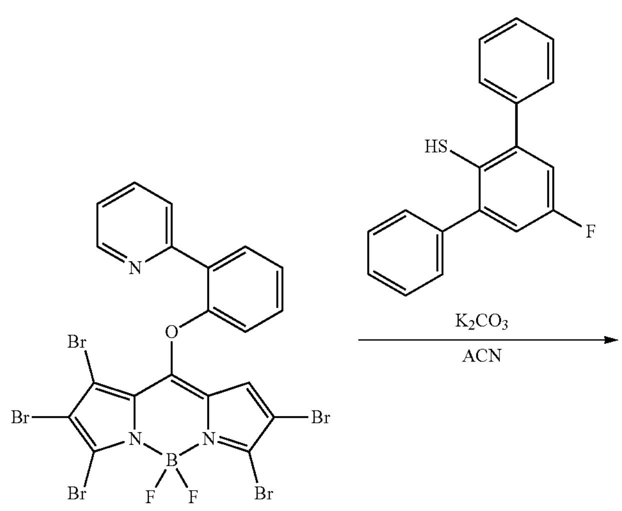

22-2

-continued
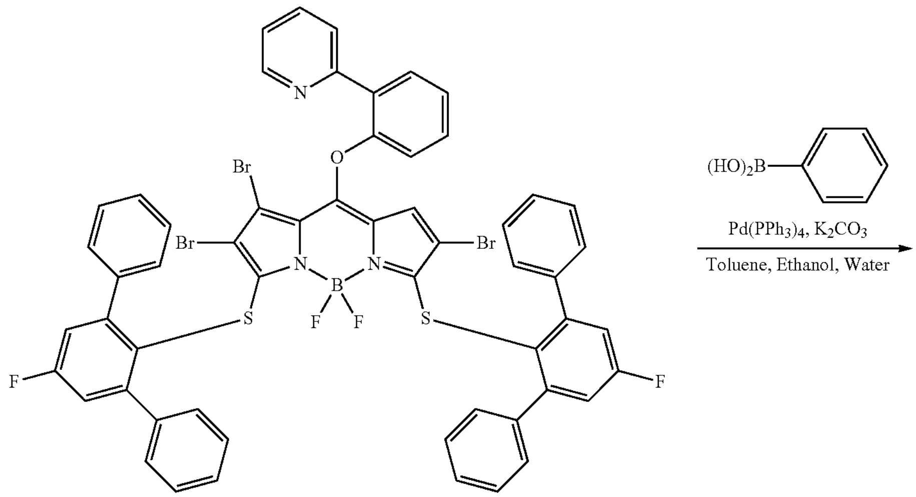
22-3
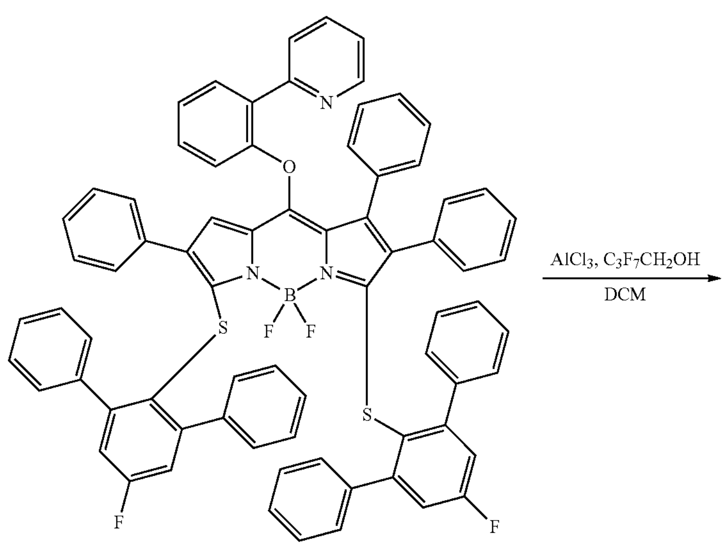
22-4

-continued

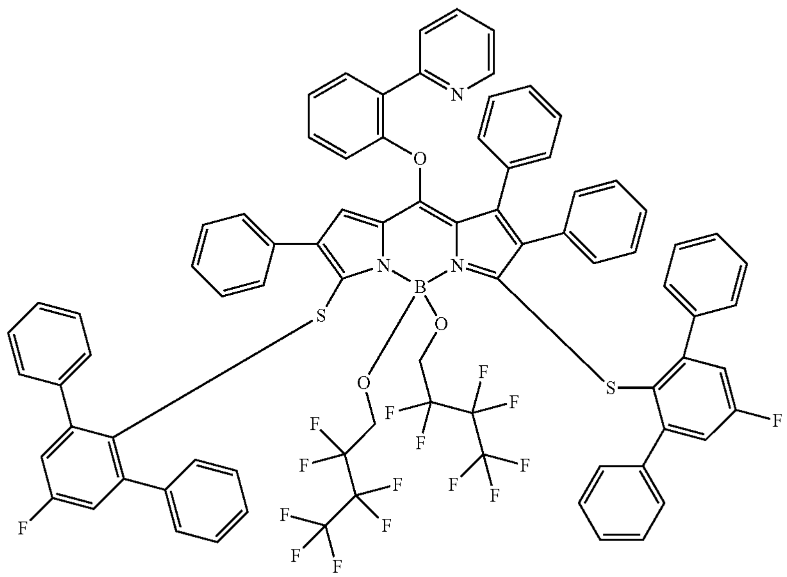

22

(Synthesis of 22-1)

Synthesis was progressed according to Synthesis Method 1 using chloro BODIPY and 2-(pyridin-2-yl)phenol. Compound 22-1 was obtained in 5.0 g (yield 63%).

(Synthesis of 22-2)

Synthesis was progressed according to Synthesis Method 2 using Compound 22-1. Compound 22-2 was obtained in 7.6 g (yield 73%).

(Synthesis of 22-3)

Synthesis was progressed according to Synthesis Method 4 using Compound 22-2 and 5'-fluoroterphenyl-2'-thiol. Compound 22-3 was obtained in 8.6 g (yield 80%).

(Synthesis of 22-4)

Synthesis was progressed according to Synthesis Method 5 using Compound 22-3 and phenylboronic acid. Compound 22-4 was obtained in 6.2 g (yield 78%).

(Synthesis of Compound 22)

Synthesis was progressed according to Synthesis Method 13 using Compound 22-4. Compound 22 was obtained in 3.1 g (yield 39%).

HR LC/MS/MS m/z calculated for $C_{82}H_{52}BF_{16}N_3O_3S_2$ (M+): 1505.3288; found: 1505.3291

Preparation Example 23

Compound 23

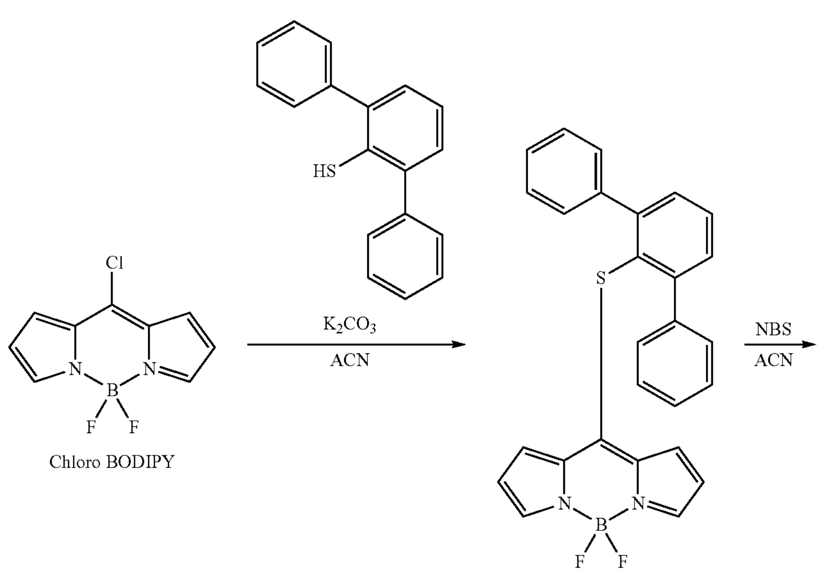

-continued
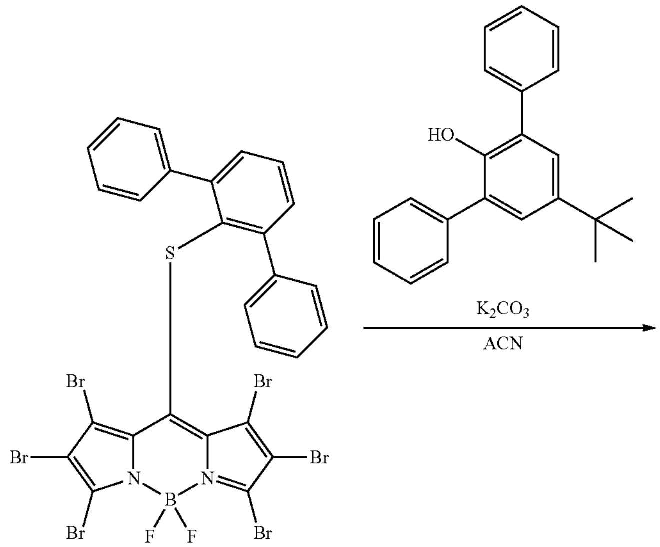
23-2
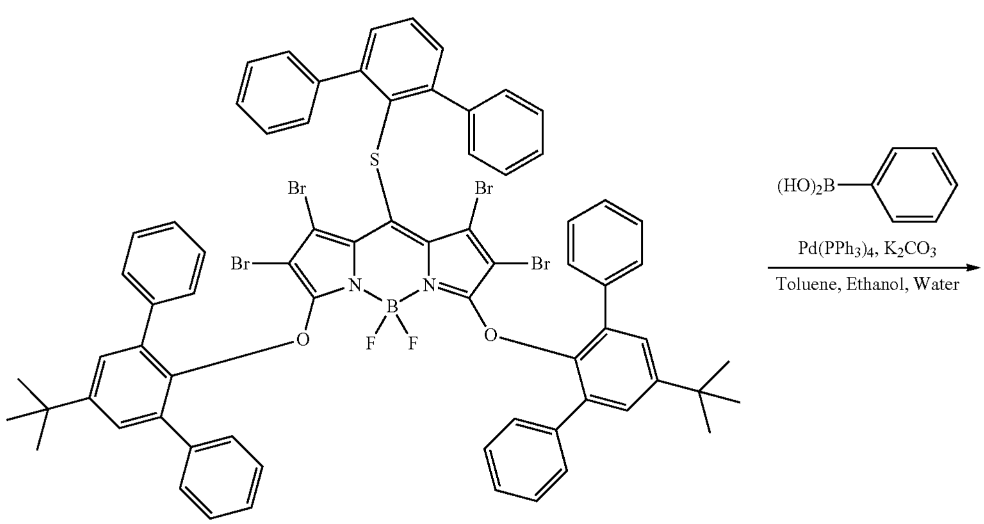
23-3

-continued
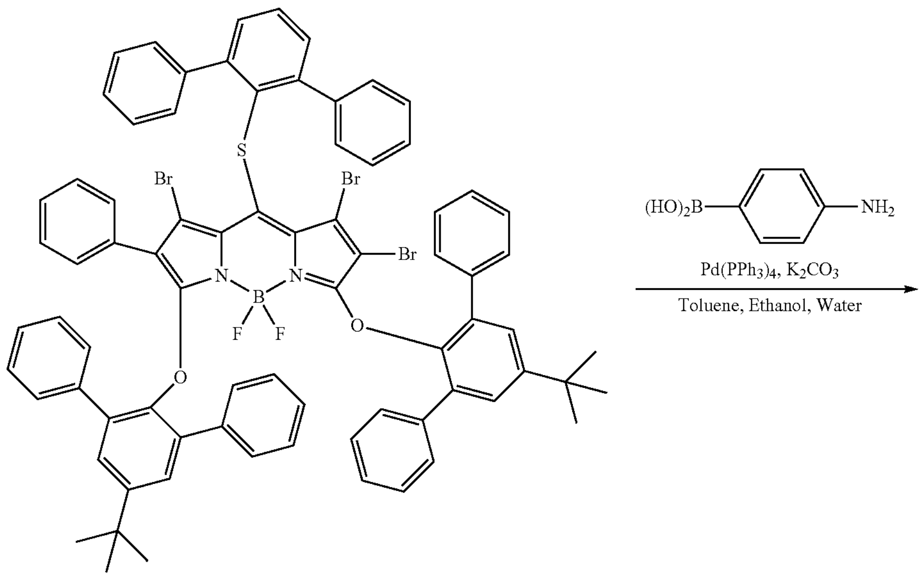
23-4
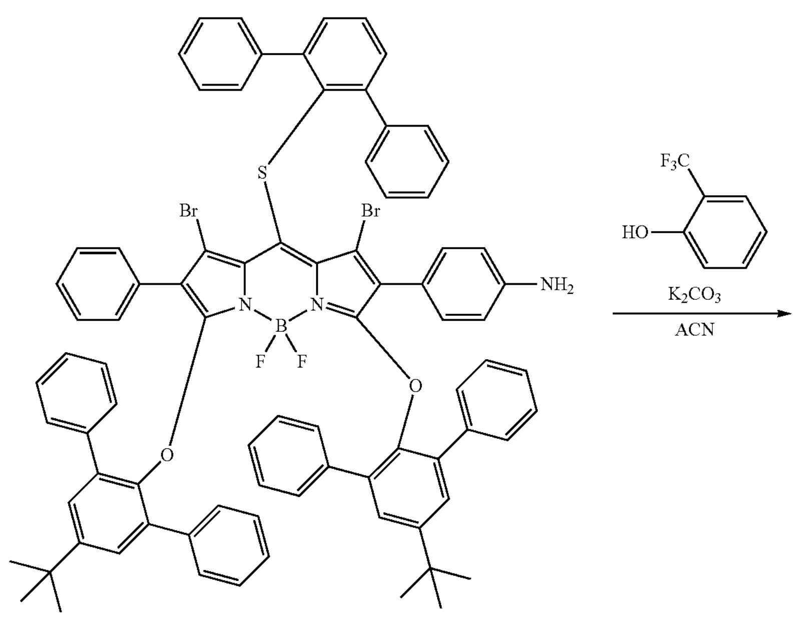
23-5

-continued

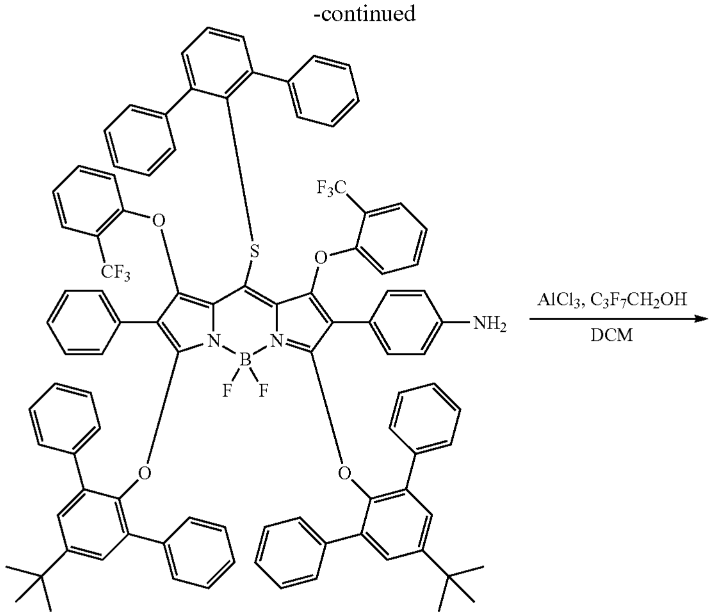

23-6

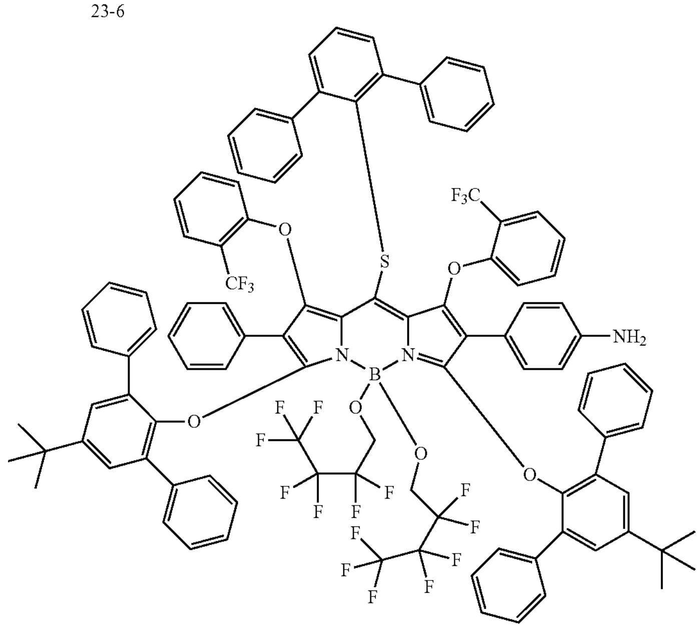

23

(Synthesis of 23-1)

Synthesis was progressed according to Synthesis Method 1 using chloro BODIPY and terphenyl-2'-thiol. Compound 23-1 was obtained in 6.5 g (yield 65%).

(Synthesis of 23-2)

Synthesis was progressed according to Synthesis Method 2 using Compound 23-1. Compound 23-2 was obtained in 10.7 g (yield 87%).

(Synthesis of 23-3)

Synthesis was progressed according to Synthesis Method 4 using Compound 23-2 and 5'-(t-butyl)-terphenyl-2'-ol. Compound 23-3 was obtained in 10.8 g (yield 73%).

(Synthesis of 23-4)

Synthesis was progressed according to Synthesis Method 5 using Compound 23-3 and phenylboronic acid. Compound 23-4 was obtained in 6.4 g (yield 64%).

(Synthesis of 23-5)

Synthesis was progressed according to Synthesis Method 5 using Compound 23-4 and 4-aminophenylboronic acid. Compound 23-5 was obtained in 4.4 g (yield 73%).

(Synthesis of 23-6)

Synthesis was progressed according to Synthesis Method 4 using Compound 23-5 and 2-trifluoromethylphenol. Compound 23-6 was obtained in 3.6 g (yield 81%).

(Synthesis of Compound 23)

Synthesis was progressed according to Synthesis Method 13 using Compound 23-6. Compound 23 was obtained in 1.6 g (yield 43%).

HR LC/MS/MS m/z calculated for $C_{105}H_{78}BF_{20}N_3O_6S$ (M+): 1899.5385; found: 1899.5382

Preparation Example 24
Compound 24
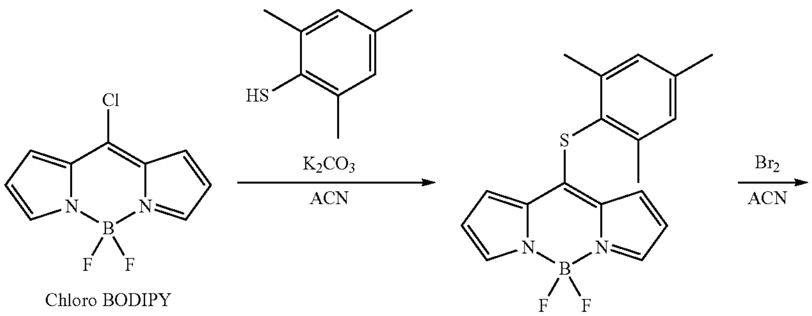
Chloro BODIPY
24-1
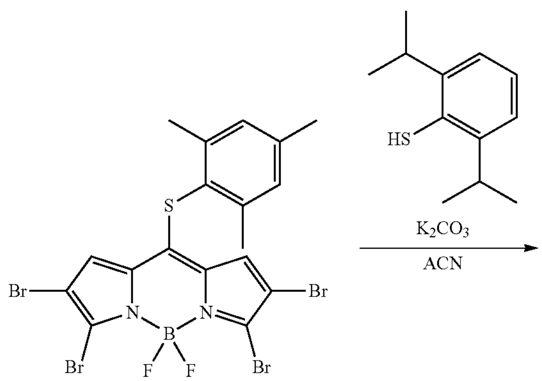
24-2
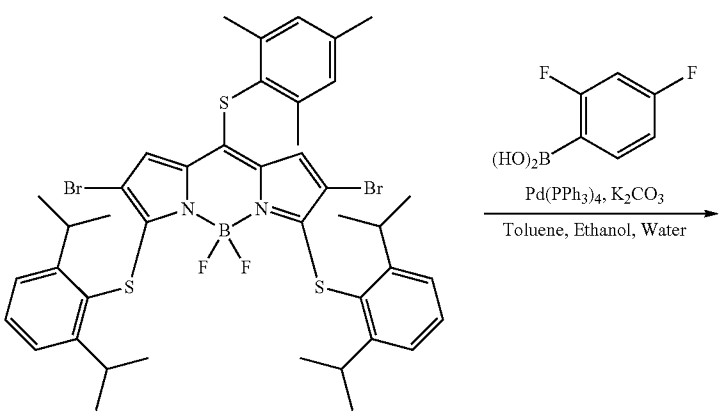
24-3

-continued

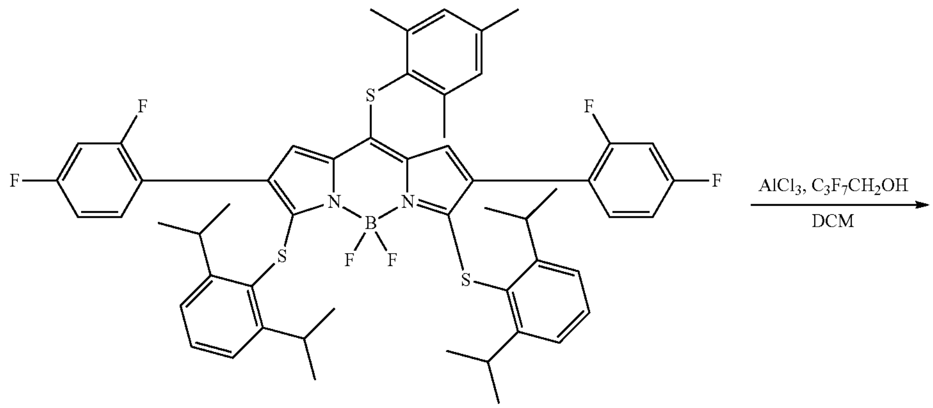

24-4

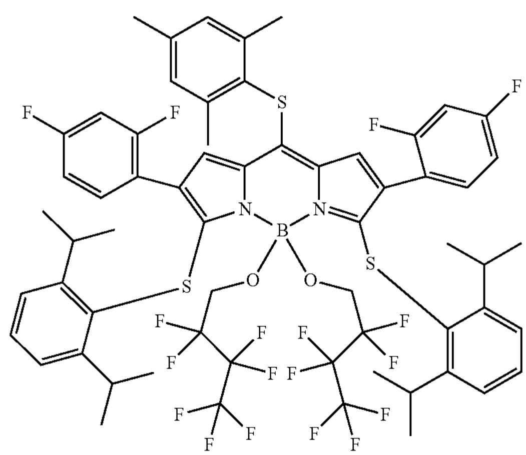

24

(Synthesis of 24-1)

Synthesis was progressed according to Synthesis Method 1 using chloro BODIPY and 2,4,6-trimethylbenzenethiol. Compound 24-1 was obtained in 6.2 g (yield 82%).

(Synthesis of 24-2)

Synthesis was progressed according to Synthesis Method 3 using Compound 24-1. Compound 24-2 was obtained in 9.7 g (yield 84%).

(Synthesis of 24-3)

Synthesis was progressed according to Synthesis Method 4 using Compound 24-2 and 2,6-diisopropylbenzenethiol. Compound 24-3 was obtained in 9.8 g (yield 81%).

(Synthesis of 24-4)

Synthesis was progressed according to Synthesis Method 5 using Compound 24-3 and 2,4-difluorophenylboronic acid. Compound 24-4 was obtained in 8.6 g (yield 89%).

(Synthesis of Compound 24)

Synthesis was progressed according to Synthesis Method 13 using Compound 24-4. Compound 24 was obtained in 5.3 g (yield 48%).

HR LC/MS/MS m/z calculated for $C_{62}H_{57}BF_{18}N_2O_2S_3$ (M+): 1310.3388; found: 1310.3390

Preparation Example 25
Compound 25
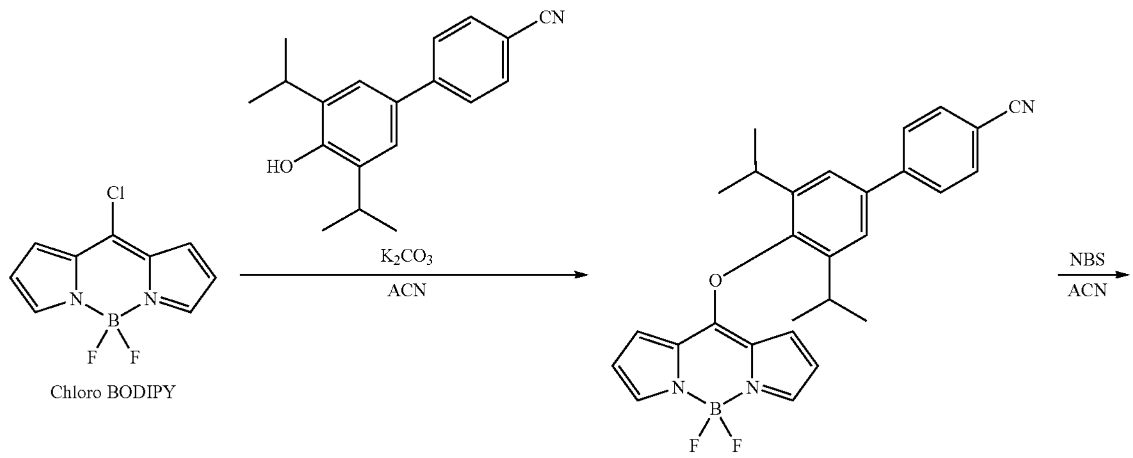
25-1
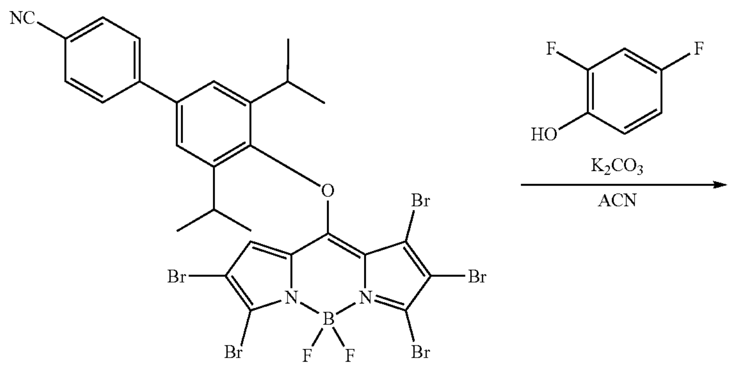
25-2
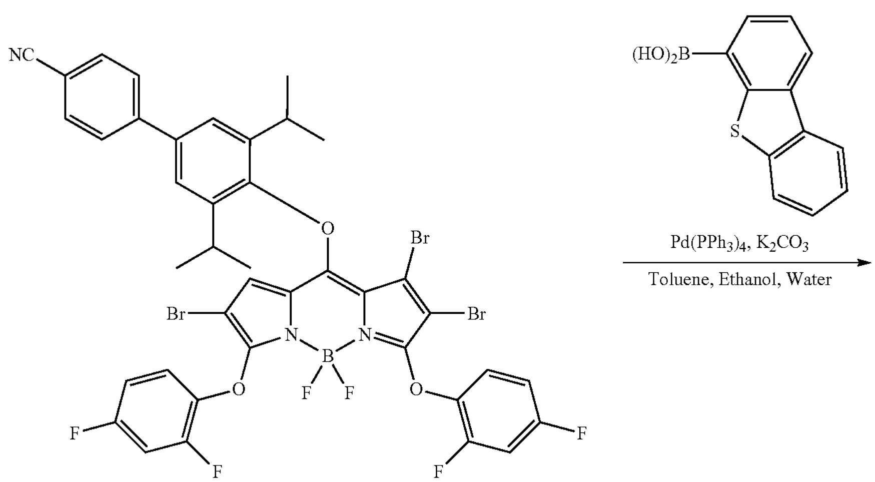
25-3

-continued
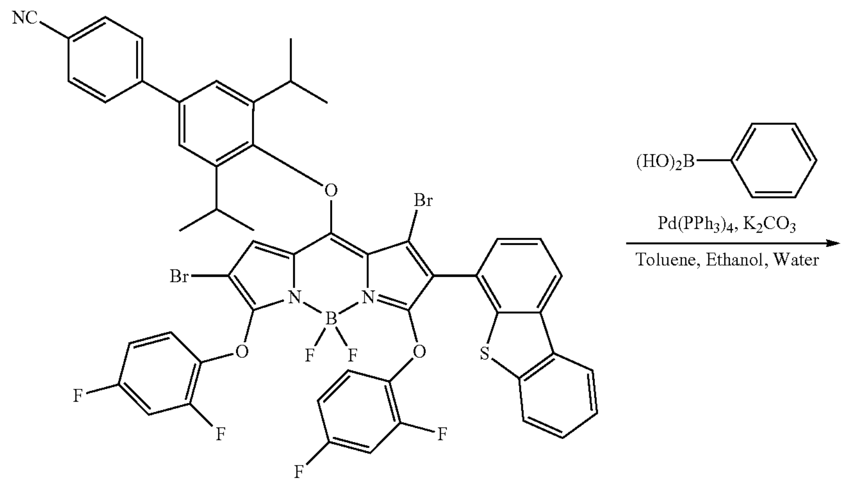
25-4
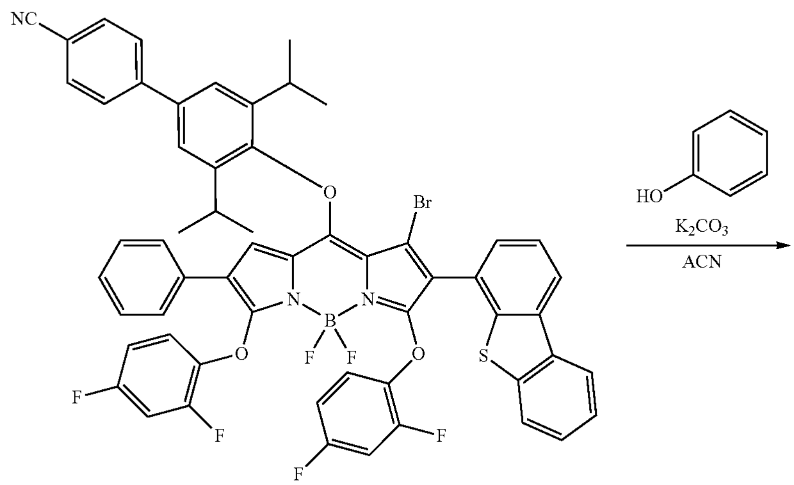
25-5
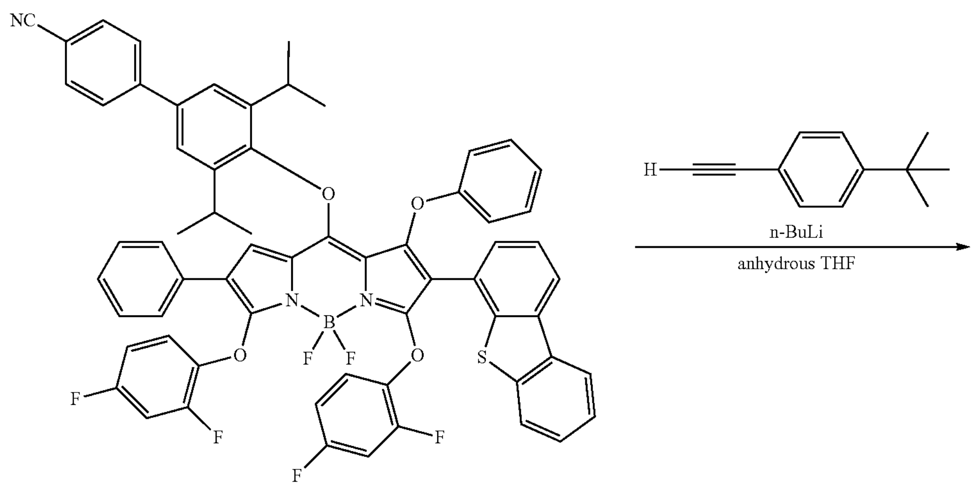
25-6

-continued

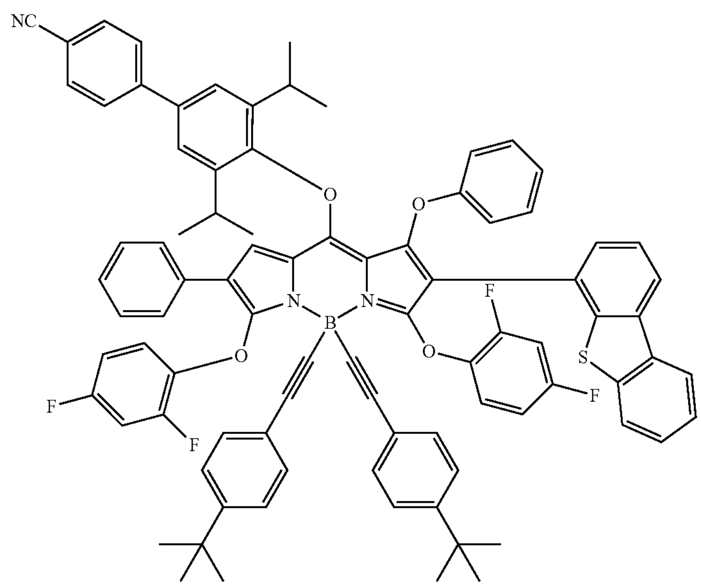

25

(Synthesis of 25-1)

Synthesis was progressed according to Synthesis Method 1 using chloro BODIPY and 4'-hydroxy-3',5'-diisopropyl-biphenyl-4-carbonitrile. Compound 25-1 was obtained in 7.8 g (yield 75%).

(Synthesis of 25-2)

Synthesis was progressed according to Synthesis Method 2 using Compound 25-1. Compound 25-2 was obtained in 8.8 g (yield 68%).

(Synthesis of 25-3)

Synthesis was progressed according to Synthesis Method 4 using Compound 25-2 and 2,4-difluorophenol. Compound 25-3 was obtained in 7.1 g (yield 80%).

(Synthesis of 25-4)

Synthesis was progressed according to Synthesis Method 5 using Compound 25-3 and dibenzothiophenyl-4-boronic acid. Compound 25-4 was obtained in 4.6 g (yield 59%).

(Synthesis of 25-5)

Synthesis was progressed according to Synthesis Method 5 using Compound 25-4 and phenylboronic acid. Compound 25-5 was obtained in 2.5 g (yield 63%).

(Synthesis of 25-6)

Synthesis was progressed according to Synthesis Method 4 using Compound 25-5 and phenol. Compound 25-6 was obtained in 4.6 g (yield 78%).

(Synthesis of Compound 25)

Synthesis was progressed according to Synthesis Method 14 using Compound 25-6. Compound 25 was obtained in 0.8 g (yield 62%).

HR LC/MS/MS m/z calculated for $C_{88}H_{70}BF_4N_3O_4S$ (M+): 1351.5116; found: 1351.5118

Preparation Example 26
Compound 26
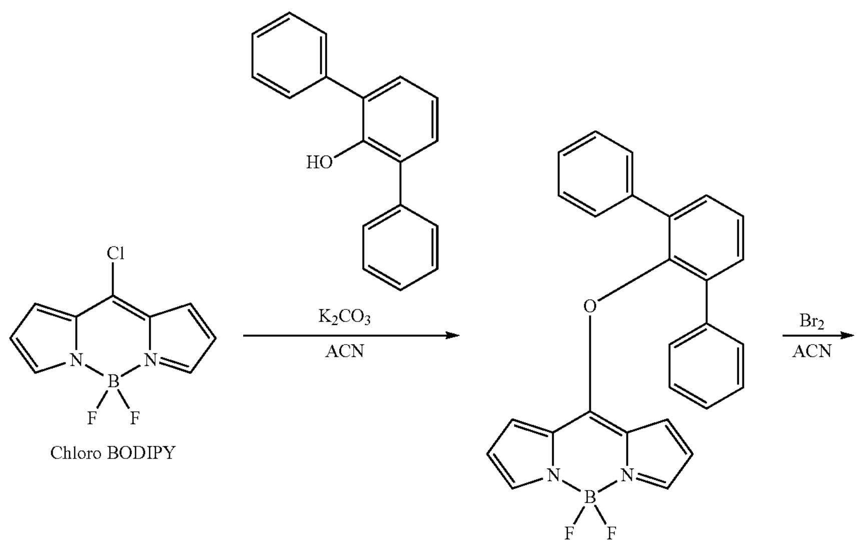
26-1
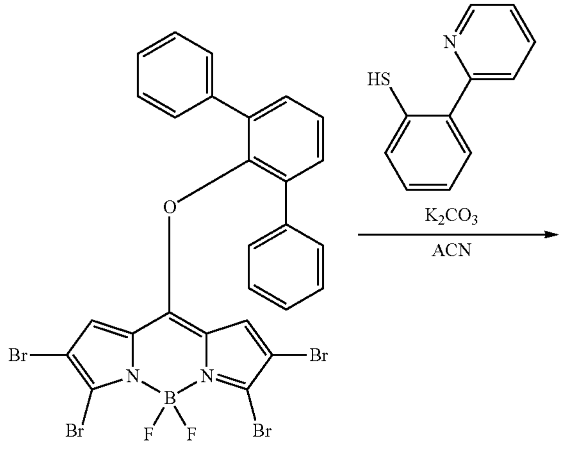
26-2

-continued
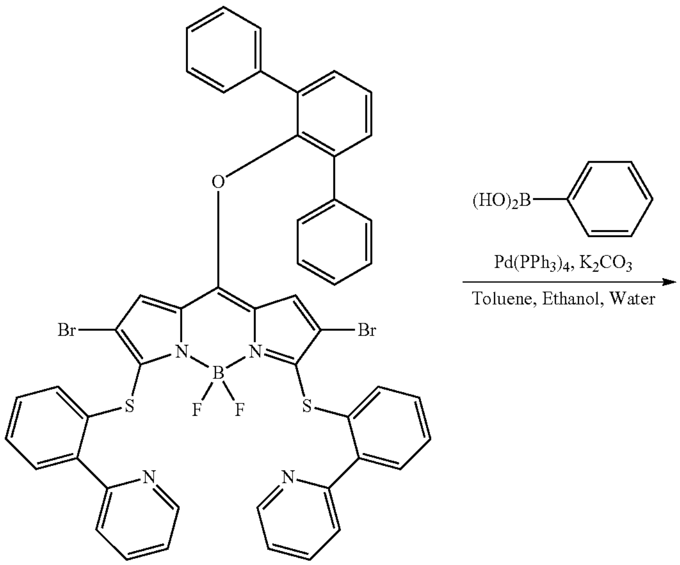
26-3
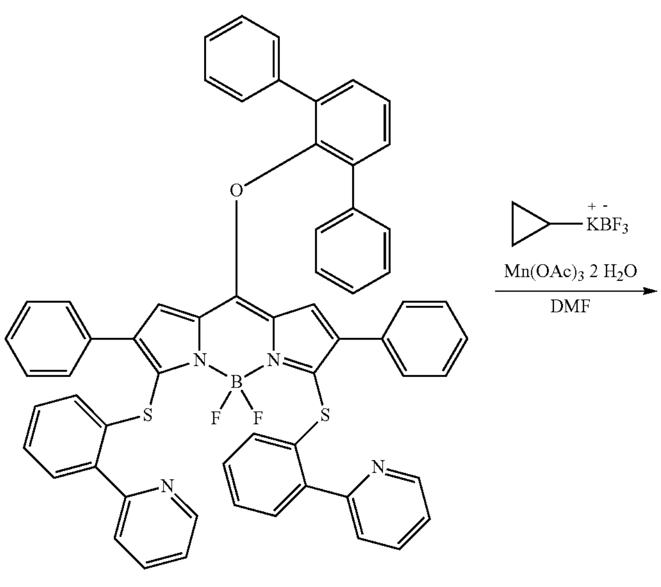
26-4

-continued

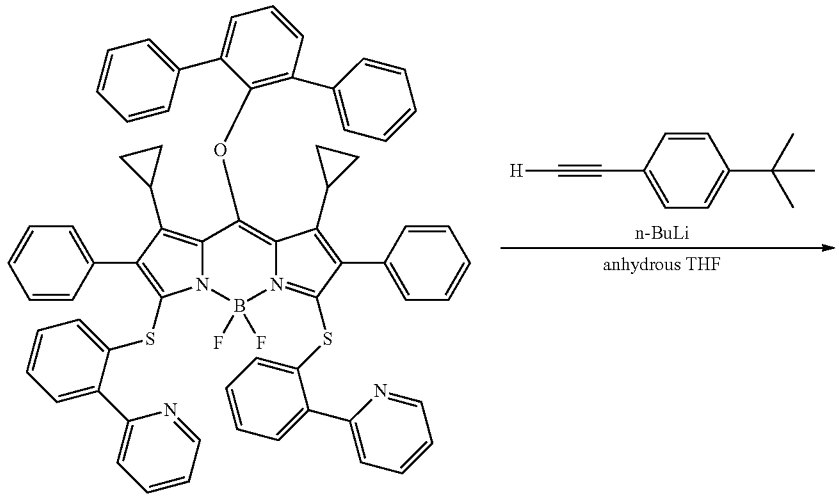

26-5

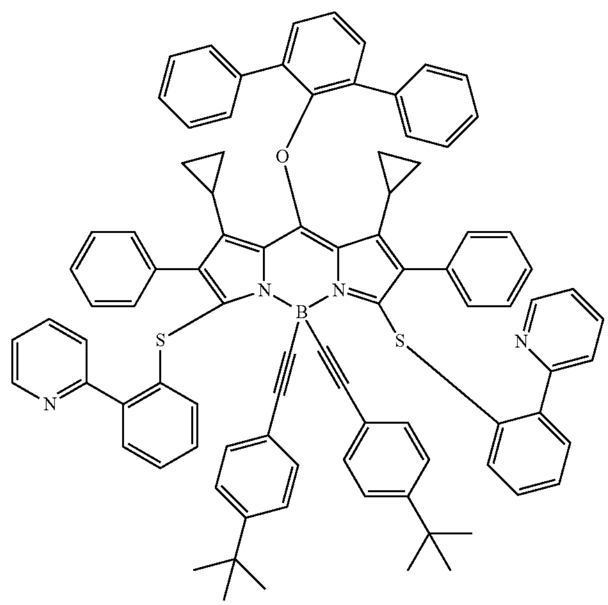

26

(Synthesis of 26-1)

Synthesis was progressed according to Synthesis Method 1 using chloro BODIPY and terphenyl-2'-ol. Compound 26-1 was obtained in 8.3 g (yield 86%).

(Synthesis of 26-2)

Synthesis was progressed according to Synthesis Method 3 using Compound 26-1. Compound 26-2 was obtained in 11.2 g (yield 81%).

(Synthesis of 26-3)

Synthesis was progressed according to Synthesis Method 4 using Compound 26-2 and 2-(2-pyridinyl)-benzenethiol. Compound 26-3 was obtained in 10.2 g (yield 72%).

(Synthesis of 26-4)

Synthesis was progressed according to Synthesis Method 5 using Compound 26-3 and phenylboronic acid. Compound 26-4 was obtained in 7.7 g (yield 77%).

(Synthesis of 26-5)

Synthesis was progressed according to Synthesis Method 8 using Compound 26-4 and cyclopropyl potassium trifluoroborate. Compound 26-5 was obtained in 4.8 g (yield 63%).

(Synthesis of Compound 26)

Synthesis was progressed according to Synthesis Method 14 using Compound 26-5. Compound 26 was obtained in 2.8 g (yield 56%).

HR LC/MS/MS m/z calculated for $C_{91}H_{75}BN_4OS_2$ (M+): 1314.5475; found: 1314.5473

Preparation Example 27
Compound 27
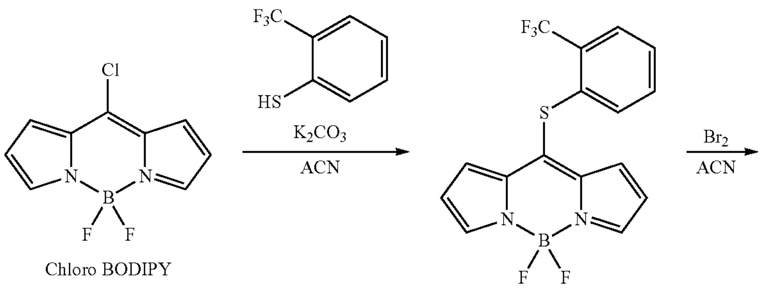
27-1
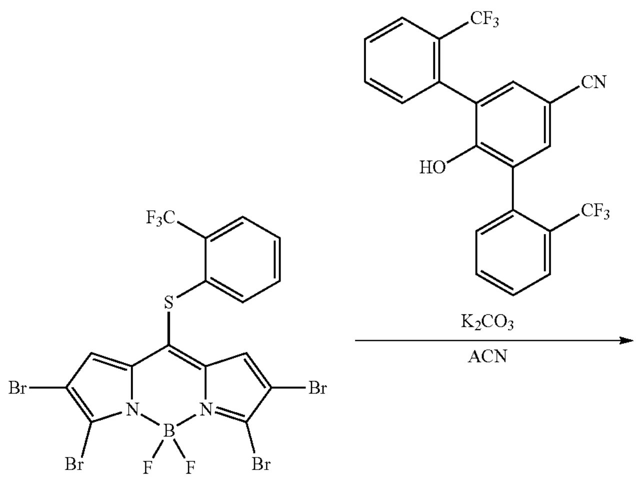
27-2
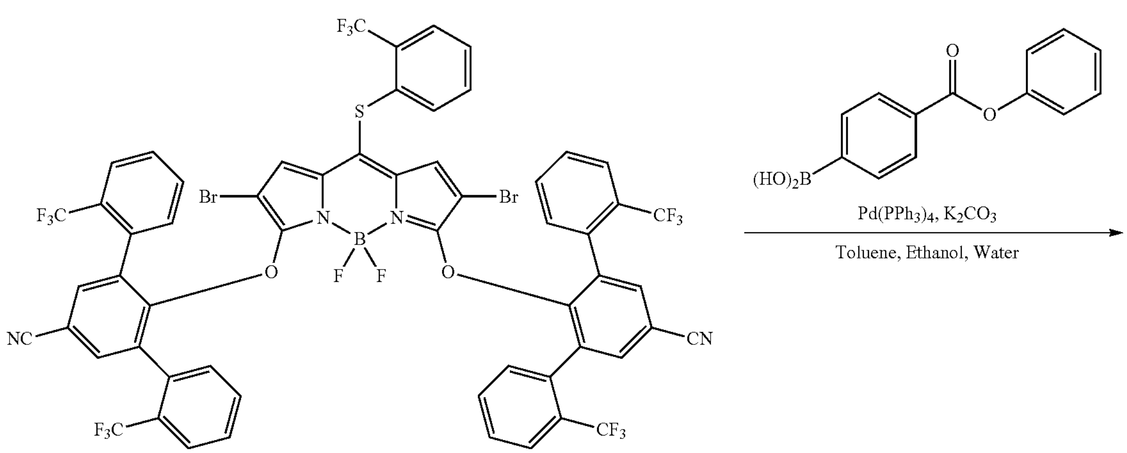
27-3

-continued
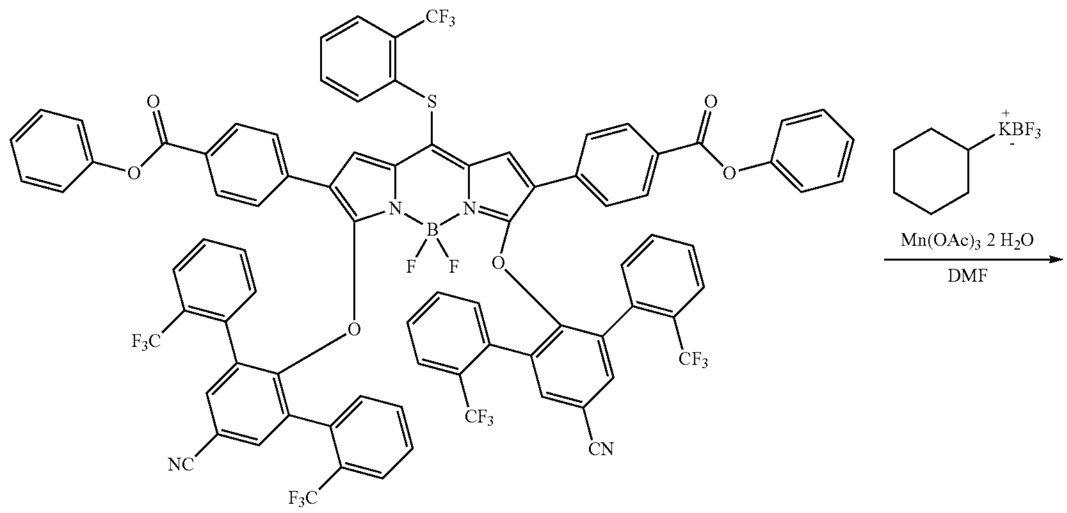
27-4
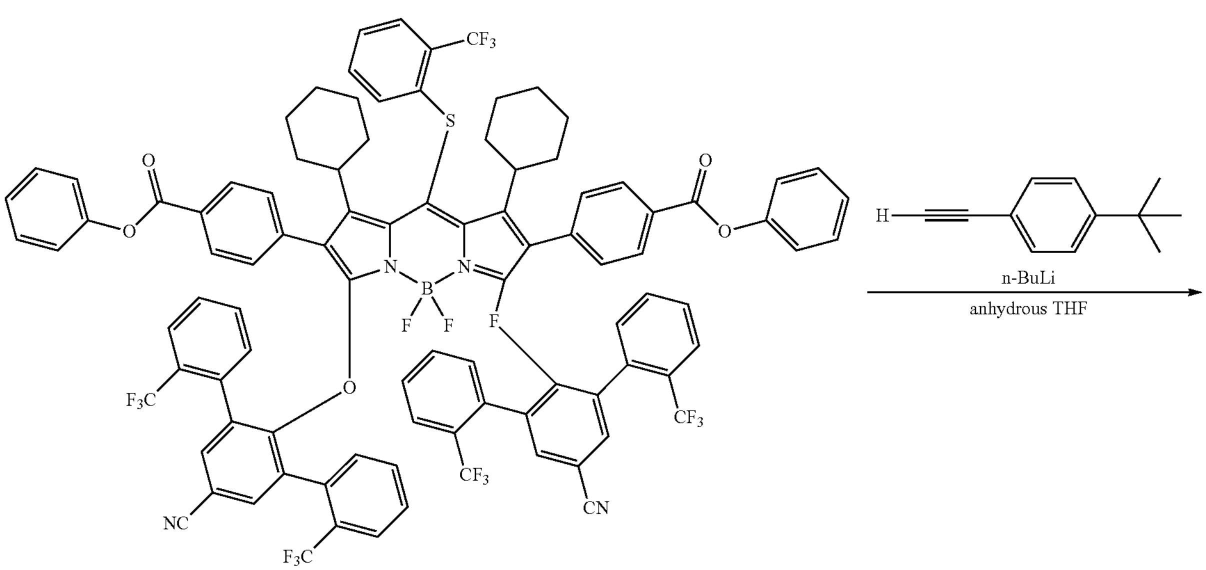
27-5

-continued

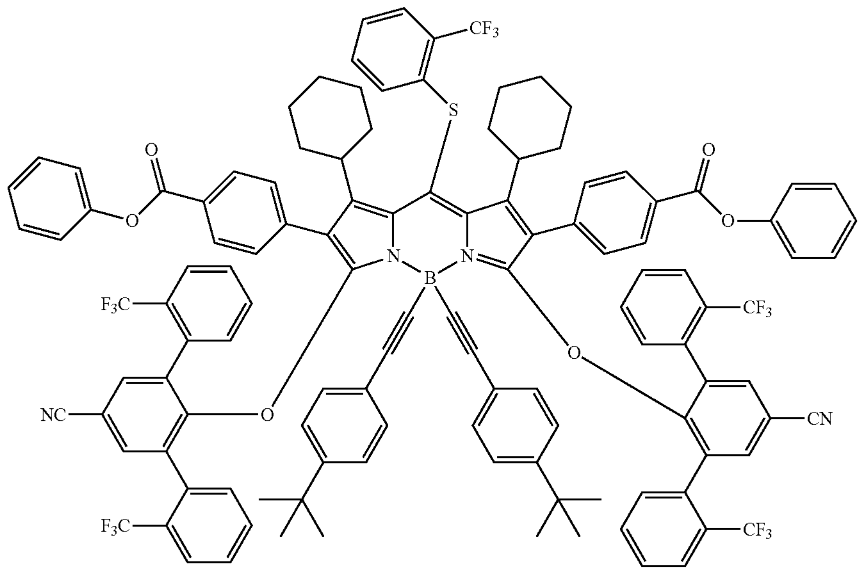

27

(Synthesis of 27-1)

Synthesis was progressed according to Synthesis Method 1 using chloro BODIPY and 2-trifluoromethylbenzenethiol. Compound 27-1 was obtained in 6.3 g (yield 78%).

(Synthesis of 27-2)

Synthesis was progressed according to Synthesis Method 3 using Compound 27-1. Compound 27-2 was obtained in 7.5 g (yield 85%).

(Synthesis of 27-3)

Synthesis was progressed according to Synthesis Method 4 using Compound 27-2 and 2'-hydroxy-2,2''-bistrifluoromethyl-terphenyl-5'-carbonitrile. Compound 27-3 was obtained in 12.8 g (yield 73%).

(Synthesis of 27-4)

Synthesis was progressed according to Synthesis Method 5 using Compound 27-3 and 4-(phenoxycarbonyl)phenylboronic acid. Compound 27-4 was obtained in 8.6 g (yield 61%).

(Synthesis of 27-5)

Synthesis was progressed according to Synthesis Method 8 using Compound 27-4 and cyclohexyl potassium trifluoroborate. Compound 27-5 was obtained in 5.0 g (yield 57%).

(Synthesis of Compound 27)

Synthesis was progressed according to Synthesis Method 14 using Compound 27-5. Compound 27 was obtained in 2.0 g (yield 34%).

HR LC/MS/MS m/z calculated for $C_{120}H_{90}BF_{15}N_4O_6S$ (M+): 2010.6435; found: 2010.6439

Preparation Example 28

Compound 28

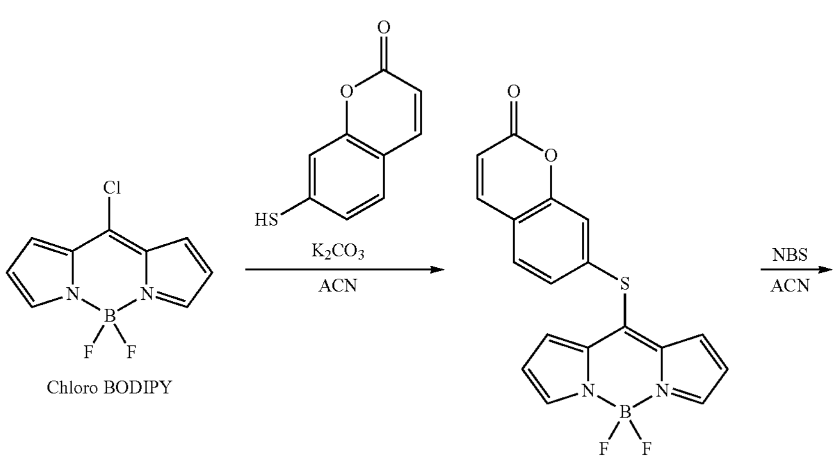

28-1

-continued
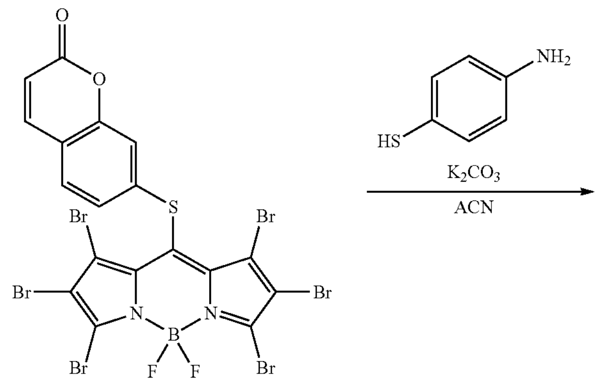
28-2
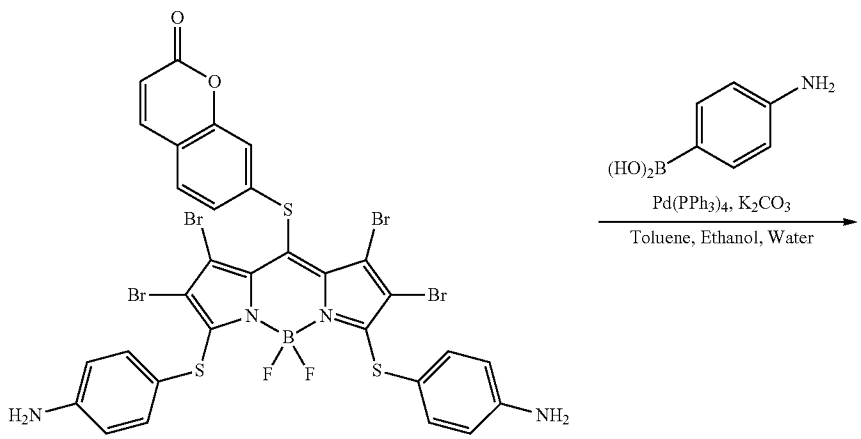
28-3
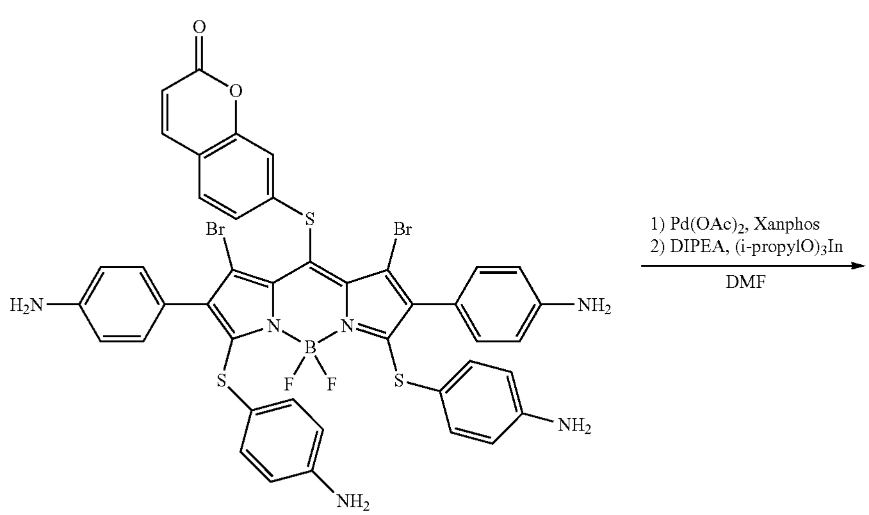
28-4

-continued

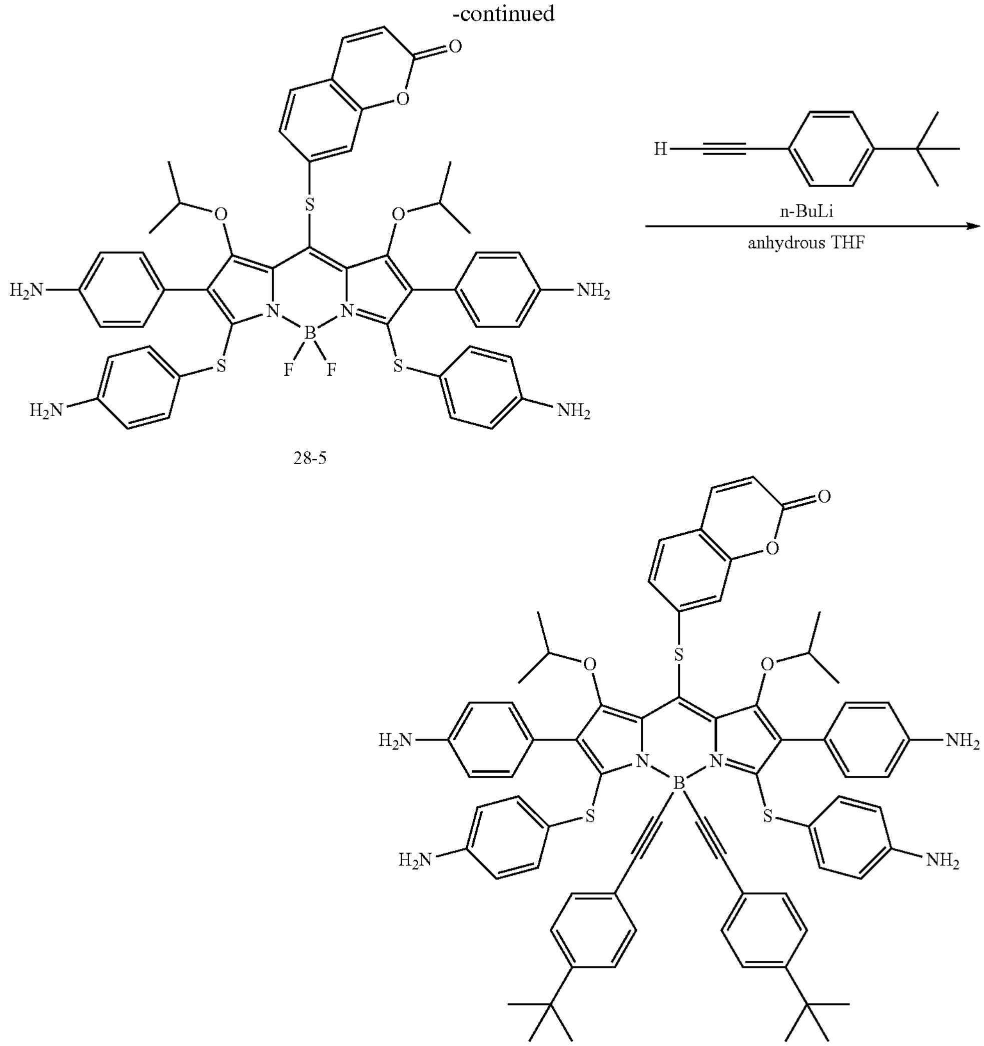

28-5

28

(Synthesis of 28-1)

Synthesis was progressed according to Synthesis Method 1 using chloro BODIPY and 7-mercapto-2H-chromen-2-one. Compound 28-1 was obtained in 11.9 g (yield 73%).

(Synthesis of 28-2)

Synthesis was progressed according to Synthesis Method 2 using Compound 28-1. Compound 28-2 was obtained in 21.1 g (yield 84%).

(Synthesis of 28-3)

Synthesis was progressed according to Synthesis Method 4 using Compound 28-2 and 4-aminobenzenethiol. Compound 28-3 was obtained in 15.8 g (yield 68%).

(Synthesis of 28-4)

Synthesis was progressed according to Synthesis Method 5 using Compound 28-3 and 4-aminobenzeneboronic acid. Compound 28-4 was obtained in 11.2 g (yield 73%).

(Synthesis of 28-5)

Synthesis was progressed according to Synthesis Method 12 using Compound 28-4 and indium(III)propan-2-olate. Compound 28-5 was obtained in 4.9 g (yield 47%).

(Synthesis of Compound 28)

Synthesis was progressed according to Synthesis Method 14 using Compound 28-5. Compound 28 was obtained in 2.7 g (yield 52%).

HR LC/MS/MS m/z calculated for $C_{72}H_{69}BN_6O_4S_3$ (M+): 1188.4635; found: 1188.4639

EXAMPLE

Example 1

A first solution was prepared by dissolving Compound 1, an organic fluorescent substance, in a xylene solvent.

A second solution was prepared by dissolving a thermoplastic resin SAN (styrene-acrylonitrile-based) in a xylene solvent. The first solution and the second solution were mixed so that the amount of the organic fluorescent substance was 0.5 parts by weight based on 100 parts by weight of the SAN, and the result was homogeneously mixed. The solid content in the mixed solution was 20% by weight and viscosity was 200 cps. This solution was coated on a PET substrate, and the result was dried to prepare a color conversion film.

A luminance spectrum of the prepared color conversion film was measured using a spectroradiometer (SR series of TOPCON Corporation). Specifically, the prepared color conversion film was laminated on one surface of a light guide plate of a backlight unit including an LED blue backlight (maximum light emission wavelength 450 nm) and the light guide plate, and after laminating a prism sheet and a DBEF film on the color conversion film, a luminance spectrum of the film was measured. When measuring the luminance spectrum, an initial value was set so that the brightness of the blue LED light was 600 nit based on without the color conversion film.

Example 2

An experiment was performed in the same manner as in Example 1 except that Compound 2 was used instead of Compound 1.

Example 3

An experiment was performed in the same manner as in Example 1 except that Compound 4 was used instead of Compound 1.

Example 4

An experiment was performed in the same manner as in Example 1 except that Compound 6 was used instead of Compound 1.

Example 5

An experiment was performed in the same manner as in Example 1 except that Compound 11 was used instead of Compound 1.

Example 6

An experiment was performed in the same manner as in Example 1 except that Compound 12 was used instead of Compound 1.

Example 7

An experiment was performed in the same manner as in Example 1 except that Compound 18 was used instead of Compound 1.

Example 8

An experiment was performed in the same manner as in Example 1 except that Compound 20 was used instead of Compound 1.

Example 9

An experiment was performed in the same manner as in Example 1 except that Compound 21 was used instead of Compound 1.

Example 10

An experiment was performed in the same manner as in Example 1 except that Compound 23 was used instead of Compound 1.

Example 11

An experiment was performed in the same manner as in Example 1 except that Compound 27 was used instead of Compound 1.

Example 12

An experiment was performed in the same manner as in Example 1 except that Compound 28 was used instead of Compound 1.

Comparative Example 1

An experiment was performed in the same manner as in Example 1 except that diPh was used instead of Compound 1.

Comparative Example 2

An experiment was performed in the same manner as in Example 1 except that diPhO was used instead of Compound 1.

Comparative Example 3

An experiment was performed in the same manner as in Example 1 except that OdiPh was used instead of Compound 1.

Comparative Example 4

An experiment was performed in the same manner as in Example 1 except that diPhS was used instead of Compound 1.

Comparative Example 5

An experiment was performed in the same manner as in Example 1 except that SdiPh was used instead of Compound 1.

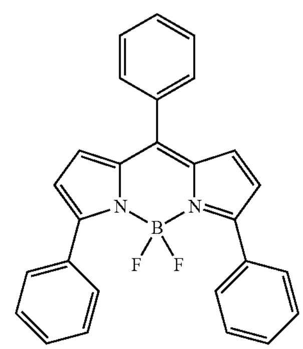

diPh

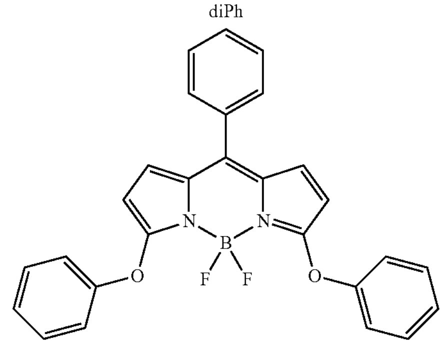

diPhO

-continued

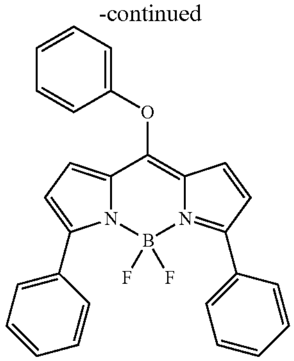

OdiPh

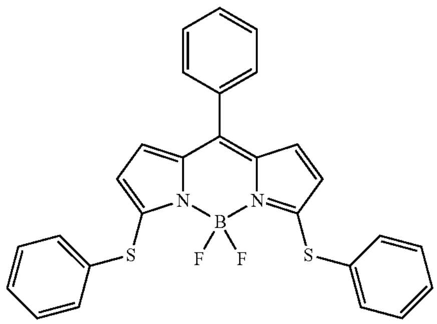

diPhS

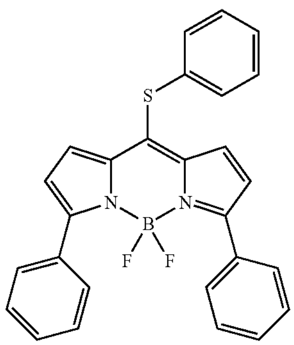

SdiPh

Thin film light emission wavelength, PLQY (thin film quantum efficiency) and PL intensity (%) of each of the color conversion films according to Examples 1 to 12 and Comparative Examples 1 to 5 are as shown in the following Table 4.

TABLE 4

| | | Thin Film Light Emission Wavelength PL$\lambda_{max}$ (nm) | PLQY (%) | PL Intensity (%) |
|---|---|---|---|---|
| Example 1 | Compound 1 | 520 | 97 | 93 |
| Example 2 | Compound 2 | 531 | 94 | 94 |
| Example 3 | Compound 4 | 620 | 96 | 82 |
| Example 4 | Compound 6 | 626 | 95 | 86 |
| Example 5 | Compound 11 | 624 | 96 | 91 |
| Example 6 | Compound 12 | 682 | 97 | 88 |
| Example 7 | Compound 18 | 613 | 95 | 92 |
| Example 8 | Compound 20 | 689 | 94 | 91 |
| Example 9 | Compound 21 | 555 | 94 | 86 |
| Example 10 | Compound 23 | 536 | 93 | 84 |
| Example 11 | Compound 27 | 629 | 94 | 95 |
| Example 12 | Compound 28 | 703 | 92 | 93 |

TABLE 4-continued

| | | Thin Film Light Emission Wavelength PL$\lambda_{max}$ (nm) | PLQY (%) | PL Intensity (%) |
|---|---|---|---|---|
| Comparative Example 1 | diPh | 622 | 90 | 54 |
| Comparative Example 2 | diPhO | 550 | 32 | 49 |
| Comparative Example 3 | OdiPh | 519 | 85 | 52 |
| Comparative Example 4 | diPhS | 616 | 56 | 53 |
| Comparative Example 5 | SdiPh | 622 | 78 | 48 |

When a color conversion film has low stability, there is a problem in that a wavelength of light finally appearing after passing through a light source and a film continuously changes over time.

According to Table 4, it was identified that the color conversion films according to Examples 1 to 12 had small changes in the PL intensity compared to Comparative Examples 1 to 5 leading to small changes in the wavelength, and therefore, light emission efficiency was high and stability was excellent.

The thin film light emission wavelength (PL $\lambda_{max}$(nm)) was measured using FS-2 equipment of SCINCO Co., Ltd., and the thin film quantum efficiency (PLQY) was measured using Quantaurus-QY equipment of HAMAMATSU Photonics K.K.

PL intensity (%) is a value obtained by, based on PL of a manufactured film, irradiating an LED light source for 1,000 hours on the corresponding film, measuring PL again, and calculating a difference in the intensity from the initial value.

The invention claimed is:

1. A compound represented by Chemical Formula 1:

[Chemical Formula 1]

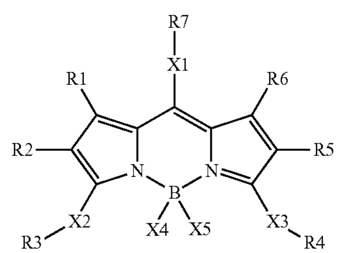

wherein, in the Chemical Formula 1,

X1 to X3 are the same as or different from each other, and each independently O or S, X4 and X5 are the same as or different from each other, and each independently a halogen group; CN; a substituted or unsubstituted alkoxy group; a substituted or unsubstituted alkenyl group; a substituted or unsubstituted alkynyl group; a substituted or unsubstituted aryl group; a substituted or unsubstituted aryloxy group; or a substituted or unsubstituted heteroaryl group, R1 and R6 are the same as or different from each other, and each independently hydrogen; deuterium; a halogen group; CN; a substituted or unsubstituted alkyl group; a substituted or unsubstituted cycloalkyl group; a substituted or unsubstituted alkoxy group; a substituted or unsubstituted aryloxy group; a substituted or unsubstituted aryl group; or a substituted or unsubstituted heteroaryl group, R2 and R5 are the same as or different from each other, and each independently a substituted or unsubstituted ester group; a substituted or unsubstituted aryl group; or a substituted or unsubstituted heteroaryl group, R3 and R4 are the same as or different from each other, and each independently an isopropyl group unsubstituted or substituted with fluorine; a substituted or unsubstituted cycloalkyl group; a substituted or unsubstituted aryl group; or a substituted or unsubstituted heteroaryl group, and R7 is a substituted or unsubstituted aryl group; or a substituted or unsubstituted heteroaryl group.

2. The compound according to claim 1, wherein X4 and X5 are the same as or different from each other, and each independently a halogen group; CN; an alkoxy group unsubstituted or substituted with a halogen group; an alkynyl group unsubstituted or substituted with a substituted or unsubstituted aryl group; an aryl group unsubstituted or substituted with a nitro group; an aryloxy group; or a heteroaryl group.

3. The compound according to claim 1, wherein R1 and R6 are the same as or different from each other, and each independently hydrogen; deuterium; a halogen group; CN;

an alkyl group; a cycloalkyl group unsubstituted or substituted with an alkyl group; an alkoxy group; an aryloxy group unsubstituted or substituted with a halogen group, CN, $CF_3$ or an alkyl group; an aryl group unsubstituted or substituted with a halogen group, CN, $CF_3$, an alkyl group or an alkoxy group; or a substituted or unsubstituted heteroaryl group.

4. The compound according to claim 1, wherein R2 and R5 are the same as or different from each other, and each independently —C(═O)ORa; an aryl group having 6 to 30 carbon atoms unsubstituted or substituted with one or more selected from the group consisting of a halogen group, CN, $CF_3$, —C(═O)ORa, a substituted or unsubstituted alkyl group, a substituted or unsubstituted alkoxy group, a substituted or unsubstituted amine group, a substituted or unsubstituted aryl group, and a substituted or unsubstituted heteroaryl group; or a heteroaryl group having 6 to 30 carbon atoms unsubstituted or substituted with an aryl group, and Ra is a substituted or unsubstituted alkyl group; a substituted or unsubstituted aryl group; or a substituted or unsubstituted heteroaryl group.

5. The compound according to claim 1, wherein R3 and R4 are the same as or different from each other, and each independently isopropyl group unsubstituted or substituted with $CF_3$; a cycloalkyl group having 1 to 30 carbon atoms unsubstituted or substituted with an alkyl group; an aryl group having 6 to 30 carbon atoms unsubstituted or substituted with one or more selected from the group consisting of a halogen group, CN, $CF_3$, —C(═O)ORa, an amine group, an alkoxy group, an alkyl group having 1 to 30 carbon atoms and a heteroaryl group having 6 to 30 carbon atoms; or a substituted or unsubstituted heteroaryl group having 6 to 30 carbon atoms, and Ra is a substituted or unsubstituted alkyl group; a substituted or unsubstituted aryl group; or a substituted or unsubstituted heteroaryl group.

6. The compound according to claim 1, wherein R7 is an aryl group unsubstituted or substituted with one or more selected from the group consisting of a halogen group, CN, $CF_3$, an alkoxy group, an alkyl group unsubstituted or substituted with a halogen group, a substituted or unsubstituted aryl group, and a heteroaryl group; or a heteroaryl group unsubstituted or substituted with O═.

7. The compound according to claim 1, wherein X1 to X5 are selected from the combinations consisting of A1 to A40 of the following Tables 1-1 to 1-4, R1, R6 and R7 are selected from the combinations consisting of B1 to B1577 of the following Tables 2-1 to 2-9, and R2 to R5 are selected from the combinations consisting of Cl to C1435 of the following Tables 3-1 to 3-14:

TABLE 1-1

| | $X_4$ | $X_5$ | $X_1$ | $X_2$ | $X_3$ |
|---|---|---|---|---|---|
| A1 | F | F | O | O | O |
| A2 | F | CN | O | O | O |
| A3 | CN | CN | O | O | O |
| A4 | 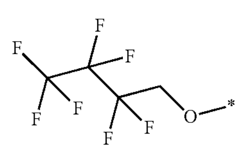 | 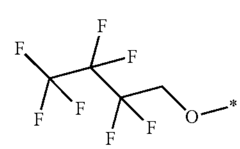 [SMILES: *OCC(F)(F)C(F)(F)C(F)(F)F] | O | O | O |
| A5 | 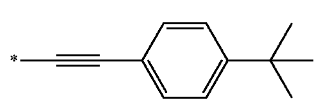 [SMILES: *C#Cc1ccc(C(C)(C)C)cc1] | 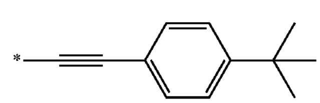 | O | O | O |
| A6 | 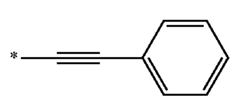 | 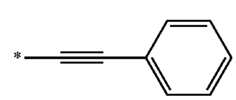 | O | O | O |
| A7 | 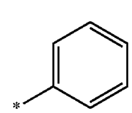 [SMILES: *c1ccccc1] | 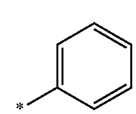 | O | O | O |

TABLE 1-1-continued
| | $X_4$ | $X_5$ | $X_1$ | $X_2$ | $X_3$ |
|---|---|---|---|---|---|
| A8 | 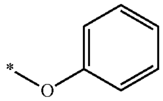 [SMILES: *Oc1ccccc1] | 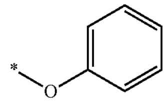 | O | O | O |
| A9 | 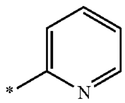 | 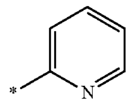 [SMILES: *c1ccccn1] | O | O | O |
| A10 | 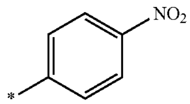 [SMILES: *c1ccc([N+](=O)[O-])cc1] | 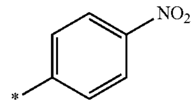 | O | O | O |
TABLE 1-2
| | $X_4$ | $X_5$ | $X_1$ | $X_2$ | $X_3$ |
|---|---|---|---|---|---|
| A11 | F | F | O | S | S |
| A12 | F | CN | O | S | S |
| A13 | CN | CN | O | S | S |
| A14 | 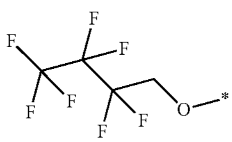 [SMILES: *OCC(F)(F)C(F)(F)C(F)(F)F] | 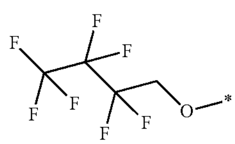 | O | S | S |
| A15 | 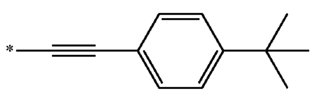 [SMILES: *C#Cc1ccc(C(C)(C)C)cc1] | 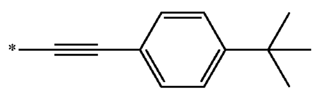 | O | S | S |
| A16 | 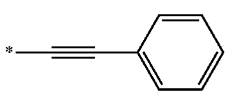 [SMILES: *C#Cc1ccccc1] | 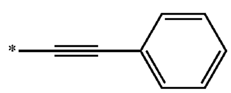 [SMILES: *C#Cc1ccccc1] | O | S | S |
| A17 | 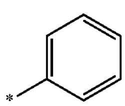 [SMILES: *c1ccccc1] | 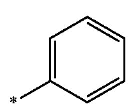 | O | S | S |
| A18 | 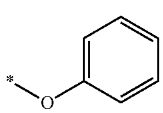 [SMILES: *Oc1ccccc1] | 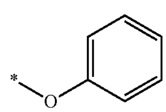 | O | S | S |
| A19 | 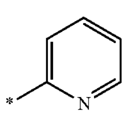 [SMILES: *c1ccccn1] | 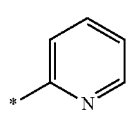 [SMILES: *c1ccccn1] | O | S | S |
| A20 | 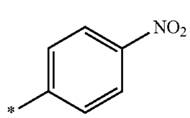 [SMILES: *c1ccc([N+](=O)[O-])cc1] | 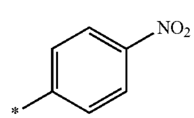 [SMILES: *c1ccc([N+](=O)[O-])cc1] | S | S | S |

TABLE 1-3
| | $X_4$ | $X_5$ | $X_1$ | $X_2$ | $X_3$ |
|---|---|---|---|---|---|
| A21 | F | F | S | O | O |
| A22 | F | CN | S | O | O |
| A23 | CN | CN | S | O | O |
| A24 | 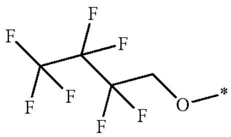 | 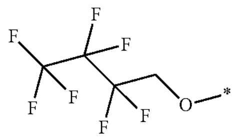 | S | O | O |
| A25 | 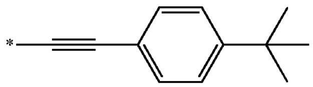 | 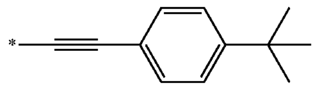 | S | O | O |
| A26 | 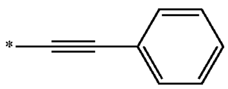 | 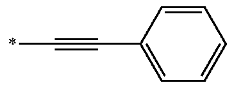 [SMILES: *C#Cc1ccccc1] | S | O | O |
| A27 | 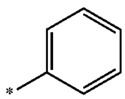 | 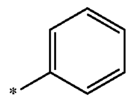 [SMILES: *c1ccccc1] | S | O | O |
| A28 | 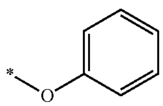 | 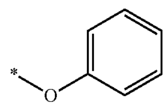 [SMILES: *Oc1ccccc1] | S | O | O |
| A29 | 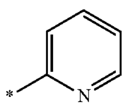 [SMILES: *c1ccccn1] | 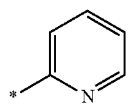 | S | O | O |
| A30 | 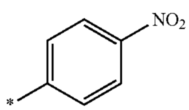 [SMILES: *c1ccc([N+](=O)[O-])cc1] | 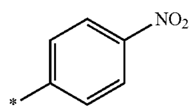 | S | O | O |
TABLE 1-4
| | $X_4$ | $X_5$ | $X_1$ | $X_2$ | $X_3$ |
|---|---|---|---|---|---|
| A31 | F | F | S | S | S |
| A32 | F | CN | S | S | S |
| A33 | CN | CN | S | S | S |
| A34 | 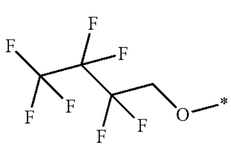 [SMILES: *OCC(F)(F)C(F)(F)C(F)(F)F] | 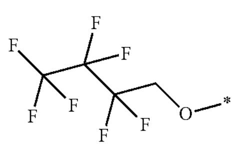 [SMILES: *OCC(F)(F)C(F)(F)C(F)(F)F] | S | S | S |
| A35 | 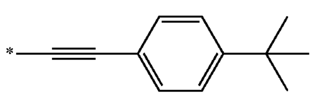 | 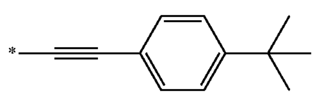 [SMILES: *C#Cc1ccc(C(C)(C)C)cc1] | S | S | S |
| A36 | 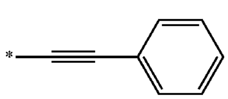 | 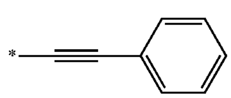 [SMILES: *C#Cc1ccccc1] | S | S | S |
| A37 | 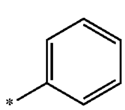 [SMILES: *c1ccccc1] | 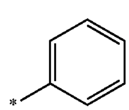 [SMILES: *c1ccccc1] | S | S | S |

TABLE 1-4-continued
| | $X_4$ | $X_5$ | $X_1$ | $X_2$ | $X_3$ |
|---|---|---|---|---|---|
| A38 | 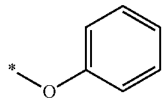 [SMILES: *Oc1ccccc1] | 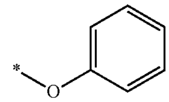 [SMILES: *Oc1ccccc1] | S | S | S |
| A39 | 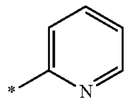 [SMILES: *c1ccccn1] | 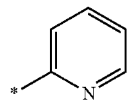 [SMILES: *c1ccccn1] | S | S | S |
| A40 | 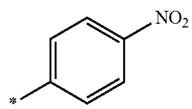 [SMILES: *c1ccc([N+](=O)[O-])cc1] | 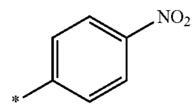 [SMILES: *c1ccc([N+](=O)[O-])cc1] | S | S | S |
TABLE 2-1
| | | $R_7$ | | | |
|---|---|---|---|---|---|
| $R_1$ | $R_6$ | 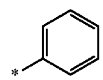 | 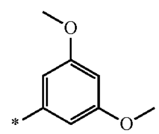 [SMILES: *c1cc(OC)cc(OC)c1] | 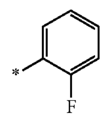 | 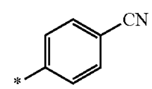 [SMILES: *c1ccc(C#N)cc1] |
| H | H | B1 | B2 | B3 | B4 |
| Cl | H | B5 | B6 | B7 | B8 |
| Cl | Cl | B9 | B10 | B11 | B12 |
| Br | Br | B13 | B14 | B15 | B16 |
| H | CN | B17 | B18 | B19 | B20 |
| H | *— | B21 | B22 | B23 | B24 |
| *— | *— | B25 | B26 | B27 | B28 |
| H |  | B29 | B30 | B31 | B32 |
| H | 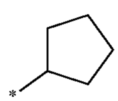 | B33 | B34 | B35 | B36 |
| H | 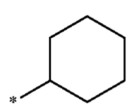 | B37 | B38 | B39 | B40 |
|  |  | B41 | B42 | B43 | B44 |
| 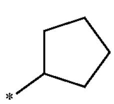 [SMILES: *C1CCCC1] | 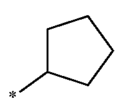 | B45 | B46 | B47 | B48 |
| 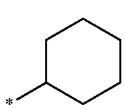 [SMILES: *C1CCCCC1] | 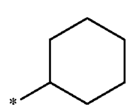 [SMILES: *C1CCCCC1] | B49 | B50 | B51 | B52 |
| H | 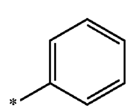 [SMILES: *c1ccccc1] | B53 | B54 | B55 | B56 |

TABLE 2-1-continued
| | | R7 | | | |
|---|---|---|---|---|---|
| $R_1$ | $R_6$ | 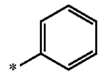 | 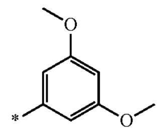 | 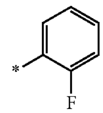 | 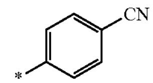 |
| H | 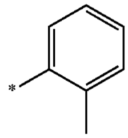 [SMILES: *c1ccccc1C] | B57 | B58 | B59 | B60 |
| H | 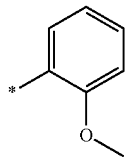 [SMILES: *c1ccccc1OC] | B61 | B62 | B63 | B64 |
| H | 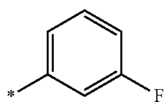 | B65 | B66 | B67 | B68 |
| H | 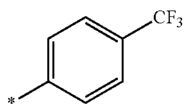 [SMILES: *c1ccc(C(F)(F)F)cc1] | B69 | B70 | B71 | B72 |
| H | 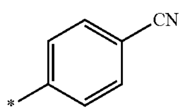 [SMILES: *c1ccc(C#N)cc1] | B73 | B74 | B75 | B76 |
| H | 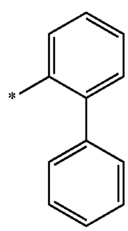 | B77 | B78 | B79 | B80 |
| 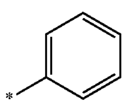 | 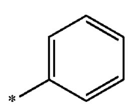 [SMILES: *c1ccccc1] | B81 | B82 | B83 | B84 |
| 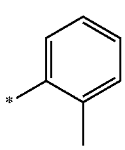 | 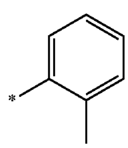 [SMILES: *c1ccccc1C] | B85 | B86 | B87 | B38 |
| 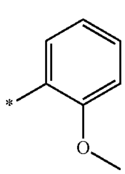 [SMILES: *c1ccccc1OC] | 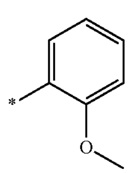 [SMILES: *c1ccccc1OC] | B89 | B90 | B91 | B92 |
| 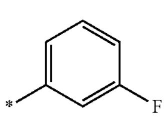 [SMILES: *c1cccc(F)c1] | 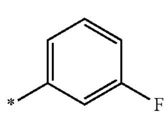 [SMILES: *c1cccc(F)c1] | B93 | B94 | B95 | B96 |

TABLE 2-1-continued
| | | R7 | | | |
|---|---|---|---|---|---|
| R1 | R6 | 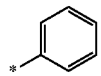 | 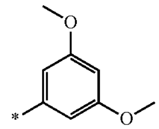 | 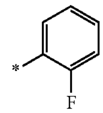 | 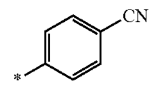 |
| 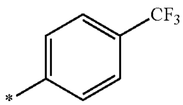 [SMILES: *c1ccc(C(F)(F)F)cc1] | 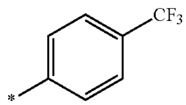 [SMILES: *c1ccc(C(F)(F)F)cc1] | B97 | B98 | B99 | B100 |
| 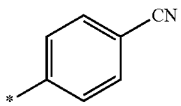 [SMILES: *c1ccc(C#N)cc1] | 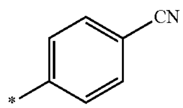 [SMILES: *c1ccc(C#N)cc1] | B101 | B102 | B103 | B104 |
| 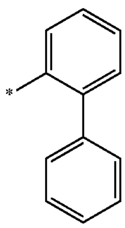 | 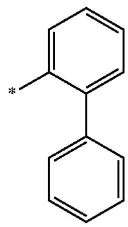 [SMILES: *c1ccccc1-c1ccccc1] | B105 | B106 | B107 | B108 |
| H | 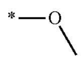 | B109 | B110 | B111 | B112 |
| H | 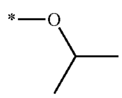 [SMILES: *OC(C)C] | B113 | B114 | B115 | B116 |
| 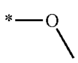 | 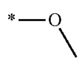 | B117 | B118 | B119 | B120 |
| 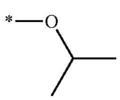 | 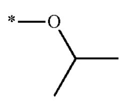 | B121 | B122 | B123 | B124 |
| H | 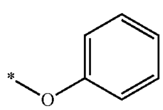 | B125 | B126 | B127 | B128 |
| H | 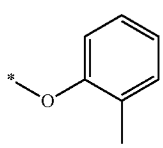 [SMILES: *Oc1ccccc1C] | B129 | B130 | B131 | B132 |
| H | 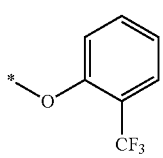 | B133 | B134 | B135 | B136 |
| H | 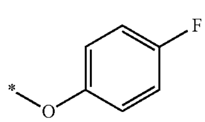 | B137 | B138 | B139 | B140 |

TABLE 2-1-continued
| | | $R_7$ | | | |
|---|---|---|---|---|---|
| $R_1$ | $R_6$ | 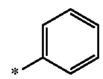 | 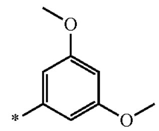 | 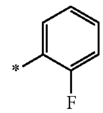 | 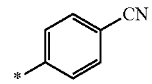 |
| H | 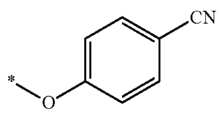 [SMILES: *Oc1ccc(C#N)cc1] | B141 | B142 | B143 | B144 |
| H | 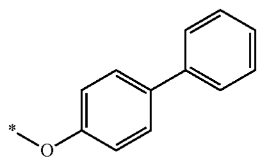 | B145 | B146 | B147 | B148 |
| 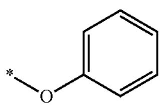 [SMILES: *Oc1ccccc1] | 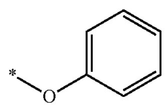 | B149 | B150 | B151 | B152 |
| 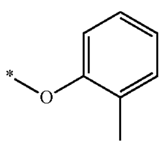 [SMILES: *Oc1ccccc1C] | 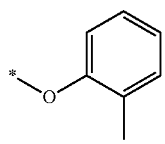 [SMILES: *Oc1ccccc1C] | B153 | B154 | B155 | B156 |
| 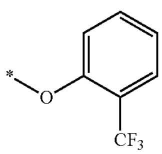 | 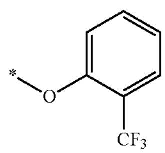 | B157 | B158 | B159 | B160 |
| 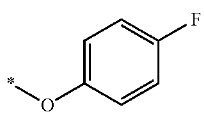 [SMILES: *Oc1ccc(F)cc1] | 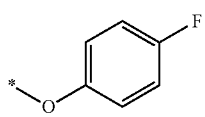 | B161 | B162 | B163 | B164 |
| 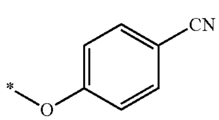 [SMILES: *Oc1ccc(C#N)cc1] | 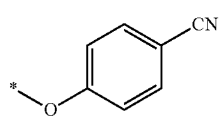 [SMILES: *Oc1ccc(C#N)cc1] | B165 | B166 | B167 | B168 |
| 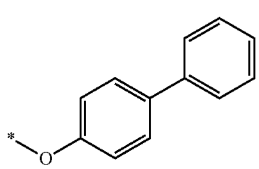 [SMILES: *Oc1ccc(-c2ccccc2)cc1] | 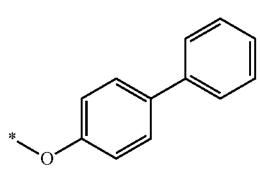 [SMILES: *Oc1ccc(-c2ccccc2)cc1] | B169 | B170 | B171 | B172 |
| 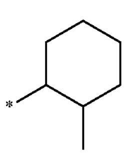 | 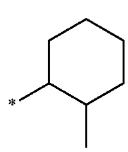 [SMILES: *C1CCCCC1C] | B173 | B174 | B175 | B176 |

TABLE 2-2
| | | R7 | | | |
|---|---|---|---|---|---|
| $R_1$ | $R_6$ | 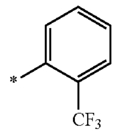 | 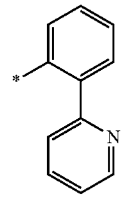 [SMILES: *c1ccccc1-c1ccccn1] | 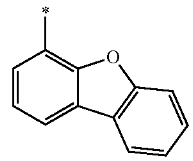 | 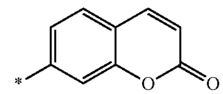 [SMILES: *c1ccc2ccc(=O)oc2c1] |
| H | H | B177 | B178 | B179 | B180 |
| Cl | H | B181 | B182 | B183 | B184 |
| Cl | Cl | B185 | B186 | B187 | B188 |
| Br | Br | B189 | B190 | B191 | B192 |
| H | CN | B193 | B194 | B195 | B196 |
| H | *— | B197 | B198 | B199 | B200 |
| *— | *— | B201 | B202 | B203 | B204 |
| H | 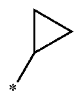 | B205 | B206 | B207 | B208 |
| H | 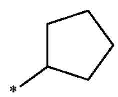 [SMILES: *C1CCCC1] | B209 | B210 | B211 | B212 |
| H | 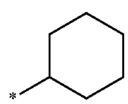 [SMILES: *C1CCCCC1] | B213 | B214 | B215 | B216 |
| 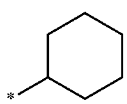 | H | B217 | B218 | B219 | B220 |
|  |  | B221 | B222 | B223 | B224 |
| 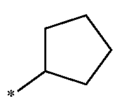 | 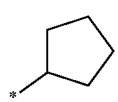 [SMILES: *C1CCCC1] | B225 | B226 | B227 | B228 |
| 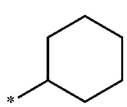 [SMILES: *C1CCCCC1] | 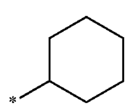 [SMILES: *C1CCCCC1] | B229 | B230 | B231 | B232 |
| H | 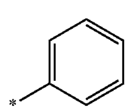 [SMILES: *c1ccccc1] | B233 | B234 | B235 | B236 |
| H | 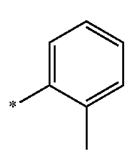 [SMILES: *c1ccccc1C] | B237 | B238 | B239 | B240 |
| H | 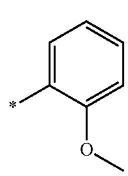 | B241 | B242 | B243 | B244 |

TABLE 2-2-continued
| | | $R_7$ | | | |
|---|---|---|---|---|---|
| $R_1$ | $R_6$ | 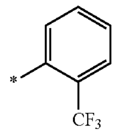 | 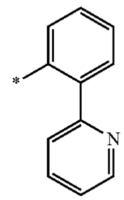 | 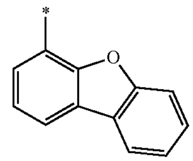 | 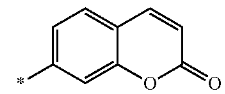 |
| H | 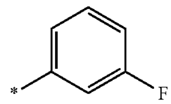 [SMILES: *c1cccc(F)c1] | B245 | B246 | B247 | B248 |
| H | 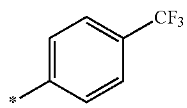 [SMILES: *c1ccc(C(F)(F)F)cc1] | B249 | B250 | B251 | B252 |
| H | 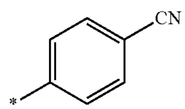 [SMILES: *c1ccc(C#N)cc1] | B253 | B254 | B255 | B256 |
| H | 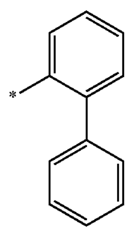 [SMILES: *c1ccccc1-c1ccccc1] | B257 | B258 | B259 | B260 |
| 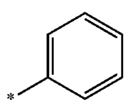 [SMILES: *c1ccccc1] | 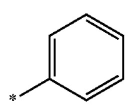 [SMILES: *c1ccccc1] | B261 | B262 | B263 | B264 |
| 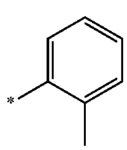 [SMILES: *c1ccccc1C] | 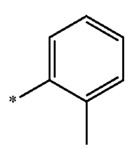 [SMILES: *c1ccccc1C] | B265 | B266 | B267 | B268 |
| 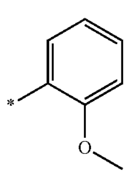 [SMILES: *c1ccccc1OC] | 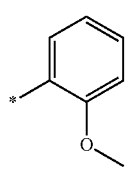 [SMILES: *c1ccccc1OC] | B269 | B270 | B271 | B272 |
| 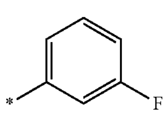 [SMILES: *c1cccc(F)c1] | 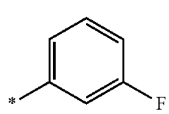 [SMILES: *c1cccc(F)c1] | B273 | B274 | B275 | B276 |
| 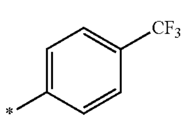 [SMILES: *c1ccc(C(F)(F)F)cc1] | 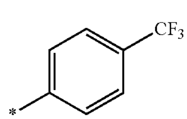 [SMILES: *c1ccc(C(F)(F)F)cc1] | B277 | B278 | B279 | B280 |
| 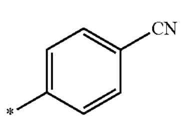 [SMILES: *c1ccc(C#N)cc1] | 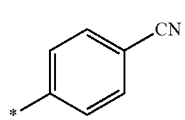 [SMILES: *c1ccc(C#N)cc1] | B281 | B282 | B283 | B284 |

TABLE 2-2-continued
| | | R7 | | | |
|---|---|---|---|---|---|
| R1 | R6 | 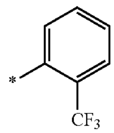 | 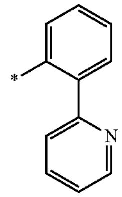 | 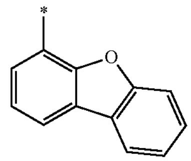 | 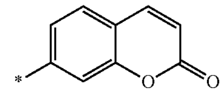 |
| 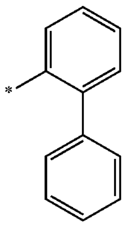 [SMILES: *c1ccccc1-c1ccccc1] | 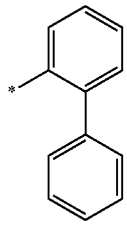 [SMILES: *c1ccccc1-c1ccccc1] | B285 | B286 | B287 | B288 |
| H | 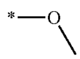 | B289 | B290 | B291 | B292 |
| H | 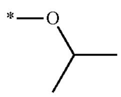 | B293 | B294 | B295 | B296 |
| 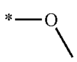 | 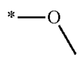 | B297 | B298 | B299 | B300 |
| 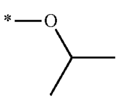 | 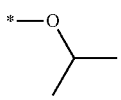 [SMILES: *OC(C)C] | B301 | B302 | B303 | B304 |
| H | 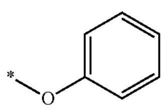 | B305 | B036 | B037 | B308 |
| H | 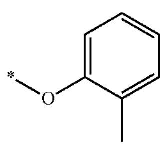 | B309 | B310 | B311 | B312 |
| H | 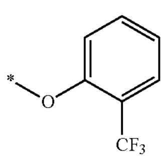 | B313 | B314 | B315 | B316 |
| H | 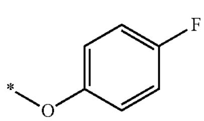 | B317 | B318 | B319 | B320 |
| H | 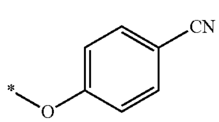 [SMILES: *Oc1ccc(C#N)cc1] | B321 | B322 | B323 | B324 |

TABLE 2-2-continued
| | | R7 | | | |
|---|---|---|---|---|---|
| $R_1$ | $R_6$ | 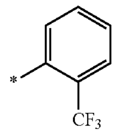 | 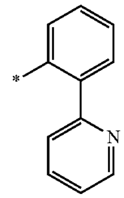 | 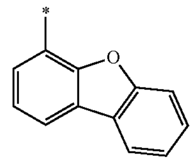 | 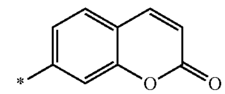 |
| 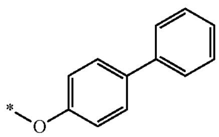 [SMILES: *Oc1ccc(-c2ccccc2)cc1] | H | B325 | B326 | B327 | B328 |
| 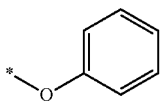 | 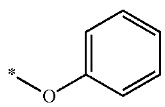 | B329 | B330 | B331 | B332 |
| 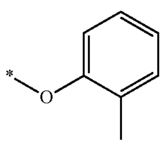 | 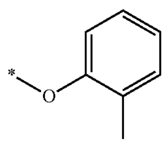 | B333 | B334 | B335 | B336 |
| 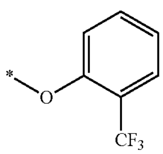 | 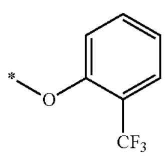 | B337 | B338 | B339 | B340 |
| 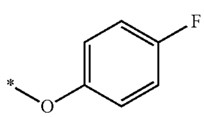 [SMILES: *Oc1ccc(F)cc1] | 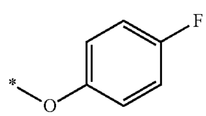 [SMILES: *Oc1ccc(F)cc1] | B341 | B342 | B343 | B344 |
| 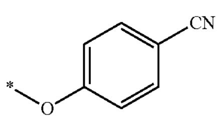 | 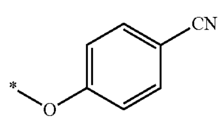 | B345 | B346 | B347 | B348 |
| 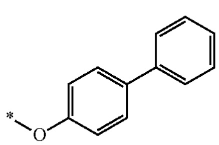 [SMILES: *Oc1ccc(-c2ccccc2)cc1] | 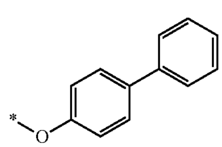 [SMILES: *Oc1ccc(-c2ccccc2)cc1] | B349 | B350 | B351 | B352 |
TABLE 2-3
| | | R7 | | | |
|---|---|---|---|---|---|
| $R_1$ | $R_6$ | 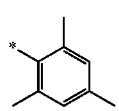 | 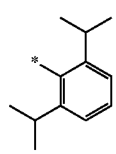 | 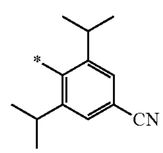 | 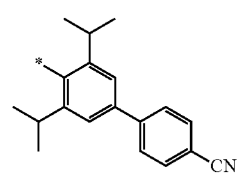 |
| H | H | B353 | B354 | B355 | B356 |
| Cl | H | B357 | B358 | B359 | B360 |
| Cl | Cl | B361 | B362 | B363 | B364 |
| Br | Br | B365 | B366 | B367 | B368 |
| H | CN | B369 | B370 | B371 | B372 |

TABLE 2-3-continued
| | | $R_7$ | | | |
|---|---|---|---|---|---|
| $R_1$ | $R_6$ | 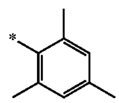 | 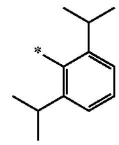 | 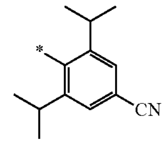 | 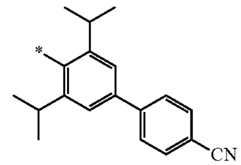 |
| H | *— | B373 | B374 | B375 | B376 |
| *— | *— | B377 | B378 | B379 | B380 |
| H |  | B381 | B382 | B383 | B384 |
| H | 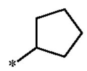 | B386 | B386 | B387 | B388 |
| H | 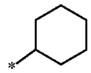 | B389 | B390 | B391 | B392 |
|  |  | B393 | B394 | B395 | B396 |
| 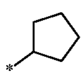 | 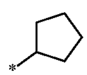 | B397 | B398 | B399 | B400 |
| 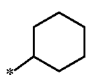 | 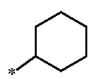 | B401 | B402 | B403 | B404 |
| H | 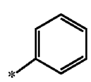 | B406 | B046 | B407 | B408 |
| H | 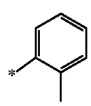 | B409 | B410 | B411 | B412 |
| H | 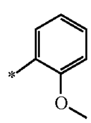 | B413 | B414 | B416 | B416 |
| H | 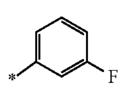 | B417 | B418 | B419 | B420 |
| H | 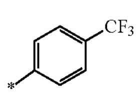 | B421 | B422 | B423 | B424 |
| H | 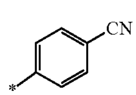 | B425 | B426 | B427 | B428 |
| H | 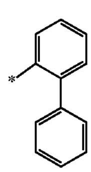 | B429 | B430 | B431 | B432 |

TABLE 2-3-continued
| $R_1$ | $R_6$ | $R_7$ 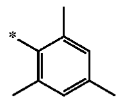 | $R_7$ 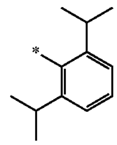 | $R_7$ 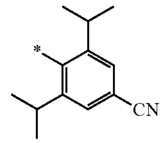 | $R_7$ 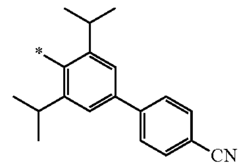 |
|---|---|---|---|---|---|
| 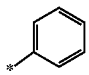 | 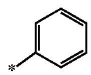 | B433 | B434 | B435 | B436 |
| 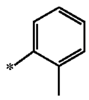 | 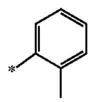 | B437 | B438 | B439 | B440 |
| 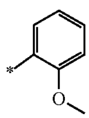 | 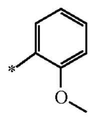 | B441 | B442 | B443 | B444 |
| 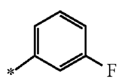 | 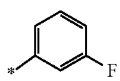 | B445 | B446 | B447 | B448 |
| 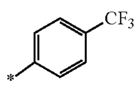 | 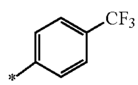 | B449 | B450 | B451 | B452 |
| 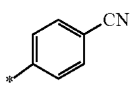 | 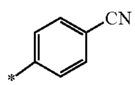 | B453 | B454 | B455 | B456 |
| 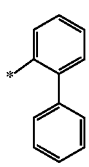 | 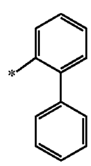 | B457 | B458 | B459 | B460 |
| H | 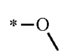 | B461 | B462 | B463 | B464 |
| H | 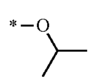 | B465 | B466 | B467 | B468 |
| 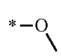 | 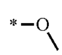 | B469 | B470 | B471 | B472 |
| 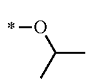 | 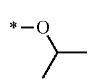 | B473 | B474 | B475 | B476 |
| H | 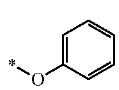 | B477 | B478 | B479 | B480 |
| H | 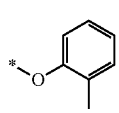 | B481 | B482 | B483 | B484 |
| H | 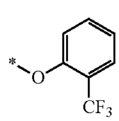 | B485 | B486 | B487 | B488 |

TABLE 2-3-continued
| | | R7 | | | |
|---|---|---|---|---|---|
| R1 | R6 | 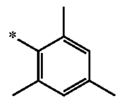 | 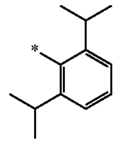 | 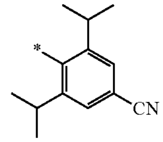 | 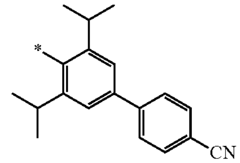 |
| H | 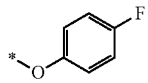 | B489 | B490 | B491 | B492 |
| H | 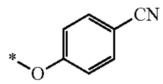 | B493 | B494 | B495 | B496 |
| H | 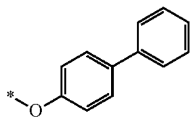 | B407 | B498 | B499 | B500 |
| 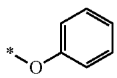 | 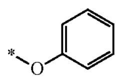 | B501 | B502 | B503 | B504 |
| 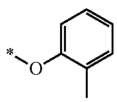 | 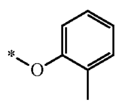 | B505 | B506 | B507 | B508 |
| 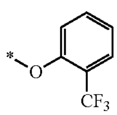 | 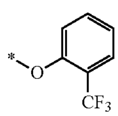 | B509 | B510 | B511 | B512 |
| 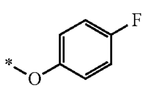 | 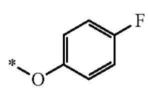 | B513 | B514 | B515 | B516 |
| 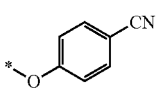 | 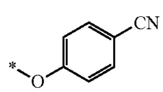 | B517 | B518 | B519 | B520 |
| 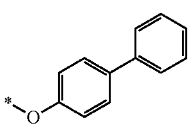 | 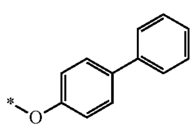 | B521 | B522 | B523 | B524 |
TABLE 2-4
| | | R7 | | | |
|---|---|---|---|---|---|
| R1 | R6 | 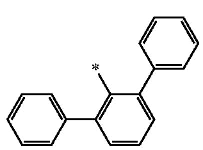 | 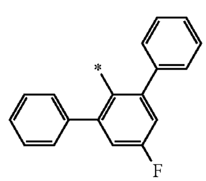 | 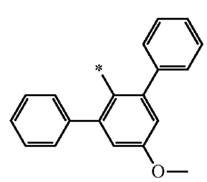 | 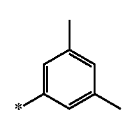 |
| H | H | B525 | B526 | B527 | B528 |
| Cl | H | B529 | B530 | B531 | B532 |
| Cl | Cl | B533 | B534 | B535 | B536 |
| Br | Br | B537 | B538 | B539 | B540 |
| H | CN | B541 | B542 | B543 | B544 |

TABLE 2-4-continued
| | | R7 | | | |
|---|---|---|---|---|---|
| R1 | R6 | 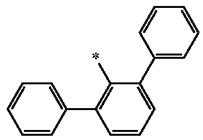 | 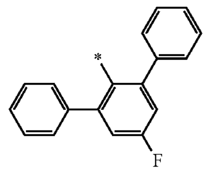 | 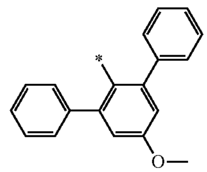 | 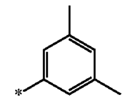 |
| H | *— | B545 | B546 | B547 | B548 |
| *— | *— | B549 | B550 | B551 | B552 |
| H |  | B563 | B554 | B555 | B556 |
| H | 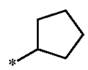 | B557 | B558 | B559 | B560 |
| H | 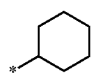 | B561 | B562 | B563 | B564 |
|  |  | B565 | B566 | B567 | B568 |
| 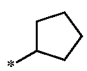 | 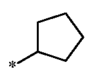 | B569 | B570 | B571 | B572 |
| 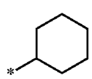 | 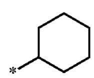 | B573 | B574 | B575 | B576 |
| H | 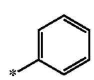 | B577 | B578 | B579 | B580 |
| 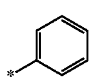 | H | B581 | B582 | B583 | B584 |
| H | 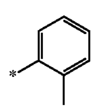 | B585 | B586 | B587 | B588 |
| H | 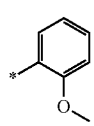 | B589 | B590 | B591 | B592 |
| H | 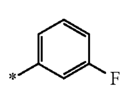 | B593 | B594 | B595 | B596 |
| H | 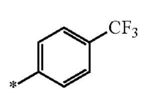 | B597 | B598 | B599 | B600 |
| H | 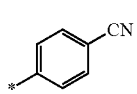 | B601 | B602 | B603 | B604 |

TABLE 2-4-continued
| | | R7 | | | |
|---|---|---|---|---|---|
| $R_1$ | $R_6$ | 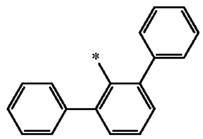 | 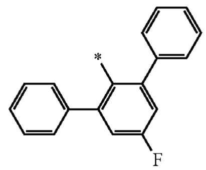 | 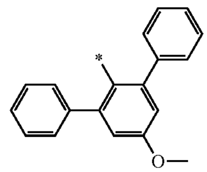 | 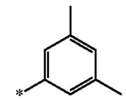 |
| H | 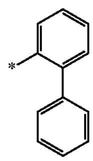 | B605 | B606 | B607 | B608 |
| 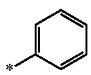 | 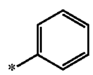 | B609 | B610 | B611 | B612 |
| 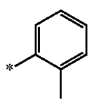 | 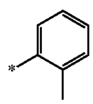 | B613 | B614 | B615 | B616 |
| 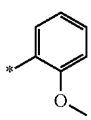 | 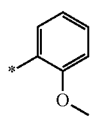 | B617 | B618 | B619 | B620 |
| 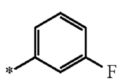 | 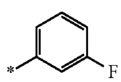 | B621 | B622 | B623 | 8624 |
| 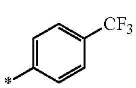 | 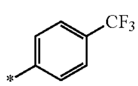 | B625 | B626 | B627 | B628 |
| 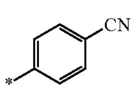 | 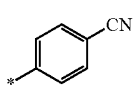 | B629 | B630 | B631 | B632 |
| 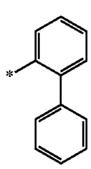 | 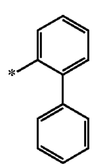 | B633 | B634 | B635 | B636 |
| H | 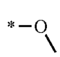 | B637 | B638 | B639 | B640 |
| H | 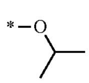 | B641 | B642 | B643 | B644 |
| 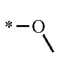 | 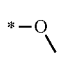 | B645 | B646 | B647 | B648 |
| 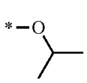 | 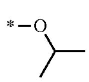 | B649 | B650 | B651 | B652 |
| H | 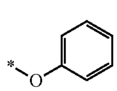 | B653 | B654 | B655 | B656 |

TABLE 2-4-continued
| | | R7 | | | |
|---|---|---|---|---|---|
| R1 | R6 | 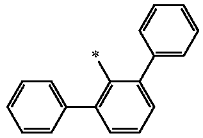 | 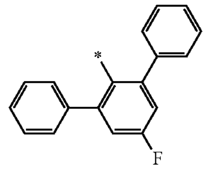 | 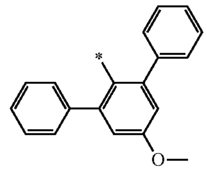 | 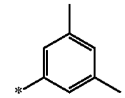 |
| H | 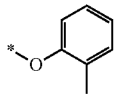 | B657 | B658 | B659 | B660 |
| H | 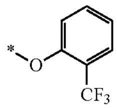 | B661 | B662 | B663 | B664 |
| H | 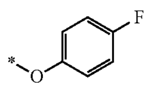 | B665 | B666 | B667 | B668 |
| H | 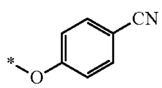 | B669 | B670 | B671 | B672 |
| H | 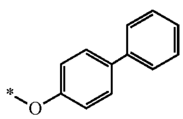 | B673 | B674 | B675 | B676 |
| 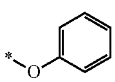 | 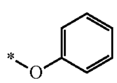 | B677 | B678 | B679 | B680 |
| 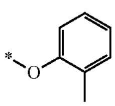 | 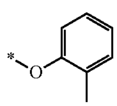 | B681 | B682 | B683 | B684 |
| 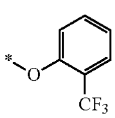 | 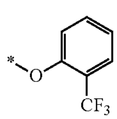 | B685 | B686 | B687 | B688 |
| 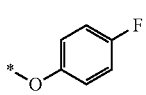 | 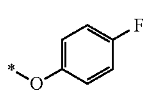 | B689 | B690 | B691 | B692 |
| 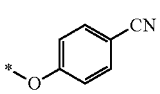 | 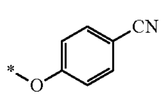 | B693 | B694 | B695 | B696 |
| 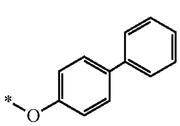 | 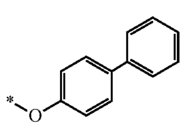 | B697 | B698 | B699 | B700 |

TABLE 2-5
| | | R7 | | | |
|---|---|---|---|---|---|
| R1 | R6 | 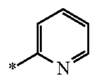 | 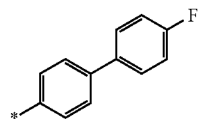 | 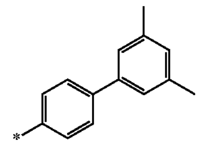 | 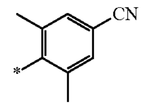 |
| H | H | B701 | B702 | B703 | B704 |
| Cl | H | B705 | B706 | B707 | B708 |
| Cl | Cl | B709 | B710 | B711 | B712 |
| Br | Br | B713 | B714 | B715 | B716 |
| H | CN | B717 | B718 | B719 | B720 |
| H | *— | B721 | B722 | B723 | B724 |
| *— | *— | B725 | B726 | B727 | B728 |
| H |  | B729 | B730 | B731 | B732 |
| H | 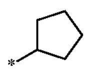 | B733 | B734 | B735 | B736 |
| H | 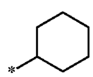 | B737 | B738 | B739 | B740 |
|  |  | B741 | B742 | B743 | B744 |
| 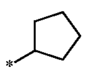 | 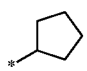 | B745 | B746 | B747 | B748 |
| 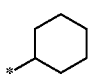 | 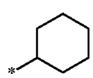 | B749 | B750 | B751 | B752 |
| H | 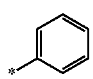 | B753 | B754 | B755 | B756 |
| H | 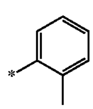 | B757 | B758 | B759 | B760 |
| H | 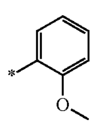 | B761 | B762 | B763 | 8764 |
| H | 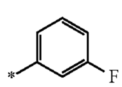 | B765 | B766 | B767 | B768 |
| H | 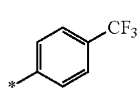 | B769 | B770 | B771 | B772 |
| H | 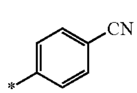 | B773 | B774 | B775 | B776 |

TABLE 2-5-continued
| | | R7 | | | |
|---|---|---|---|---|---|
| R1 | R6 | 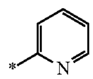 | 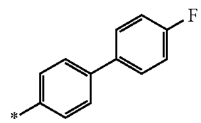 | 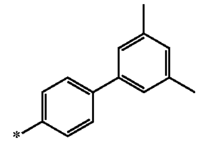 | 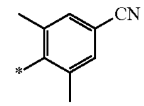 |
| H | 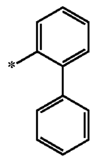 | B777 | B778 | B779 | B780 |
| 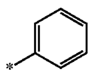 | 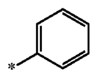 | B781 | B782 | B733 | B784 |
| 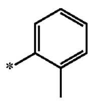 | 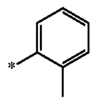 | B785 | B786 | B787 | B788 |
| 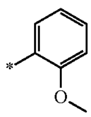 | 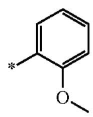 | B789 | B790 | B791 | B792 |
| 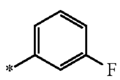 | 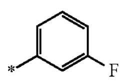 | B793 | B794 | B795 | B796 |
| 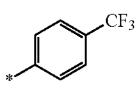 | 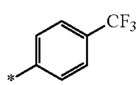 | B797 | B798 | B799 | B800 |
| 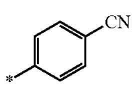 | 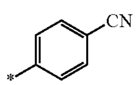 | B801 | B802 | B803 | B804 |
| 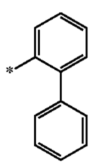 | 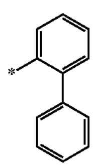 | B805 | B806 | B807 | B808 |
| H | 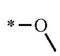 | B809 | B810 | B811 | B812 |
| H | 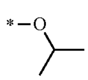 | B813 | B814 | B815 | B816 |
| 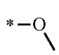 | 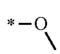 | B817 | B818 | B819 | B820 |
| 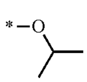 | 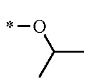 | B821 | B822 | B823 | B824 |
| H | 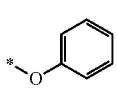 | B825 | B826 | B827 | B828 |

TABLE 2-5-continued
| | | $R_7$ | | | |
|---|---|---|---|---|---|
| $R_1$ | $R_6$ | 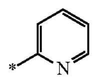 | 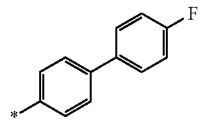 | 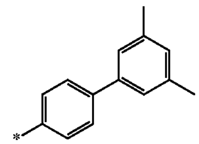 | 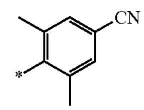 |
| H | 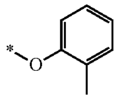 | B829 | B830 | B831 | B832 |
| H | 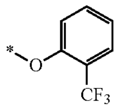 | B833 | B834 | B835 | B836 |
| H | 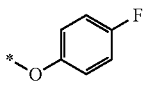 | B837 | B838 | B839 | B840 |
| H | 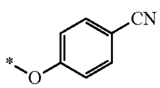 | B841 | B842 | B843 | B844 |
| H | 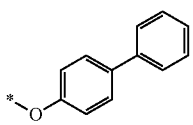 | B845 | B846 | B847 | B848 |
| 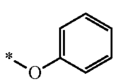 | 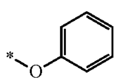 | B849 | B850 | B851 | B852 |
| 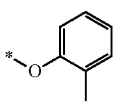 | 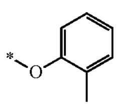 | B853 | B854 | B855 | B856 |
| 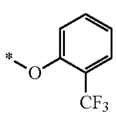 | 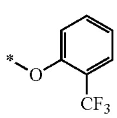 | B857 | B858 | B859 | B860 |
| 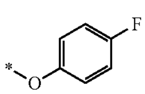 | 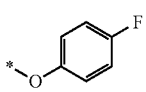 | B861 | B862 | B863 | B864 |
| 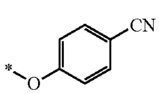 | 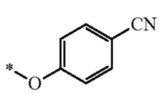 | B865 | B866 | B867 | B868 |
| 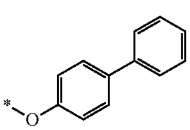 | 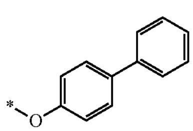 | B869 | B870 | B871 | B872 |
| 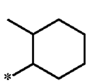 | 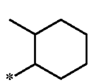 | B873 | B874 | B875 | B876 |

TABLE 2-6
| | | R7 | | | |
|---|---|---|---|---|---|
| R1 | R6 | 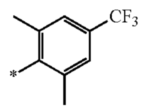 | 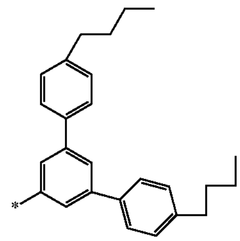 | 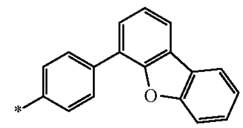 | 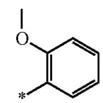 |
| H | H | B877 | B878 | B879 | B880 |
| Cl | H | B881 | B882 | B883 | B884 |
| Cl | Cl | B885 | B886 | B887 | B888 |
| Br | Br | B889 | B890 | B891 | B892 |
| H | CN | B893 | B894 | B895 | B896 |
| H | *— | B897 | B898 | B899 | B900 |
| *— | *— | B901 | B902 | B903 | B904 |
| H | 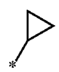 | B905 | B906 | B907 | B908 |
| H | 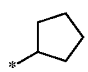 | B909 | B910 | B911 | B912 |
| 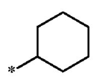 | H | B913 | B914 | B915 | B916 |
|  |  | B917 | B918 | B919 | B920 |
| 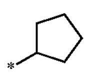 | 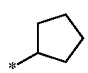 | B921 | B922 | B923 | B924 |
| 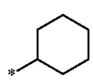 | 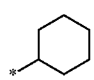 | B925 | B926 | B927 | B928 |
| H | 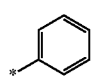 | B929 | B930 | B931 | B932 |
| H | 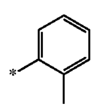 | B933 | B934 | B935 | B936 |
| H | 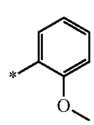 | B937 | B938 | B939 | B940 |
| H | 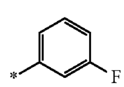 | B941 | B942 | B943 | B944 |
| H | 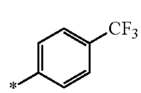 | B945 | B946 | B947 | B948 |
| H | 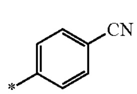 | B949 | B950 | B951 | B952 |

TABLE 2-6-continued
| $R^1$ | $R^6$ | $R^7$ | | | |
|---|---|---|---|---|---|
| | | 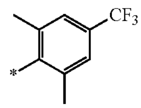 | 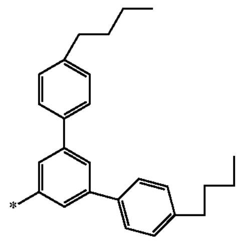 | 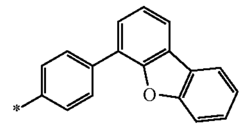 | 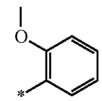 |
| H | 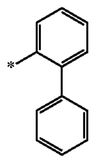 | B953 | B954 | B955 | B956 |
| 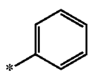 | 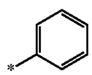 | B957 | B958 | B959 | B960 |
| 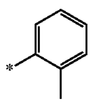 | 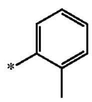 | B961 | B962 | B963 | B964 |
| 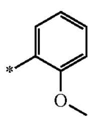 | 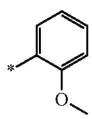 | B965 | B966 | B967 | B968 |
| 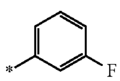 | 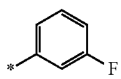 | B969 | B970 | B971 | B972 |
| 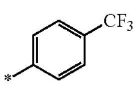 | 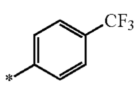 | B973 | B974 | B975 | B976 |
| 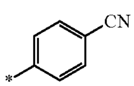 | 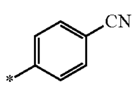 | B977 | B978 | B979 | B980 |
| 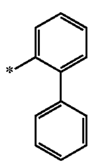 | 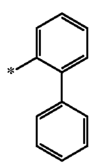 | B981 | B982 | B983 | B983 |
| H | 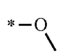 | B985 | B986 | B987 | B988 |
| H | 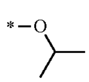 | B989 | B990 | B991 | B992 |
| 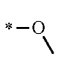 | 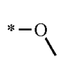 | B993 | B994 | B995 | B996 |
| 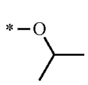 | 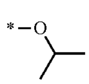 | B997 | B998 | B999 | B1000 |
| H | 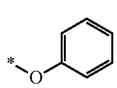 | B1001 | B1002 | B1003 | B1004 |

TABLE 2-6-continued
| | | $R^7$ | | | |
|---|---|---|---|---|---|
| $R^1$ | $R^6$ | 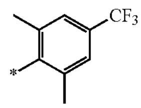 | 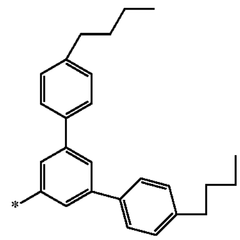 | 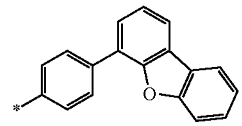 | 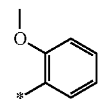 |
| H | 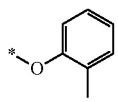 | B1005 | B1006 | B1007 | B1008 |
| H | 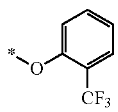 | B1009 | B1010 | B1011 | B1012 |
| H | 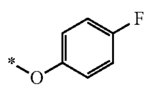 | B1013 | B1014 | B1016 | B1016 |
| H | 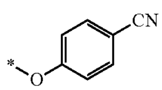 | B1017 | B1018 | B1019 | B1020 |
| H | 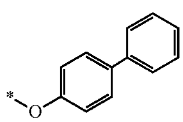 | B1021 | B1022 | B1023 | B1024 |
| 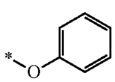 | 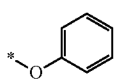 | B1025 | B1026 | B1027 | B1028 |
| 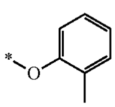 | 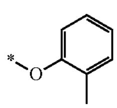 | B1029 | B1030 | B1031 | B1032 |
| 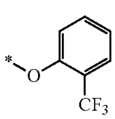 | 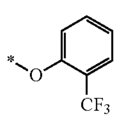 | B1033 | B1034 | B1035 | B1036 |
| 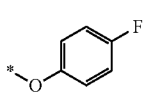 | 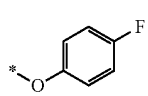 | B1037 | B1038 | B1039 | B1040 |
| 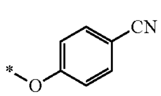 | 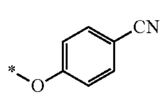 | B1041 | B1042 | B1043 | B1044 |
| 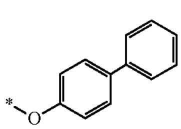 | 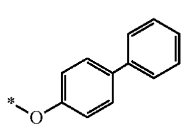 | B1045 | B1046 | B1047 | B1048 |
| 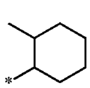 | 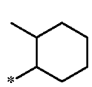 | B1049 | B1050 | B1051 | B1052 |

TABLE 2-7
| | | R7 | | | |
|---|---|---|---|---|---|
| $R_1$ | $R_6$ | 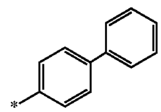 | 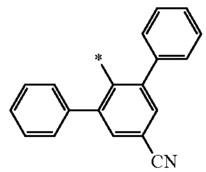 | 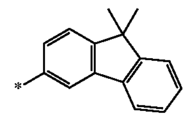 | 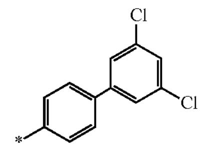 |
| H | H | B1053 | B1054 | B1055 | B1056 |
| Cl | H | B1057 | B1058 | B1059 | B1060 |
| Cl | Cl | B1061 | B1062 | B1063 | B1064 |
| Br | Br | B1065 | B1066 | B1067 | B1068 |
| H | CN | B1069 | B1070 | B1071 | B1072 |
| H | *— | B1073 | B1074 | B1075 | B1076 |
| *— | *— | B1077 | B1078 | B1079 | B1080 |
| H |  | B1081 | B1082 | B1083 | B1084 |
| H | 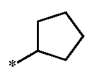 | B1085 | B1086 | B1087 | B1088 |
| H | 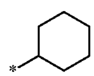 | B1089 | B1090 | B1091 | B1092 |
|  |  | B1093 | B1094 | B1095 | B1096 |
| 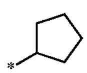 | 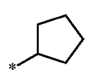 | B1097 | B1093 | B1099 | B1100 |
| 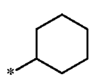 | 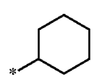 | B1101 | B1102 | B1103 | B1104 |
| H | 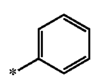 | B1105 | B1106 | B1107 | B1108 |
| H | 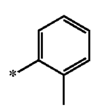 | B1109 | B1110 | B1111 | B1112 |
| H | 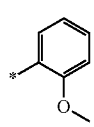 | B1113 | B1114 | B1115 | B1116 |
| H | 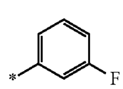 | B1117 | B1118 | B1119 | B1120 |
| H | 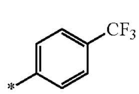 | B1121 | B1122 | B1123 | B1123 |
| H | 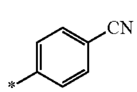 | B1124 | B1125 | B1126 | B1127 |

TABLE 2-7-continued
| | | $R_7$ | | | |
|---|---|---|---|---|---|
| $R_1$ | $R_6$ | 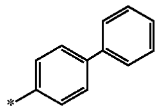 | 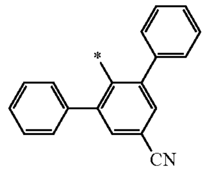 | 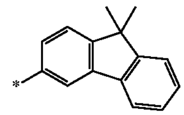 | 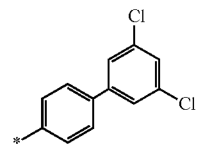 |
| H | 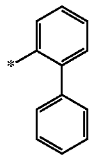 | B1128 | B1129 | B1130 | B1131 |
| 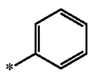 | 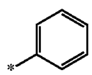 | B11132 | B1133 | B1134 | B1135 |
| 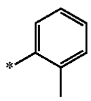 | 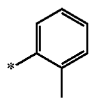 | B1136 | B1137 | B1138 | B1139 |
| 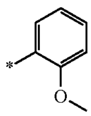 | 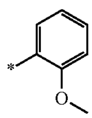 | B1140 | B1141 | B1142 | B1143 |
| 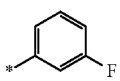 | 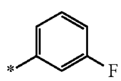 | B1144 | B1145 | B1146 | B1147 |
| 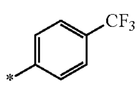 | 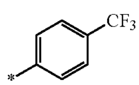 | B1143 | B1149 | B1150 | B1151 |
| 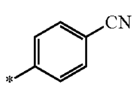 | 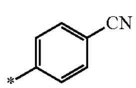 | B1152 | B1153 | B1154 | B1155 |
| 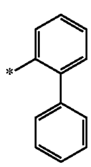 | 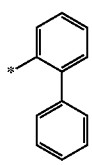 | B1156 | B1157 | B1158 | B1159 |
| H | 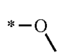 | B1160 | B1161 | B1162 | B1163 |
| H | 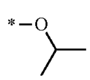 | B1164 | B1165 | B1166 | B1167 |
| 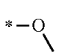 | 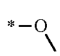 | B1168 | B1169 | B1170 | B1171 |
| 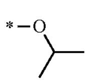 | 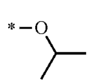 | B1172 | B1173 | B1174 | B1175 |
| H | 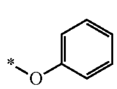 | B1176 | B1177 | B1178 | B1179 |

TABLE 2-7-continued
| | | $R_7$ | | | |
|---|---|---|---|---|---|
| $R_1$ | $R_6$ | 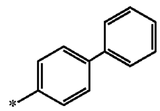 | 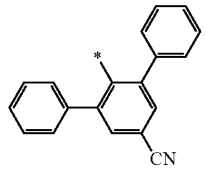 | 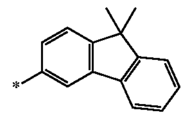 | 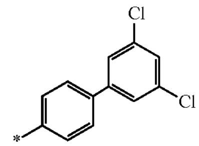 |
| H | 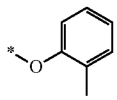 | B1180 | B1181 | B1182 | B1183 |
| H | 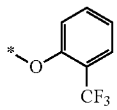 | B1184 | B1185 | B1186 | B1187 |
| H | 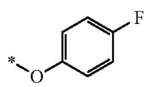 | B1188 | B1189 | B1190 | B1191 |
| H | 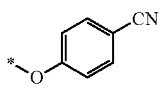 | B1192 | B1193 | B1194 | B1195 |
| H | 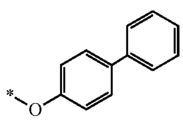 | B1196 | B1197 | B1198 | B1199 |
| 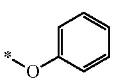 | 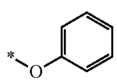 | B1200 | B1201 | B1202 | B1203 |
| 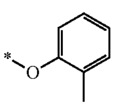 | 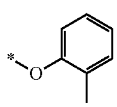 | B1204 | B1205 | B1206 | B1207 |
| 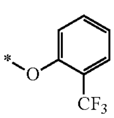 | 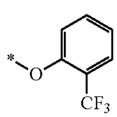 | B1208 | B1209 | B1210 | B1211 |
| 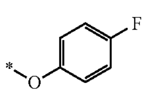 | 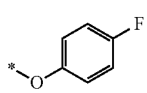 | B1212 | B1213 | B1214 | B1215 |
| 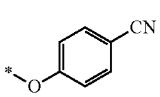 | 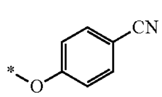 | B1216 | B1217 | B1218 | B1219 |
| 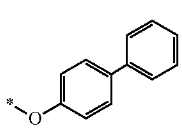 | 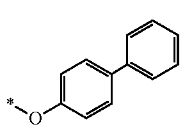 | B1220 | B1221 | B1222 | B1223 |

TABLE 2-7-continued
| | | $R_7$ | | | |
|---|---|---|---|---|---|
| $R_1$ | $R_6$ | 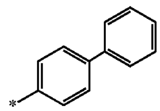 | 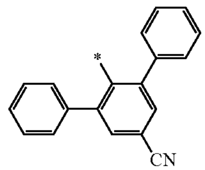 | 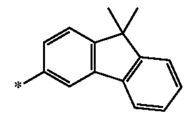 | 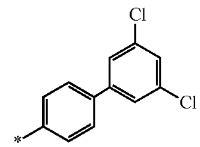 |
| 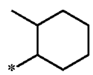 | 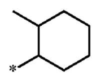 | B1224 | B1225 | B1226 | B1227 |
| 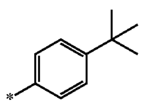 | H | B1228 | B1229 | B1230 | B1231 |
TABLE 2-8
| | | $R_7$ | | | |
|---|---|---|---|---|---|
| $R_1$ | $R_6$ | 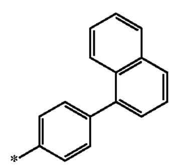 | 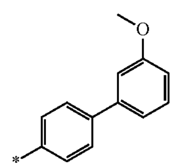 | 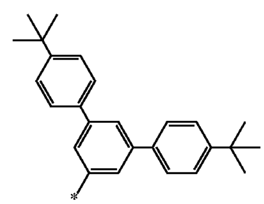 | 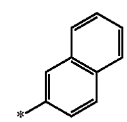 |
| H | H | B1232 | B1233 | B1234 | B1235 |
| Cl | H | B1236 | B1237 | B1237 | B1238 |
| Cl | Cl | B1239 | B1240 | B1241 | B1242 |
| Br | Br | B1243 | B1244 | B1245 | B1246 |
| H | CN | B1247 | B1248 | B1249 | B1250 |
| H | *— | B1251 | B1252 | B1253 | B1254 |
| *— | *— | B1255 | B1256 | B1257 | B1258 |
| H |  | B1259 | B1260 | B1261 | B1262 |
| H | 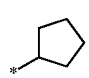 | B1263 | B1264 | B1265 | B1266 |
| H | 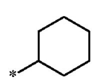 | B1267 | B1268 | B1269 | B1270 |
| 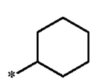 | H | B1271 | B1272 | B1273 | B1274 |
|  |  | B1275 | B1276 | B1277 | B1278 |
| 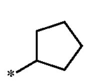 | 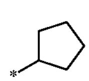 | B1279 | B1280 | B1281 | B1282 |
| 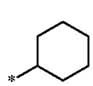 | 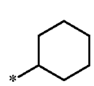 | B1283 | B1284 | B1285 | B1286 |

TABLE 2-8-continued
| | | $R_7$ | | | |
|---|---|---|---|---|---|
| $R_1$ | $R_6$ | 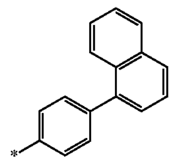 | 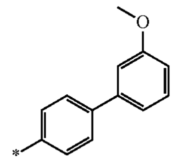 | 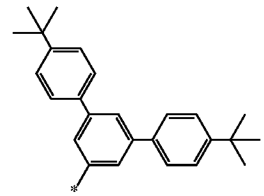 | 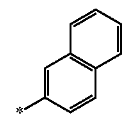 |
| H | 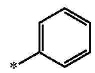 | B1287 | B1288 | B1289 | B1290 |
| 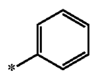 | H | B1291 | B1292 | B1293 | B1294 |
| H | 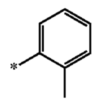 | B1295 | B1296 | B1297 | B1298 |
| H | 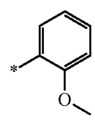 | B1299 | B1300 | B1301 | B1302 |
| H | 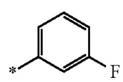 | B1303 | B1304 | B1035 | B1306 |
| H | 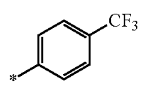 | B1037 | B1308 | B1309 | B1310 |
| H | 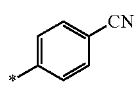 | B1311 | B1312 | B1313 | B1314 |
| H | 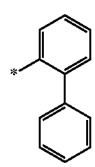 | B1315 | B1316 | B1317 | B1318 |
| 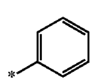 | 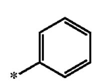 | B1319 | B1320 | B321 | B1322 |
| 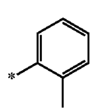 | 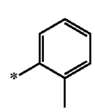 | B1323 | B1324 | B1325 | B1326 |
| 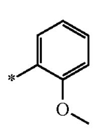 | 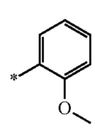 | B1327 | B1328 | B1329 | B1330 |
| 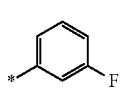 | 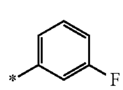 | B1331 | B1332 | B1333 | B1334 |
| 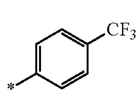 | 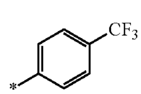 | B1335 | B1336 | B1337 | B1338 |

TABLE 2-8-continued
| | | $R_7$ | | | |
|---|---|---|---|---|---|
| $R_1$ | $R_6$ | 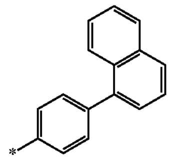 | 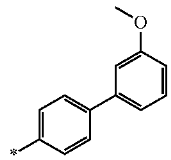 | 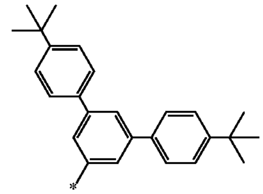 | 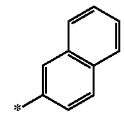 |
| 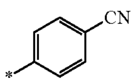 | 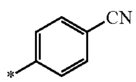 | B1339 | B1340 | B1341 | B1342 |
| 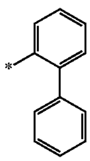 | 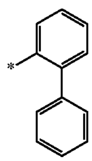 | B1343 | B1344 | B1345 | B1346 |
| H | 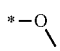 | B1347 | B1348 | B1349 | B1350 |
| H | 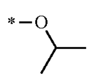 | B1351 | B1352 | B1353 | B1354 |
| 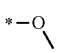 | 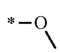 | B1355 | B1356 | B1357 | B1358 |
| 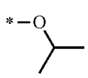 | 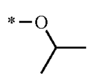 | B1359 | B1360 | B1361 | B1362 |
| H | 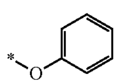 | B1363 | B1364 | B1365 | B1366 |
| H | 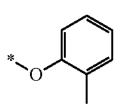 | B1367 | B1368 | B1369 | B1370 |
| H | 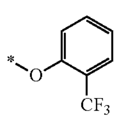 | B1371 | B1372 | B1373 | B1374 |
| H | 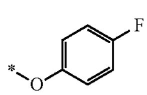 | B1375 | B1376 | B1377 | B1378 |
| H | 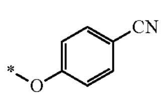 | B1379 | B1380 | B1381 | B1382 |
| H | 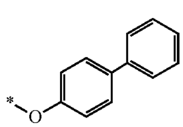 | B1383 | B1384 | B1385 | B1386 |
| 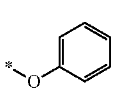 | 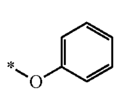 | B1387 | B1388 | B1389 | B1390 |

TABLE 2-8-continued
| R1 | R6 | R7: 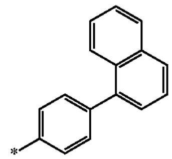 | R7: 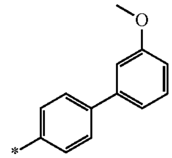 | R7: 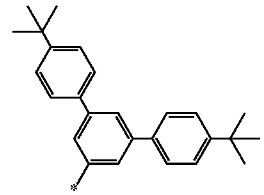 | R7: 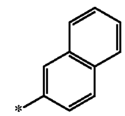 |
|---|---|---|---|---|---|
| 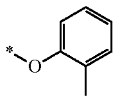 | 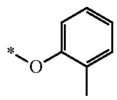 | B1391 | B1392 | B1393 | B1394 |
| 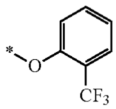 | 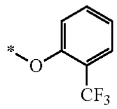 | B1395 | B1396 | B1397 | B1398 |
| 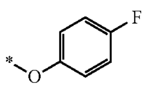 | 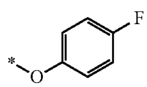 | B1399 | B1400 | B1401 | B1402 |
| 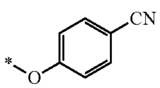 | 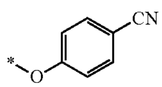 | B1403 | B1404 | B1405 | B1406 |
| 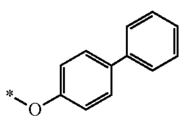 | 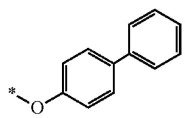 | B1407 | B1408 | B1409 | B1410 |
| 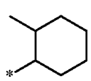 | 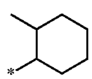 | B1411 | B1412 | B1413 | B1414 |
| 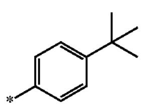 | H | B1416 | B1416 | 81417 | B1418 |
TABLE 2-9
| R1 | R6 | R7: 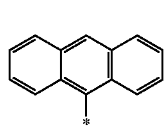 | R7: 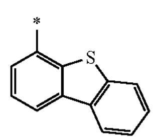 | R7: 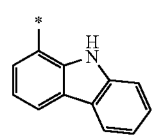 |
|---|---|---|---|---|
| H | H | B1419 | B1420 | B1421 |
| Cl | H | B1422 | B1423 | B1424 |
| Cl | Cl | B1425 | B1426 | B1427 |
| Br | Br | B1428 | B1429 | B1430 |
| H | CN | B1431 | B1432 | B1433 |
| H | *— | B1434 | B1435 | B1436 |
| *— | *— | B1437 | B1438 | B1439 |
| H |  | B1440 | B1441 | B1442 |
| H | 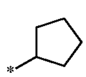 | B1443 | B1444 | B1445 |

TABLE 2-9-continued
| | | R7 | | |
|---|---|---|---|---|
| R1 | R6 | 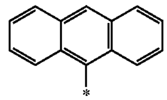 | 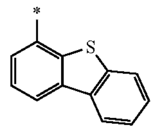 | 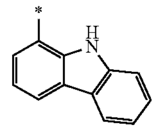 |
| H | 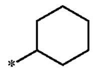 | B1446 | B1447 | B1448 |
| 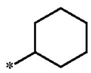 | H | B1449 | B1450 | B1451 |
|  |  | B1452 | B1453 | 81454 |
| 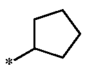 | 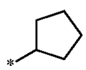 | B1455 | B1456 | B1457 |
| 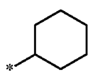 | 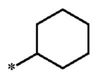 | B1458 | B1459 | B1460 |
| H | 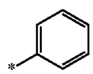 | B1461 | B1462 | B1463 |
| 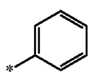 | H | B1464 | B1465 | B1466 |
| H | 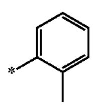 | B1467 | B1468 | B1469 |
| H | 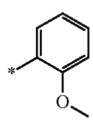 | B1470 | B1471 | B1472 |
| H | 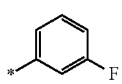 | B1473 | B1474 | B1475 |
| H | 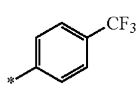 | B1476 | B1477 | B1478 |
| H | 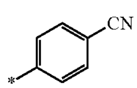 | B1479 | B1480 | B1481 |
| H | 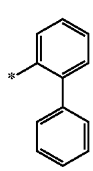 | B1482 | B1483 | B1484 |
| 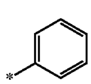 | 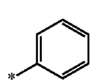 | B1485 | B1486 | B1487 |

TABLE 2-9-continued
| | | $R_7$ | | |
|---|---|---|---|---|
| $R_1$ | $R_6$ | 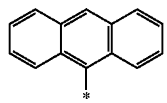 | 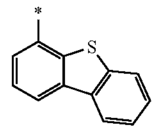 | 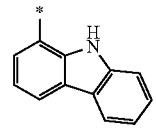 |
| 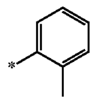 | 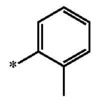 | B1488 | B1489 | B1490 |
| 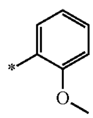 | 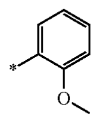 | B1491 | B1492 | B1493 |
| 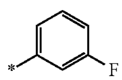 | 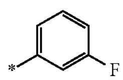 | B1494 | B1495 | B1496 |
| 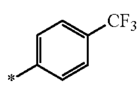 | 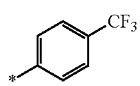 | B1497 | B1498 | B1499 |
| 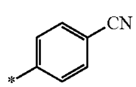 | 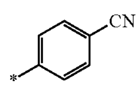 | B1500 | B1501 | B1502 |
| 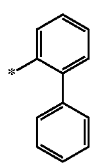 | 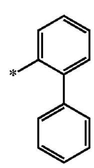 | B1503 | B1504 | B1505 |
| H | 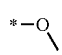 | B1506 | B1507 | B1508 |
| H | 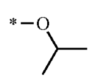 | B1509 | B1510 | B1511 |
| 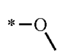 | 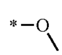 | B1512 | B1513 | B1514 |
| 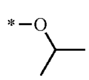 | 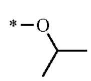 | B1515 | B1516 | B1517 |
| H | 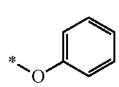 | B1518 | B1519 | B1520 |
| 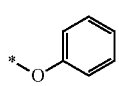 | H | B1521 | B1522 | B1523 |
| H | 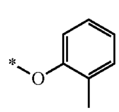 | B1524 | B1525 | B1526 |
| H | 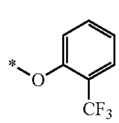 | B1527 | B1528 | B1529 |

TABLE 2-9-continued
| | | $R_7$ | | |
|---|---|---|---|---|
| $R_1$ | $R_6$ | 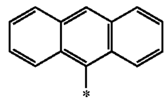 | 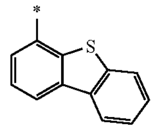 | 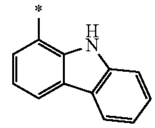 |
| H | 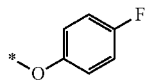 | B1530 | B1531 | B1532 |
| H | 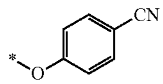 | B1533 | B1534 | B1535 |
| H | 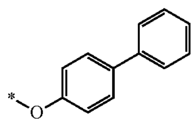 | B1536 | B1537 | B1538 |
| 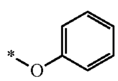 | 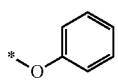 | B1539 | B1540 | B1541 |
| 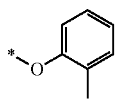 | 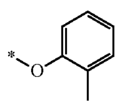 | B1542 | B1543 | B1544 |
| 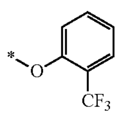 | 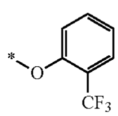 | B1545 | B1546 | B1547 |
| 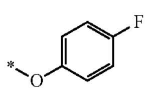 | 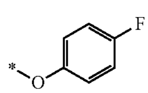 | B1548 | B1549 | B1550 |
| 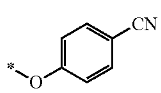 | 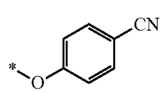 | B1551 | B1552 | B1553 |
| 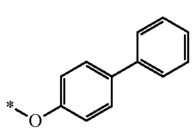 | 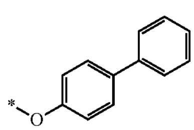 | B1554 | B1555 | B1556 |
| 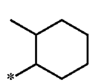 | 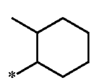 | B1557 | B1558 | B1559 |
| 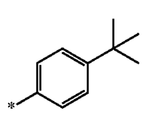 | H | B1560 | B1561 | B1562 |
| H | 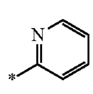 | B1563 | B1564 | B1565 |
| 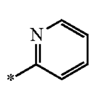 | 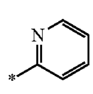 | B1566 | B1567 | B1568 |

TABLE 2-9-continued
| R1 | R6 | R7 | | |
|---|---|---|---|---|
| | | 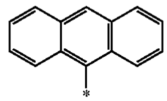 | 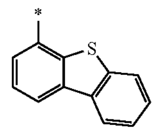 | 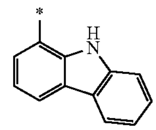 |
| 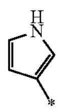 | H | B1569 | B1570 | B1571 |
| 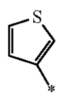 | 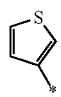 | B1572 | B1573 | B1574 |
| H | 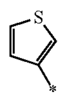 | B1575 | B1576 | B1577 |
TABLE 3-1
| R2 | R5 | R3, R4 | | | | |
|---|---|---|---|---|---|---|
| | | 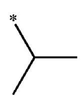 [SMILES: *C(C)C] | 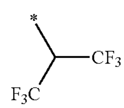 | 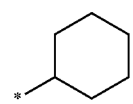 [SMILES: *C1CCCCC1] | 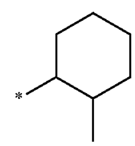 | 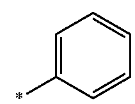 [SMILES: *c1ccccc1] |
| 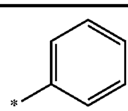 | 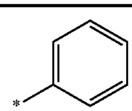 | C1 | C2 | C3 | C4 | C5 |
| 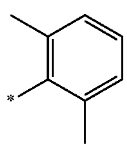 | 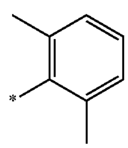 | C6 | C7 | C8 | C9 | C10 |
| 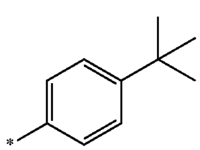 [SMILES: *c1ccc(C(C)(C)C)cc1] | 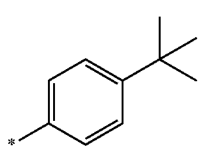 [SMILES: *c1ccc(C(C)(C)C)cc1] | C11 | C12 | C13 | C14 | C15 |
| 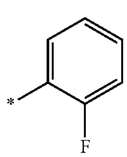 | 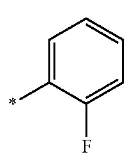 | C16 | C17 | C18 | C19 | C20 |
| 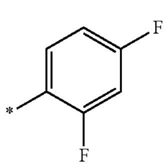 | 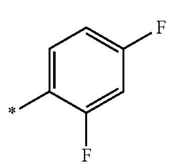 | C21 | C22 | C23 | C24 | C25 |

TABLE 3-1-continued
| | | R3, R4 | | | | |
|---|---|---|---|---|---|---|
| $R_2$ | $R_5$ | 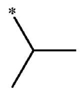 | 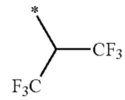 | 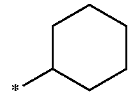 | 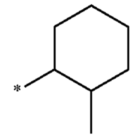 | 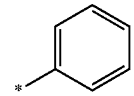 |
| 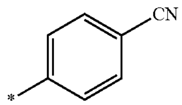 [SMILES: *c1ccc(C#N)cc1] | 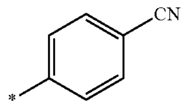 | C26 | C27 | C28 | C29 | C30 |
| 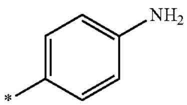 | 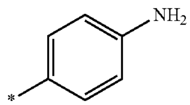 | C31 | C32 | C33 | C34 | C35 |
| 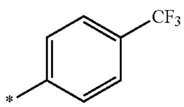 [SMILES: *c1ccc(C(F)(F)F)cc1] | 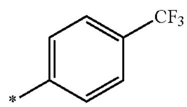 [SMILES: *c1ccc(C(F)(F)F)cc1] | C36 | C37 | C38 | C39 | C40 |
| 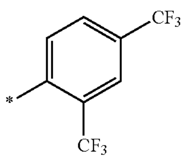 | 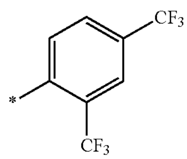 | C41 | C42 | C43 | C44 | C45 |
| 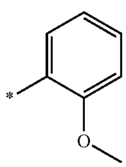 [SMILES: *c1ccccc1OC] | 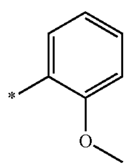 [SMILES: *c1ccccc1OC] | C46 | C47 | C48 | C49 | C50 |
| 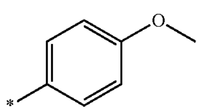 [SMILES: *c1ccc(OC)cc1] | 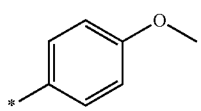 [SMILES: *c1ccc(OC)cc1] | C51 | C52 | C53 | C54 | C55 |
| 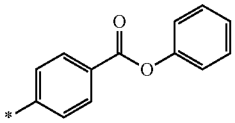 [SMILES: *c1ccc(C(=O)Oc2ccccc2)cc1] | 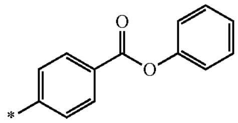 [SMILES: *c1ccc(C(=O)Oc2ccccc2)cc1] | C56 | C57 | C58 | C59 | C60 |
| 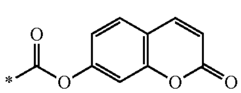 | 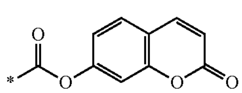 | C61 | C62 | C63 | C64 | C65 |
| 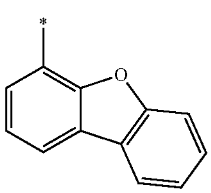 | 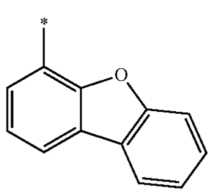 [SMILES: *c1cccc2c1oc1ccccc12] | C66 | C67 | C68 | C69 | C70 |
| 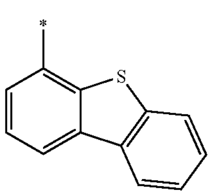 [SMILES: *c1cccc2c1sc1ccccc12] | 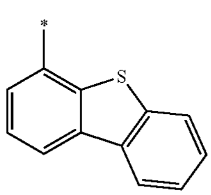 [SMILES: *c1cccc2c1sc1ccccc12] | C71 | C72 | C73 | C74 | C75 |

TABLE 3-1-continued
| | | $R_3$, $R_4$ | | | | |
|---|---|---|---|---|---|---|
| $R_2$ | $R_5$ | 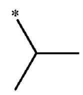 | 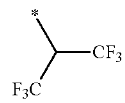 | 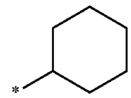 | 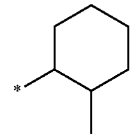 | 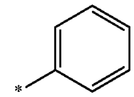 |
| 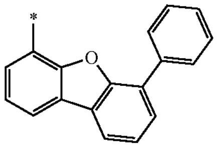 | 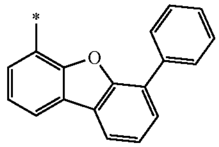 [SMILES: *c1cccc2c1oc1c(-c3ccccc3)cccc12] | C76 | C77 | C78 | C79 | C80 |
| 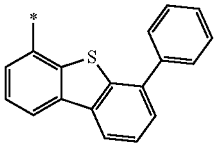 [SMILES: *c1cccc2c1sc1c(-c3ccccc3)cccc12] | 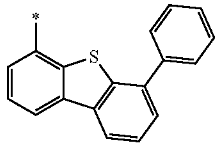 [SMILES: *c1cccc2c1sc1c(-c3ccccc3)cccc12] | C81 | C82 | C83 | C84 | C85 |
| 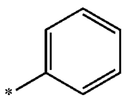 [SMILES: *c1ccccc1] | 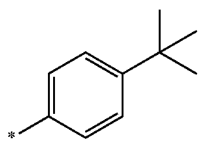 [SMILES: *c1ccc(C(C)(C)C)cc1] | C86 | C87 | C88 | C89 | C90 |
| 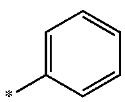 [SMILES: *c1ccccc1] | 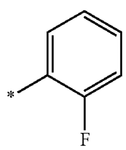 [SMILES: *c1ccccc1F] | C91 | C92 | C93 | C94 | C95 |
| 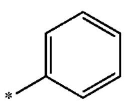 [SMILES: *c1ccccc1] | 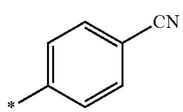 [SMILES: *c1ccc(C#N)cc1] | C96 | C97 | C98 | C99 | C100 |
| 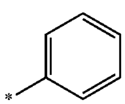 [SMILES: *c1ccccc1] | 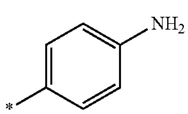 [SMILES: *c1ccc(N)cc1] | C101 | C102 | C103 | C104 | C105 |
| 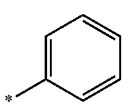 [SMILES: *c1ccccc1] | 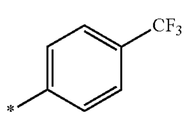 [SMILES: *c1ccc(C(F)(F)F)cc1] | C106 | C107 | C108 | C109 | C110 |
| 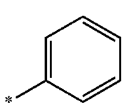 [SMILES: *c1ccccc1] | 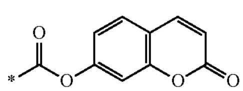 | C111 | C112 | C113 | C114 | C115 |
| 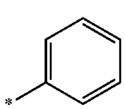 [SMILES: *c1ccccc1] | 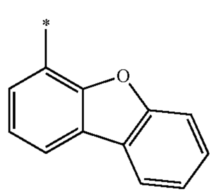 [SMILES: *c1cccc2c1oc1ccccc12] | C116 | C117 | C118 | C119 | C120 |

TABLE 3-1-continued
| | | R3, R4 | | | | |
|---|---|---|---|---|---|---|
| R2 | R5 | 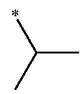 | 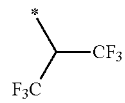 | 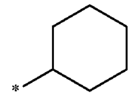 | 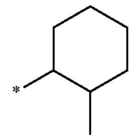 | 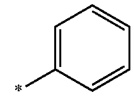 |
| 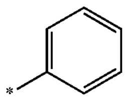 [SMILES: *c1ccccc1] | 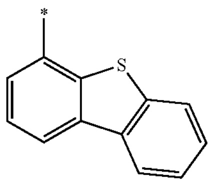 [SMILES: *c1cccc2c1sc1ccccc12] | C121 | C122 | C123 | C124 | C125 |
| 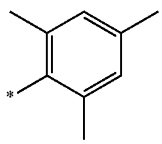 [SMILES: *c1c(C)cc(C)cc1C] | 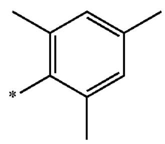 [SMILES: *c1c(C)cc(C)cc1C] | C126 | C127 | C128 | C129 | C130 |
| 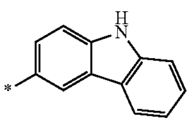 [SMILES: *c1ccc2[nH]c3ccccc3c2c1] | 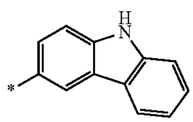 [SMILES: *c1ccc2[nH]c3ccccc3c2c1] | C131 | C132 | C133 | C134 | C135 |
| 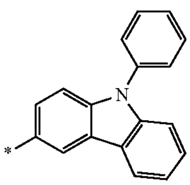 [SMILES: *c1ccc2c(c1)c1ccccc1n2-c1ccccc1] | 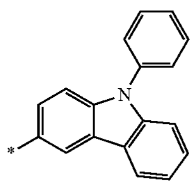 [SMILES: *c1ccc2c(c1)c1ccccc1n2-c1ccccc1] | C136 | C137 | C138 | C139 | C140 |
TABLE 3-2
| | | R3, R4 | | | |
|---|---|---|---|---|---|
| R2 | R5 | 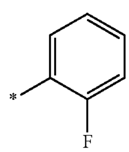 [SMILES: *c1ccccc1F] | 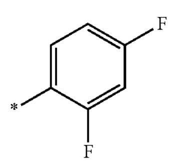 [SMILES: *c1ccc(F)cc1F] | 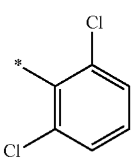 [SMILES: *c1c(Cl)cccc1Cl] | 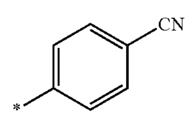 |
| 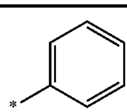 | 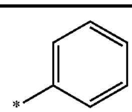 | C141 | C142 | C143 | C144 |
| 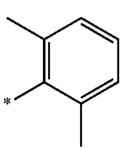 [SMILES: *c1c(C)cccc1C] | 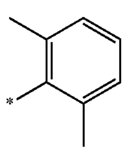 [SMILES: *c1c(C)cccc1C] | C145 | C146 | C147 | C148 |
| 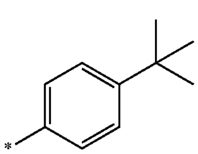 [SMILES: *c1ccc(C(C)(C)C)cc1] | 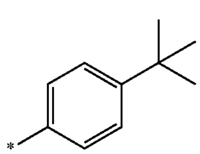 [SMILES: *c1ccc(C(C)(C)C)cc1] | C149 | C150 | C151 | C152 |

TABLE 3-2-continued
| | | R3, R4 | | | |
|---|---|---|---|---|---|
| R2 | R5 | 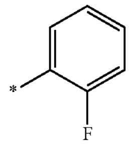 [SMILES: *c1ccccc1F] | 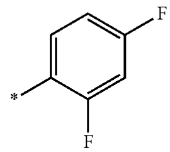 | 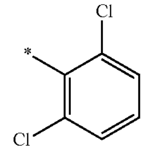 | 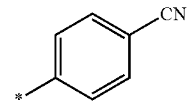 |
| 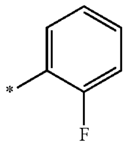 | 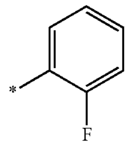 [SMILES: *c1ccccc1F] | C153 | C154 | C155 | C156 |
| 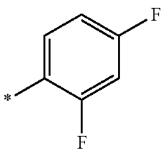 [SMILES: *c1ccc(F)cc1F] | 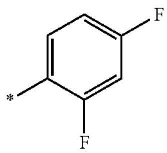 [SMILES: *c1ccc(F)cc1F] | C157 | C158 | C159 | C160 |
| 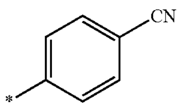 [SMILES: *c1ccc(C#N)cc1] | 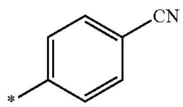 [SMILES: *c1ccc(C#N)cc1] | C161 | C162 | C163 | C164 |
| 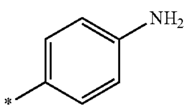 [SMILES: *c1ccc(N)cc1] | 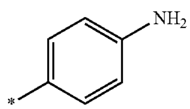 [SMILES: *c1ccc(N)cc1] | C165 | C166 | C167 | C168 |
| 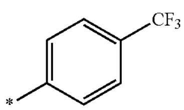 [SMILES: *c1ccc(C(F)(F)F)cc1] | 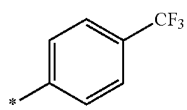 [SMILES: *c1ccc(C(F)(F)F)cc1] | C169 | C170 | C171 | C172 |
| 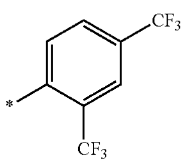 [SMILES: *c1ccc(C(F)(F)F)cc1C(F)(F)F] | 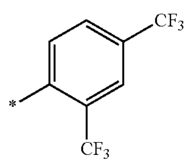 [SMILES: *c1ccc(C(F)(F)F)cc1C(F)(F)F] | C173 | C174 | C175 | C176 |
| 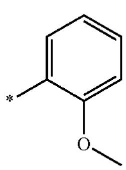 [SMILES: *c1ccccc1OC] | 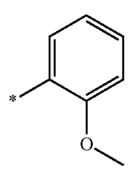 [SMILES: *c1ccccc1OC] | C177 | C178 | C179 | C180 |
| 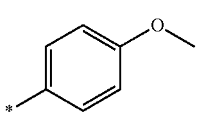 [SMILES: *c1ccc(OC)cc1] | 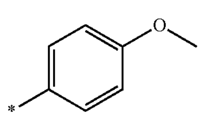 [SMILES: *c1ccc(OC)cc1] | C181 | C182 | C183 | C184 |
| 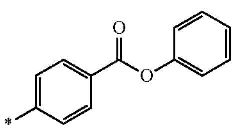 [SMILES: *c1ccc(C(=O)Oc2ccccc2)cc1] | 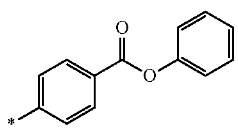 [SMILES: *c1ccc(C(=O)Oc2ccccc2)cc1] | C185 | C186 | C187 | C188 |
| 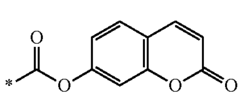 [SMILES: *C(=O)Oc1ccc2ccc(=O)oc2c1] | 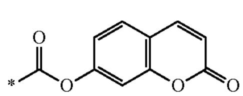 [SMILES: *C(=O)Oc1ccc2ccc(=O)oc2c1] | C189 | C190 | C191 | C192 |

TABLE 3-2-continued
| | | R3, R4 | | | |
|---|---|---|---|---|---|
| | | 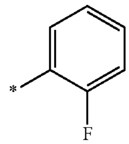 | 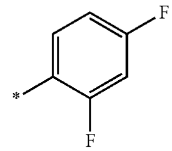 | 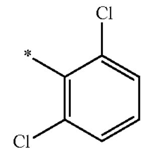 | 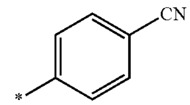 |
| R2 | R5 | | | | |
| 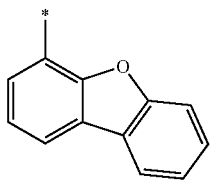 [SMILES: *c1cccc2c1oc1ccccc12] | 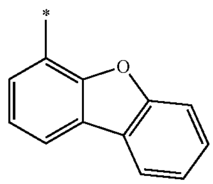 [SMILES: *c1cccc2c1oc1ccccc12] | C193 | C194 | C195 | C196 |
| 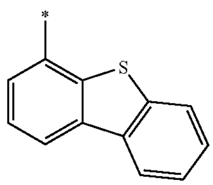 [SMILES: *c1cccc2c1sc1ccccc12] | 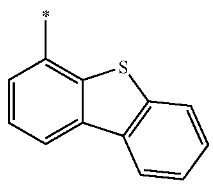 [SMILES: *c1cccc2c1sc1ccccc12] | C197 | C198 | C199 | C200 |
| 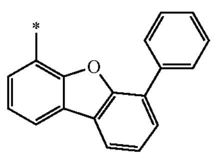 | 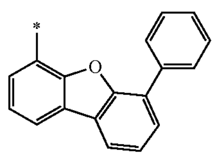 [SMILES: *c1cccc2c1oc1c(-c3ccccc3)cccc12] | C201 | C202 | C203 | C204 |
| 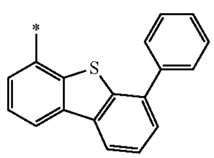 | 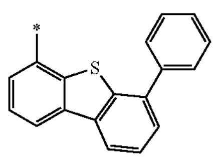 [SMILES: *c1cccc2c1sc1c(-c3ccccc3)cccc12] | C205 | C206 | C207 | C208 |
| 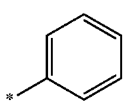 | 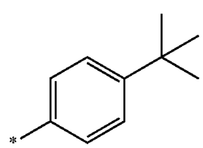 [SMILES: *c1ccc(C(C)(C)C)cc1] | C209 | C210 | C211 | C212 |
| 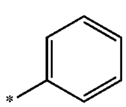 [SMILES: *c1ccccc1] | 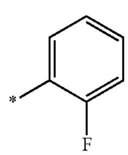 | C213 | C214 | C215 | C216 |
| 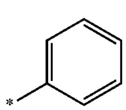 [SMILES: *c1ccccc1] | 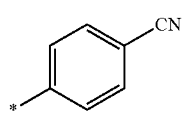 [SMILES: *c1ccc(C#N)cc1] | C217 | C218 | C219 | C220 |
| 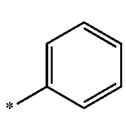 [SMILES: *c1ccccc1] | 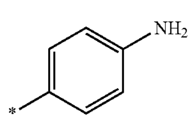 [SMILES: *c1ccc(N)cc1] | C221 | C222 | C223 | C224 |
| 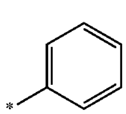 [SMILES: *c1ccccc1] | 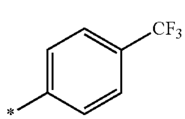 [SMILES: *c1ccc(C(F)(F)F)cc1] | C225 | C226 | C227 | C228 |

TABLE 3-2-continued
| | | R3, R4 | | | |
|---|---|---|---|---|---|
| R2 | R5 | 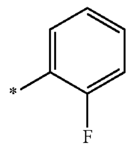 | 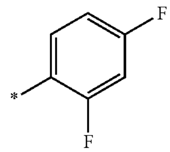 | 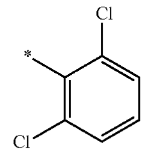 | 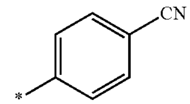 |
| 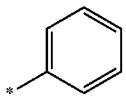 [SMILES: *c1ccccc1] | 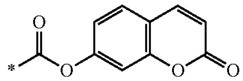 | C229 | C230 | C231 | C232 |
| 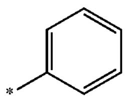 [SMILES: *c1ccccc1] | 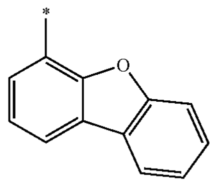 | C233 | C234 | C235 | C236 |
| 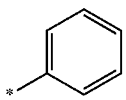 [SMILES: *c1ccccc1] | 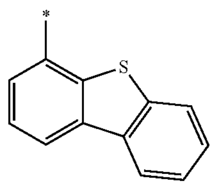 [SMILES: *c1cccc2c1sc1ccccc12] | C237 | C238 | C239 | C240 |
| 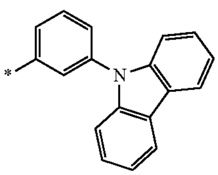 [SMILES: *c1cccc(-n2c3ccccc3c3ccccc32)c1] | 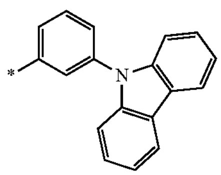 [SMILES: *c1cccc(-n2c3ccccc3c3ccccc32)c1] | C241 | C242 | C243 | C244 |
| 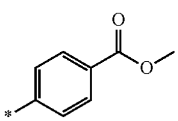 [SMILES: *c1ccc(C(=O)OC)cc1] | 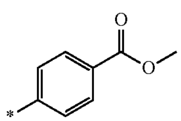 [SMILES: *c1ccc(C(=O)OC)cc1] | C245 | C246 | C247 | C248 |
TABLE 3-3
| | | R3, R4 | | |
|---|---|---|---|---|
| R2 | R5 | 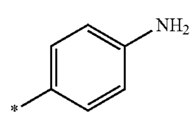 | 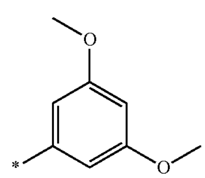 [SMILES: *c1cc(OC)cc(OC)c1] | 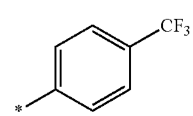 [SMILES: *c1ccc(C(F)(F)F)cc1] |
| 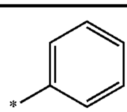 | 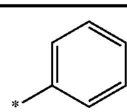 | C249 | C250 | C251 |
| 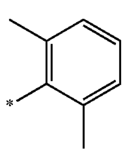 [SMILES: *c1c(C)cccc1C] | 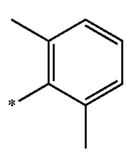 [SMILES: *c1c(C)cccc1C] | C252 | C253 | C254 |

TABLE 3-3-continued
| | | $R_3$, $R_4$ | | |
|---|---|---|---|---|
| | | 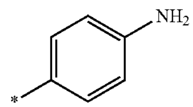 | 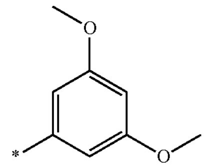 | 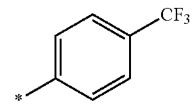 |
| $R_2$ | $R_5$ | | | |
| 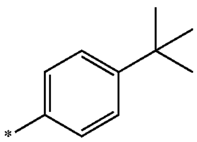 [SMILES: *c1ccc(C(C)(C)C)cc1] | 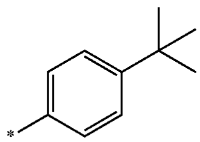 [SMILES: *c1ccc(C(C)(C)C)cc1] | C256 | C256 | C257 |
| 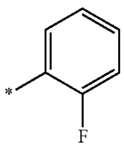 [SMILES: *c1ccccc1F] | 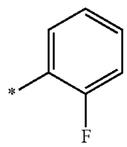 [SMILES: *c1ccccc1F] | C258 | C259 | C260 |
| 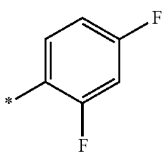 | 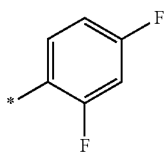 [SMILES: *c1ccc(F)cc1F] | C261 | C262 | C263 |
| 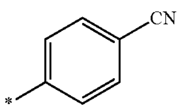 [SMILES: *c1ccc(C#N)cc1] | 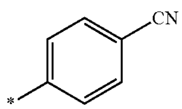 [SMILES: *c1ccc(C#N)cc1] | C264 | C265 | C266 |
| 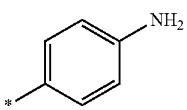 | 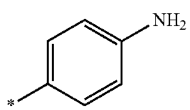 | C267 | C268 | C269 |
| 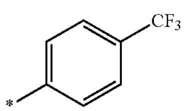 [SMILES: *c1ccc(C(F)(F)F)cc1] | 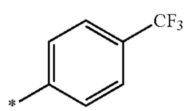 [SMILES: *c1ccc(C(F)(F)F)cc1] | C270 | C271 | C272 |
| 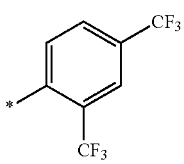 | 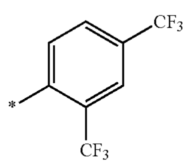 | C273 | C274 | C275 |
| 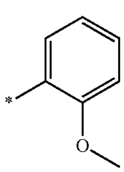 | 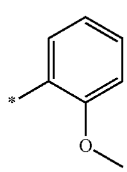 | C276 | C277 | C278 |
| 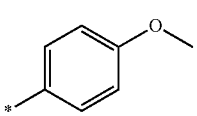 [SMILES: *c1ccc(OC)cc1] | 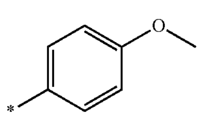 [SMILES: *c1ccc(OC)cc1] | C279 | C280 | C281 |
| 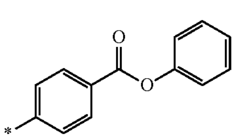 [SMILES: *c1ccc(C(=O)Oc2ccccc2)cc1] | 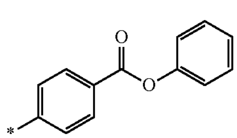 [SMILES: *c1ccc(C(=O)Oc2ccccc2)cc1] | C282 | C283 | C284 |

TABLE 3-3-continued
| | | R3, R4 | | |
|---|---|---|---|---|
| $R_2$ | $R_5$ | 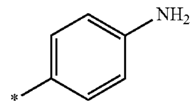 | 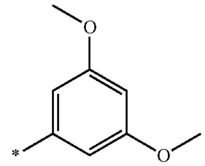 | 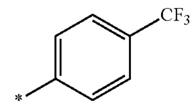 |
| 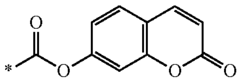 [SMILES: *C(=O)Oc1ccc2ccc(=O)oc2c1] | 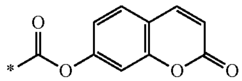 [SMILES: *C(=O)Oc1ccc2ccc(=O)oc2c1] | C285 | C286 | C287 |
| 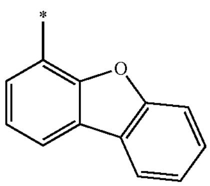 | 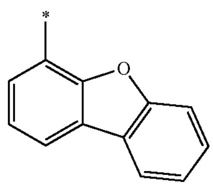 | C288 | C289 | C290 |
| 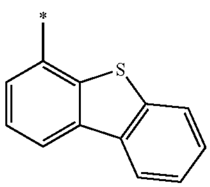 | 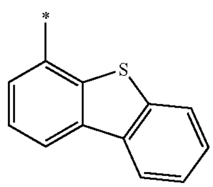 | C291 | C292 | C293 |
| 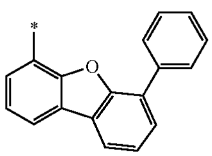 [SMILES: *c1cccc2c1oc1c(-c3ccccc3)cccc12] | 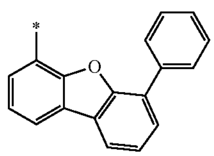 [SMILES: *c1cccc2c1oc1c(-c3ccccc3)cccc12] | C294 | C295 | C296 |
| 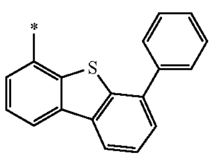 [SMILES: *c1cccc2c1sc1c(-c3ccccc3)cccc12] | 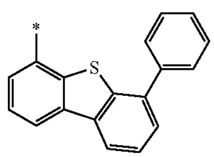 [SMILES: *c1cccc2c1sc1c(-c3ccccc3)cccc12] | C297 | C298 | C299 |
| 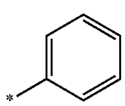 [SMILES: *c1ccccc1] | 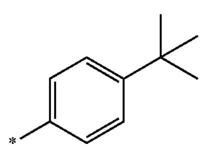 [SMILES: *c1ccc(C(C)(C)C)cc1] | C300 | C301 | C302 |
| 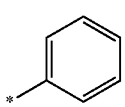 | 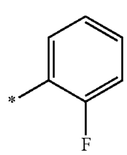 [SMILES: *c1ccccc1F] | C303 | C304 | C305 |
| 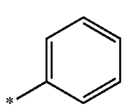 [SMILES: *c1ccccc1] | 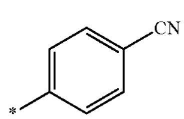 [SMILES: *c1ccc(C#N)cc1] | C306 | C307 | C308 |
| 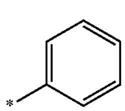 | 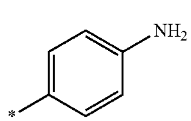 | C309 | C310 | C311 |

TABLE 3-3-continued
| R2 | R5 | R3, R4: 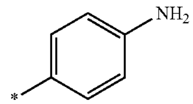 [SMILES: *c1ccc(N)cc1] | R3, R4: 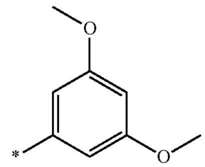 | R3, R4: 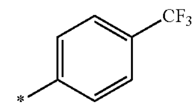 |
|---|---|---|---|---|
| 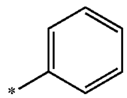 [SMILES: *c1ccccc1] | 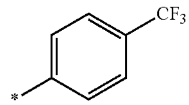 [SMILES: *c1ccc(C(F)(F)F)cc1] | C312 | C313 | C314 |
| 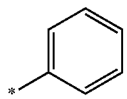 [SMILES: *c1ccccc1] | 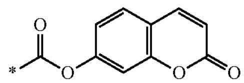 | C315 | C316 | C317 |
| 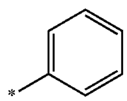 [SMILES: *c1ccccc1] | 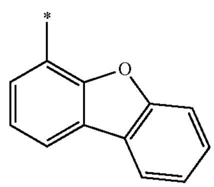 | C318 | C319 | C320 |
| 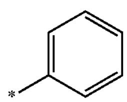 [SMILES: *c1ccccc1] | 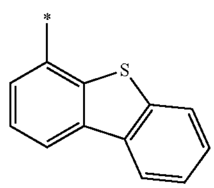 | C321 | C322 | C323 |
| 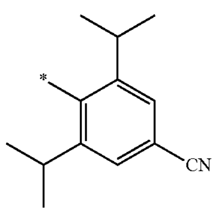 [SMILES: *c1c(C(C)C)cc(C#N)cc1C(C)C] | 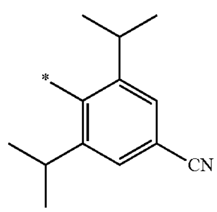 [SMILES: *c1c(C(C)C)cc(C#N)cc1C(C)C] | C324 | C325 | C326 |
| 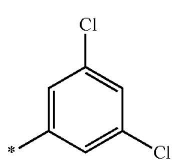 [SMILES: *c1cc(Cl)cc(Cl)c1] | 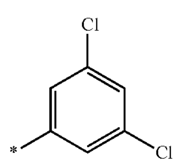 [SMILES: *c1cc(Cl)cc(Cl)c1] | C327 | C328 | C329 |
TABLE 3-4
| R2 | R5 | R3, R4: 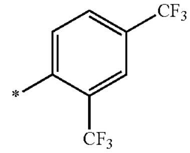 | R3, R4: 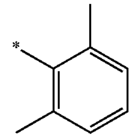 | R3, R4: 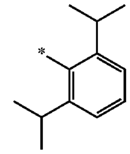 | R3, R4: 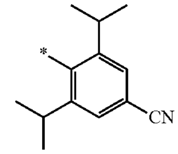 |
|---|---|---|---|---|---|
| 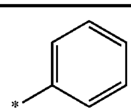 | 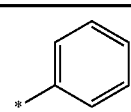 | C330 | C331 | C332 | C333 |

TABLE 3-4-continued
| | | R3, R4 | | | |
|---|---|---|---|---|---|
| R2 | R5 | 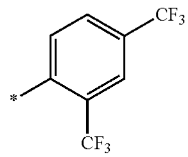 [SMILES: *c1ccc(C(F)(F)F)cc1C(F)(F)F] | 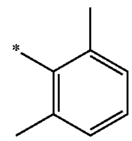 | 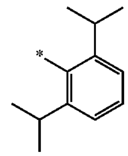 | 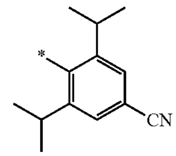 [SMILES: *c1c(C(C)C)cc(C#N)cc1C(C)C] |
| 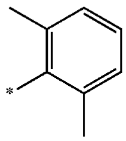 [SMILES: *c1c(C)cccc1C] | 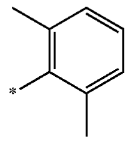 [SMILES: *c1c(C)cccc1C] | C334 | C335 | C336 | C337 |
| 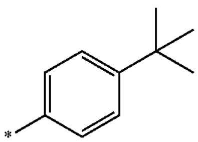 [SMILES: *c1ccc(C(C)(C)C)cc1] | 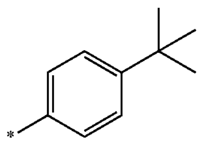 [SMILES: *c1ccc(C(C)(C)C)cc1] | C338 | C339 | C340 | C341 |
| 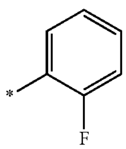 [SMILES: *c1ccccc1F] | 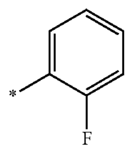 | C342 | C343 | C344 | C345 |
| 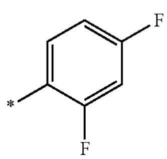 [SMILES: *c1ccc(F)cc1F] | 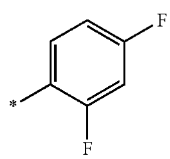 [SMILES: *c1ccc(F)cc1F] | C346 | C347 | C348 | C349 |
| 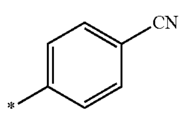 [SMILES: *c1ccc(C#N)cc1] | 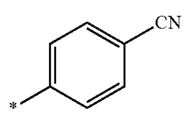 [SMILES: *c1ccc(C#N)cc1] | C350 | C351 | C352 | C353 |
| 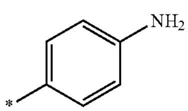 [SMILES: *c1ccc(N)cc1] | 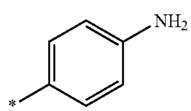 [SMILES: *c1ccc(N)cc1] | C354 | C355 | C356 | C357 |
| 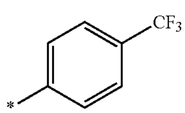 [SMILES: *c1ccc(C(F)(F)F)cc1] | 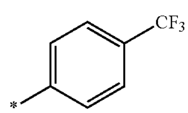 [SMILES: *c1ccc(C(F)(F)F)cc1] | C358 | C359 | C360 | C361 |
| 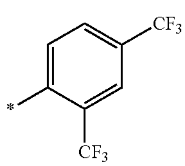 | 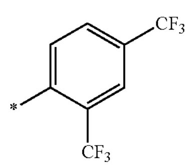 | C362 | C363 | C364 | C365 |
| 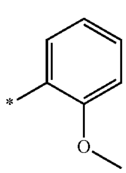 | 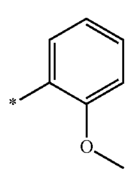 | C366 | C367 | C368 | C369 |
| 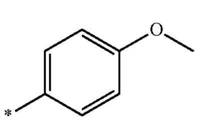 [SMILES: *c1ccc(OC)cc1] | 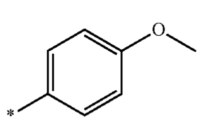 [SMILES: *c1ccc(OC)cc1] | C370 | C371 | C372 | C373 |

TABLE 3-4-continued
| | | $R_3$, $R_4$ | | | |
|---|---|---|---|---|---|
| $R_2$ | $R_5$ | 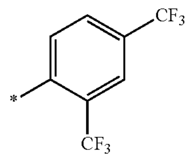 | 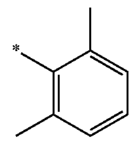 | 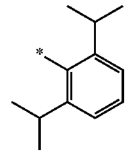 | 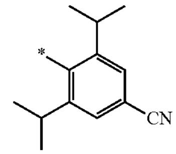 |
| 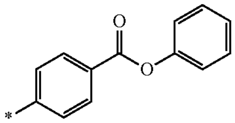 [SMILES: *c1ccc(C(=O)Oc2ccccc2)cc1] | 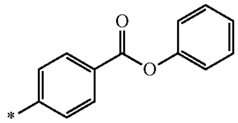 [SMILES: *c1ccc(C(=O)Oc2ccccc2)cc1] | C374 | C375 | C376 | C377 |
| 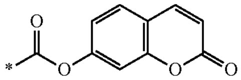 | 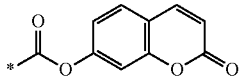 | C378 | C379 | C380 | C381 |
| 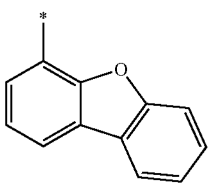 [SMILES: *c1cccc2c1oc1ccccc12] | 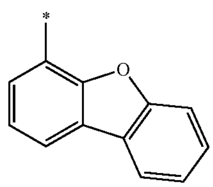 | C382 | C383 | C384 | C385 |
| 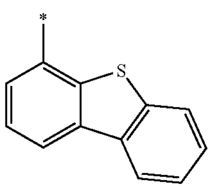 | 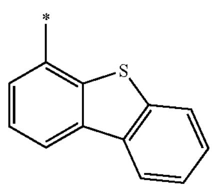 | C386 | C387 | C388 | C389 |
| 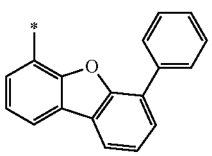 | 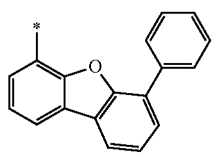 | C390 | C391 | C392 | C393 |
| 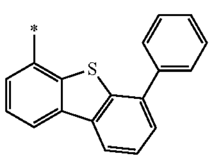 | 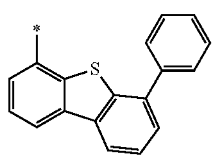 | C394 | C395 | C396 | C397 |
| 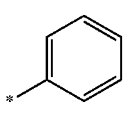 [SMILES: *c1ccccc1] | 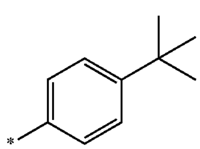 [SMILES: *c1ccc(C(C)(C)C)cc1] | C398 | C399 | C400 | C401 |
| 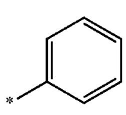 | 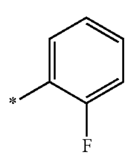 | C402 | C403 | C404 | C405 |
| 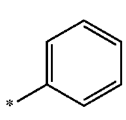 [SMILES: *c1ccccc1] | 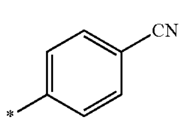 [SMILES: *c1ccc(C#N)cc1] | C406 | C407 | C408 | C409 |

TABLE 3-4-continued
| R2 | R5 | R3, R4 | | | |
|---|---|---|---|---|---|
| | | 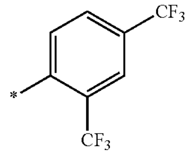 | 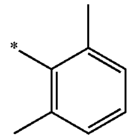 | 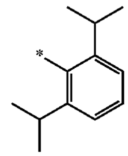 | 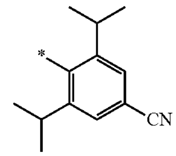 |
| 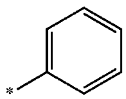 [SMILES: *c1ccccc1] | 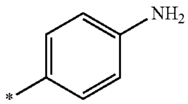 [SMILES: *c1ccc(N)cc1] | C410 | C411 | C412 | C413 |
| 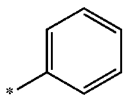 | 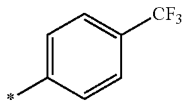 [SMILES: *c1ccc(C(F)(F)F)cc1] | C414 | C415 | C416 | C417 |
| 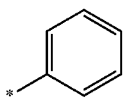 | 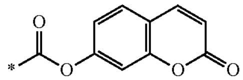 | C418 | C419 | C420 | C421 |
| 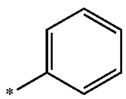 [SMILES: *c1ccccc1] | 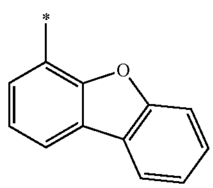 | C422 | C423 | C424 | C425 |
| 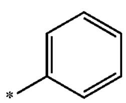 [SMILES: *c1ccccc1] | 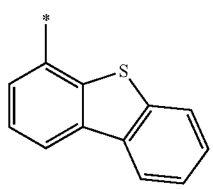 | C426 | C427 | C428 | C429 |
TABLE 3-5
| R2 | R5 | R3, R4 | | |
|---|---|---|---|---|
| | | 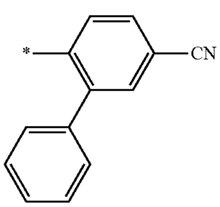 [SMILES: *c1ccc(C#N)cc1-c1ccccc1] | 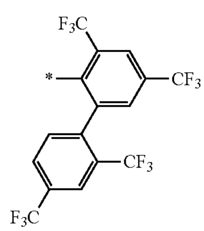 [SMILES: *c1c(-c2ccc(C(F)(F)F)cc2C(F)(F)F)cc(C(F)(F)F)cc1C(F)(F)F] | 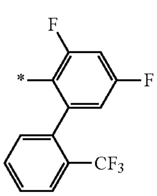 [SMILES: *c1c(F)cc(F)cc1-c1ccccc1C(F)(F)F] |
| 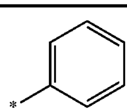 | 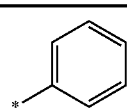 | C430 | C431 | C432 |
| 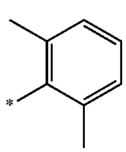 | 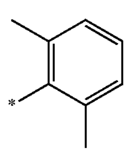 | C433 | C434 | C435 |

TABLE 3-5-continued
| R₂ | R₅ | R₃, R₄ | | |
|---|---|---|---|---|
| | | 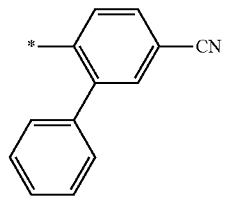 | 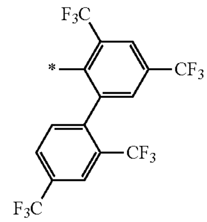 | 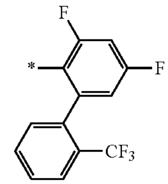 |
| 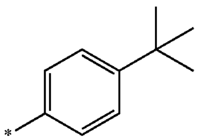 [SMILES: *c1ccc(C(C)(C)C)cc1] | 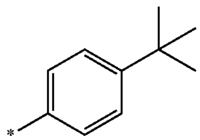 [SMILES: *c1ccc(C(C)(C)C)cc1] | C436 | C437 | C438 |
| 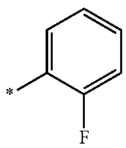 [SMILES: *c1ccccc1F] | 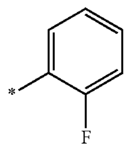 [SMILES: *c1ccccc1F] | C439 | C440 | C441 |
| 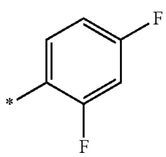 [SMILES: *c1ccc(F)cc1F] | 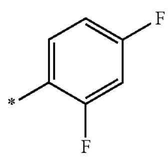 [SMILES: *c1ccc(F)cc1F] | C442 | C443 | C444 |
| 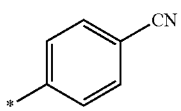 [SMILES: *c1ccc(C#N)cc1] | 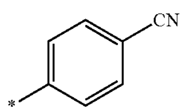 [SMILES: *c1ccc(C#N)cc1] | C445 | C446 | C447 |
| 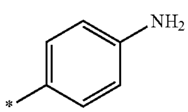 [SMILES: *c1ccc(N)cc1] | 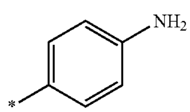 [SMILES: *c1ccc(N)cc1] | C448 | C449 | C450 |
| 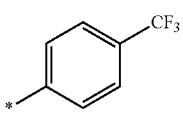 [SMILES: *c1ccc(C(F)(F)F)cc1] | 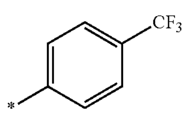 [SMILES: *c1ccc(C(F)(F)F)cc1] | C451 | C452 | C453 |
| 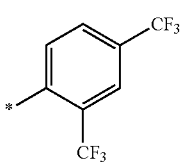 | 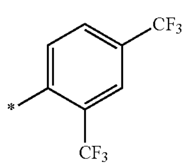 | C454 | C455 | C456 |
| 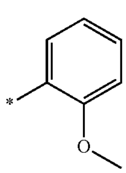 | 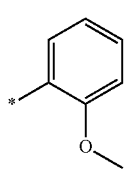 | C457 | C458 | C459 |
| 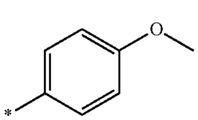 [SMILES: *c1ccc(OC)cc1] | 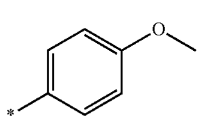 [SMILES: *c1ccc(OC)cc1] | C460 | C461 | C462 |

TABLE 3-5-continued
| | | $R_3$, $R_4$ | | |
|---|---|---|---|---|
| $R_2$ | $R_5$ | 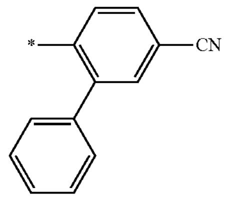 | 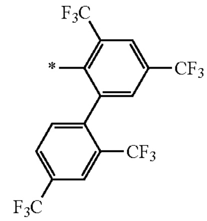 | 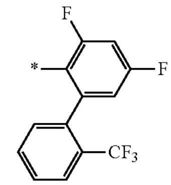 |
| 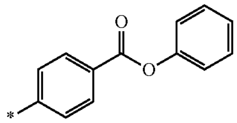 [SMILES: *c1ccc(C(=O)Oc2ccccc2)cc1] | 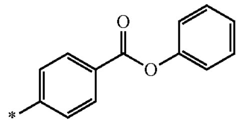 [SMILES: *c1ccc(C(=O)Oc2ccccc2)cc1] | C463 | C464 | C465 |
| 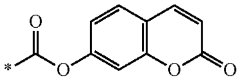 | 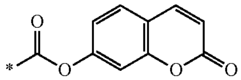 [SMILES: *C(=O)Oc1ccc2ccc(=O)oc2c1] | C466 | C467 | C468 |
| 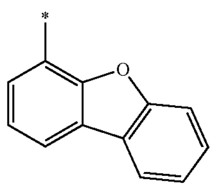 | 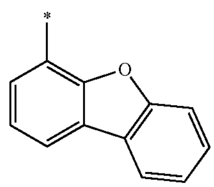 | C469 | C470 | C471 |
| 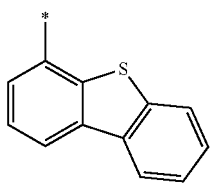 | 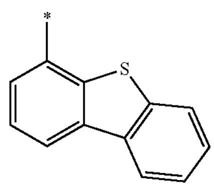 | C472 | C473 | C474 |
| 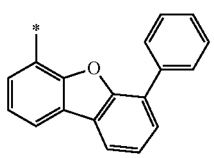 | 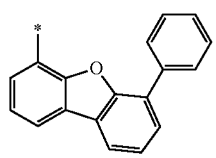 | C475 | C476 | C477 |
| 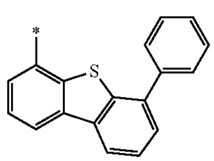 | 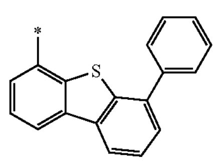 | C478 | C479 | C480 |
| 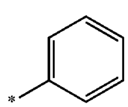 | 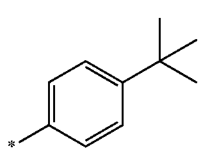 [SMILES: *c1ccc(C(C)(C)C)cc1] | C481 | C482 | C483 |
| 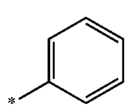 [SMILES: *c1ccccc1] | 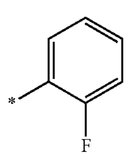 [SMILES: *c1ccccc1F] | C484 | C485 | C486 |
| 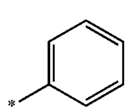 | 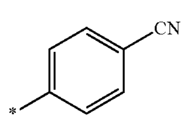 [SMILES: *c1ccc(C#N)cc1] | C487 | C488 | C489 |

TABLE 3-5-continued
| $R_2$ | $R_5$ | $R_3$, $R_4$: 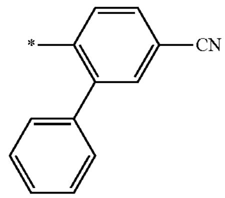 | $R_3$, $R_4$: 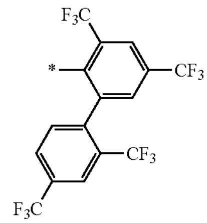 | $R_3$, $R_4$: 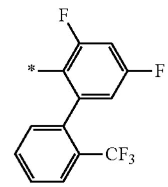 |
|---|---|---|---|---|
| 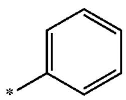 [SMILES: *c1ccccc1] | 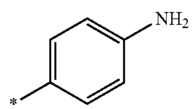 [SMILES: *c1ccc(N)cc1] | C490 | C491 | C492 |
| 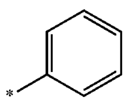 | 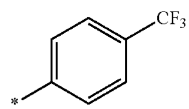 [SMILES: *c1ccc(C(F)(F)F)cc1] | C493 | C494 | C495 |
| 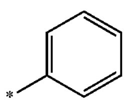 [SMILES: *c1ccccc1] | 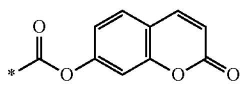 [SMILES: *C(=O)Oc1ccc2ccc(=O)oc2c1] | C496 | C497 | C498 |
| 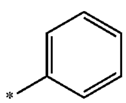 [SMILES: *c1ccccc1] | 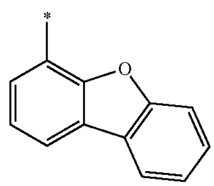 | C499 | C500 | C501 |
| 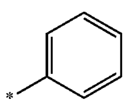 [SMILES: *c1ccccc1] | 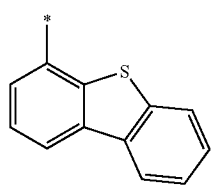 | C502 | C503 | C504 |
TABLE 3-6
| $R_2$ | $R_5$ | $R_3$, $R_4$: 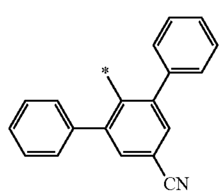 [SMILES: *c1c(-c2ccccc2)cc(C#N)cc1-c1ccccc1] | $R_3$, $R_4$: 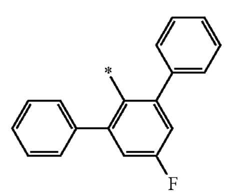 | $R_3$, $R_4$: 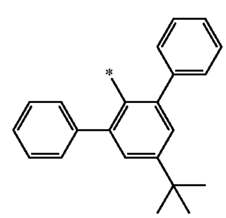 [SMILES: *c1c(-c2ccccc2)cc(C(C)(C)C)cc1-c1ccccc1] |
|---|---|---|---|---|
| 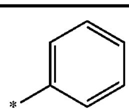 | 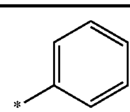 | C505 | C506 | C507 |
| 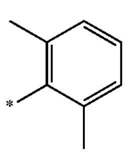 | 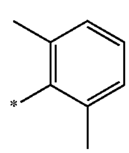 | C508 | C509 | C510 |

TABLE 3-6-continued
| | | $R_3$, $R_4$ | | |
|---|---|---|---|---|
| $R_2$ | $R_5$ | 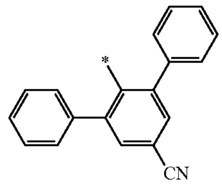 | 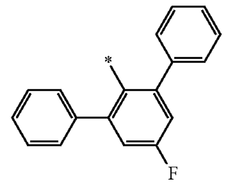 | 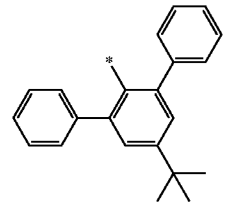 |
| 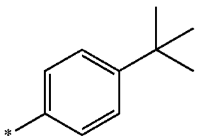 [SMILES: *c1ccc(C(C)(C)C)cc1] | 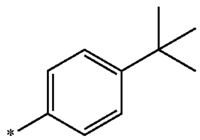 [SMILES: *c1ccc(C(C)(C)C)cc1] | C511 | C512 | C513 |
| 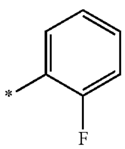 | 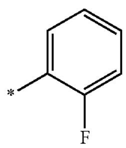 [SMILES: *c1ccccc1F] | C514 | C515 | C516 |
| 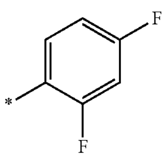 [SMILES: *c1ccc(F)cc1F] | 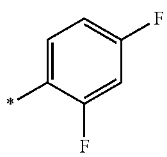 [SMILES: *c1ccc(F)cc1F] | C517 | C518 | C519 |
| 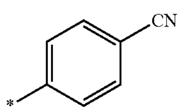 [SMILES: *c1ccc(C#N)cc1] | 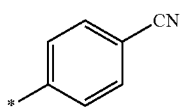 | C520 | C521 | C522 |
| 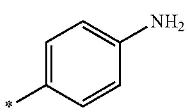 [SMILES: *c1ccc(N)cc1] | 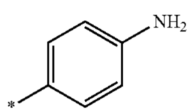 [SMILES: *c1ccc(N)cc1] | C523 | C524 | C525 |
| 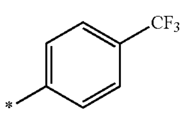 [SMILES: *c1ccc(C(F)(F)F)cc1] | 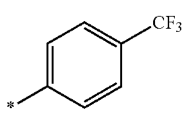 [SMILES: *c1ccc(C(F)(F)F)cc1] | C526 | C527 | C528 |
| 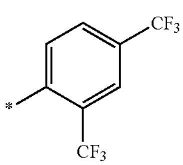 | 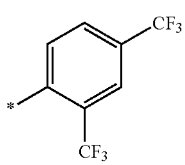 | C529 | C530 | C531 |
| 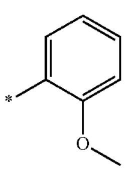 | 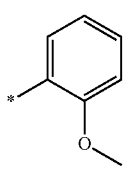 | C532 | C533 | C534 |
| 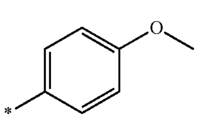 [SMILES: *c1ccc(OC)cc1] | 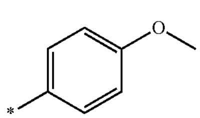 [SMILES: *c1ccc(OC)cc1] | C535 | C536 | C537 |

TABLE 3-6-continued
| | | R3, R4 | | |
|---|---|---|---|---|
| R2 | R5 | 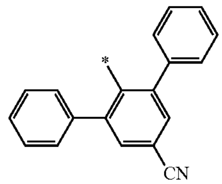 | 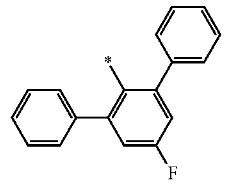 | 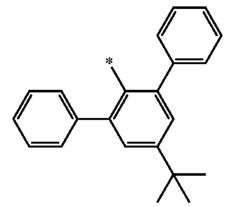 |
| 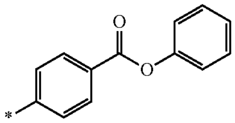 [SMILES: *c1ccc(C(=O)Oc2ccccc2)cc1] | 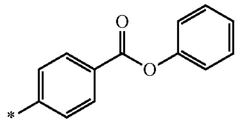 [SMILES: *c1ccc(C(=O)Oc2ccccc2)cc1] | C538 | C539 | C540 |
| 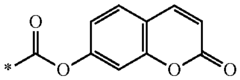 | 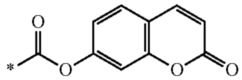 | C541 | C542 | C543 |
| 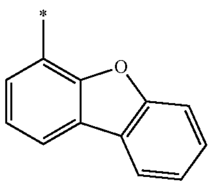 | 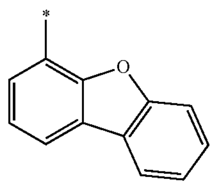 | C544 | C545 | C546 |
| 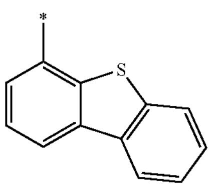 | 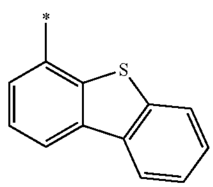 | C547 | C548 | C549 |
| 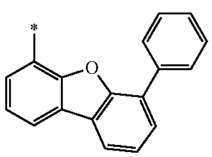 [SMILES: *c1cccc2c1oc1c(-c3ccccc3)cccc12] | 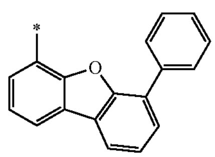 [SMILES: *c1cccc2c1oc1c(-c3ccccc3)cccc12] | C550 | C551 | C552 |
| 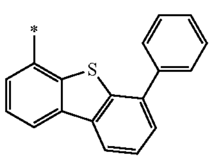 | 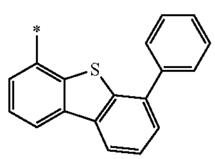 | C553 | C554 | C555 |
| 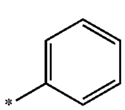 [SMILES: *c1ccccc1] | 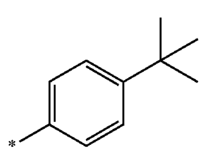 [SMILES: *c1ccc(C(C)(C)C)cc1] | C556 | C557 | C558 |
| 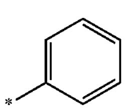 [SMILES: *c1ccccc1] | 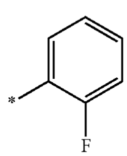 [SMILES: *c1ccccc1F] | C559 | C560 | C561 |
| 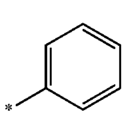 | 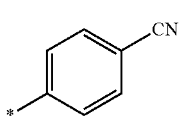 [SMILES: *c1ccc(C#N)cc1] | C562 | C563 | C564 |

TABLE 3-6-continued
| | | R3, R4 | | |
|---|---|---|---|---|
| R2 | R5 | 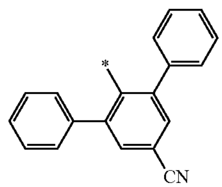 | 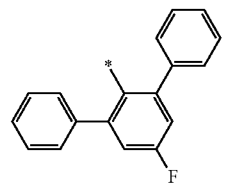 | 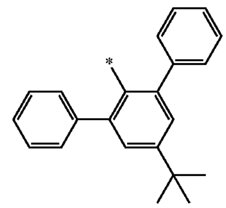 |
| 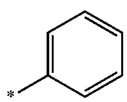 | 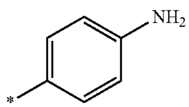 | C565 | C566 | C567 |
| 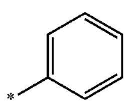 [SMILES: *c1ccccc1] | 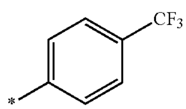 [SMILES: *c1ccc(C(F)(F)F)cc1] | C568 | C569 | C570 |
| 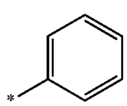 [SMILES: *c1ccccc1] | 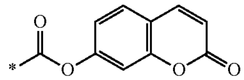 | C571 | C572 | C573 |
| 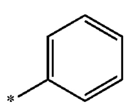 [SMILES: *c1ccccc1] | 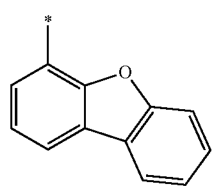 | C574 | C575 | C576 |
| 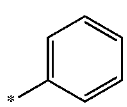 [SMILES: *c1ccccc1] | 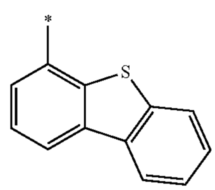 | C577 | C578 | C579 |
| 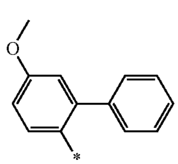 [SMILES: *c1ccc(OC)cc1-c1ccccc1] | 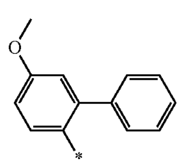 [SMILES: *c1ccc(OC)cc1-c1ccccc1] | C580 | C581 | C582 |
| 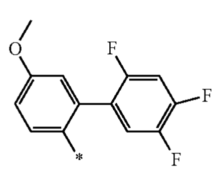 [SMILES: *c1ccc(OC)cc1-c1cc(F)c(F)cc1F] | 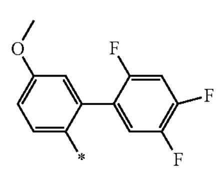 [SMILES: *c1ccc(OC)cc1-c1cc(F)c(F)cc1F] | C583 | C584 | C585 |

TABLE 3-7
| | | R3, R4 | | |
|---|---|---|---|---|
| R2 | R5 | 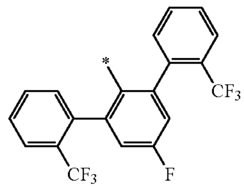 [SMILES: *c1c(-c2ccccc2C(F)(F)F)cc(F)cc1-c1ccccc1C(F)(F)F] | 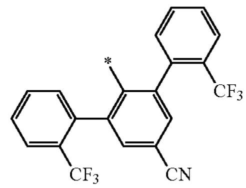 [SMILES: *c1c(-c2ccccc2C(F)(F)F)cc(C#N)cc1-c1ccccc1C(F)(F)F] | 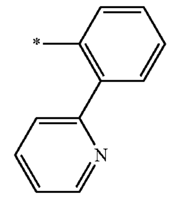 [SMILES: *c1ccccc1-c1ccccn1] |
| 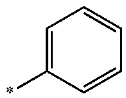 [SMILES: *c1ccccc1] | 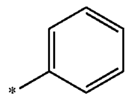 [SMILES: *c1ccccc1] | C586 | C587 | C588 |
| 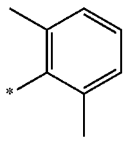 [SMILES: *c1c(C)cccc1C] | 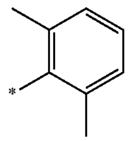 | C589 | C590 | C591 |
| 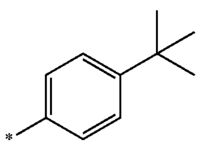 [SMILES: *c1ccc(C(C)(C)C)cc1] | 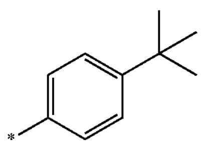 [SMILES: *c1ccc(C(C)(C)C)cc1] | C592 | C593 | C594 |
| 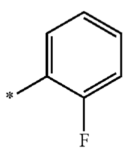 [SMILES: *c1ccccc1F] | 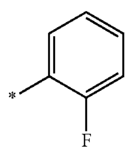 [SMILES: *c1ccccc1F] | C595 | C596 | C597 |
| 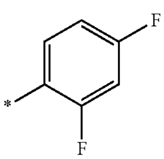 [SMILES: *c1ccc(F)cc1F] | 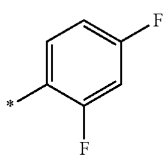 | C598 | C599 | C600 |
| 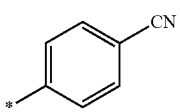 [SMILES: *c1ccc(C#N)cc1] | 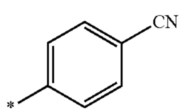 [SMILES: *c1ccc(C#N)cc1] | C601 | C602 | C603 |
| 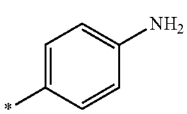 | 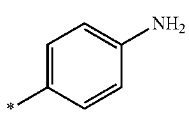 | C604 | C605 | C606 |
| 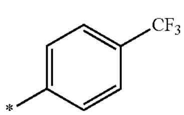 | 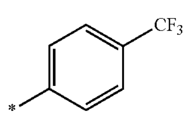 | C607 | C608 | C609 |
| 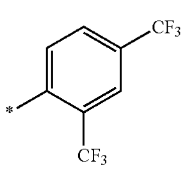 | 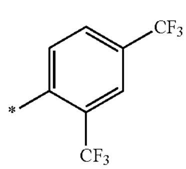 [SMILES: *c1ccc(C(F)(F)F)cc1C(F)(F)F] | C610 | C611 | C612 |

TABLE 3-7-continued
| | | R3, R4 | | |
|---|---|---|---|---|
| R2 | R5 | 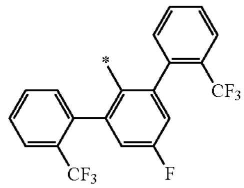 | 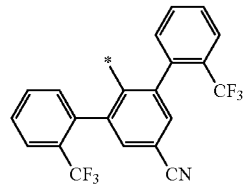 | 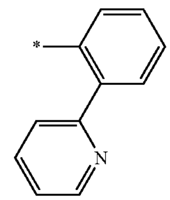 |
| 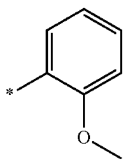 [SMILES: *c1ccccc1OC] | 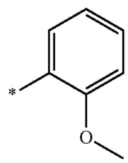 [SMILES: *c1ccccc1OC] | C613 | C614 | C615 |
| 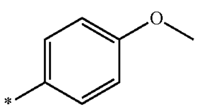 [SMILES: *c1ccc(OC)cc1] | 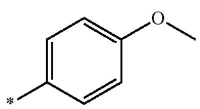 | C616 | C617 | C618 |
| 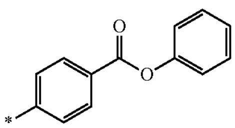 [SMILES: *c1ccc(C(=O)Oc2ccccc2)cc1] | 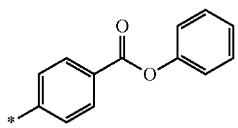 [SMILES: *c1ccc(C(=O)Oc2ccccc2)cc1] | C619 | C620 | C621 |
| 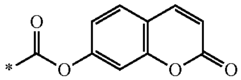 | 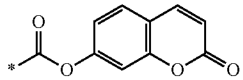 | C622 | C623 | C624 |
| 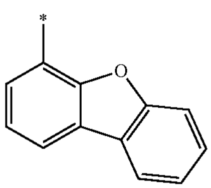 [SMILES: *c1cccc2c1oc1ccccc12] | 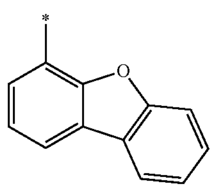 [SMILES: *c1cccc2c1oc1ccccc12] | C625 | C626 | C627 |
| 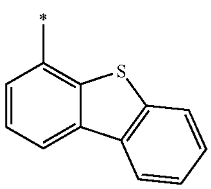 [SMILES: *c1cccc2c1sc1ccccc12] | 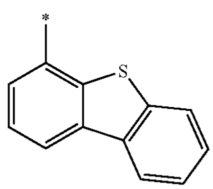 [SMILES: *c1cccc2c1sc1ccccc12] | C628 | C629 | C630 |
| 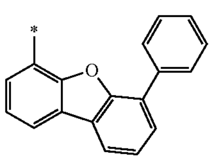 | 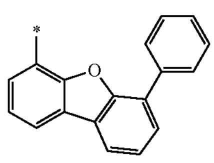 [SMILES: *c1cccc2c1oc1c(-c3ccccc3)cccc12] | C631 | C632 | C633 |
| 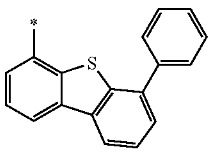 [SMILES: *c1cccc2c1sc1c(-c3ccccc3)cccc12] | 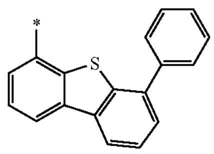 [SMILES: *c1cccc2c1sc1c(-c3ccccc3)cccc12] | C634 | C635 | C636 |
| 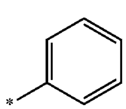 [SMILES: *c1ccccc1] | 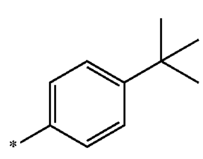 [SMILES: *c1ccc(C(C)(C)C)cc1] | C637 | C638 | C639 |

TABLE 3-7-continued
| | | $R_3$, $R_4$ | | |
|---|---|---|---|---|
| $R_2$ | $R_5$ | 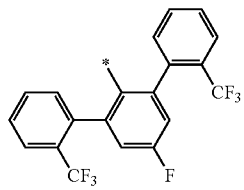 | 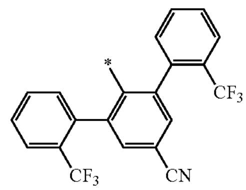 | 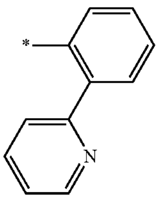 |
| 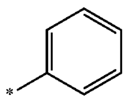 [SMILES: *c1ccccc1] | 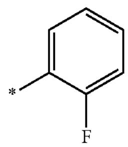 | C640 | C641 | C642 |
| 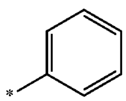 [SMILES: *c1ccccc1] | 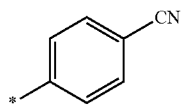 [SMILES: *c1ccc(C#N)cc1] | C643 | C644 | C645 |
| 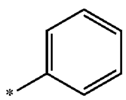 [SMILES: *c1ccccc1] | 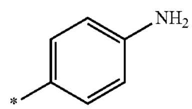 | C646 | C647 | C648 |
| 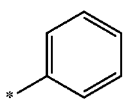 [SMILES: *c1ccccc1] | 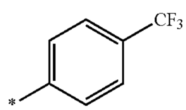 [SMILES: *c1ccc(C(F)(F)F)cc1] | C649 | C650 | C651 |
| 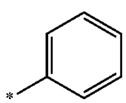 [SMILES: *c1ccccc1] | 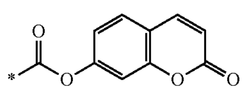 | C652 | C653 | C654 |
| 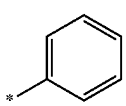 [SMILES: *c1ccccc1] | 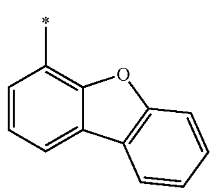 | C655 | C656 | C657 |
| 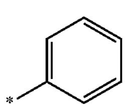 [SMILES: *c1ccccc1] | 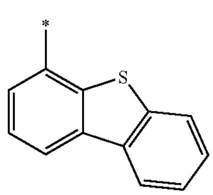 | C658 | C659 | C660 |

TABLE 3-8
| R2 | R5 | R3, R4 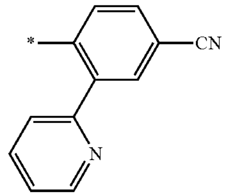 [SMILES: *c1ccc(C#N)cc1-c1ccccn1] | R3, R4 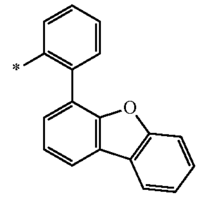 [SMILES: *c1ccccc1-c1cccc2c1oc1ccccc12] | R3, R4 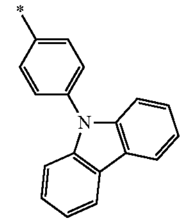 [SMILES: *c1ccc(-n2c3ccccc3c3ccccc32)cc1] |
|---|---|---|---|---|
| 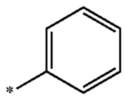 [SMILES: *c1ccccc1] | 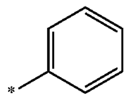 | C661 | C662 | C663 |
| 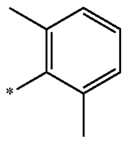 [SMILES: *c1c(C)cccc1C] | 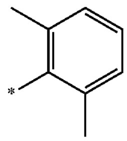 | C664 | C665 | C666 |
| 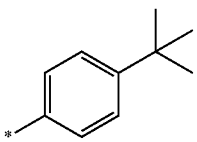 [SMILES: *c1ccc(C(C)(C)C)cc1] | 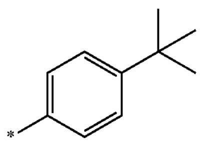 [SMILES: *c1ccc(C(C)(C)C)cc1] | C667 | C668 | C669 |
| 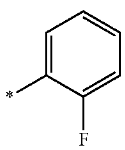 [SMILES: *c1ccccc1F] | 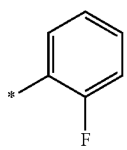 | C670 | C671 | C672 |
| 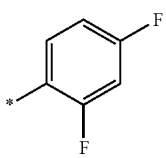 | 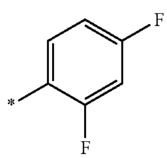 [SMILES: *c1ccc(F)cc1F] | C673 | C674 | C675 |
| 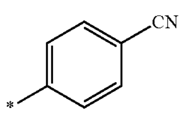 [SMILES: *c1ccc(C#N)cc1] | 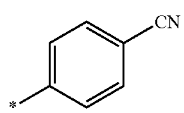 [SMILES: *c1ccc(C#N)cc1] | C676 | C677 | C678 |
| 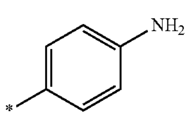 | 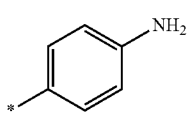 | C679 | C680 | C681 |
| 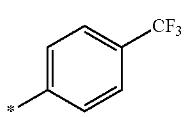 [SMILES: *c1ccc(C(F)(F)F)cc1] | 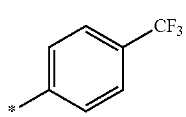 [SMILES: *c1ccc(C(F)(F)F)cc1] | C682 | C683 | C684 |
| 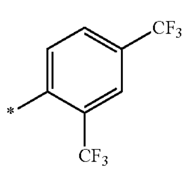 | 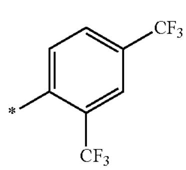 | C685 | C686 | C687 |

TABLE 3-8-continued
| | | R3, R4 | | |
|---|---|---|---|---|
| R2 | R5 | 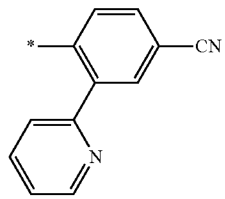 | 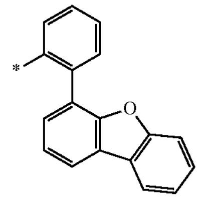 | 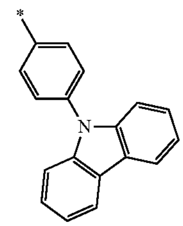 |
| 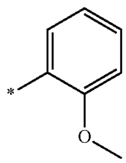 [SMILES: *c1ccccc1OC] | 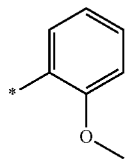 [SMILES: *c1ccccc1OC] | C688 | C689 | C690 |
| 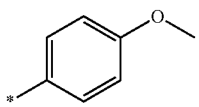 [SMILES: *c1ccc(OC)cc1] | 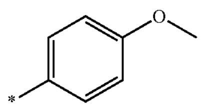 [SMILES: *c1ccc(OC)cc1] | C691 | C692 | C693 |
| 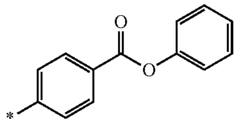 [SMILES: *c1ccc(C(=O)Oc2ccccc2)cc1] | 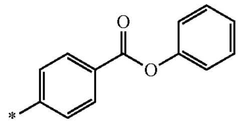 [SMILES: *c1ccc(C(=O)Oc2ccccc2)cc1] | C694 | C695 | C696 |
| 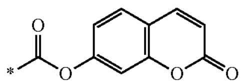 [SMILES: *C(=O)Oc1ccc2ccc(=O)oc2c1] | 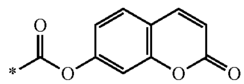 | C697 | C698 | C699 |
| 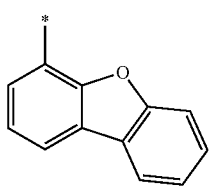 [SMILES: *c1cccc2c1oc1ccccc12] | 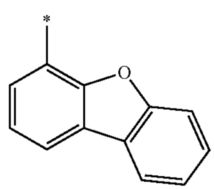 [SMILES: *c1cccc2c1oc1ccccc12] | C700 | C701 | C702 |
| 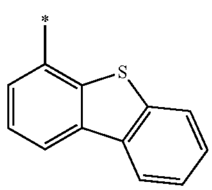 | 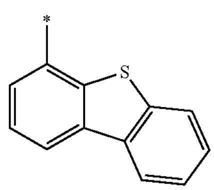 | C703 | C704 | C705 |
| 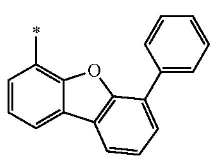 [SMILES: *c1cccc2c1oc1c(-c3ccccc3)cccc12] | 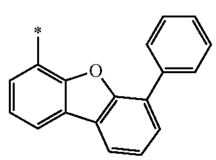 [SMILES: *c1cccc2c1oc1c(-c3ccccc3)cccc12] | C706 | C707 | C708 |
| 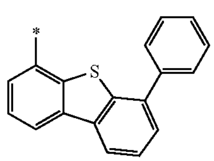 [SMILES: *c1cccc2c1sc1c(-c3ccccc3)cccc12] | 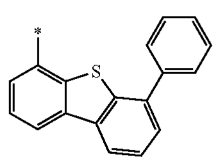 [SMILES: *c1cccc2c1sc1c(-c3ccccc3)cccc12] | C709 | C710 | C711 |
| 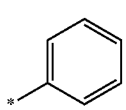 [SMILES: *c1ccccc1] | 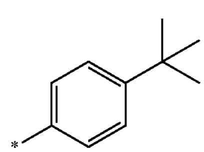 [SMILES: *c1ccc(C(C)(C)C)cc1] | C712 | C713 | C714 |

TABLE 3-8-continued
| | | R3, R4 | | |
|---|---|---|---|---|
| R2 | R5 | 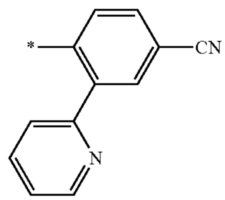 | 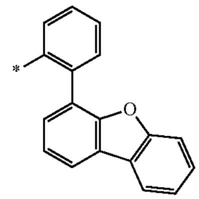 | 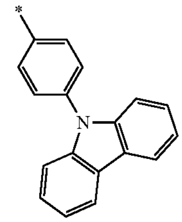 |
| 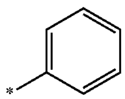 [SMILES: *c1ccccc1] | 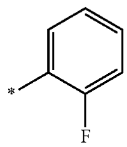 | C715 | C716 | C717 |
| 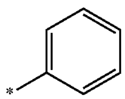 [SMILES: *c1ccccc1] | 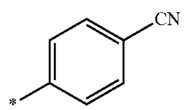 | C718 | C719 | C720 |
| 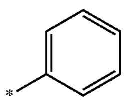 [SMILES: *c1ccccc1] | 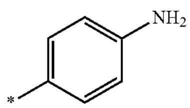 | C721 | C722 | C723 |
| 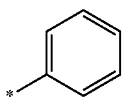 [SMILES: *c1ccccc1] | 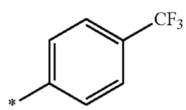 [SMILES: *c1ccc(C(F)(F)F)cc1] | C724 | C725 | C726 |
| 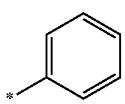 [SMILES: *c1ccccc1] | 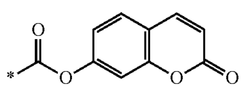 [SMILES: *C(=O)Oc1ccc2ccc(=O)oc2c1] | C727 | C728 | C729 |
| 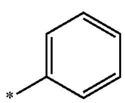 [SMILES: *c1ccccc1] | 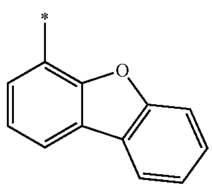 [SMILES: *c1cccc2c1oc1ccccc12] | C730 | C731 | C732 |
| 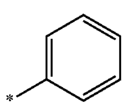 [SMILES: *c1ccccc1] | 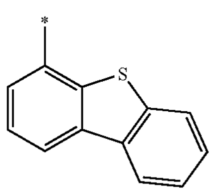 [SMILES: *c1cccc2c1sc1ccccc12] | C733 | C734 | C735 |
| 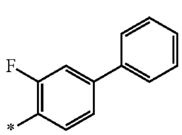 [SMILES: *c1ccc(-c2ccccc2)cc1F] | 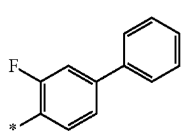 [SMILES: *c1ccc(-c2ccccc2)cc1F] | C736 | C737 | C738 |
| 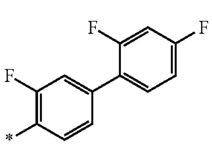 [SMILES: *c1ccc(-c2ccc(F)cc2F)cc1F] | 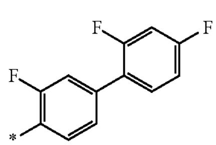 | C739 | C740 | C741 |

TABLE 3-8-continued
| | | R3, R4 | | |
|---|---|---|---|---|
| | | 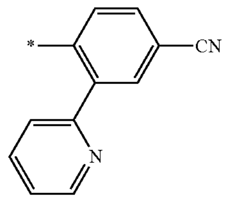 | 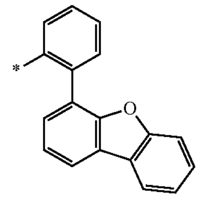 | 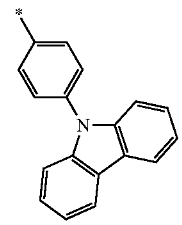 |
| R2 | R5 | | | |
| 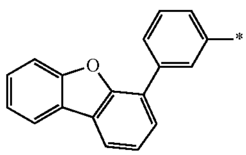 [SMILES: *c1cccc(-c2cccc3c2oc2ccccc23)c1] | 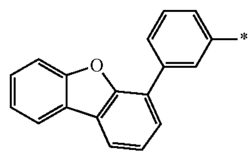 [SMILES: *c1cccc(-c2cccc3c2oc2ccccc23)c1] | C742 | C743 | C744 |
TABLE 3-9
| | | R3, R4 | | |
|---|---|---|---|---|
| | | 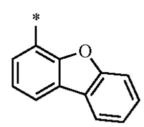 | 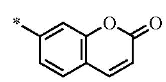 | 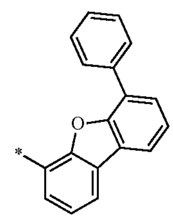 |
| R2 | R5 | | | |
| 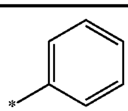 | 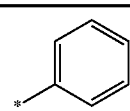 | C745 | C746 | C747 |
| 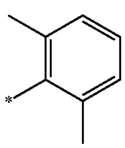 | 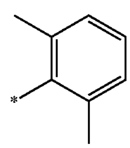 | C748 | C749 | C750 |
| 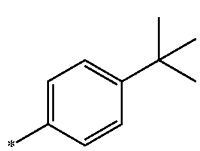 | 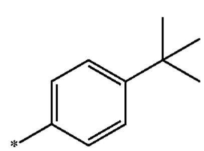 | C751 | C752 | C753 |
| 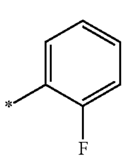 | 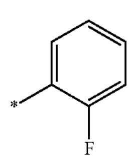 | C754 | C755 | C756 |
| 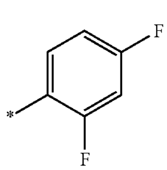 | 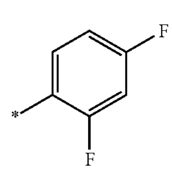 | C757 | C758 | C759 |

TABLE 3-9-continued
| | | R3, R4 | | |
|---|---|---|---|---|
| R2 | R5 | 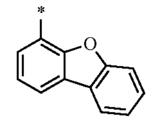 | 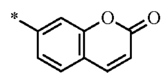 | 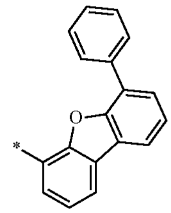 |
| 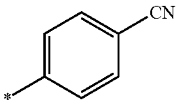 | 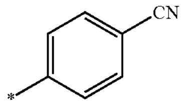 | C760 | C761 | C762 |
| 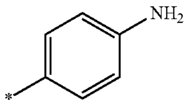 | 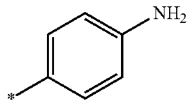 | C763 | C764 | C765 |
| 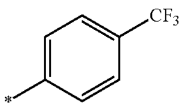 | 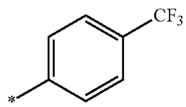 | C766 | C767 | C768 |
| 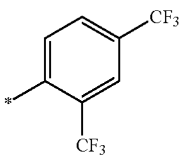 | 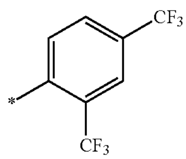 | C769 | C770 | C771 |
| 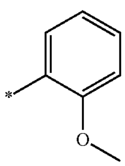 | 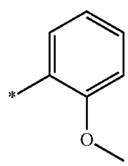 | C772 | C773 | C774 |
| 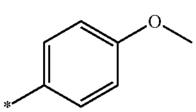 | 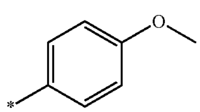 | C775 | C776 | C777 |
| 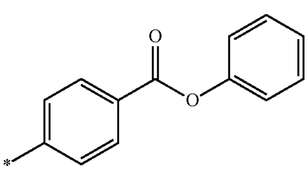 | 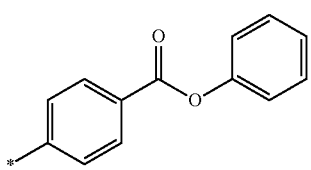 | C778 | C779 | C780 |
| 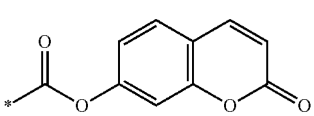 | 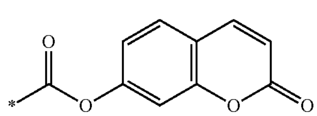 | C781 | C782 | C783 |
| 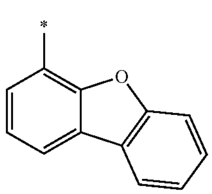 | 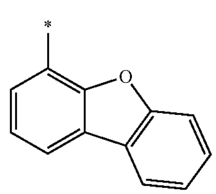 | C784 | C785 | C786 |

TABLE 3-9-continued
| | | R3, R4 | | |
|---|---|---|---|---|
| R2 | R5 | 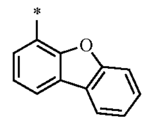 | 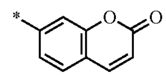 | 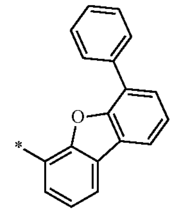 |
| 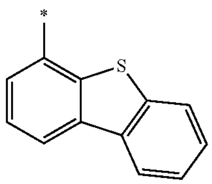 | 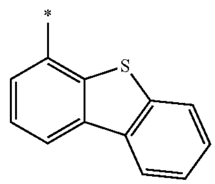 | C787 | C788 | C789 |
| 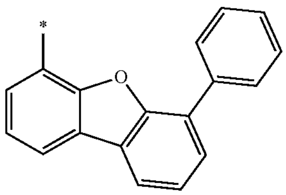 | 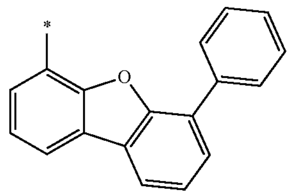 | C790 | C791 | C792 |
| 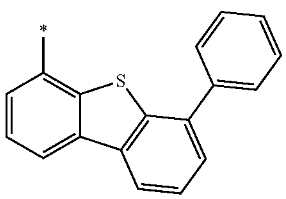 | 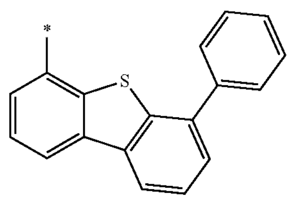 | C793 | C794 | C795 |
| 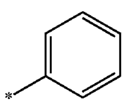 | 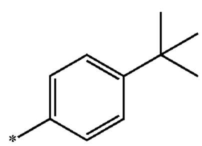 | C796 | C797 | C798 |
| 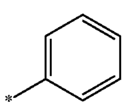 | 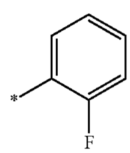 | C799 | C800 | C801 |
| 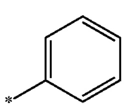 | 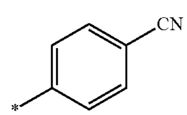 | C802 | C803 | C804 |
| 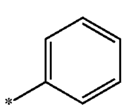 | 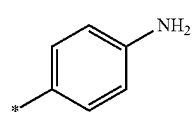 | C805 | C806 | C807 |
| 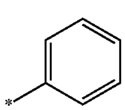 | 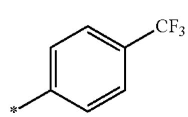 | C808 | C809 | C810 |

TABLE 3-9-continued
| | | R3, R4 | | |
|---|---|---|---|---|
| R2 | R5 | 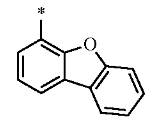 | 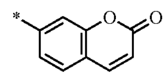 | 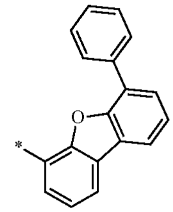 |
| 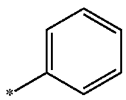 | 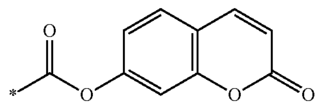 | C811 | CS12 | C813 |
| 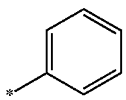 | 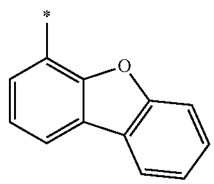 | C814 | CS15 | C816 |
| 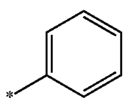 | 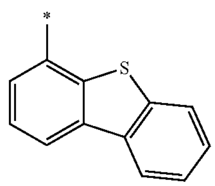 | C817 | C818 | C819 |
| 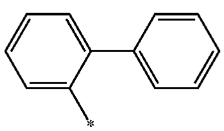 | 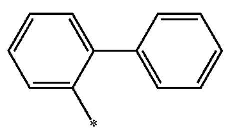 | C820 | C821 | C822 |
| 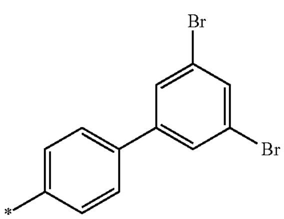 | 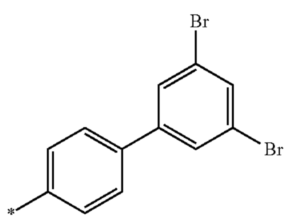 | C823 | C824 | C825 |
| 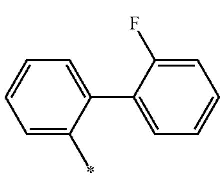 | 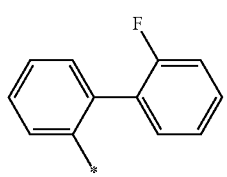 | C826 | C827 | CS2S |
| 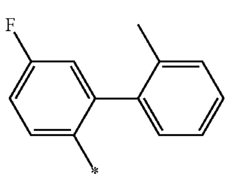 | 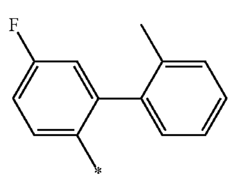 | C829 | C830 | C831 |

TABLE 3-9-continued
| | | R3, R4 | | |
|---|---|---|---|---|
| R2 | R5 | 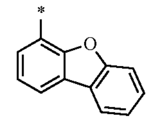 | 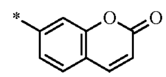 | 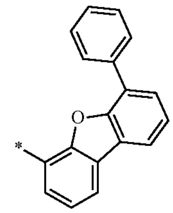 |
| 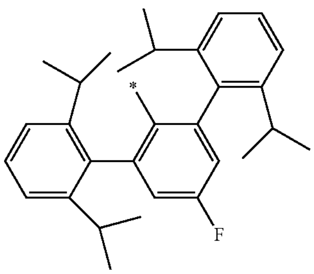 | 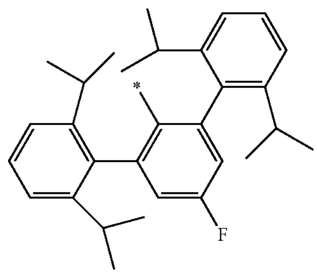 | C832 | C833 | C834 |
| 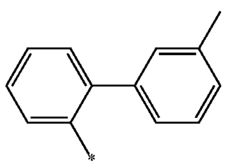 | 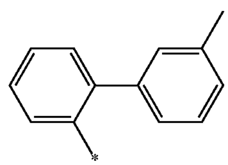 | C835 | C836 | C837 |
| 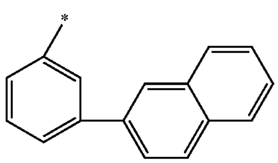 | 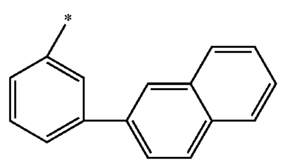 | C838 | C839 | C840 |
TABLE 3-10
| | | R3, R4 | | |
|---|---|---|---|---|
| R2 | R5 | 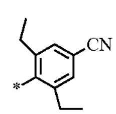 | 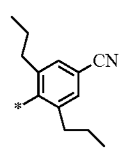 | 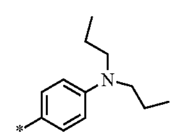 |
| 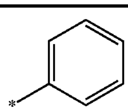 | 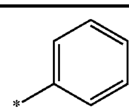 | C841 | C842 | C843 |
| 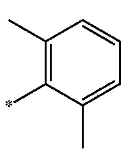 | 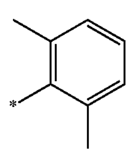 | C844 | C845 | C846 |
| 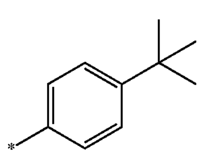 | 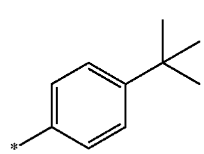 | C847 | C848 | C849 |

TABLE 3-10-continued
| | | R3, R4 | | |
|---|---|---|---|---|
| | | 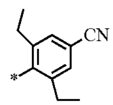 | 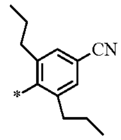 | 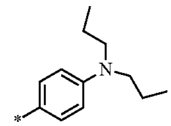 |
| $R_2$ | $R_5$ | | | |
| 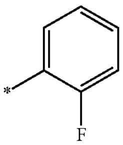 | 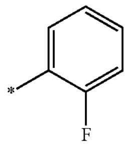 | C850 | C851 | C852 |
| 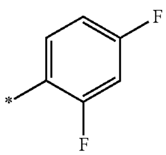 | 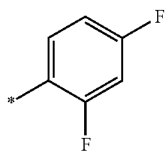 | C853 | C854 | C855 |
| 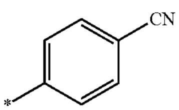 | 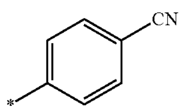 | C856 | C857 | C858 |
| 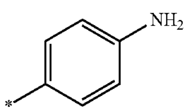 | 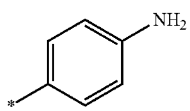 | C859 | C860 | C861 |
| 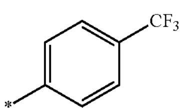 | 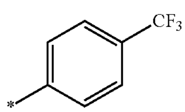 | C862 | C863 | C864 |
| 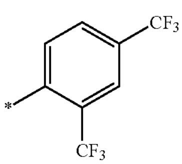 | 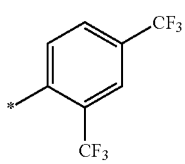 | C865 | C866 | C867 |
| 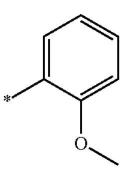 | 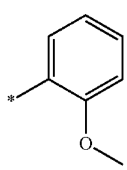 | C868 | C869 | C870 |
| 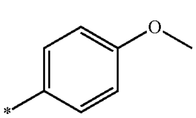 | 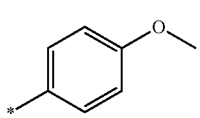 | C871 | C872 | C873 |
| 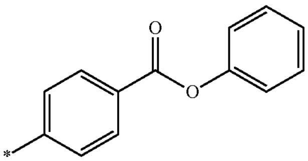 | 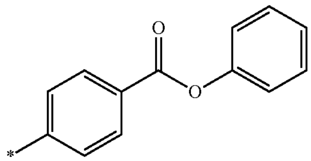 | C874 | C875 | C876 |

TABLE 3-10-continued
| | | R3, R4 | | |
|---|---|---|---|---|
| R2 | R5 | 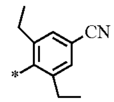 | 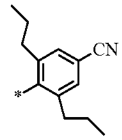 | 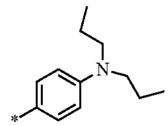 |
| 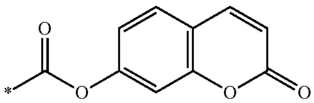 | 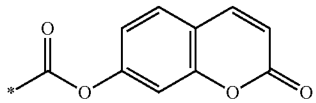 | C877 | C878 | C879 |
| 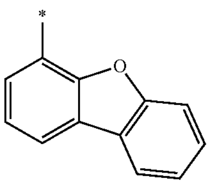 | 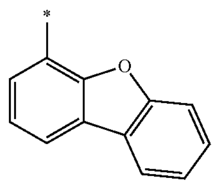 | C880 | C881 | C882 |
| 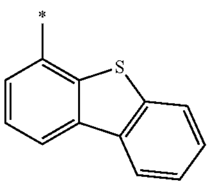 | 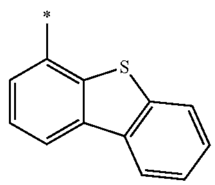 | C883 | C884 | C885 |
| 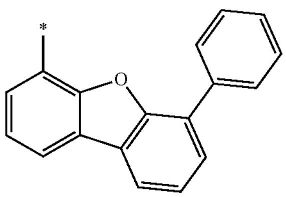 | 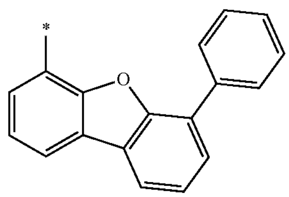 | C886 | C887 | C888 |
| 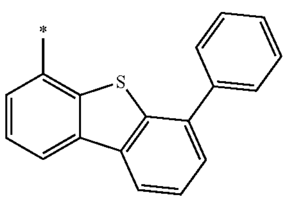 | 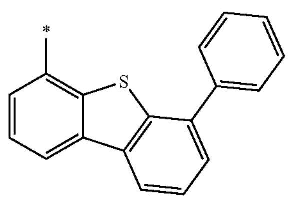 | C889 | C890 | C891 |
| 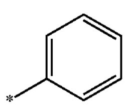 | 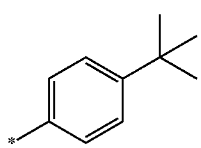 | C892 | C893 | C894 |
| 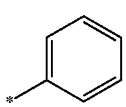 | 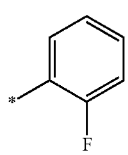 | C895 | C896 | C897 |
| 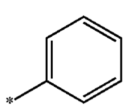 | 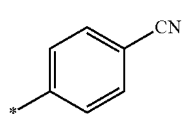 | C898 | C899 | C900 |

TABLE 3-10-continued
| R2 | R5 | R3, R4 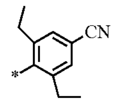 | 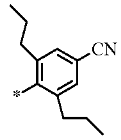 | 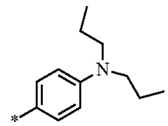 |
|---|---|---|---|---|
| 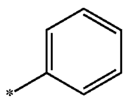 | 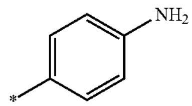 | C901 | C902 | C903 |
| 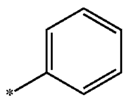 | 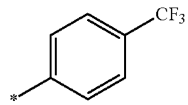 | C904 | C905 | C906 |
| 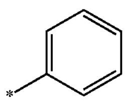 | 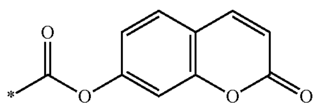 | C907 | C908 | C909 |
| 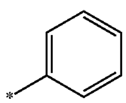 | 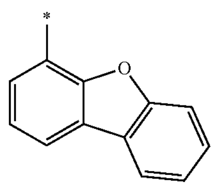 | C910 | C911 | C912 |
| 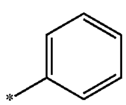 | 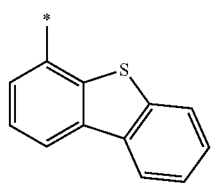 | C913 | C914 | C915 |
TABLE 3-11
| R2 | R5 | R3, R4 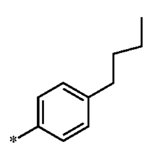 | 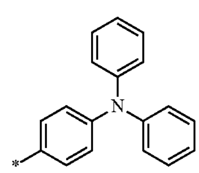 | 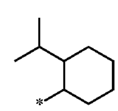 | 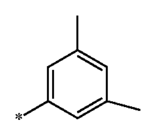 |
|---|---|---|---|---|---|
| 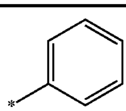 | 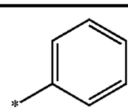 | C916 | C917 | C918 | C919 |
| 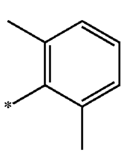 | 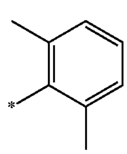 | C920 | C921 | C922 | C923 |

TABLE 3-11-continued
| | | R3, R4 | | | |
|---|---|---|---|---|---|
| | | 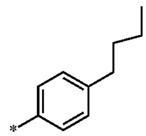 | 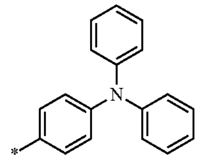 | 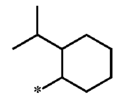 | 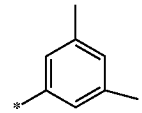 |
| $R_2$ | $R_5$ | | | | |
| 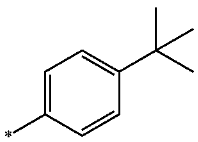 | 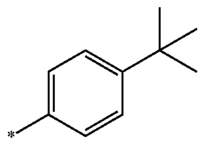 | C924 | C925 | C926 | C927 |
| 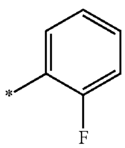 | 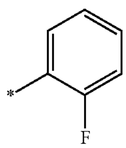 | C928 | C929 | C930 | C931 |
| 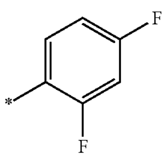 | 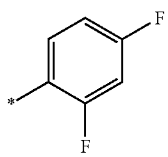 | C932 | C933 | C934 | C935 |
| 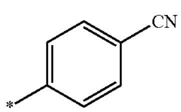 | 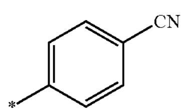 | C936 | C937 | C938 | C939 |
| 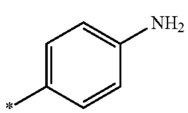 | 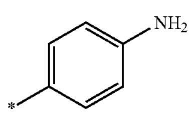 | C940 | C941 | C942 | C943 |
| 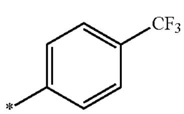 | 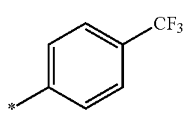 | C944 | C945 | C946 | C947 |
| 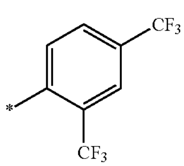 | 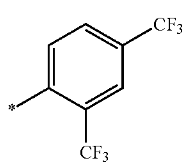 | C948 | C949 | C950 | C951 |
| 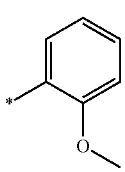 | 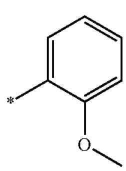 | C952 | C953 | C954 | C955 |
| 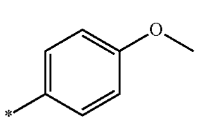 | 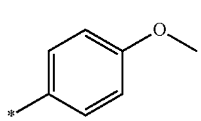 | C956 | C957 | C958 | C959 |

TABLE 3-11-continued
| | | $R_3$, $R_4$ | | | |
|---|---|---|---|---|---|
| | | 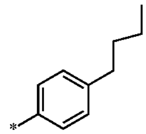 | 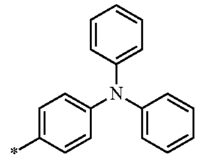 | 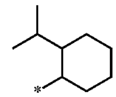 | 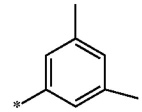 |
| $R_2$ | $R_5$ | | | | |
| 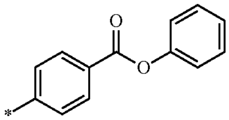 | 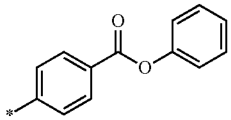 | C960 | C961 | C962 | C963 |
| 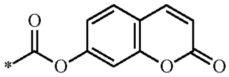 | 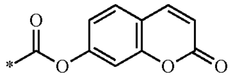 | C964 | C965 | C966 | C967 |
| 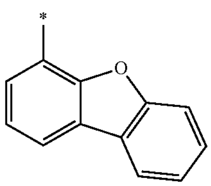 | 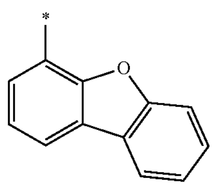 | C968 | C969 | C970 | C971 |
| 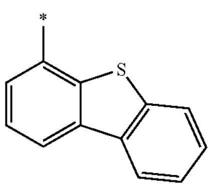 | 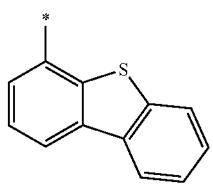 | C972 | C973 | C974 | C975 |
| 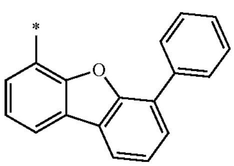 | 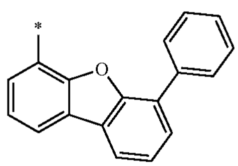 | C976 | C977 | C978 | C979 |
| 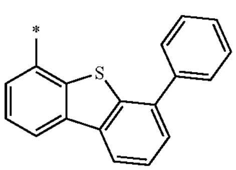 | 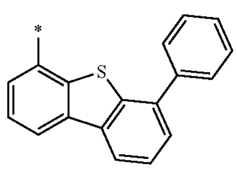 | C980 | C981 | C982 | C983 |
| 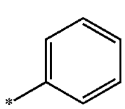 | 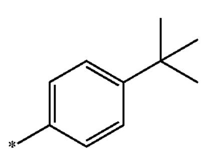 | C984 | C985 | C986 | C987 |
| 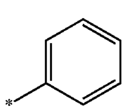 | 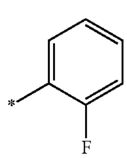 | C988 | C989 | C990 | C991 |

TABLE 3-11-continued
| | | $R_3$, $R_4$ | | | |
|---|---|---|---|---|---|
| | | 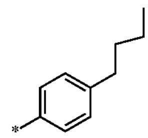 | 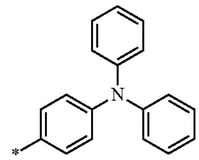 | 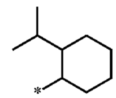 | 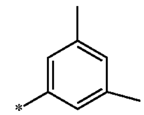 |
| $R_2$ | $R_5$ | | | | |
| 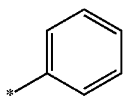 | 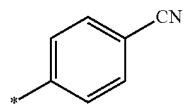 | C992 | C993 | C994 | C995 |
| 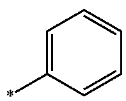 | 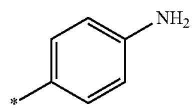 | C996 | C997 | C998 | C999 |
| 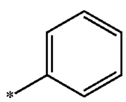 | 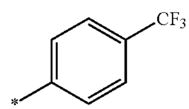 | C1000 | C1001 | C1002 | C1003 |
| 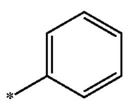 | 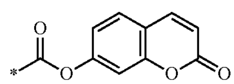 | C1004 | C1005 | C1006 | C1007 |
| 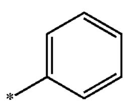 | 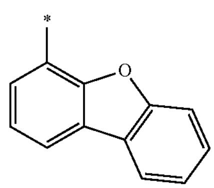 | C1008 | C1009 | C1010 | C1011 |
| 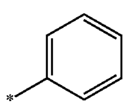 | 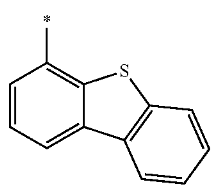 | C1012 | C1013 | C1014 | C1015 |
| 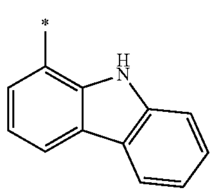 | 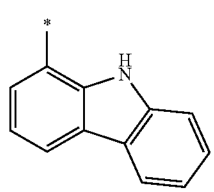 | C1016 | C1017 | C1018 | C1019 |

TABLE 3-12
| R₂ | R₅ | R₃, R₄ | | | |
|---|---|---|---|---|---|
| | | 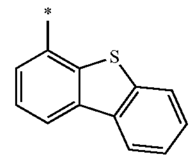 | 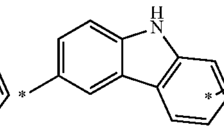 | 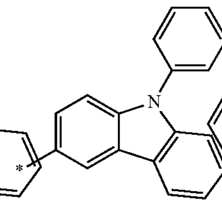 | 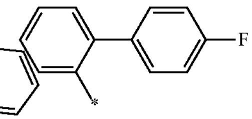 |
| 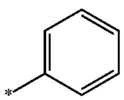 | 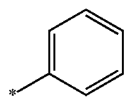 | C1020 | C1021 | C1022 | C1023 |
| 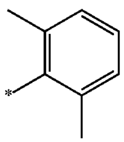 | 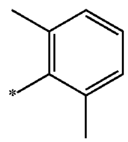 | C1024 | C1025 | C1026 | C1027 |
| 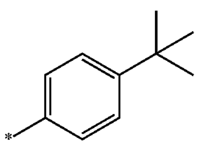 | 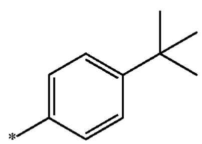 | C1028 | C1029 | C1030 | C1031 |
| 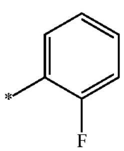 | 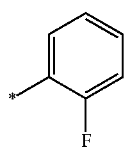 | C1032 | C1033 | C1034 | C1035 |
| 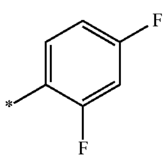 | 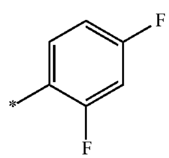 | C1036 | C1037 | C1038 | C1039 |

TABLE 3-12-continued
| R2 | R5 | R3, R4 | | | |
|---|---|---|---|---|---|
| | | 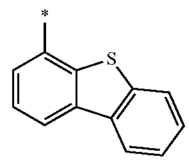 | 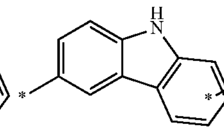 | 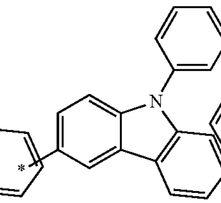 | 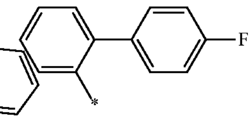 |
| 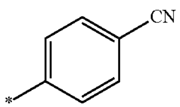 | 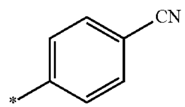 | C1040 | C1041 | C1042 | C1043 |
| 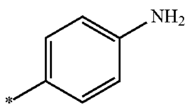 | 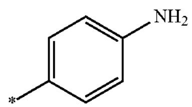 | C1044 | C1045 | C1046 | C1047 |
| 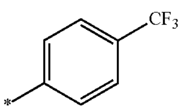 | 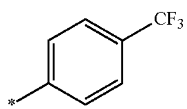 | C1048 | C1049 | C1050 | C1051 |
| 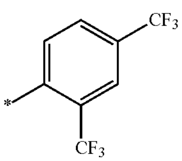 | 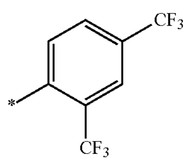 | C1052 | C1053 | C1054 | C1055 |
| 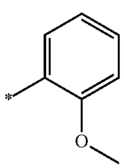 | 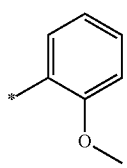 | C1056 | C1057 | C1058 | C1059 |
| 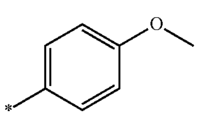 | 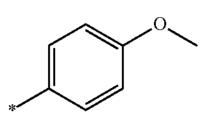 | C1060 | C1061 | C1062 | C1063 |

TABLE 3-12-continued
| | | R3, R4 | | | |
|---|---|---|---|---|---|
| $R_2$ | $R_5$ | 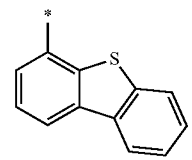 | 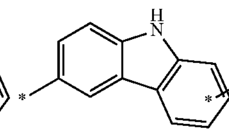 | 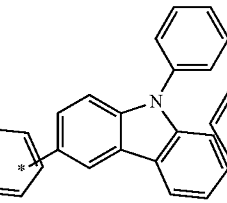 | 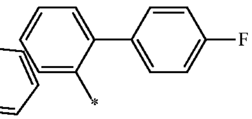 |
| 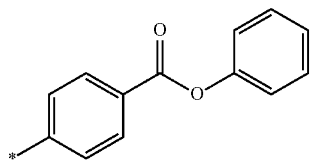 | 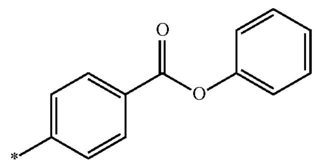 | C1064 | C1065 | C1066 | C1067 |
| 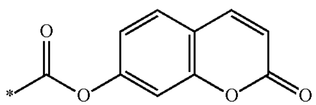 | 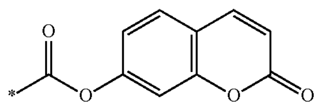 | C1068 | C1069 | C1070 | C1071 |
| 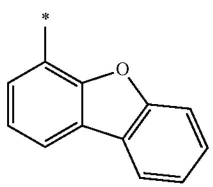 | 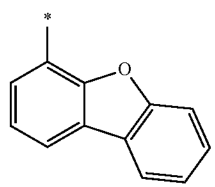 | C1072 | C1073 | C1074 | C1075 |
| 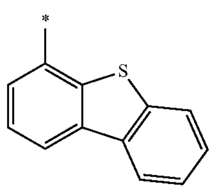 | 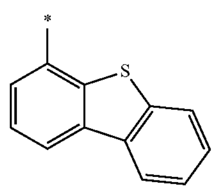 | C1076 | C1077 | C1078 | C1079 |

TABLE 3-12-continued
| R2 | R5 | R3, R4 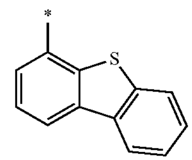 | 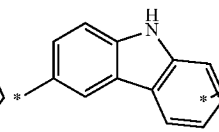 | 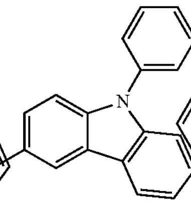 | 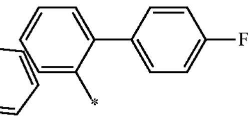 |
|---|---|---|---|---|---|
| 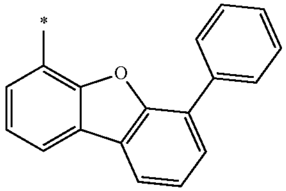 | 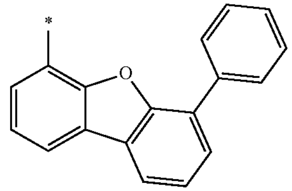 | C1080 | C1081 | C1082 | C1083 |
| 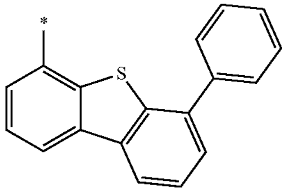 | 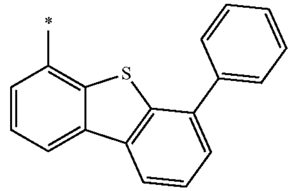 | C1084 | C1085 | C1086 | C1087 |
| 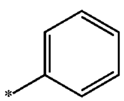 | 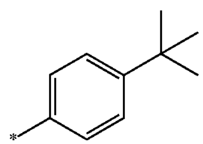 | C1088 | C1089 | C1090 | C1091 |
| 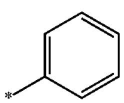 | 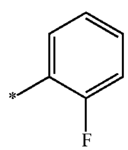 | C1092 | C1093 | C1094 | C1095 |

TABLE 3-12-continued
| | | R3, R4 | | | |
|---|---|---|---|---|---|
| R2 | R5 | 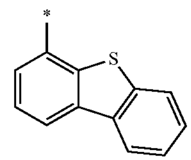 | 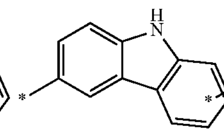 | 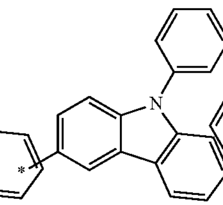 | 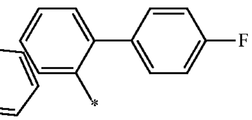 |
| 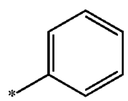 | 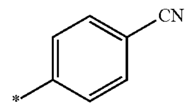 | C1096 | C1097 | C1098 | C1099 |
| 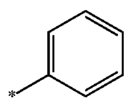 | 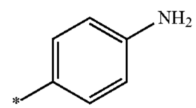 | C1100 | C1101 | C1102 | C1103 |
| 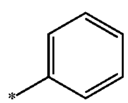 | 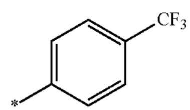 | C1104 | C1105 | C1106 | C1107 |
| 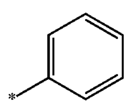 | 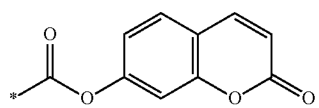 | C1108 | C1109 | C1110 | C1111 |
| 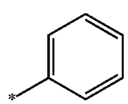 | 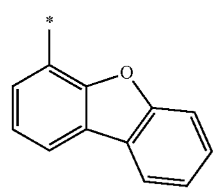 | C1112 | C1113 | C1114 | C1115 |

TABLE 3-12-continued
| R2 | R5 | R3, R4 | | | |
|---|---|---|---|---|---|
| | | 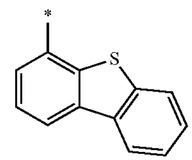 | 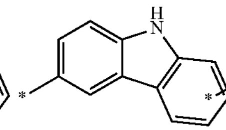 | 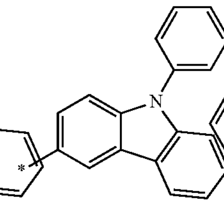 | 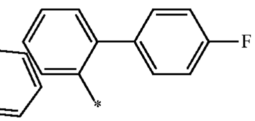 |
| 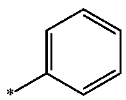 | 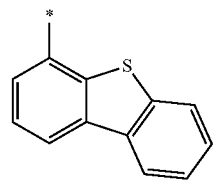 | C1116 | C1117 | C1118 | C1119 |
| 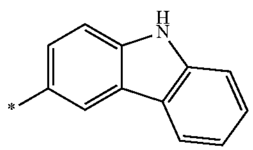 [SMILES: *c1ccc2[nH]c3ccccc3c2c1] | 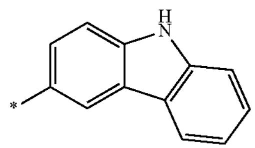 [SMILES: *c1ccc2[nH]c3ccccc3c2c1] | C1120 | C1121 | C1122 | C1123 |
| 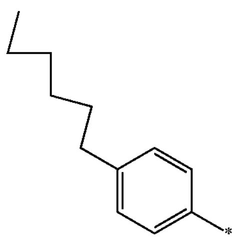 | 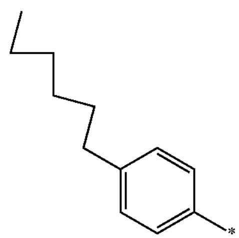 | C1124 | C1125 | C1126 | C1127 |

TABLE 3-12-continued
| R₂ | R₅ | R₃, R₄: 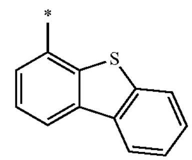 | 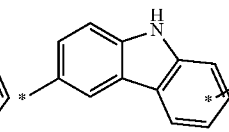 | 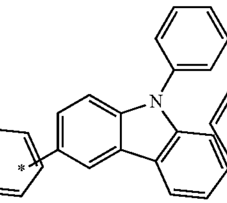 | 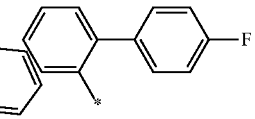 |
|---|---|---|---|---|---|
| 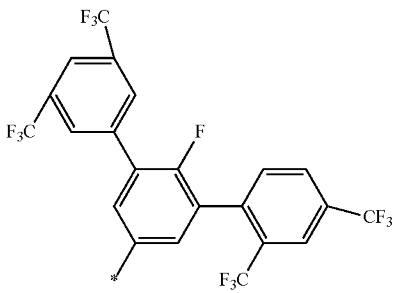 | 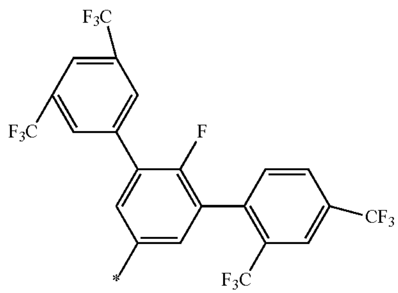 | C1128 | C1129 | C1130 | C1131 |
| 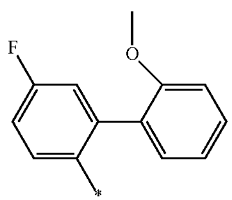 | 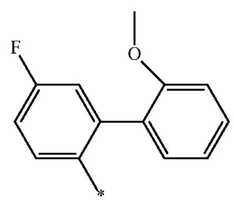 | C1132 | C1133 | C1134 | C1135 |
| 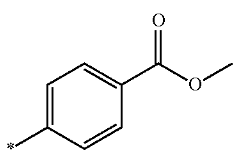 | 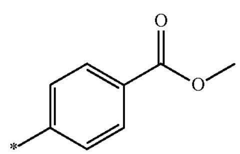 | C1136 | C1137 | C1138 | C1139 |

TABLE 3-12-continued
| R2 | R5 | R3, R4 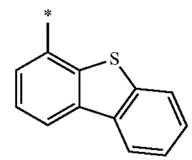 | 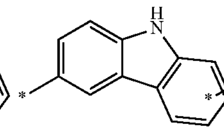 | 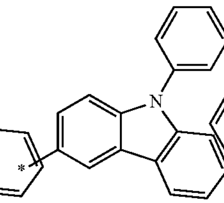 | 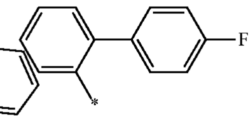 |
|---|---|---|---|---|---|
| 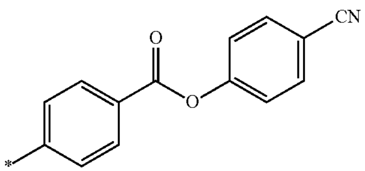 | 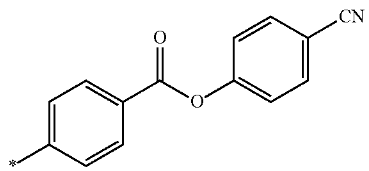 | C1140 | C1141 | C1142 | C1143 |
| 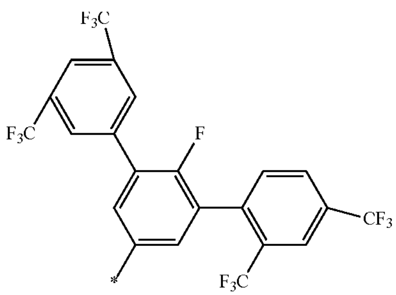 | 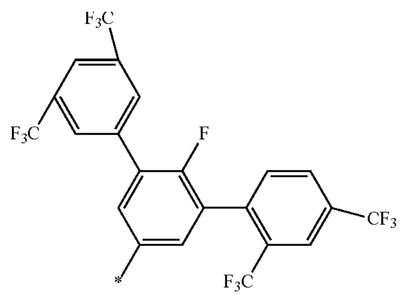 | C1144 | C1145 | C1146 | C1147 |
| 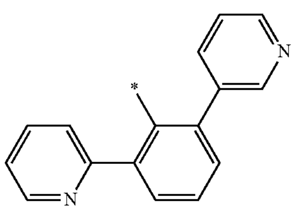 | 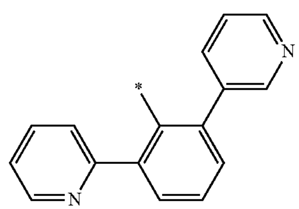 | C1148 | C1149 | C1150 | C1151 |

TABLE 3-12-continued
| R2 | R5 | R3, R4 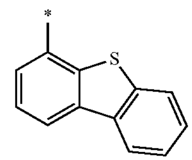 | 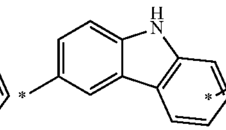 | 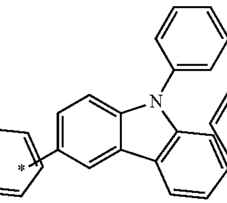 | 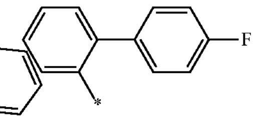 |
| --- | --- | --- | --- | --- | --- |
| 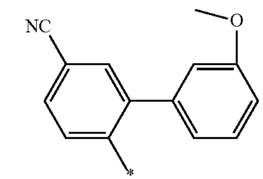 | 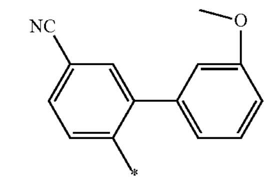 | C1152 | C1153 | C1154 | C1155 |
| 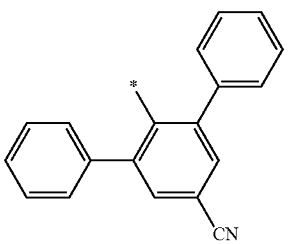 | 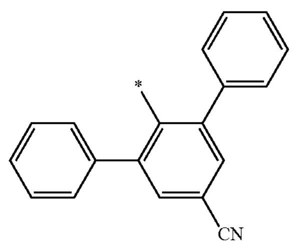 | C1156 | C1157 | C1158 | C1159 |
| 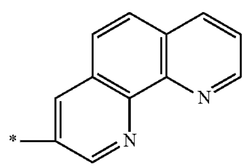 | 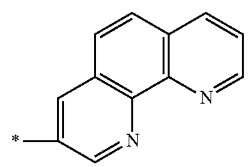 | C1160 | C1161 | C1162 | C1163 |

TABLE 3-12-continued
| | | R3, R4 | | | |
|---|---|---|---|---|---|
| | | 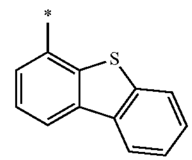 | 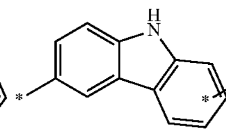 | 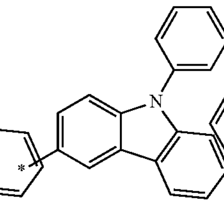 | 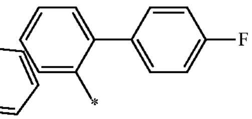 |
| R2 | R5 | C1164 | C1165 | C1166 | C1167 |
| 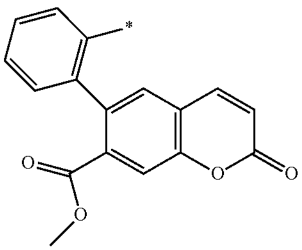 | 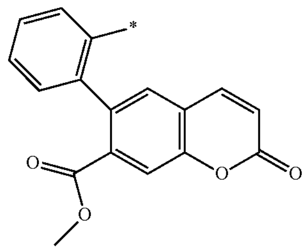 | | | | |

TABLE 3-13
| | | R₃, R₄ | | | |
|---|---|---|---|---|---|
| R₂ | R₅ | 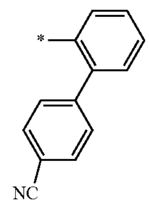 | 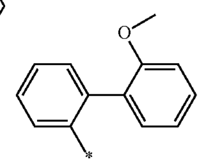 | 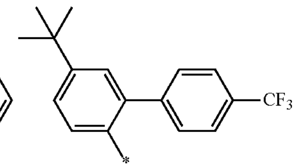 | 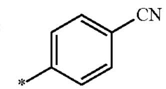 |
| 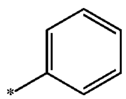 | 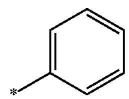 | C1168 | C1169 | C1170 | C1171 |
| 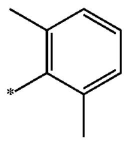 | 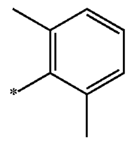 | C1172 | C1173 | C1174 | C1175 |
| 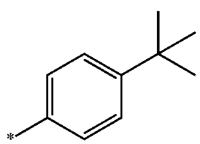 | 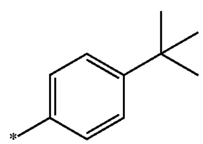 | C1176 | C1177 | C1178 | C1179 |
| 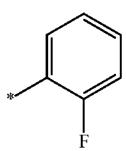 | 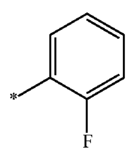 | C1180 | C1181 | C1182 | C1183 |
| 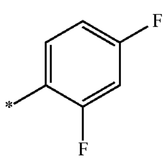 | 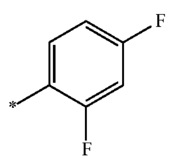 | C1184 | C1185 | C1186 | C1187 |

TABLE 3-13-continued
| | | R3, R4 | | | |
|---|---|---|---|---|---|
| $R_2$ | $R_5$ | 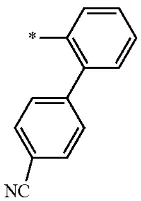 | 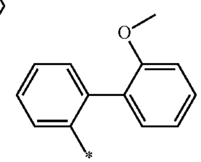 | 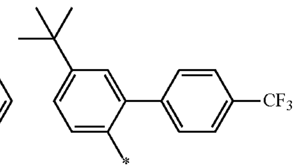 | 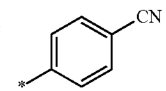 |
| 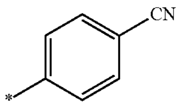 | 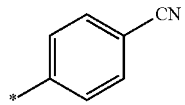 | C1188 | C1189 | C1190 | C1191 |
| 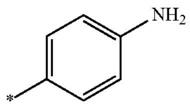 | 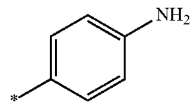 | C1192 | C1193 | C1194 | C1195 |
| 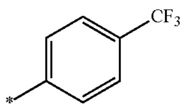 | 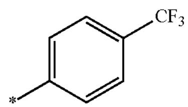 | C1196 | C1197 | C1198 | C1199 |
| 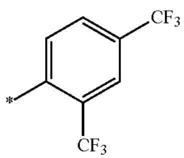 | 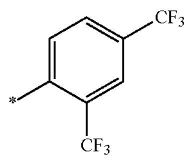 | C1200 | C1201 | C1202 | C1203 |
| 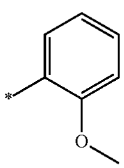 | 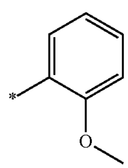 | C1204 | C1205 | C1206 | C1207 |
| 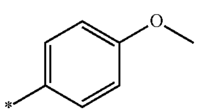 | 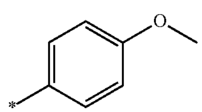 | C1208 | C1209 | C1210 | C1211 |

TABLE 3-13-continued
| R$_2$ | R$_5$ | R$_3$, R$_4$ | | | |
|---|---|---|---|---|---|
| | | 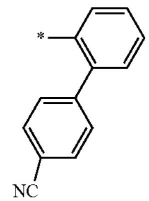 | 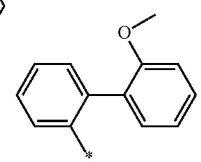 | 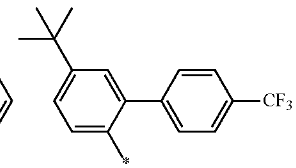 | 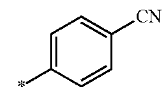 |
| 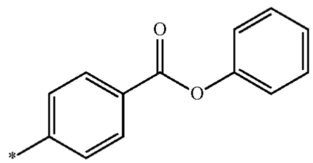 | 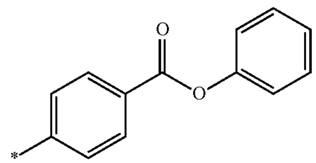 | C1212 | C1213 | C1214 | C1215 |
| 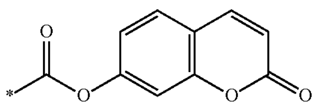 | 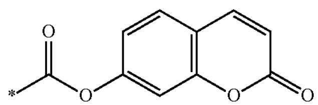 | C1216 | C1217 | C1218 | C1219 |
| 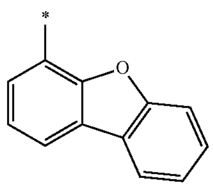 | 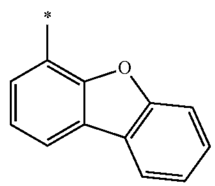 | C1220 | C1221 | C1222 | C1223 |
| 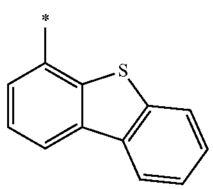 | 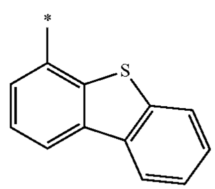 | C1224 | C1225 | C1226 | C1227 |

TABLE 3-13-continued
| | | $R_3$, $R_4$ | | | |
|---|---|---|---|---|---|
| $R_2$ | $R_5$ | 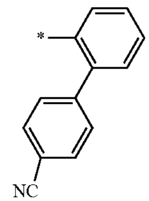 | 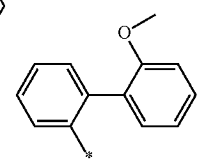 | 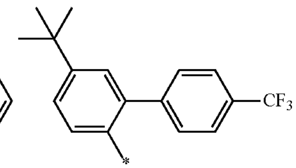 | 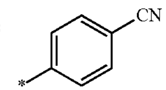 |
| 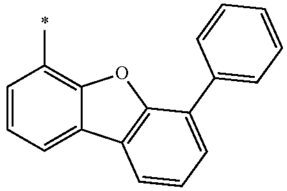 | 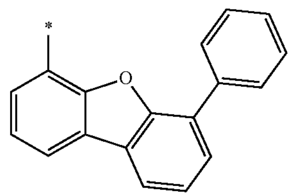 | C1228 | C1229 | C1230 | C1231 |
| 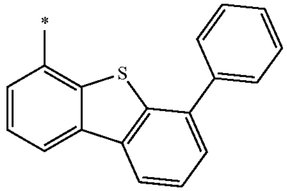 | 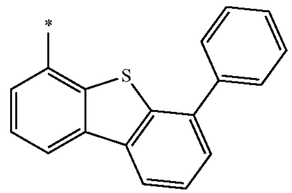 | C1232 | C1233 | C1234 | C1235 |
| 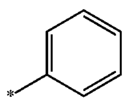 | 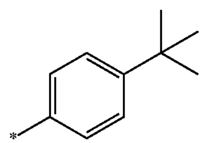 | C1236 | C1237 | C1238 | C1239 |
| 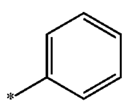 | 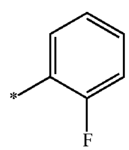 | C1240 | C1241 | C1242 | C1243 |

TABLE 3-13-continued
| $R_2$ | $R_5$ | $R_3$, $R_4$ | | | |
|---|---|---|---|---|---|
| | | 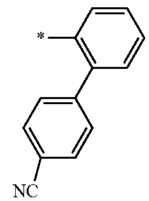 | 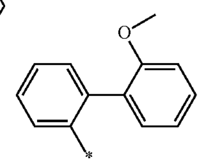 | 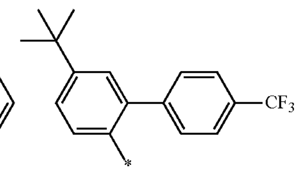 | 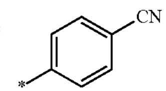 |
| 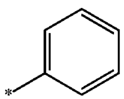 | 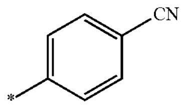 | C1244 | C1245 | C1246 | C1247 |
| 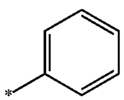 | 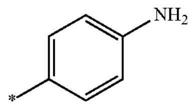 | C1248 | C1249 | C1250 | C1251 |
| 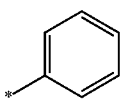 | 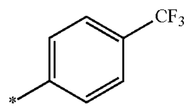 | C1252 | C1253 | C1254 | C1255 |
| 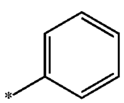 | 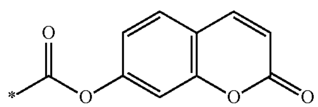 | C1256 | C1257 | C1258 | C1259 |
| 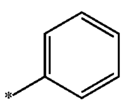 | 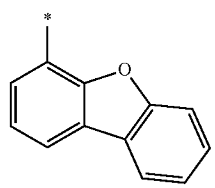 | C1260 | C1261 | C1262 | C1263 |

TABLE 3-13-continued
| R$_2$ | R$_5$ | R$_3$, R$_4$ | | | |
|---|---|---|---|---|---|
| | | 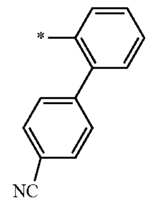 | 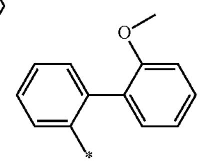 | 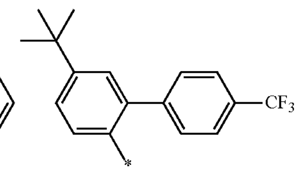 | 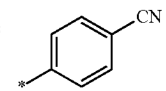 |
| 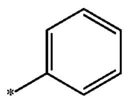 | 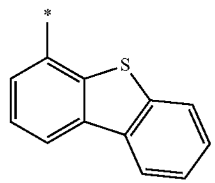 | C1264 | C1265 | C1266 | C1267 |
| 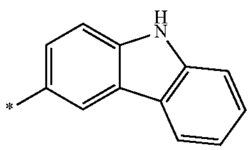 [SMILES: *c1ccc2[nH]c3ccccc3c2c1] | 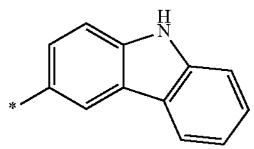 [SMILES: *c1ccc2[nH]c3ccccc3c2c1] | C1268 | C1269 | C1270 | C1271 |
| 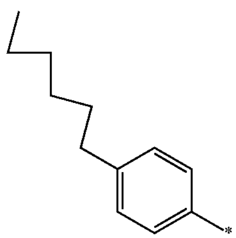 | 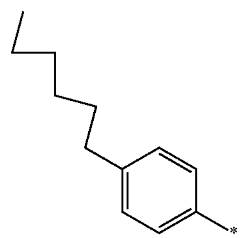 | C1272 | C1273 | C1274 | C1275 |

TABLE 3-13-continued
| R2 | R5 | R3, R4 | | | |
|---|---|---|---|---|---|
| | | 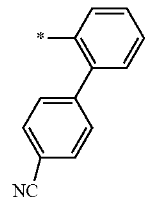 | 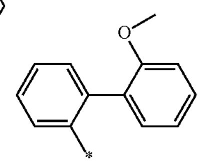 | 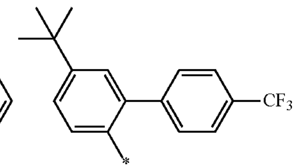 | 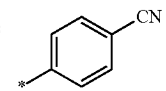 |
| 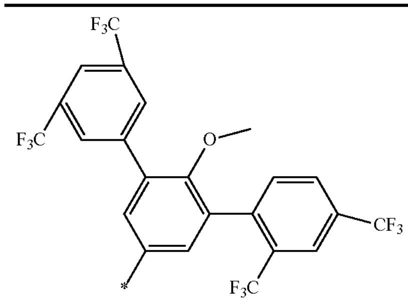 | 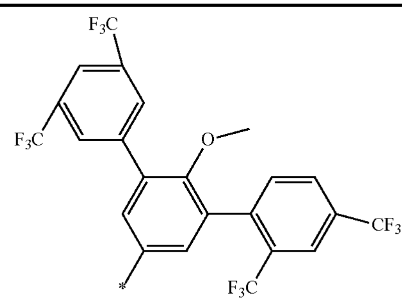 | C1276 | C1277 | C1278 | C1279 |
| 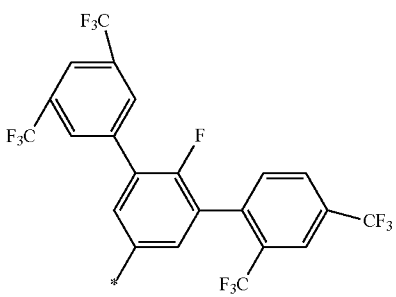 | 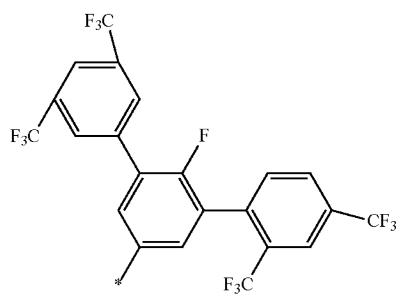 | C1280 | C1281 | C1282 | C1283 |
| 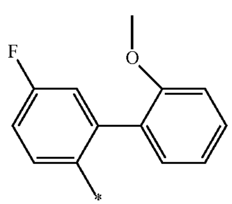 | 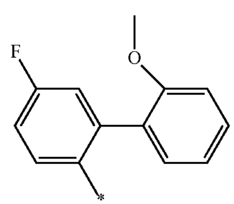 | C1284 | C1285 | C1286 | C1287 |

TABLE 3-13-continued
| R2 | R5 | R3, R4 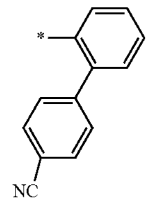 | 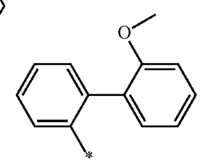 | 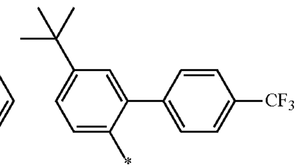 | 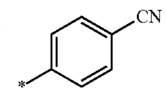 |
|---|---|---|---|---|---|
| 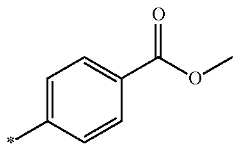 | 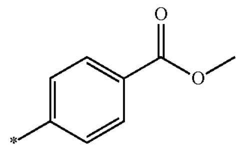 | C1288 | C1289 | C1290 | C1291 |
| 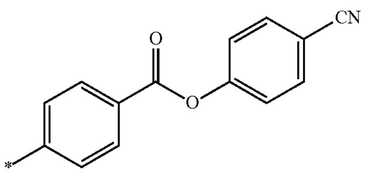 | 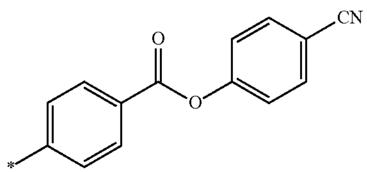 | C1292 | C1293 | C1294 | C1295 |
| 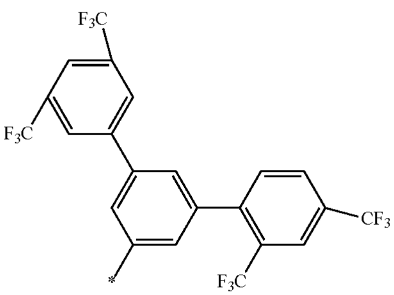 | 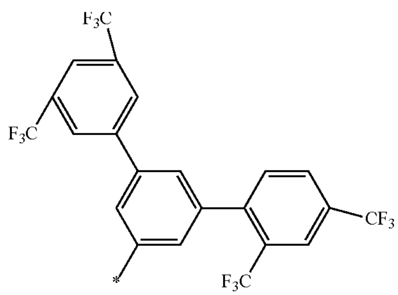 | C1296 | C1297 | C1298 | C1299 |

TABLE 3-13-continued
| R2 | R5 | R3, R4 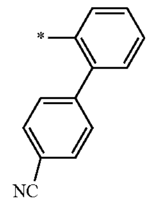 | 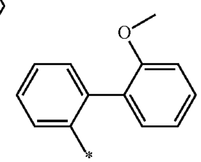 | 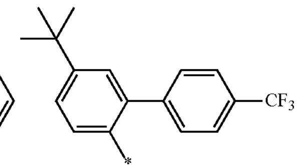 | 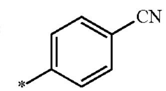 |
|---|---|---|---|---|---|
| 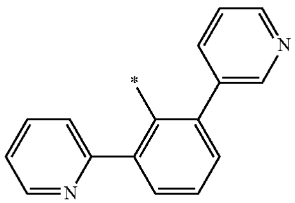 | 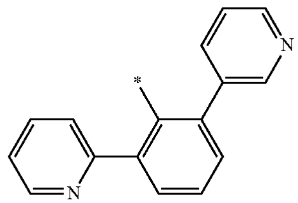 | C1300 | C1301 | C1302 | C1303 |
| 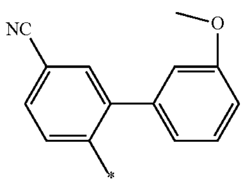 | 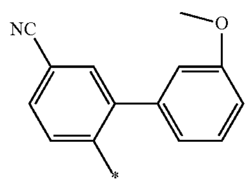 | C1304 | C1305 | C1306 | C1307 |
| 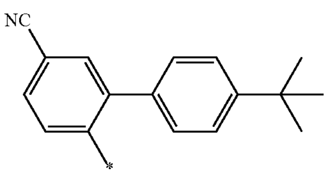 | 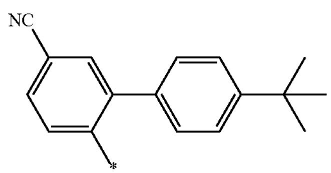 | C1308 | C1309 | C1310 | C1311 |
| 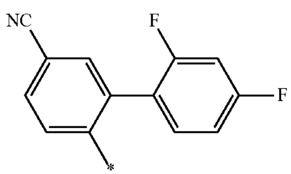 | 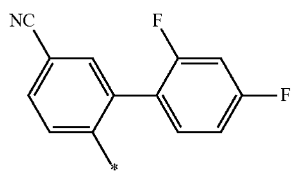 | C1312 | C1313 | C1314 | C1315 |

TABLE 3-13-continued
| R2 | R5 | R3, R4 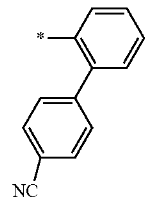 | 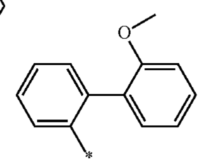 | 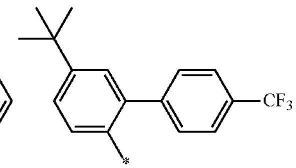 | 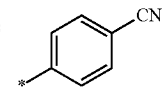 |
|---|---|---|---|---|---|
| 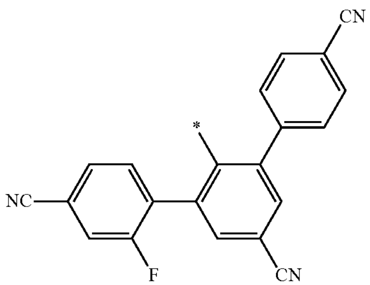 | 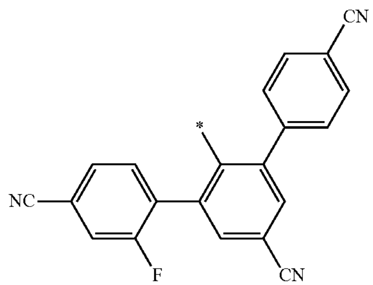 | C1316 | C1317 | C1318 | C1319 |
| 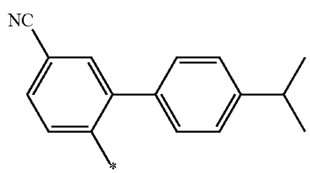 | 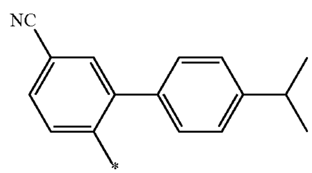 | C1320 | C1321 | C1322 | C1323 |
| 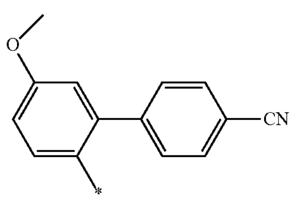 | 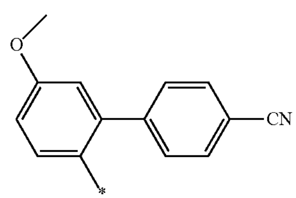 | C1324 | C1325 | C1326 | C1327 |

TABLE 3-13-continued
| $R_2$ | $R_5$ | $R_3$, $R_4$: 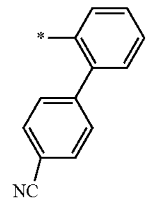 | 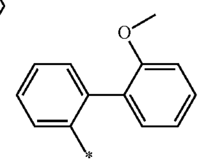 | 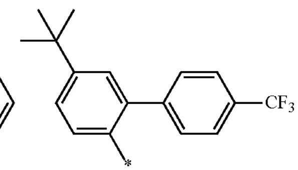 | 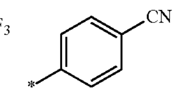 |
|---|---|---|---|---|---|
| 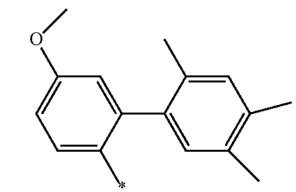 | 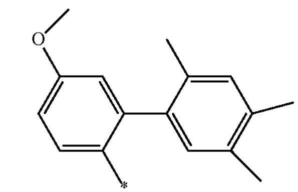 | C1328 | C1329 | C1330 | C1331 |
| 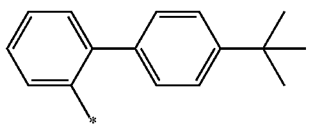 | 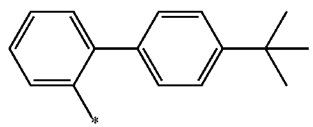 | C1332 | C1333 | C1334 | C1335 |
| 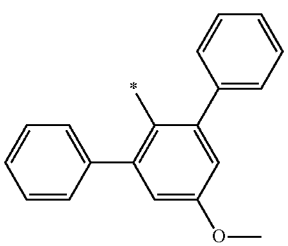 | 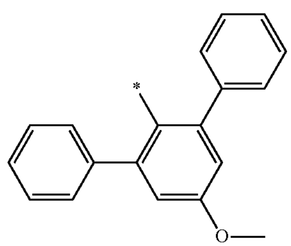 | C1336 | C1337 | C1338 | C1339 |
| 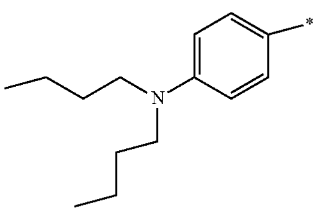 | 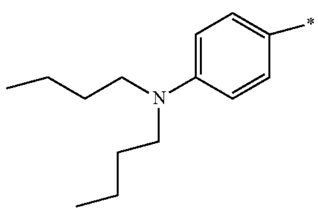 | C1340 | C1341 | C1342 | C1343 |

TABLE 3-13-continued
| R₂ | R₅ | R₃, R₄ | | | |
|---|---|---|---|---|---|
| | | 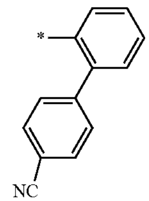 | 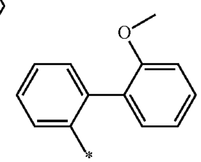 | 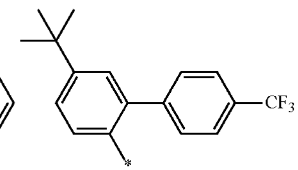 | 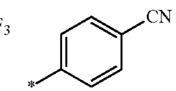 |
| | | C1344 | C1345 | C1346 | C1347 |
| 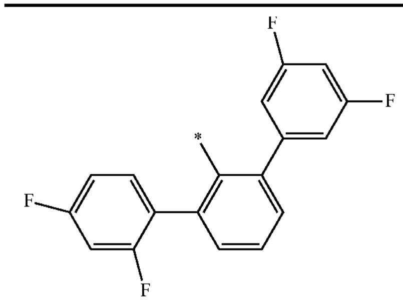 | 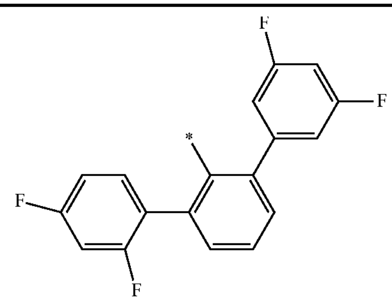 | | | | |

TABLE 3-14
| | | R3, R4 | |
|---|---|---|---|
| R2 | R5 | 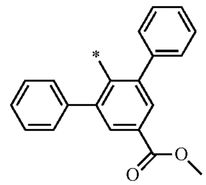 | 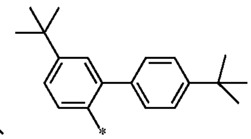 |
| 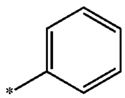 | 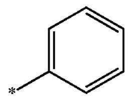 | C1348 | C1349 |
| 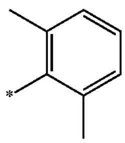 | 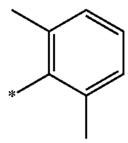 | C1350 | C1351 |
| 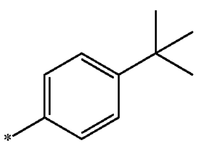 | 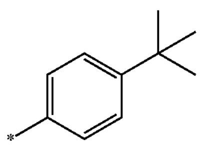 | C1352 | C1353 |
| 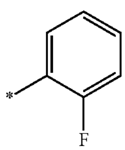 | 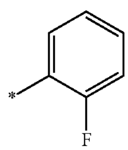 | C1354 | C1355 |
| 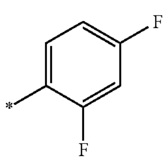 | 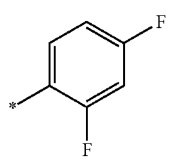 | C1356 | C1357 |
| 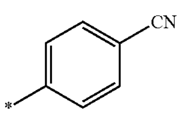 | 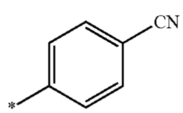 | C1358 | C1369 |
| 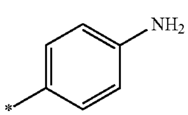 | 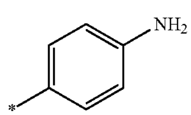 | C1360 | C1361 |
| 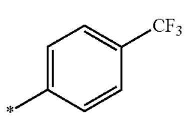 | 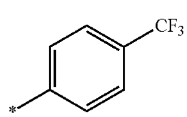 | C1362 | C1363 |
| 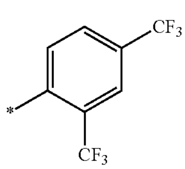 | 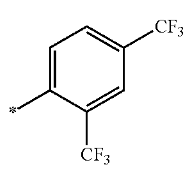 | C1364 | C1365 |

TABLE 3-14-continued
| $R_2$ | $R_5$ | $R_3$, $R_4$ 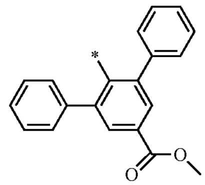 | 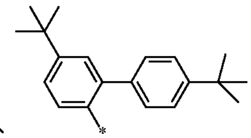 |
|---|---|---|---|
| 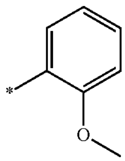 | 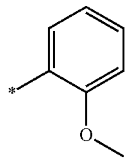 | C1366 | C1367 |
| 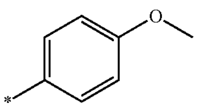 | 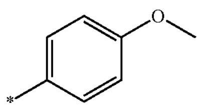 | C1368 | C1369 |
| 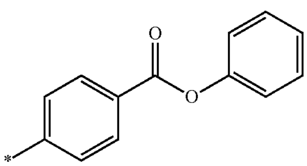 | 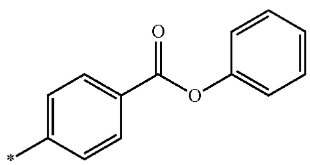 | C1370 | C1371 |
| 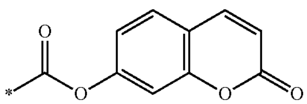 | 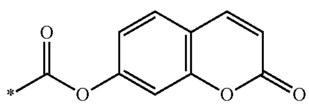 | C1372 | C1373 |
| 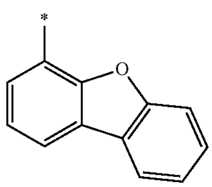 | 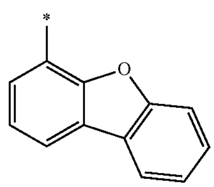 | C1374 | C1375 |
| 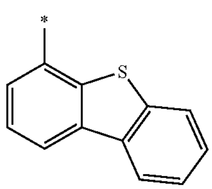 | 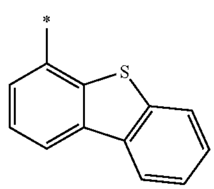 | C1376 | C1377 |
| 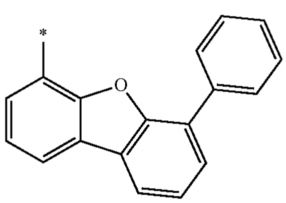 | 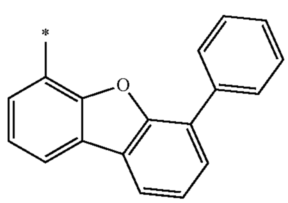 | C1378 | C1379 |
| 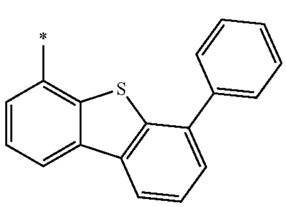 | 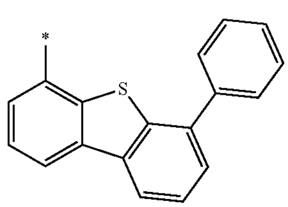 | C1380 | C1381 |

TABLE 3-14-continued
| R2 | R5 | R3, R4 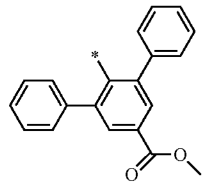 | R3, R4 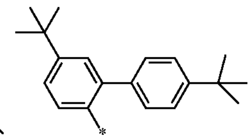 |
| --- | --- | --- | --- |
| 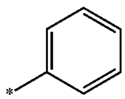 | 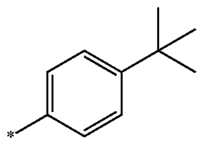 | C1382 | C1383 |
| 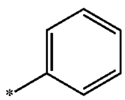 | 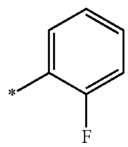 | C1384 | C1385 |
| 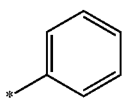 | 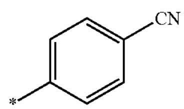 | C1386 | C1387 |
| 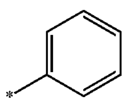 | 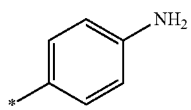 | C1388 | C1389 |
| 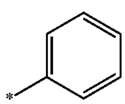 | 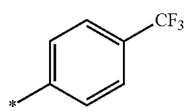 | C1390 | C1391 |
| 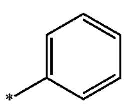 | 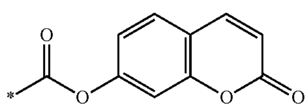 | C1392 | C1393 |
| 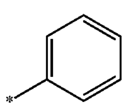 | 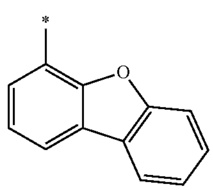 | C1394 | C1395 |
| 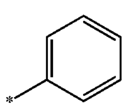 | 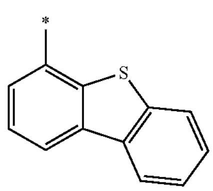 | C1396 | C1397 |
| 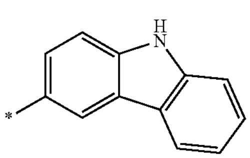 [SMILES: *c1ccc2[nH]c3ccccc3c2c1] | 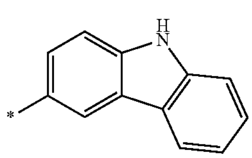 [SMILES: *c1ccc2[nH]c3ccccc3c2c1] | C1398 | C1399 |

TABLE 3-14-continued
| | | R3, R4 | |
|---|---|---|---|
| R2 | R5 | 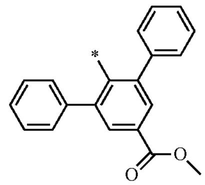 | 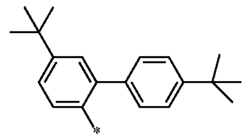 |
| 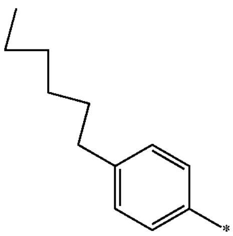 | 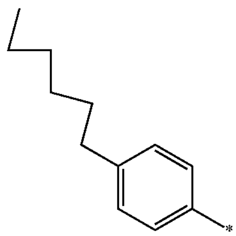 | C1400 | C1401 |
| 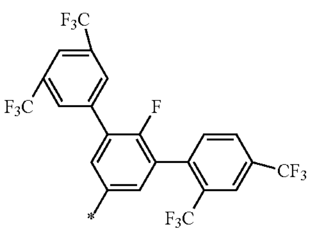 | 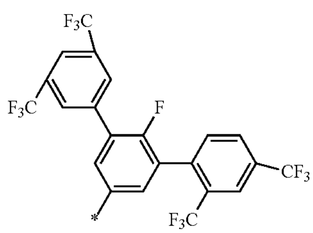 | C1402 | C1403 |
| 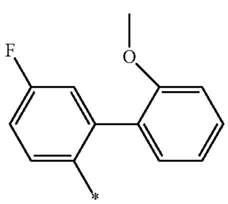 | 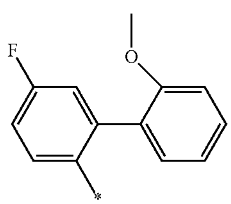 | C1404 | C1405 |
| 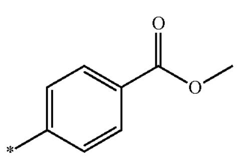 | 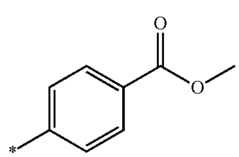 | C1406 | C1407 |
| 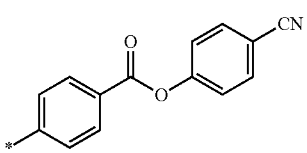 | 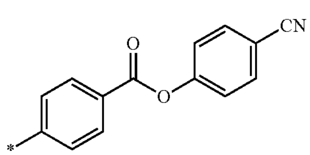 | C1408 | C1409 |
| 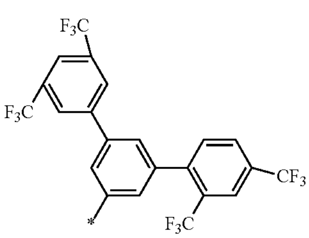 | 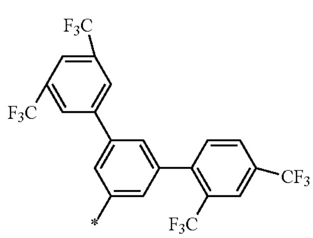 | C1410 | C1411 |

TABLE 3-14-continued
| | | R3, R4 | |
|---|---|---|---|
| R2 | R5 | 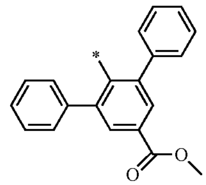 | 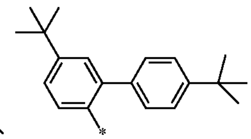 |
| 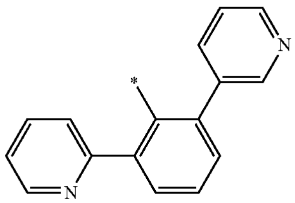 | 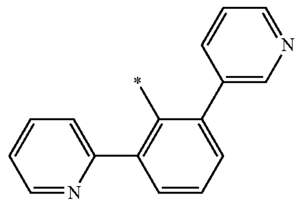 | C1412 | C1413 |
| 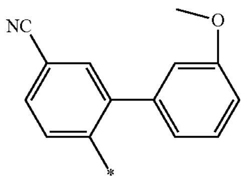 | 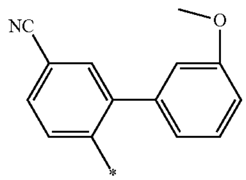 | C1414 | C1415 |
| 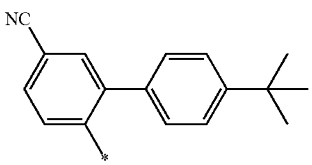 | 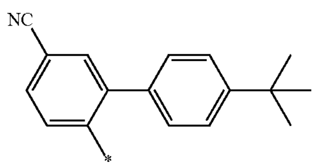 | C1416 | C1417 |
| 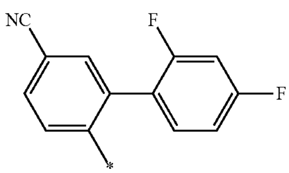 | 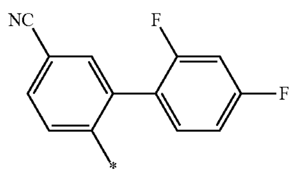 | C1418 | C1419 |
| 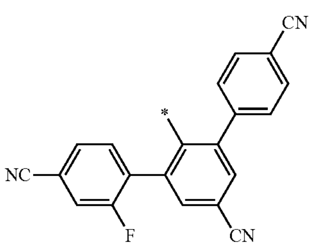 | 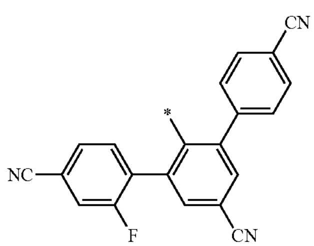 | C1420 | C1421 |
| 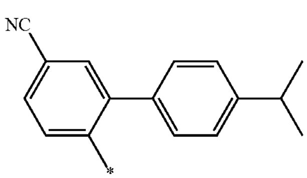 | 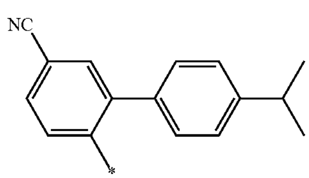 | C1422 | C1423 |
| 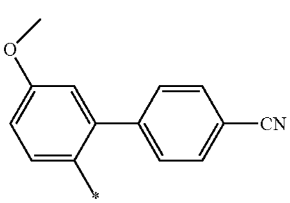 | 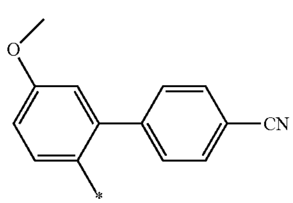 | C1424 | C1425 |

TABLE 3-14-continued

| R₂ | R₅ | R₃, R₄ 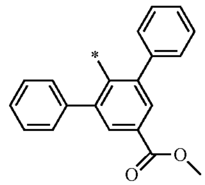 | 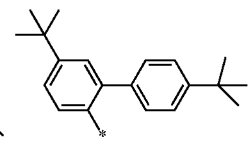 |
| --- | --- | --- | --- |
| 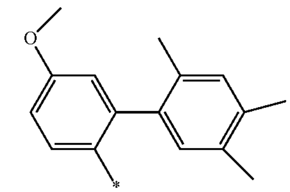 | 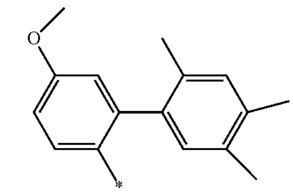 | C1426 | C1427 |
| 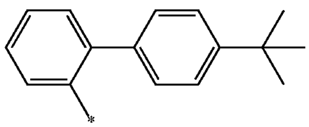 | 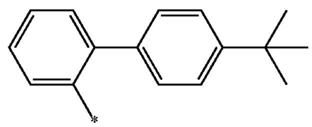 | C1428 | C1429 |
| 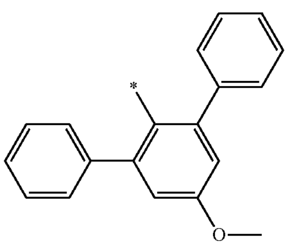 | 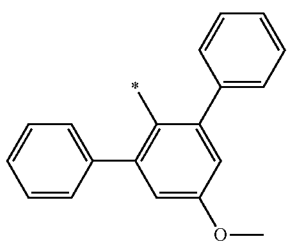 | C1430 | C1431 |
| 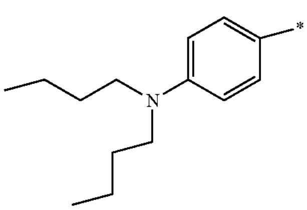 | 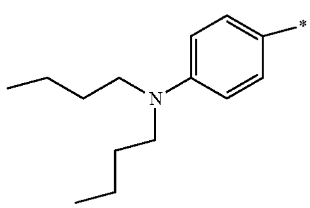 | C1432 | C1433 |
| 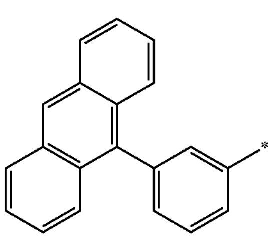 | 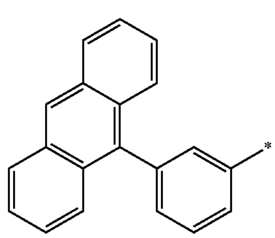 | C1434 | C1435. |

8. A color conversion film comprising:

a resin matrix; and the compound according to claim 1 dispersed in the resin matrix.

9. A backlight unit comprising the color conversion film according to 8.

10. A display apparatus comprising the backlight unit according to claim 9.

11. The color conversion film according to claim 8, wherein a material for the resin matrix is a thermoplastic polymer or a thermocurable polymer.

12. The color conversion film according to claim 11, wherein the material is a resin selected from the group consisting of a poly(meth)acryl-based resin, a polycarbonate (PC)-based, a polystyrene (PS)-based, a polyarylene (PAR)-based, a polyurethane (TPU)-based, a styrene-acrylonitrile (SAN)-based, a polyvinylidene fluoride (PVDF)-based, and a modified polyvinylidene fluoride (modified-PVDF)-based resin.

13. The compound according to claim 1, wherein the Chemical Formula 1 is represented by any one of the following Chemical Formulae 1-1 to 1-4:

[Chemical Formula 1-1]

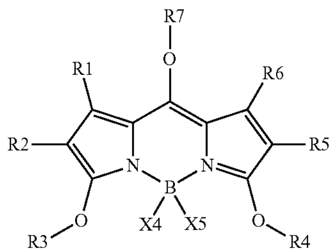

[Chemical Formula 1-2]

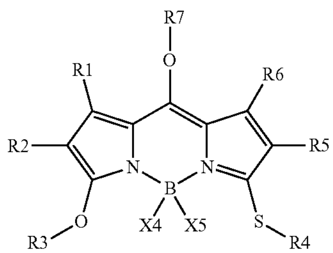

-continued

[Chemical Formula 1-3]

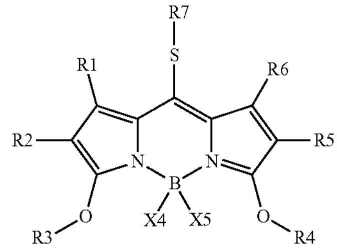

[Chemical Formula 1-4]

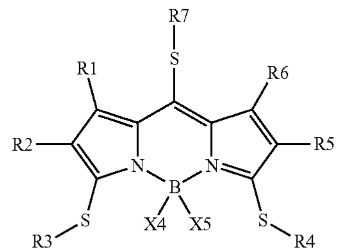

in Chemical Formulae 1-1 to 1-4,

R1 to R7, X4 and X5 have the same definitions as in Chemical Formula 1.

* * * * *